(12) United States Patent
Bryant

(10) Patent No.: US 6,951,211 B2
(45) Date of Patent: Oct. 4, 2005

(54) COLD AIR SUPER-CHARGED INTERNAL COMBUSTION ENGINE, WORKING CYCLE AND METHOD

(76) Inventor: Clyde C. Bryant, 410 Trammell Dr., Alpharetta, GA (US) 30004

(*) Notice: Subject to any disclaimer, the term of this patent is extended or adjusted under 35 U.S.C. 154(b) by 0 days.

(21) Appl. No.: 10/385,588

(22) Filed: Mar. 11, 2003

(65) Prior Publication Data

US 2004/0123849 A1 Jul. 1, 2004

Related U.S. Application Data

(63) Continuation-in-part of application No. 10/206,847, filed on Jul. 26, 2002, now abandoned, which is a continuation-in-part of application No. 09/632,739, filed on Aug. 4, 2000, which is a continuation of application No. 08/863,103, filed on May 23, 1997, now Pat. No. 6,279,550, which is a continuation-in-part of application No. 08/841,488, filed on Apr. 23, 1997, now abandoned, which is a continuation-in-part of application No. 09/757,772, filed on Jan. 9, 2001, now abandoned, said application No. 10/385,588, is a continuation-in-part of application No. 10/029,224, filed on Dec. 20, 2001, now abandoned.

(60) Provisional application No. 60/022,102, filed on Jul. 17, 1996, provisional application No. 60/023,460, filed on Aug. 6, 1996, provisional application No. 60/029,260, filed on Oct. 25, 1996, provisional application No. 60/040,630, filed on Mar. 7, 1997, provisional application No. 60/175,597, filed on Jan. 11, 2000, provisional application No. 60/259,727, filed on Jan. 4, 2001, provisional application No. 60/278,030, filed on Mar. 22, 2001, provisional application No. 60/284,711, filed on Apr. 18, 2001, provisional application No. 60/296,620, filed on Jun. 7, 2001, provisional application No. 60/297,663, filed on Jun. 12, 2001, provisional application No. 60/340,728, filed on Oct. 22, 2001, provisional application No. 60/340,609, filed on Dec. 14, 2001, and provisional application No. 60/374,392, filed on Apr. 22, 2002.

(51) Int. Cl.$^7$ .................................................. F02B 33/00
(52) U.S. Cl. .................. 123/559.1; 123/316; 123/432
(58) Field of Search .............................. 123/559.1, 564, 123/316, 432, 213, 216

(56) References Cited

U.S. PATENT DOCUMENTS

| | | | |
|---|---|---|---|
| 1,562,692 A | 11/1925 | De Rochefort-Lucay | ... 123/432 |
| 1,825,817 A | 10/1931 | Patterson | ................. 123/559.1 |
| 1,963,780 A | 6/1934 | Du Bois | .................... 60/605.1 |
| 2,202,227 A | 5/1940 | Noland | |

(Continued)

FOREIGN PATENT DOCUMENTS

DE  29 30 124 A1  2/1981

(Continued)

OTHER PUBLICATIONS

Diesel Engine Reference Book—LCR Lilly—Butterworth & Co.—1984.

(Continued)

*Primary Examiner*—Michael Koczo, Jr.
(74) *Attorney, Agent, or Firm*—Womble Carlyle Sandridge & Rice PLLC

(57) ABSTRACT

Working cycle for internal combustion engines, with methods and apparatuses for managing combustion charge density, temperature, pressures and turbulence (among other characteristics). At least one embodiment describes a supercharged internal combustion engine in which a supercharging portion of air is compressed, cooled and injected late in the compression process. A sub-normal compression ratio or low "effective" compression ratio initial air charge is received by a cylinder/compression chamber on the engine intake process, which during compression produces only a fraction of heat-of-compression as that produced by a conventional engine. During compression process, dense, cooled supercharging air charge is injected, adding density and turbulence above that of conventional engines with low "effective" compression ratio for this portion of air charge also. Compression continues and near piston top dead center, the air charge being mixed with fuel is ignited for power pulse followed by scavenging.

28 Claims, 37 Drawing Sheets

U.S. PATENT DOCUMENTS

| | | | |
|---|---|---|---|
| 2,292,233 A | 8/1942 | Lysholm | 123/316 |
| 2,344,993 A | 3/1944 | Lysholm | 123/105 |
| 2,391,176 A * | 12/1945 | Mallory | 123/432 |
| 2,453,377 A | 11/1948 | Lozivit | 123/432 |
| 2,522,456 A | 9/1950 | Mallory | 123/432 |
| 2,594,845 A | 4/1952 | Baumann | 60/13 |
| 2,644,436 A | 7/1953 | Berlyn | |
| 2,670,595 A | 3/1954 | Miller | 60/13 |
| 2,773,490 A | 12/1956 | Miller | 123/316 |
| 3,015,934 A | 1/1962 | Miller | 123/316 |
| 3,186,388 A | 6/1965 | Bricout | 60/605.1 |
| 3,250,068 A | 5/1966 | Vulliamy | |
| 3,257,797 A | 6/1966 | Lieberherr | |
| 3,266,234 A | 8/1966 | Cook | 60/605.1 |
| 3,405,692 A | 10/1968 | Hanns-Dieter | |
| 3,964,451 A | 6/1976 | Goto | 123/432 |
| 4,020,809 A | 5/1977 | Kern et al. | |
| 4,033,304 A | 7/1977 | Luria | |
| 4,050,435 A | 9/1977 | Fuller, Jr. et al. | |
| 4,132,213 A | 1/1979 | Weaver | |
| 4,149,493 A | 4/1979 | Franke | 123/432 |
| 4,161,166 A | 7/1979 | Roznovsky | |
| 4,180,035 A | 12/1979 | Saiki et al. | |
| 4,206,728 A | 6/1980 | Trenne | |
| 4,315,488 A | 2/1982 | Tadokoro et al. | |
| 4,344,289 A | 8/1982 | Curiel et al. | |
| 4,387,672 A | 6/1983 | Crocker | |
| 4,423,709 A | 1/1984 | Arrieta | |
| 4,424,790 A | 1/1984 | Curtil | |
| 4,474,008 A | 10/1984 | Sakurai et al. | |
| 4,520,774 A | 6/1985 | Sitter | |
| 4,527,534 A | 7/1985 | Sakurai et al. | 123/432 |
| 4,554,890 A | 11/1985 | Okimoto et al. | 123/432 |
| 4,561,253 A | 12/1985 | Curtil | |
| 4,565,167 A | 1/1986 | Bryant | 123/70 |
| 4,566,422 A | 1/1986 | Tadokoro et al. | 123/432 |
| 4,572,114 A | 2/1986 | Sickler | |
| 4,633,844 A | 1/1987 | Okimoto | 123/432 |
| 4,643,049 A | 2/1987 | Nishikawa et al. | |
| 4,730,457 A | 3/1988 | Yamada et al. | 60/609 |
| 4,759,188 A | 7/1988 | Schatz | 60/605.1 |
| 4,815,423 A | 3/1989 | Holmer | |
| 4,833,971 A | 5/1989 | Kubik | |
| 4,841,936 A | 6/1989 | Takahashi | |
| 4,903,488 A | 2/1990 | Shibata | 60/609 |
| 4,934,344 A | 6/1990 | Perr | |
| 4,959,961 A | 10/1990 | Hiereth | 60/612 |
| 5,000,145 A | 3/1991 | Quenneville | |
| 5,012,778 A | 5/1991 | Pitzi | |
| 5,119,795 A | 6/1992 | Goto et al. | 123/563 |
| 5,191,867 A | 3/1993 | Glassey | |
| 5,251,595 A | 10/1993 | Wei-Min | |
| 5,255,641 A | 10/1993 | Schechter | |
| 5,327,856 A | 7/1994 | Schroeder et al. | |
| 5,327,858 A | 7/1994 | Hausknecht | |
| 5,333,456 A | 8/1994 | Bollinger | |
| 5,335,633 A | 8/1994 | Thien | |
| 5,363,816 A | 11/1994 | Yorita et al. | |
| 5,379,743 A | 1/1995 | Stokes et al. | |
| 5,408,979 A | 4/1995 | Backlund et al. | |
| 5,445,128 A | 8/1995 | Letang et al. | |
| 5,456,222 A | 10/1995 | Schechter | |
| 5,479,890 A | 1/1996 | Hu et al. | |
| 5,515,818 A | 5/1996 | Born | |
| 5,520,161 A | 5/1996 | Klopp | |
| 5,546,914 A | 8/1996 | Scheinert | |
| 5,549,095 A | 8/1996 | Goto et al. | |
| 5,564,386 A | 10/1996 | Korte et al. | |
| 5,586,526 A | 12/1996 | Lindquist | |
| 5,586,531 A | 12/1996 | Vittorio | |
| 5,611,204 A | 3/1997 | Radovanovic et al. | |
| 5,615,646 A | 4/1997 | Feucht | |
| 5,619,965 A | 4/1997 | Cosma et al. | |
| 5,645,030 A | 7/1997 | Letsche | |
| 5,649,516 A | 7/1997 | Laveran | 123/563 |
| 5,680,841 A | 10/1997 | Hu | |
| 5,682,854 A | 11/1997 | Ozawa | |
| 5,713,331 A | 2/1998 | Eisenbacher et al. | |
| 5,718,199 A | 2/1998 | Hu et al. | |
| 5,724,939 A | 3/1998 | Faletti et al. | |
| 5,732,678 A | 3/1998 | Lindquist et al. | |
| 5,778,674 A | 7/1998 | Kimura | |
| 5,787,859 A | 8/1998 | Meistrick et al. | |
| 5,809,964 A | 9/1998 | Meistrick et al. | |
| 5,813,231 A | 9/1998 | Faletti et al. | |
| 5,816,216 A | 10/1998 | Egashira et al. | |
| 5,829,397 A | 11/1998 | Vorih et al. | |
| 5,839,400 A | 11/1998 | Vattaneo et al. | |
| 5,839,453 A | 11/1998 | Hu | |
| 5,937,807 A | 8/1999 | Peters et al. | |
| 5,967,115 A | 10/1999 | Konopka et al. | |
| 5,970,929 A | 10/1999 | Tacquet | |
| 6,000,374 A | 12/1999 | Cosma et al. | |
| 6,003,316 A | 12/1999 | Baert et al. | |
| 6,006,706 A | 12/1999 | Kanzaki | |
| 6,012,424 A | 1/2000 | Meistrick | |
| 6,020,651 A | 2/2000 | Nakamura et al. | |
| 6,026,786 A | 2/2000 | Groff et al. | |
| 6,035,639 A | 3/2000 | Kolmanovsky et al. | |
| 6,035,640 A | 3/2000 | Kolmanovsky et al. | |
| 6,067,800 A | 5/2000 | Kolmanovsky et al. | |
| 6,067,946 A | 5/2000 | Bunker et al. | |
| 6,076,353 A | 6/2000 | Freudenberg et al. | |
| 6,082,328 A | 7/2000 | Meistrick et al. | |
| 6,095,127 A | 8/2000 | Kolmanovsky et al. | |
| 6,101,998 A | 8/2000 | Tamura et al. | |
| 6,128,902 A | 10/2000 | Kolmanovsky et al. | |
| 6,135,073 A | 10/2000 | Feucht et al. | |
| 6,148,778 A | 11/2000 | Sturman | |
| 6,170,441 B1 | 1/2001 | Haldeman et al. | |
| 6,178,749 B1 | 1/2001 | Kolmanovsky et al. | |
| 6,189,504 B1 | 2/2001 | Israel et al. | |
| 6,209,516 B1 | 4/2001 | Yamashita | |
| 6,223,846 B1 | 5/2001 | Schechter | |
| 6,234,123 B1 | 5/2001 | Iiyama et al. | |
| 6,237,551 B1 | 5/2001 | Macor et al. | |
| 6,244,257 B1 | 6/2001 | Hu | |
| 6,267,107 B1 | 7/2001 | Ward | |
| 6,273,076 B1 | 8/2001 | Beck et al. | |
| 6,279,550 B1 | 8/2001 | Bryant | |
| 6,301,887 B1 | 10/2001 | Gorel et al. | |
| 6,301,889 B1 | 10/2001 | Gladden et al. | |
| 6,302,076 B1 | 10/2001 | Bredy | |
| 6,439,195 B1 | 8/2002 | Warner | |
| 6,467,452 B1 | 10/2002 | Duffy et al. | |
| 6,571,765 B2 | 6/2003 | Kuboshima et al. | |
| 6,575,129 B2 | 6/2003 | Almkvist et al. | |
| 6,651,618 B1 | 11/2003 | Coleman et al. | 123/305 |
| 6,688,280 B2 | 2/2004 | Weber et al. | 123/305 |
| 6,722,349 B2 | 4/2004 | Leman et al. | |
| 6,732,685 B2 | 5/2004 | Leman | |
| 2001/0002379 A1 | 5/2001 | Schechter | |
| 2001/0023671 A1 | 9/2001 | Vorih | |
| 2002/0157623 A1 | 10/2002 | Turner et al. | |
| 2003/0145810 A1 | 8/2003 | Leman et al. | |
| 2004/0020204 A1 | 2/2004 | Callas et al. | 60/612 |
| 2004/0118118 A1 | 6/2004 | Weber et al. | |
| 2004/0206331 A1 | 10/2004 | Leman | |

FOREIGN PATENT DOCUMENTS

DE        31 24 668 A1    1/1983

| | | |
|---|---|---|
| DE | 39 03 474 A1 | 2/1988 |
| DE | 39 03 474 A1 | 9/1989 |
| DE | FR 43 08 354 A1 | 9/1993 |
| DE | 44 40 289 A1 | 5/1996 |
| DE | 44 43 169 A1 | 6/1996 |
| EP | 0 275 244 | 1/1988 |
| EP | 0 961 018 A1 | 12/1999 |
| EP | 1 022 446 A1 | 7/2000 |
| FR | 2 583 108 A2 | 12/1986 |
| GB | 1331348 | 9/1973 |
| JP | 355153820 A | 12/1982 |
| JP | 58-62314 * | 4/1983 |
| JP | 358062314 A | 4/1983 |
| JP | 58-180 722 | 10/1983 |
| JP | 58-211 526 | 12/1983 |
| JP | 59 060034 A | 4/1984 |
| JP | 359188031 A | 10/1984 |
| JP | 60090926 | 5/1985 |
| JP | 61070130 | 4/1986 |
| JP | 63055324 | 3/1988 |
| JP | 363057822 A | 3/1988 |
| JP | 63198728 | 8/1988 |
| JP | 363268926 A | 11/1988 |
| JP | 363268927 A | 11/1988 |
| JP | 1024414 | 1/1989 |
| JP | 401083820 A | 3/1989 |
| JP | 05106415 A2 | 4/1993 |
| JP | 200120457 | 4/2000 |
| JP | 2000 120457 | 4/2000 |
| JP | 2000-145484 | 5/2000 |
| JP | 2000145484 | 5/2000 |
| JP | 2003262137 A | 9/2003 |
| SU | 248375 | 7/1969 |
| SU | 1247573 | 7/1986 |
| WO | WO 90/15917 | 12/1990 |
| WO | WO 98/02653 | 1/1998 |
| WO | WO 01/20150 | 3/2001 |
| WO | WO 01/46574 | 6/2001 |

OTHER PUBLICATIONS

SAE Technical Paper Series—A Review & Classification of Variable Valve Timing Mechanisms—Dresner et al.—Feb. 27, 1989–Mar. 3, 1989—pp. 1–14.
SAE Technical Paper Series—A Review of Variable Valve Timing Benefits & Modes of Operation—Dresner et al.—Aug. 7, 1989–Aug. 10, 1989—pp. 1–9.
Jacobs Vehicle Systems, VVA—Variable Actuation Systems—pp. 1–2.
Paxman Diesel Engines since 1934, pp. 1 and 9, Aug. 23, 2004.
ALSTOM Engines Paxman VP185—pp. 1–6.
The 8$^{th}$ Annual Automobile & Engine Technology Colloquium in Aachen—An Overview—Dipl.-Ing. Jörg Ballauf—pp. 1–5, Oct., 1999.
Sturman Industries—Hydraulic Valve Actuation—Sep. 5, 2004.
The Internal–Combustion Engine in Theory & Practice—vol. 1: Thermodynamics, Fluid Flow, Performance—Second Edition, Revised—Charles Fayette Taylor—1985.
The Internal–Combustion Engine in Theory & Practice—vol. 2: Combustion, Fuels, Materials, Design—Revised Edition—Charles Fayette Taylor—1985.
http://www.mazda.com.au/corpora/209.html, Oct. 16, 2001, p. 1–6.
Challen et al., "Diesel Engine Reference Book, Second Edition," SAE International, 1999, pp. 75, 81, 84, 146, and 263–305.
Edwards et al, "The Potential of a Combined Miller Cycle & Internal EGR Engine for Future Heavy Duty Truck Apps" SAE Int'l Congress & Expo, Feb. 23–Feb. 26, 1998.
Yorihiro Fukuzawa et al., "Development of High Efficiency Miller Cycle Gas Engine", Mitsubishi Heavy Industries, Ltd., Technical Review, vol. 38, No. 3, Oct. 2001, pp. 146–150.
Pending U.S. Appl. No. 10/992,198; Title: Combustion Engine Including Fluidically–Driven Engine Valve Actuator—Filing Date: Nov. 19, 2004.
Pending U.S. App. No. 10/992,137: Title: Combustion Engine Including Fluidically–Controlled Engine Valve Actuator—Filing Date: Nov. 19, 2004.
Pending U.S. Appl. No. 10/933,300; Title: Air & Fuel Supply System for Combustion Engine—Filing Date: Nov. 19, 2004.
Pending U.S. Appl. No. 10/992,074: Title: Combustion Engine Including Cam Phase–Shifting—Filing Date: Nov. 19, 2004.
Pending U.S. Appl. No. 10/992,866: Title: Air & Fuel Supply System for Combustion Engine With Particulate Trap—Filing Date: Nov. 19, 2004.
Pending U.S. Appl. No. 10/992,857: Title: Air & Fuel Supply System for Combustion Engine Operating at Optimum Engine Speed—Filing Date: Nov. 19, 2004.
Pending U.S. Appl. No. 10/992,897: Title: Air & Fuel Supply System for Combustion Engine—Filing Date: Nov. 19, 2004.
Pending U.S. Appl. No. 10/933,065; Title: Air & Fuel Supply System for Combustion Engine Operating in HCCI Mode—Filing Date: Nov. 19, 2004.
Pending U.S. Appl. No. 10/992,070: Title: Combustion Engine Including Exhaust Purification with On–Board Ammonia Production—Filing Date Nov. 19, 2004.
Pending U.S. Appl. No. 10/992,071; Title: Combustion Engine Including Engine Valve Actuation System—Filing Date Nov. 19, 2004.
Pending U.S. Appl. No. 10/992,069; Title: Air & Fuel Supply System for Combustion Engine—Filing Date Nov. 19, 2004.
Pending U.S. Appl. No. 10/992,125; Title: Air & Fuel Supply System for A Combustion Engine—Filing Date Nov. 19, 2004.
NOX Control in Heavy–Duty Diesel Engines—What is the Limit?—Dickey, Ryan III & Matheaus—International Congress & Exposition—Feb. 23–26, 1998—pp. 1–14.
http://www.mazda.com.au/corpora/209.html, Oct. 16, 2001, pp. 1–6.
Yorihiro Fukuzawa et al., "Development of High Efficiency Miller Cycle Gas Engine", Mitsubishi Heavy Industries, Ltd., Technical Review, vol. 38, No. 3, Oct., 2001, pp. 146–150.

* cited by examiner

A — COMPRESSION BEGINS IN 2-STROKE AND 4-STROKE DIESEL CYCLE ENGINE
B — COMPRESSION BEGINS IN 2-STROKE AND 4-STROKE NEW CYCLE ENGINE
C — EXPANSION ENDS IN 4-STROKE DIESEL CYCLE ENGINE
D — EXPANSION ENDS IN 2-STROKE AND 4-STROKE NEW CYCLE ENGINE
E — EXPANSION ENDS (AT EXHAUST BLOW-DOWN) IN 2-STROKE DIESEL CYCLE ENGINE
V — SEE NOTE 1 IN DESCRIPTION

Addendum to Fig. 21

| ITEM | DESCRIPTION | FUNCTIONS |
|---|---|---|
| 2 | Secondary Relief Valve | Used to limit pressure in fuel tank. |
| 3 | Primary Relief Valve | Used to limit pressure in fuel tank. |
| 4 | Manual Vent Valve | Used to vent pressure from the fuel tank. |
| 5 | Economizer Regulator | Used to control operating pressure of the fuel tank. |
| 8 | Fill Check Valve | Used to prevent reverse flow in the fill line. |
| 9 | Excess Flow Valve | Used to restrict excess flow in event of a fuel line breakage. |
| 11 | Fuel Shut off Valve | Used to shut off fuel supply. |
| 12 | Probe Connection | Used to "feed thru" capacitor signal from tank to fuel sender. |
| 13 | Fuel Gauge Sending Unit | Used to convert the capacitance signal for the fuel gauge. |
| 14 | Fuel Gauge | Used to display fuel level in the tank. |
| 15 | Vaporizer | Used to convert the liquid fuel to gaseous fuel. |
| 16 | Vent Connection | Used to connect to the vent line. |
| 17 | Filling Connection | Used to fill the LNG fuel tank. |
| 18 | LNG Tank | Used to store LNG and supply fuel to the engine. |
| 19 | Fuel Tank Pressure Gauge | Used to display fuel tank pressure. |
| 20 | Liquid Withdrawal Tube | Used to deliver liquid. |
| 21 | Vapor Withdrawal Tube | Used to deliver vapor. |
| 22 | Liquid Spray Bar | Used to top fill the tank and collapse the vapor. |
| C-1 | Remote Fill Connection | Used to fill the LNG Fuel Tank. |

*FIG 22*

COLD AIR SUPER-CHARGED INTERNAL COMBUSTION ENGINE, WORKING CYCLE AND METHOD

CROSS-REFERENCE TO RELATED APPLICATIONS

This application is a continuation-in-part of application Ser. No. 10/206,847, filed Jul. 26, 2002; which is a continuation-in-part of application Ser. No. 09/632,739, filed on Aug. 4, 2000; which is a continuation of application Ser. No. 08/863,103, filed May 23, 1997, now U.S. Pat. No. 6,279,550; which is a continuation-in-part of application Ser. No. 08/841,488, filed on Apr. 23, 1997 (now abandoned); which application claims the benefit of provisional application Nos. 60/022,102, filed on Jul., 17, 1996; 60/023,460, filed on Aug. 6, 1996; 60/029,260, filed on Oct. 25, 1996; and 60/040,630, filed on Mar. 7, 1997; which is a continuation-in-part of Ser. No. 09/757,772, filed on Jan. 9, 2001 (now abandoned); which application claims the benefit of provisional application No. 60/175,597, filed on Jan. 11, 2000; which is a continuation-in-part of application Ser. No. 10/029,224, filed on Dec. 20,2001 (now abandoned); which application claims the benefit of provisional application Nos. 60/259,727, filed on Jan. 4, 2001; 60/278,030, filed on Mar. 22, 2001; 60/284,711, filed on Apr. 18, 2001; 60/296,620, filed on Jun. 7, 2001; 60/297,663, filed on Jun. 12, 2001; 60/340,728, filed on Oct. 22, 2001; 60/340,609, filed on Dec. 14, 2001; and 60/374,392, filed Apr. 22, 2002.

The present invention constitutes a new working cycle for internal combustion engines, with methods and apparatuses for managing combustion charge density, temperatures, pressures and turbulence (among other characteristics). At least one embodiment describes a cold air super-charged internal combustion engine in which a super-charging portion of air is compressed, cooled or chilled and injected late in the compression process.

Initial air charge for 4-stroke engines and for epitrochoid (Wankel) type rotary and straight rotary engines: A subnormal compression ratio or a low "effective" compression ratio initial air charge (A) is received on the intake process, which during the compression process, produces only a fraction of the heat-of-compression as that produced by a conventional engine.

Super-charging air: During the compression process, a dense, cooled or chilled supplementary air charge (B) is injected into the engine, adding density and turbulence above that of conventional engines and producing a low compression ratio or a low "effective" compression ratio for this portion of air charge also. Compression of the combined charge continues and near piston or rotor top dead center (TDC) position, the air charge, being mixed with fuel, is ignited for the power pulse, followed by scavenging, air intake and compression process to complete one power cycle.

For 2-stroke engines: In 2-stroke engines, reciprocating, epitrochoid-action or straight rotary, the cold supplementary air charge (B) is injected during the compression process after a low compression ratio engine or a low "effective" compression ratio process engine has been scavenged and charged with fresh air (A). Compression continues and near piston or rotor top dead center (TDC) position, the fuel-air charge is ignited, producing the power pulse, scavenging, fresh air charging and compression process, thus completing one power cycle.

The charge density is selectively much greater than that of state-of-art engines, providing greater power and torque with increased efficiency, while producing ultra low polluting emissions.

BACKGROUND OF INVENTION

It is well known that as the expansion ratio, as compared to charge density of an internal combustion engine is increased, more energy is extracted from the combustion gases and converted to kinetic energy, increasing the thermodynamic efficiency of the engine. It is further understood that increasing air charge density increases both power and fuel economy due to further thermodynamic improvements. The objectives for an efficient engine are to provide a high-density charge, to begin combustion at maximum density and then to expand the gases as far as possible against a piston, vane or rotor lobe.

It is further known that if the air-fuel charge of an engine is homogeneous, the elimination of cycle-to-cycle variations in components, (pressures, air-fuel ratios, temperatures, etc.), will greatly improve engine performance.

It is also well known that if an air-fuel mixture has a high air content, and because fuel is fully mixed with air before combustion, the fuel bums cooler bringing the burn temperature below the threshold at which it would damage the pistons.

It is also an established principle that the lower the temperature of a standard density charge is at the time of ignition, the lower the comparative peak temperature and pressure produced which further reduces polluting emissions, especially $NO_X$.

Now, the compression ratio of current engine technology sets the level to which a piston "compacts" a mix of air and fuel before the charge is ignited and hence sets the limits of power and efficiency. If the ratio is too high in gasoline or gas engines, the fuel ignites itself as it does in a Diesel engine. Although efficiency is high with a Diesel engine, polluting emissions, including particulates (smoke and nano-particles, all caused by pre-mixed fuel-bum) make it a health hazard.

The engine of this invention is capable of producing the same "compactness" of charge and an even denser charge than that of the Diesel engine, but without having a high compression ratio or producing excessively high temperature. The charge is introduced and managed in such a manner that regardless of the charge density, the temperature of the charge can be kept below auto-ignition temperature of the fuel until the point for ignition. The homogeneous charge then bums cooler and more completely for truly clean power production.

Described herein is a unique engine, which, within its combustion chambers, produces a lighter than normal or denser than normal, temperature-adjusted homogeneous air-fuel mixture. The temperature of the charge is so managed that at 10–15 degrees before piston top dead center (TDC), the charge can be very low and optionally below auto-ignition temperature, and it is at that point that the charge is ignited by spark, heat infusion or heat profusion or by catalyst for high torque, power and efficiency with ultra low polluting emissions.

Gasoline and Natural Gas Auto-Ignition Engine Concept Under Development by Lawrence Livermore National Laboratories (LLNL), et al.

Discussion of a Novel Engine Concept

HCCI is an abbreviation of "Homogeneous Charge Compression Ignition." Scientists have discovered that at some engine speeds and loads, the combustion in internal combustion engines became more stable and that an engine ran smoother when the fuel was auto-ignited, instead of being ignited by sparkplug. As the name implies, the homogeneous ("well mixed") charge of air and fuel is ignited by compression heat.

Homogeneous Charge Compression Ignition, or HCCI, is a relatively new combustion technology. It is a hybrid of the traditional spark ignition (SI) and the compression ignition process (such as the Diesel engine). A project at the UC Berkeley Combustion Analysis Laboratory (CAL) is to focus on the experimental side of HCCI. Data collected there is being used to validate the computational models generated by engineers at Lawrence Livermore National Lab (LLNL). Entec Engine Corporation, Atlanta, Ga. is an integral part of the continuing effort to make practical an HCCI engine to provide low emission, high efficiency power generation as well as for transportation.

Unlike a traditional SI or Diesel engine, true HCCI combustion takes place spontaneously and homogeneously without flame propagation. This eliminates heterogeneous air/fuel mixture regions. In addition, HCCI is a lean combustion process. These conditions translate to a lower local flame temperature which lowers the amount of $NO_X$ produced in the process. $NO_X$ is a gas that is believed to be responsible for the creation of ozone (O3).

The Principal of the HCCI Engine Concept

As mentioned above, the HCCI-engine can be seen as a hybrid of the SI-engine and the Diesel engine. First, we will describe the SI and Diesel engines.

In the SI-engine, a homogeneous mixture of fuel and air is ignited at the end of the compression stroke by a spark. The spark causes a flame kernel that grows and propagates throughout the combustion chamber. By controlling the mixture flow to the engine with a throttle plate, the engine load (torque) is changed. The mixture ratio between air and fuel is kept almost constant at all loads.

In the Diesel engine, pure air is compressed. The fuel is injected under high pressure at the end of the compression stroke into the hot compressed air. The fuel is vaporized and mixed partially before self-ignition occurs. The load is adjusted by varying the amount of fuel injected.

In the HCCI-engine, homogeneous air-fuel mixture is compressed so that auto-ignition occurs when the piston is near the top dead center position (TDC). A high compression ratio is necessary in order to ensure auto-ignition. Very lean mixtures have to be used in order to get slow chemistry that reduces the combustion rate. Diluted mixtures can be achieved by using a high air-fuel ratio or by Exhaust Gas Recycling (EGR). Varying the amount of fuel controls the load. Like the Diesel engine, there is no throttle plate i.e., the engine will always get maximum amount of air flow as-the engine is un-throttled.

Advantages of the HCCI Engine

The HCCI-engine is always un-throttled. A high compression ratio is used and the combustion is fast. This provides high efficiency at low loads, compared to a SI-engine that has low efficiency at part load. According to computational models generated by engineers at LLNL, an HCCI engine will reduce fuel consumption to one half of that in an ordinary automobile engine. The formation of nitrogen-oxides is strongly dependent on combustion temperature. Higher temperature gives higher amounts of $NO_X$. Therefore, since the combustion charge is homogeneous and a very lean mixture is used, the combustion temperature becomes very low, which results in very low amounts of $NO_X$. LLNL predicts that the HCCI engine will also virtually eliminate soot (particulates) and $NO_X$.

Disadvantages of the Current HCCI Engine Concept as Being Developed by LLNL, et al.

The control of the combustion is more difficult in the HCCI engine than in the SI or Diesel engines. The HCCI engine provides no direct control of the start of combustion. In other words, there is no "triggering" mechanism as a spark or an injection of fuels into a super-hot air-charge, as in conventional engines. The start of combustion depends on several parameters. The strongest ones are the compression ratio and the air charge inlet temperature. Also, there is no means of separately controlling charge density and temperature. By adjusting these parameters in "the right way," it is possible to control the start of combustion to a desired moment. Another current disadvantage in their concept is high levels of hydrocarbons (HC), which is unburned fuel. The low combustion temperature causes the fuel to burn incompletely.

Potential of the Current HCCI Engine Concept

An appropriate field of operation is power plants where the engines operate with constant speed. Present concepts of the HCCI-engine would compete favorably with natural gas driven SI-engines due to the higher efficiency and lower $NO_X$ emissions. One interesting concept would be to use HCCI combustion at part load conditions and SI combustion at high loads in a car engine. In this way, the fuel consumption would be reduced significantly. Researchers say if the emissions standards should rise and the problem with the HC emissions could be solved, the HCCI engine would be able to compete favorably with the Diesel engine, since the Diesel combustion causes high $NO_X$, soot particulates and other emissions.

Why HCCI?

The modern conventional SI engine, fitted with a three-way catalyst, can be seen as a very clean engine, but it suffers from poor part load efficiency. As mentioned earlier, this is mainly due to the throttling. Engines in passenger cars operate most of the time at light and part load conditions. For some shorter periods of time, at overtaking and acceleration, they run at high loads, but they seldom run at high loads for any long periods. This means that the overall efficiency at normal driving conditions becomes very low.

The Diesel engine has a much higher part load efficiency than the SI engine. Instead, the Diesel engine fights with great smoke and $NO_X$ problems. Soot (particulates) is mainly formed in the fuel rich regions and $NO_X$ in the hot stoichiometric regions. Due to these mechanisms, it is difficult to reduce both smoke and $NO_X$ simultaneously through combustion improvement. Today, there is no well working exhaust after treatment that takes away both soot and $NO_X$.

The HCCI engine has much higher part load efficiency than the SI engine and is comparable to the Diesel engine. It has no problem with $NO_X$ and soot (particulates) formation like the Diesel engine. In summary, the HCCI-engine beats the SI engine regarding the efficiency and the Diesel engine regarding the emissions.

The foregoing discussion of the anticipated operating features show that when the HCCI system is successfully developed, according to the present plans of various labs and engine research groups, it will have a low-density air charge for low efficiency and power for diesel fuel, but will be clean burning and have the efficiency of the Diesel engine if using gasoline or natural gas fuel.

Advantages of the Engine of this Present Invention, the Gasoline, Natural Gas, Hydrogen & New Diesel Fueled, Spark or Auto-Ignition Engine The present invention described herein promises to make practical the HCCI-engine and provides all of the hoped for advantages stated for the futuristic HCCI-engine concept. In addition, the present invention provides many other engine improvements not anticipated for the HCCI-engine e.g., greater power and efficiency for diesel operation, whether ignited by spark or as an HCCI engine.

The engine of this present invention provides a homogenized air-fuel charge, which can always be much denser than that of the Diesel engine and, in some designs, has an extended expansion ratio, yet with compression temperatures lower than those which would cause auto-ignition prematurely. It can be ignited by spark, compression, modified HCCI or true HCCI. Other advantages are no-knock operation, multi-fuel capabilities, double burning "dwell" time near TDC with improved power, torque, efficiency and durability and greatly reduced $NO_X$, CO, $CO_2$, formaldehyde, HC and particulates. Knock-free operation allows reduction or elimination of the gasoline additive methyl tertiary-butyl ether (MTBE) which is currently polluting ground water.

The present invention describes a means of selectively managing the density, pressure and temperature of an air or air-fuel charge with each feature being separately adjustable with regard to the other features. This selective management provides the same reduction in $NO_X$, particulates and other polluting emissions as projected for HCCI, while providing greater power, efficiency and engine durability.

The density of the final air-fuel charge can be much greater even than that of the Diesel engine and yet has a temperature low enough to prevent knock or pre-auto-ignition. For example, natural gas-air mix auto-ignites at a compression ratio of 19:1 or 20:1, while diesel fuel-air mix auto-ignites at the temperature produced by a compression ratio of about 8:1. Therefore, using diesel fuel in a HCCI engine, under development by LLNL, et al., would greatly reduce its efficiency and power. But, in the present invention, the charge can be "compacted" to an effective compression ratio of as much as 40:1 or greater, with a temperature lower than that normally produced by an 8:1 compression ratio. The engine of this invention can then ignite the charge for greater than "Diesel" power and efficiency.

Currently, according to researchers, the greatest problems in making the HCCI engine feasible are timing of ignition and the problem of temperature control in regard to compression ratio. In their HCCI engine concept, the temperature of the compressed charge can not be kept low, thus severely limiting power and efficiency in HCCI for all fuels. The present invention allows the control of the temperature and density of the charge separately, for much greater steady-state power density and fuel economy, with ultra-low emissions and timely ignition control for all fuels, liquid or gaseous.

Described herein are several alternate means of timely igniting the charge of the present invented engine e.g., a) spark ignited, b) compression ignited, c) by modified HCCI, and d) by true HCCI operation.

SUMMARY OF THE INVENTION

Briefly described, the present invention comprises an internal combustion engine system, (including methods and apparatuses) optionally operating in a first mode and, optionally and selectively, in a second mode and optionally in a preferred third mode for managing combustion charge densities, temperatures, pressures and turbulence in order to produce a true mastery within the power cylinder to increase fuel economy, power, and torque while minimizing polluting emissions. In its preferred embodiments, the method includes the steps of (i) producing a primary air charge and optionally, a secondary air charge (ii) controlling the temperature, density and pressure of the air charges, (iii) transferring an air charge to a power cylinder of the engine in one stage for mode 1 operation and in two stages for mode 2 and mode 3 operation. The primary air charge is supplemented by the secondary air charge in producing mode 2 and mode 3 operation. This system is such that an air charge having a weight and density selected from a range of weight and density levels, ranging from less than atmospheric weight and density to a heavier-than-atmospheric weight and density, is introduced into the power cylinder, and (iv) then compressing the air charge at a normal, or a lower-than-normal compression ratio, (v) optionally introducing a secondary air or air-fuel charge into the same cylinder during the compression stroke, (vi) compressing the total charge, (vii) causing a pre-determined quantity of charge-air and fuel to produce a combustible mixture, (viii) causing the mixture to be ignited within the power cylinder and (ix) allowing the combustion gas to expand against a piston operable in the power cylinder with the expansion ratio of the power cylinder being equal to, or substantially greater than the compression ratio of the power cylinders of the engine. In addition to other advantages, the invented method is capable of producing mean effective [cylinder] pressures (mep) in a range ranging from lower-than-normal to higher-than-normal. In the preferred embodiments, the mean effective cylinder pressure is selectively variable (and selectively varied) throughout the mentioned range during the operation of the engine. In an alternate embodiment related to constant speed operation, the mean effective cylinder pressure is selected from the range and the engine is configured, in accordance with the present invention, so that the mean effective cylinder pressure range is limited, being varied only in the amount required for producing the power, torque and RPM of the duty cycle for which the engine is designed.

In its preferred embodiments, the apparatus of the present invention provides a reciprocating internal combustion engine with at least one atmospheric air intake port for providing charge air to two different cylinder inlet ports at different pressures. The apparatus also provides at least one ancillary compressor for pre-compressing a portion of the air charge, an intercooler, or heat exchanger, through or around which, the compressed air can be directed for temperature adjustment. The apparatus further provides power cylinders in which the combustion gas is ignited and expanded, a piston operable in each power cylinder, connected to a crankshaft by a connecting link for rotating the crankshaft in response to reciprocation of each piston and a transfer conduit communicating the compressor outlet to a control valve and to the intercooler or heat exchanger. Also provided is a transfer manifold communicating the intercooler, or bypass system, with the power cylinders, through which manifold the compressed charge is transferred to enter the power cylinders. The apparatus further provides one intake port or valve controlling admission of the low pressure (primary) air charge to the power cylinder, an intake valve controlling admission of the compressed (secondary) charge from the transfer manifold to said power cylinders, and an exhaust valve controlling discharge of the exhaust gases from said power cylinders.

For the 4-stroke engine of this invention, one of two intake valves of the power cylinders is timed to operate so that a charge of air, which is lighter, equal to, or heavier than normal, can be received and maintained within a transfer manifold, when required. This charge of air can then be introduced into the power cylinder during the intake (primary) piston stroke with the intake valve closing at piston BDC, or closing substantially before piston BDC position or with the intake valve closing at some point after BDC, or near the end of the compression stroke to provide, in a first mode of operation, either a normal, a low, or a zero compression ratio. This establishes that the expansion ratio can be equal to or greater than the compression ratio of the power cylinders. In this design, in a second mode or third mode of operation, a second intake valve can open during the intake stroke or preferably during the compression stroke, or as late as near TDC, at the point or after the piston has reached the point where the first intake valve closes on either the intake or the compression stroke and closes quickly in order to inject a temperature adjusted high-pressure secondary air charge.

Mode 1 Operation: The 2-stroke engine of this invention, also operating in optional triple modes, introduces lightly compressed scavenging and charging air into primary ports at piston BDC and is the sole air charge in mode 1 operation.

For mode 2 or mode 3 operation, the intake valves of the power cylinders are timed to operate so that a high pressure supercharging air charge is cool and maintained within the transfer manifold, alternatively expansion chilled, and introduced into the power cylinder, during or near the end of the compression stroke, at such a time that the power cylinder has been scavenged and charged by air received from ports which are now closed and the exhaust valve has closed normally or late. This establishes that the expansion ratio of the engine can be equal to or greater than the compression ratio of the power cylinders. Means are provided in both 4-stroke and 2-stroke for causing fuel to be mixed with the air charge to produce a combustible mixture. The combustion chambers of the power cylinders are sized with respect to the displaced volume of the power cylinder in some designs to produce an initial low compression ratio so that the exploded combustion gas can be expanded to a volume equal to the compression ratio of the power cylinder of the engine.

In other 2-stroke designs, the exhaust valve is closed late in order to produce an expansion ratio greater than the "effective" compression ratio.

For mode 3 operation, modes 1 and 2 are combined.

For both 4-stroke and 2-stroke engines, fuel being present, ignition of the charge occurs at near piston TDC and the power pulse occurs as fully described hereafter.

Some of the advantages of the present invention over existing internal combustion engines are, as stated earlier, that it can provide a normal compression ratio or an "effective" compression ratio lower than the expansion ratio of the engine and can selectively provide a mean effective cylinder pressure higher than the conventional engine arrangement with the same or lower maximum cylinder pressure and temperature than that of prior art engines. In addition, the invention, in some designs, alternatively provides for double the burn time over existing engines by providing "Dwell"-burn time at piston TDC.

Because charge density, temperature and pressure are managed separately, light-load operation is practical, even for extended periods, with no sacrifice of fuel economy. The new working cycle is applicable to 2-stroke or 4-stroke engines, spark-ignited, compression-ignited and modified or true HCCI. For all engines, the weight of the charge can be greatly increased without the usual problems of high peak temperatures and pressures with the usual attendant problem of combustion detonation and pre-ignition. (Even in compression-ignited Diesel engines, a heavier, cooler, more turbulent air charge provides low peak cylinder pressure for a given expansion ratio and allows richer, smoke-limited air-fuel ratio giving increased power with lower particulate and $NO_X$ emissions.) Modified HCCI or true HCCI operation will provide greater than "diesel efficiency", using gasoline, natural gas, hydrogen or diesel fuels, while limiting $NO_X$ and particulate emissions (both smoke and nanoparticle) but with diesel and hydrogen fuel performance being most benefited. Compression work is reduced due to reduced heat transfer during the compression process. Engine durability is improved because of an overall cooler working cycle and a cooler than normal exhaust and, in some duty cycles, by lower RPM, allowed by greater torque. Due to the ability to greatly increase air-fuel charge density and turbulence, even above that of diesel engines, while controlling the temperature and keeping it below auto-ignition temperature using diesel oils, allows spark ignition for diesel type oils, thus eliminating smoke particles and $NO_X$.

All of the objects, features and advantages of the present invention cannot be briefly stated in this summary, but will be understood by reference to the following specifications and the accompanying drawings.

BRIEF DESCRIPTION OF THE DRAWINGS

Embodiments of the cold air supercharged internal combustion engines, according to the invention, will now be described, by way of example, with reference to the accompanying drawings.

FIG. 2 depicts three alternative systems (two in phantom lines) of inducting a low pressure primary air charge, one of which is by dividing the flow of the primary compressor to supply low-pressure air to the engine and to supply a first stage of compression for the high-pressure air supply. Among its other components, this embodiment is seen as having three air coolers and dual manifolds and the means of controlling the temperature, density and pressure of the charge by an engine control module and by valving variations.

FIG. 2B shows schematically another embodiment in which the engines secondary-charge air or air-fuel charge is optionally wholly or partially compression chilled before being introduced to power cylinders 7a to 7f to provide a cooler charge and lower polluting emissions.

FIG. 2C shows schematically another embodiment in which the engine primary-charge air or air-fuel charge, or air charge only, is, wholly or partially. thermodynamically (compression) chilled before being introduced to power cylinders 7a to 7f to provide a cooler charge, greater fuel economy, engine durability and lower polluting emissions. In this design, a cool very dense secondary air charge is introduced during mode 2 operation without any expansion by expansion valves.

FIG. 2D shows schematically an embodiment in which the engine's sole charge air or air-fuel charge is alternatively, wholly or partially, compression chilled before being introduced to power cylinders 7a to 7f to provide greater charge density, fuel economy, durability and lower polluting emissions.

FIG. 11-B is a schematic view of a six cylinder engine having both low and high pressure charge air, supplied by one or two stages of compression by ordinary compressors, and the pressure then being amplified by a pressure amplifier. This illustrates how one compressor and a pressure amplifier can supply low or low boosted, and high pressure air for operation of a constant speed engine of this invention, such as for power generation, pumping, etc. FIG. 11-B further illustrates partial or whole compression-expansion chilled cooling of supplementary charge air for the engines of this invention or charge air for any Otto or Diesel Cycle or turbine engine.

FIG. 17-B is a schematic drawing representing any of the engines of the present invention, depicting a constant-speed engine in accordance with an alternate embodiment of the present invention, in which there is provided a single compressor with optional intercoolers, providing a single stage of pre-compressed charge-air, either optionally intercooled or adiabatically compressed

FIG. 18-B illustrates a variant design of the split-cycle engine, in which a primary charge at boosted or atmospheric pressure air can supply two more stages of compression, one in the firing cylinder, another in an ancillary compressor, whose charge is temperature adjusted and then injected into the power cylinder during the last part or near the end of the compression stroke or even during combustion. In addition, this figure illustrates a compression-expansion chill cooling system for alternative partially or wholly chilling the charge air or air-fuel for greater density, lower polluting emissions and improved engine durability.

FIG. 18-C illustrates a variant design of the split-cycle engine that provides a primary air charge at boosted or atmospheric pressure. The engine supplies two more stages of compression, with the two final compression stages being accomplished within the cylinder whose charge is intermittently cooled, then re-injected into the power cylinder, during the last part of the compression stroke, providing a low effective compression ratio with very dense air charge and an extended expansion ratio.

FIG. 18-D illustrates schematically the operation of the engine of FIG. 18-C.

FIG. 18-E illustrates the valve layout of the power cylinder of the engine of FIG. 18-C.

FIG. 19-B is a schematic transverse sectional view of a pre-combustion chamber and a combustion chamber with associated inlet conduits, ducts and valving for optional compression-expansion chill air cooling and/or water cooling as well as optional electric heating elements and fluid conduits, having the purpose of producing and controlling charge temperatures to facilitate homogeneous charge compression ignition (HCCI) for the engines of this invention or for any other internal combustion engine and for facilitating spark, or compression ignition or modified HCCI in any engine.

FIG. 19-C illustrates a hemispheric-plus (perhaps 300 degrees, more or less), shaped combustion chamber 38-B, containing all of the conduits, ducts, valves and controls pictured and described for FIG. 19-B which are operated and controlled in the manner suggested for FIG. 19-B system. The shape of the combustion chamber allows control of charge temperatures by the charge being surrounded by combustion chamber 38 and piston crown.

FIG. 19-D illustrates a hemispheric-plus (perhaps 300 degrees, more or less) shaped combustion chamber 38-B containing all of the conduits, ducts, valves and controls pictured and described for FIG. 19-C which are operated and controlled in the manner suggested for FIG. 19-C system. The shape of the combustion chamber allow control of charge temperatures by the charge being surrounded by combustion chamber 38-B and piston crown. Piston projection performs the last stage of compression for auto-ignition of fuel-air charge in HCCI system.

FIG. 22 is a list of the numbered components in FIG. 21.

FIG. 24-B is a perspective view of the engine of FIG. 24, showing the combustion chamber in firing position with supercharge port closed by rotor.

FIG. 25-B is a perspective view of the engine of FIG. 25, showing alternate valving systems with the rotor shown in firing position.

DETAILED DESCRIPTIONS OF THE DRAWINGS

Figure 1:
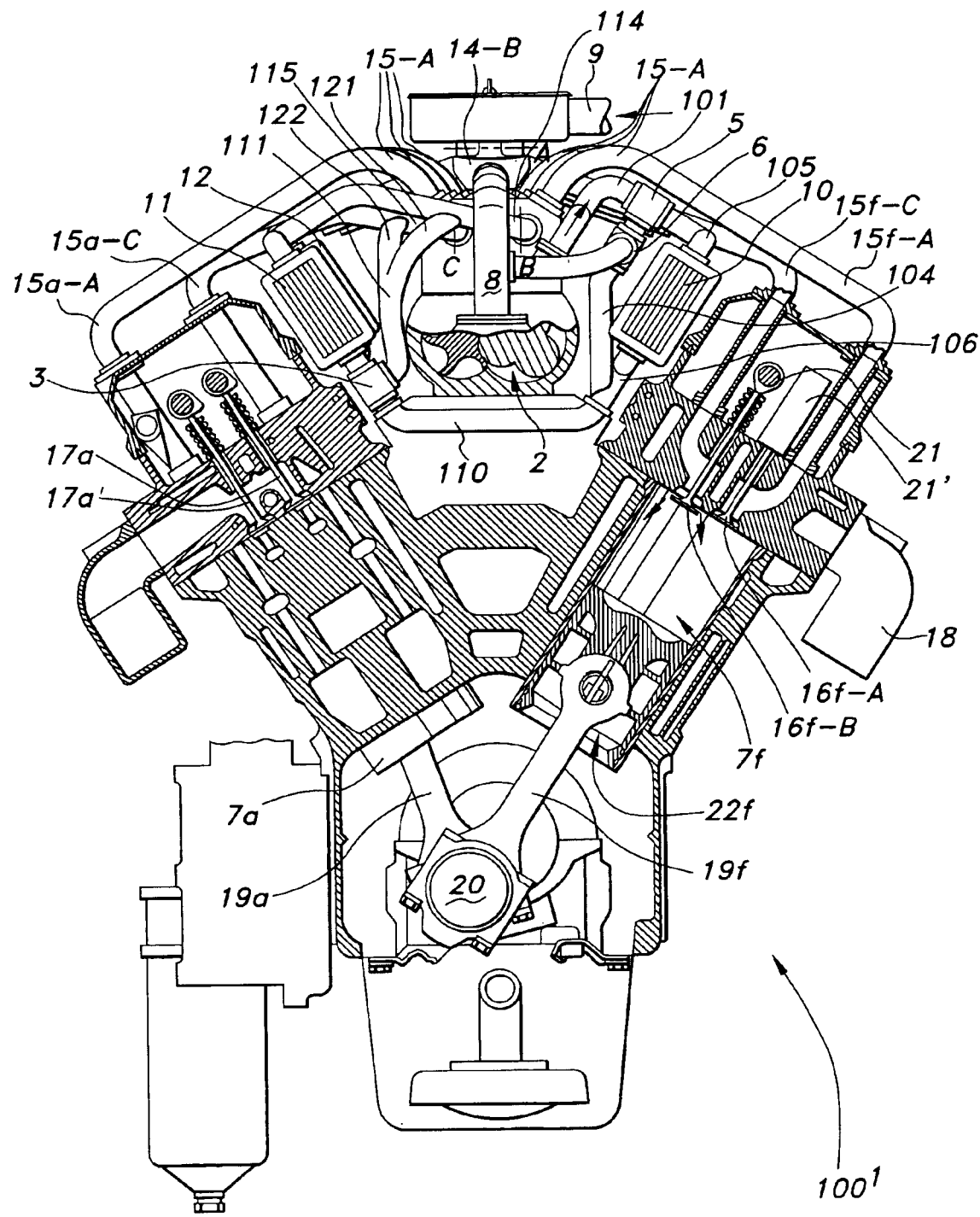
FIG. 1 is a perspective view (with portions in cross-section) of the cylinder block and head of a six cylinder internal combustion engine. It operates in a 4-stroke cycle, and represents a first embodiment of apparatus of the present invention from which a method of operation can be performed and will be described. Among its other components, this embodiment is seen as having an ancillary high performance compressor, with one atmospheric charge-air intake duct and dual intake air routes, one of which is low pressure and one which is high pressure. Both lead to the same power cylinder, a temperature adjusting system with bypass systems and valves for controlling charge-air pressures, density and temperature.
Figure 1C:
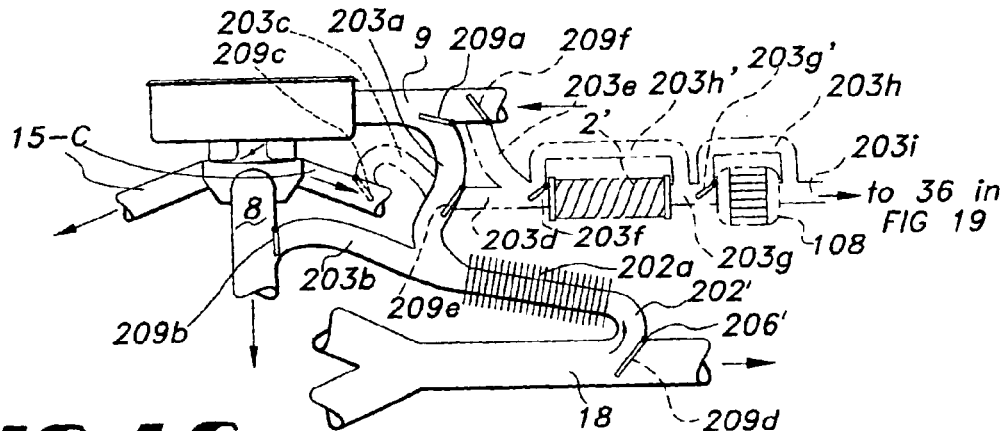
FIG. 1C is a schematic view of an exhaust and an air intake system of an engine, showing a means of re-burning exhaust gases or showing a means of directing exhaust gases to an ancillary compressor and temperature adjusting system for use as a charge diluent or as an ignition catalyst.

With reference now in greater detail to the drawings, a plurality of alternate preferred embodiments of the apparatus of the cold air supercharged internal combustion engine 100 of the present invention are depicted. Like components will be represented by like numerals throughout the several views and, in some but, not all circumstances, as is deemed necessary (due to the large number of embodiments), similar but, alternate components will be represented by superscripted numerals (e.g. $100^1$). When there are a plurality of similar components, the plurality is often times referenced herein (e.g., six cylinders 7a–7f), even though fewer than all components are visible in the drawing. Also, components which are common among multiple cylinders are sometimes written with reference solely to the common numeral, for ease of drafting—e.g. piston 22a–22f=>piston 22. In an effort to facilitate the understanding of the plurality of embodiments, (but not to limit the disclosure) some, but not all, sections of this Detailed Description are subtitled to reference the system or sub-system detailed in the subject section.

The invented system of the present invention is, perhaps, best presented by reference to the method(s) of managing combustion charge densities, temperatures, pressures and turbulence; and the following description attempts to describe the preferred methods of the present invention by association with and in conjunction with apparatuses configured for and operated in accordance with the alternate, preferred methods.

Some, but not necessarily all, of the system components that are common to two or more of the herein depicted embodiments include a crankshaft 20, to which are mounted connecting rods 19a–19f, to each of which is mounted a piston 22a–22f; each piston traveling within a power cylinder 7a–7f; air being introduced into cylinder 7 or 12 through inlet ports controlled by intake valves 16-A and 16-B, or inlet ports 11, and air being exhausted from the cylinders through exhaust ports controlled by exhaust valves 17 or 8-B and conduit 18. The interaction, modification and operation of these and such other components as are deemed necessary to an understanding of the various embodiments of the present invention are expressed below.

The Engine $100^1$ of FIG. 1 Operating in Operational Designs 1–6

Figure 2:
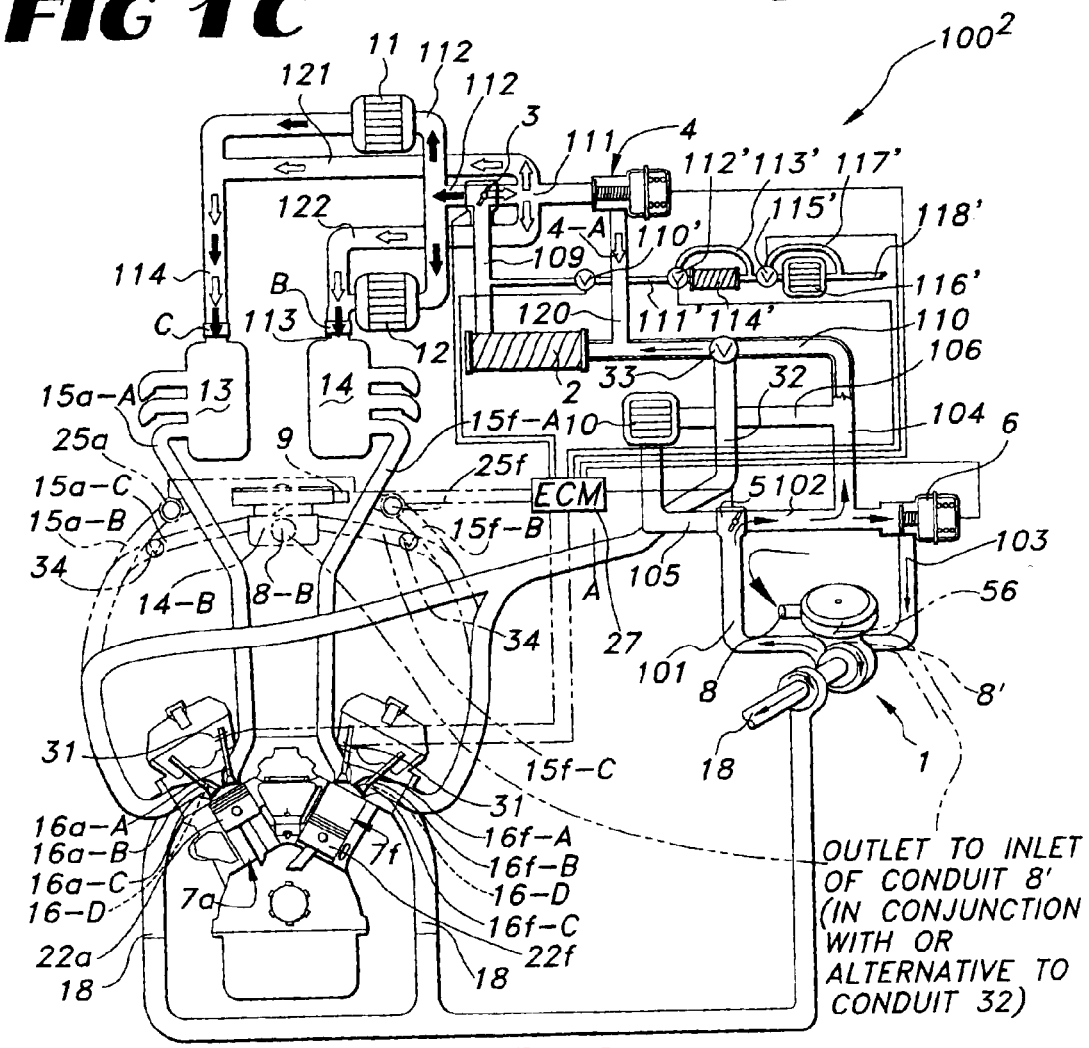
FIG. 2 is a schematic drawing of a six cylinder, 4-stroke engine representing yet another embodiment of the apparatus of the present invention, from which yet another method of operation can be performed and will be described.
Figure 2B:
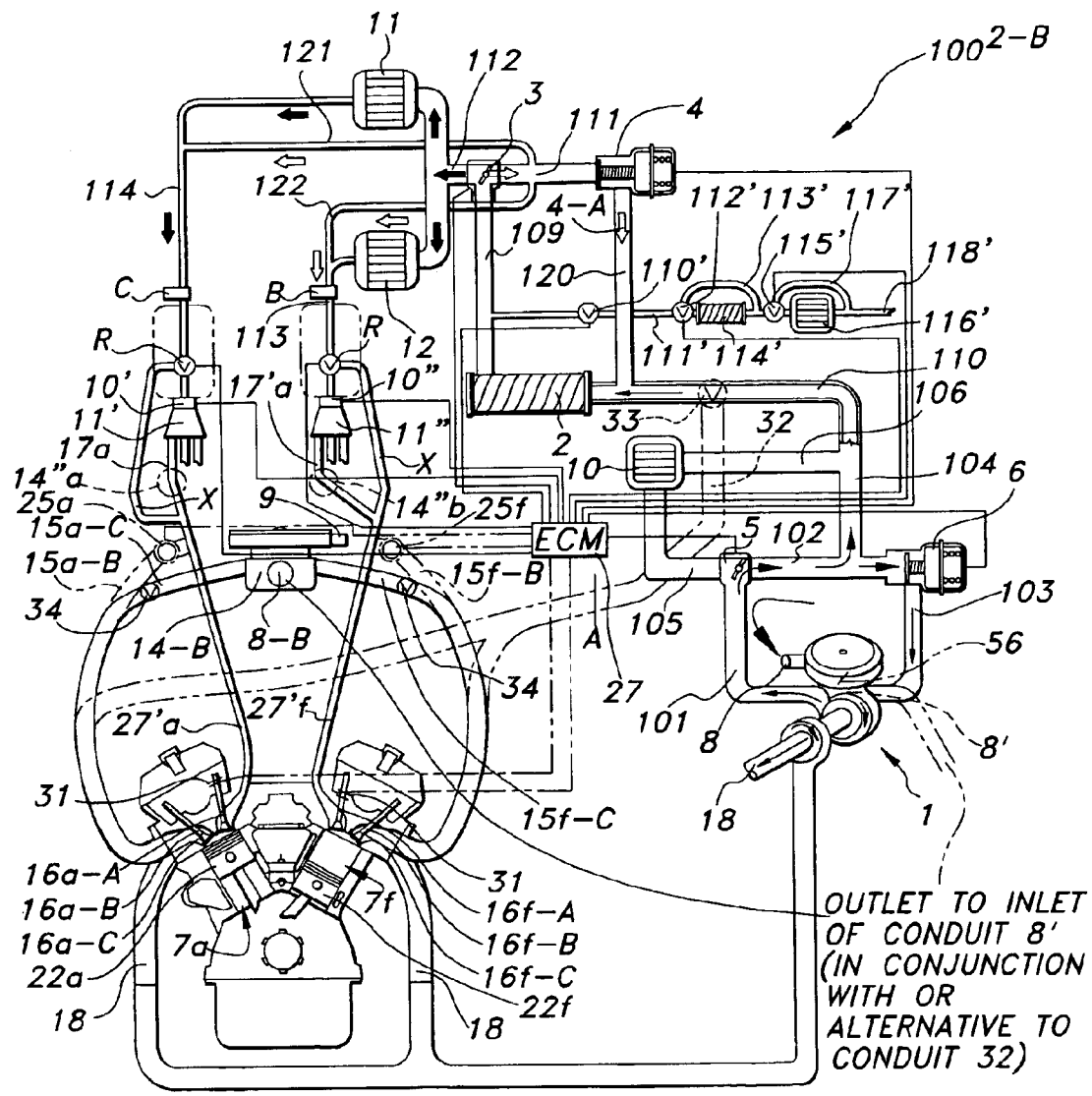
FIG. 2B is a schematic drawing of a six cylinder, 4-stroke engine, representing yet another embodiment of the apparatus of the present invention, from which yet another method of operation can be performed and will be described. It depicts three alternative systems (two in phantom lines) of inducting a low pressure primary air charge, one of which is by dividing the flow of the primary compressor to supply both low-pressure air to the engine and to supply a first stage of compression for the high-pressure air supply. Among its other components, this embodiment is seen as having three air coolers and dual manifolds and the means of controlling the temperature, density and pressure of the charge by an engine control module and by valving variations. In addition.
Figure 2C:
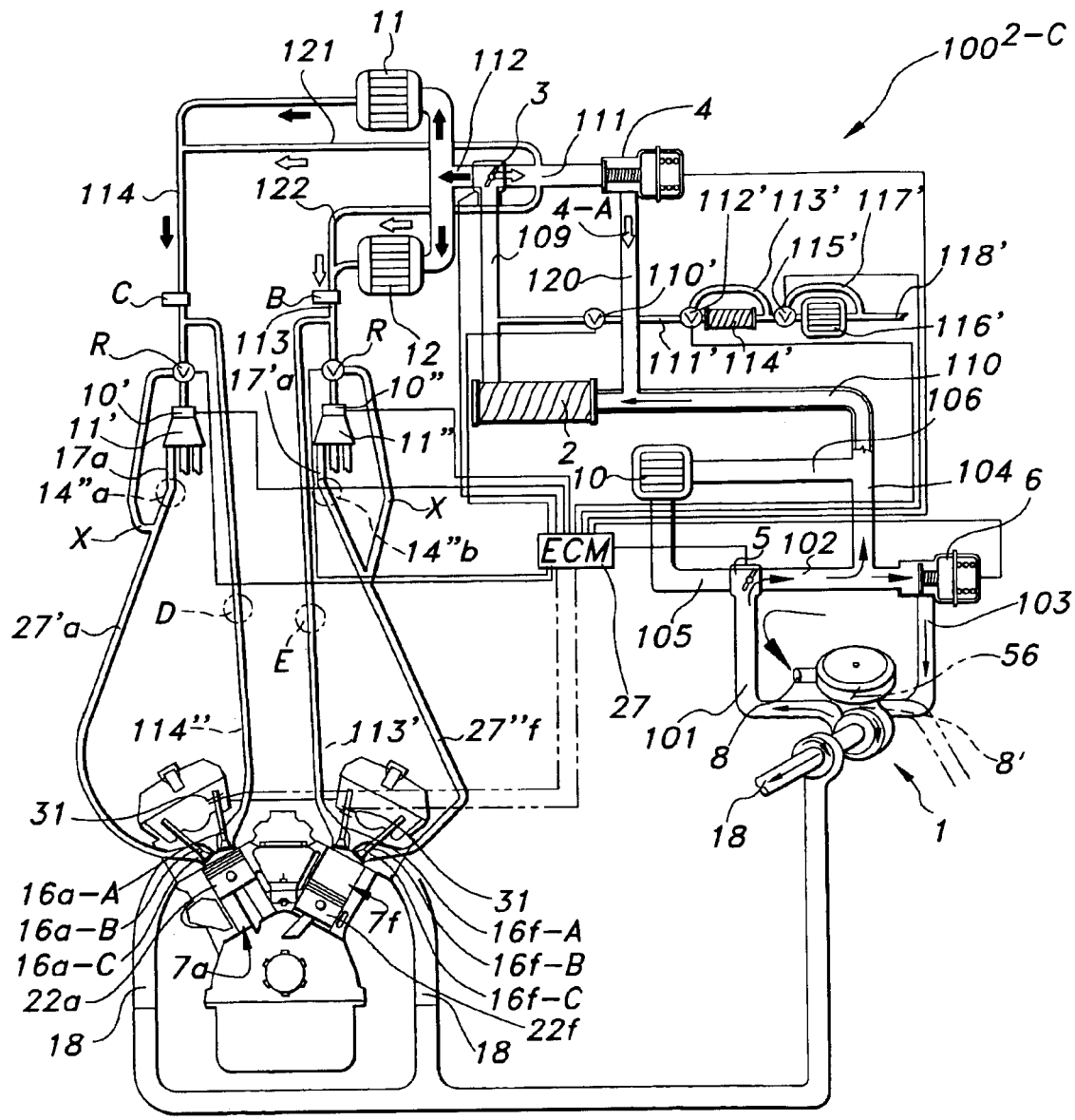
FIG. 2C is a schematic drawing of a six cylinder, 4-stroke engine, representing yet another embodiment of the apparatus of the present invention, from which yet another method of operation can be performed and will be described. Among its other components, this embodiment is seen as having three air coolers and dual manifolds and the means of controlling the temperature, density and pressure of the charge by an engine control module and by valving variations. In addition.

Referring now to FIG. 1, there is shown a six cylinder reciprocating internal combustion engine $100^1$ optionally operating in modes 1, 2 or a steady state method 3 and having one atmospheric air intake 9, FIG. 1. It is so constructed and arranged that a compressor 2 receives charge air from manifold 14-B through openings 8-B (shown in FIG. 2) and conduit 8' which air enters through common air intake duct 9 of FIG. 3. Intake conduits 15a-C to 15f-C distributes the low pressure air to the intake valves 16-B of each power cylinder. This arrangement allows the provision of air to intake valves 16-A and 16-B at different pressure levels since the charge air from conduit 15-A is selectively pressurized by compressor 2. Intake conduits 15-A, 15-C, in which all of the cylinders (only one (7) of which is shown in a sectional view) 7a–7f and associated pistons 22a–22f operate in a 4-stroke cycle and all power cylinders are used for producing power to a common crankshaft 20 via connecting rods 19a–19f, respectively. A compressor 2, in FIG. 1 and FIG. 2, shows a Lysholm type rotary compressor which, with air conduits, as shown selectively, supplies pressurized air to one or more cylinder intake valves 16A. An air inlet conduit 8' receives atmospheric air from a low-pressure manifold 14-B which receives atmospheric air through inlet 9, selectively compresses and cools the charge which then goes to intake valve 16-B by way of conduit 32, FIG. 2. Inlet conduits 15-A, 15-C and 32, FIG. 2 separately supply air charge at atmospheric pressure and air which has been compressed to a higher pressure to separate intake valves 16-B and 16-A, opening to the same cylinder 7a–7f (for example, shown here opening to cylinder 7f). Intercoolers 10, 11 and 12 and control valves 3, 4, 5 and 6 are used in the preferred embodiments to control the air charge density, weight, temperature and pressure of the air charge going to intake valve 16-A, while compressor 1, intercooler 10 and conduit 32 optionally and selectively convey charge air to intake valve 16-B. The intake valves 16a-B-16f-B, which receive air through manifold 14-B and intake conduits 15a-C to 15f-C or through conduit 8' and conduit 32, are timed to control the compression ratio of the engine $100^1$ in Operational Designs 3–6. The combustion chambers are sized to establish the compression ratio of the engine in Designs 1 and 2. Because of noticeable similarities between the engine $100^1$ of FIG. 1 and that of FIG. 2 (where the atmospheric air inlet 9 system has been shown in phantom, for informational value), reference will be made as deemed helpful to FIG. 2 for certain common components.

The engine $100^1$ shown in FIG. 1 is characterized by the ability to provide a normal expansion ratio in Operational Designs 1 and 2 and an extended expansion ratio and a low effective compression ratio in Operational Designs 3 through 6, with Design 4 having an effective compression ratio of near zero, perhaps 2:1 or less, and all capable of producing a combustion charge varying in weight from substandard to heavier-than-normal and capable of selectively providing a mean effective cylinder pressure higher than can the conventional arrangement in normal engines with lower maximum cylinder temperature in comparison to conventional engines. Engine Control Module (ECM) (refer to FIG. 2) and variable valves 3, 4, 5, and 6 on conduits, as shown, provide a system for controlling the charge pressure, density, temperature and mean and peak pressure within the cylinder, which allows greater fuel economy, production of greater power and torque, with low polluting emissions for spark ignited, compression ignited, modified HCCI, or true HCCI engines. In alternate embodiments, a variable valve timing system with the ECM-27 can also control the time of opening and closing of the intake valves 16-A and/or 16-B to further provide an improved management of conditions in the combustion chambers to allow for a flatter torque curve and higher power, with low levels of both fuel consumption and polluting emissions. In another alternate embodiment, as shown in FIG. 2-B, FIG. 2-C, FIG. 2-D, FIG. 11-B, FIG. 18-B, FIG. 20, FIG. 21 and FIG. 23, the engines of this invention and any current technology Otto or Diesel Cycle engine, or any other internal combustion engine, can utilize compression-expansion chilled charge air for greater power and efficiency and to lessen polluting emissions. (A design for Otto and Diesel Cycle engines, using refrigerated charge air, is depicted in and described for FIG. 2-D).

Brief Description of Triple Mode Operation

The new cycle engine $100^1$ of FIG. 1 is a high efficiency engine that attains both high power and torque, with low fuel consumption and low polluting emissions. The new cycle is an external compression type combustion cycle. In this cycle, part of the intake air (all of which is compressed in the power cylinders in conventional engines) is selectively compressed by an ancillary compressor 2. The temperature rise at the end of compression can be adjusted by use of air coolers 10, 11 and 12, which cool the intake air and by the late cylinder injection of temperature-adjusted air, and alternatively, by using chilled charge air and always with a low compression ratio in Operational Designs 2–6. While operating optionally in mode 1, the valve 16-A, which injects a supplementary secondary air-fuel charge in mode 2 and mode 3 can be deactivated and/or compressor 2 is "waste gated" by bypass valves 3, 4, 5 and 6 in FIG. 2, being opened. (Optionally, high-pressure valve 16-A is a simple air or gas injection valve similar to a natural gas fuel injector which is closed during mode 1 operation.)

Optional operational modes for the engines of this invention assures continued reliable engine operation in mode 1 at such a time that ancillary compressor(s) may fail when operating in mode 2 or mode 3. By cutting out the supercharging air supply section, the engine continues to operate in mode 1 with power equal to conventional engines and with improved fuel economy. (This pertains to Operational Designs 1, 2, 3 and 6 with Design 4 being excepted.) Thus, mode 1 is especially essential for military vehicle or power generation duty.

Mode 1

During operation, a primary air charge is supplied by piston 22 intake ($1^{st}$) stroke to the cylinder 7 through intake valve 16-B at atmospheric pressure or air which has been increased in pressure by perhaps one-half to one atmosphere through an atmospheric air inlet 9 or through inlet 8 of FIG. 2, which is preferably carbureted. For mode 1 operation, the charge is then compressed ($2^{nd}$ stroke) in the cylinder 7, fuel added if not present, and ignited at the appropriate point near TDC for the power ($3^{rd}$) stroke, followed by the scavenging ($4^{th}$) stroke, providing high fuel economy and low polluting emissions. This completes one power cycle.

Mode 2

When more power is desired for mode 2 or mode 3 operation, a secondary air charge (mandatory at all times for Design 4), originating from air conduit 8' and high pressure manifold (13 and 14 in FIG. 2), is introduced into the power cylinder 7 by a second intake valve 16-A, which introduces a higher pressure temperature adjusted air or air-fuel charge after the first intake valve, 16-B has closed. It is then injected either during the intake stroke, or preferably after compression has begun, or at any time during the compression stroke, or near TDC. This is in order to adjust the temperature and increase charge density and turbulence when needed. After the secondary air charge has been injected, intake valve 16-A, which can be operated hydraulically or electrically or in some designs by cam, quickly closes. Compression ($2^{nd}$) stroke continues and the charge is ignited near TDC. Piston 22 expands in the power ($3^{rd}$) stroke followed by the scavenging $4^{th}$ stroke. This completes one power cycle.

Mode 3 (Steady-State)

For mode 3 operation, modes 1 and 2 are combined, simplifying operation with the high-pressure secondary charge being injected without interruption into cylinder 7 any time after low-pressure intake valve 16-B closes as in mode 1, and preferably injected during the compression stroke. The compression stroke continues to near TDC. The charge is ignited for the power ($3^{rd}$) stroke followed the scavenging ($4^{th}$) stroke. This completes one power cycle in mode 3 operation.

Alternatively, a one-way valve (one type of which is shown as 2' in FIGS. 7, 9 and 10) can be utilized to provide a constant or a variable initial "pressure ratio" in the cylinder 12, while improving turbulence. In this alternate method of operation, valve 2' would close when the pressure in the cylinder 12 nearly equates or exceeds the pressure in conduit B, FIGS. 7, 9 and 10 or conduit 15-A in FIGS. 1 and 2, isolating valve 16-A from cylinders 7 or 12 and giving valve 16-A adequate time to close. Thus, the pressure in conduit B or 15-A, FIG. 1, controlled by compressor speed, along with valves 3, 4, 5 and 6 and the ultimate compression ratio would regulate the pressure, density, temperature and turbulence of the combustion charge.

The air pressure, supplied to intake runner-conduit 15-A (FIG. 1), is produced at a high level, and intake valve 16-A is, in alternate embodiments, replaced by a fast-acting, more controllable valve, such as, but not limited to a high speed valve (21', FIGS. 3, 4, 5, 7 and 10), which valve is, preferably, either mechanically, hydraulically, electrically or vacuum operated alternatively under the control of an engine control module (ECM)-27. In such an embodiment, a small or large, dense, temperature-adjusted, high-pressure charge, with or without accompanying fuel, can, selectively, be injected (perhaps by a gas-fuel type injector) at any time during the compression stroke, or even during the combustion process (always after intake valve 16-B has closed) in order to adjust the charge temperature and density, to reduce peak and overall combustion temperatures and to complete the desired charge mixing before combustion.

Figure 11:
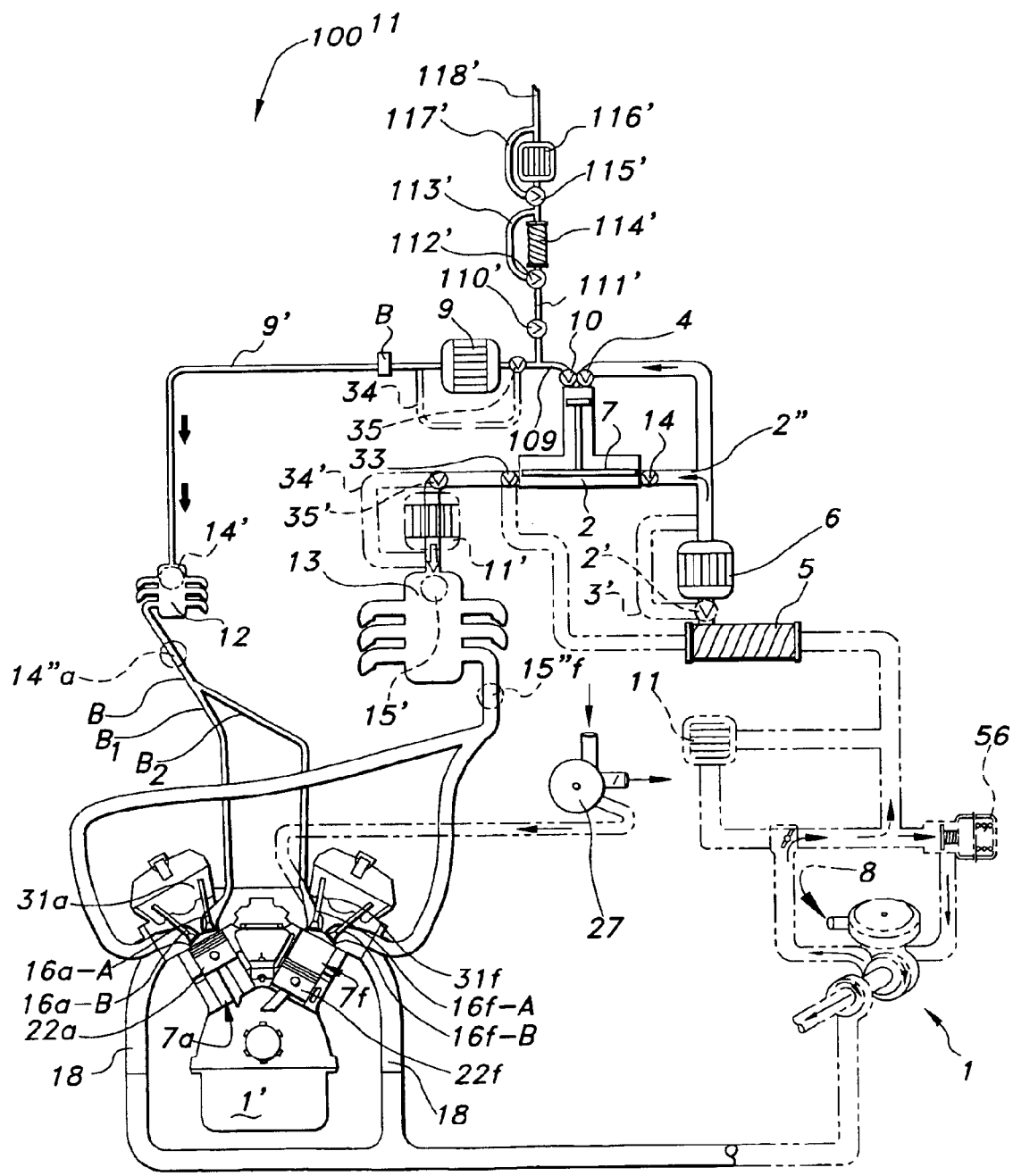
FIG. 11 is a schematic view of a six cylinder engine having both low and high pressure charge air supplied by one or two stages of compression and the pressure being amplified by a pressure amplifier. It illustrates how one compressor and a pressure amplifier can supply both low, or low boosted, and high pressure air, for operation of a constant speed engine of this invention, such as for power generation, pumping, etc.
Figure 11B:
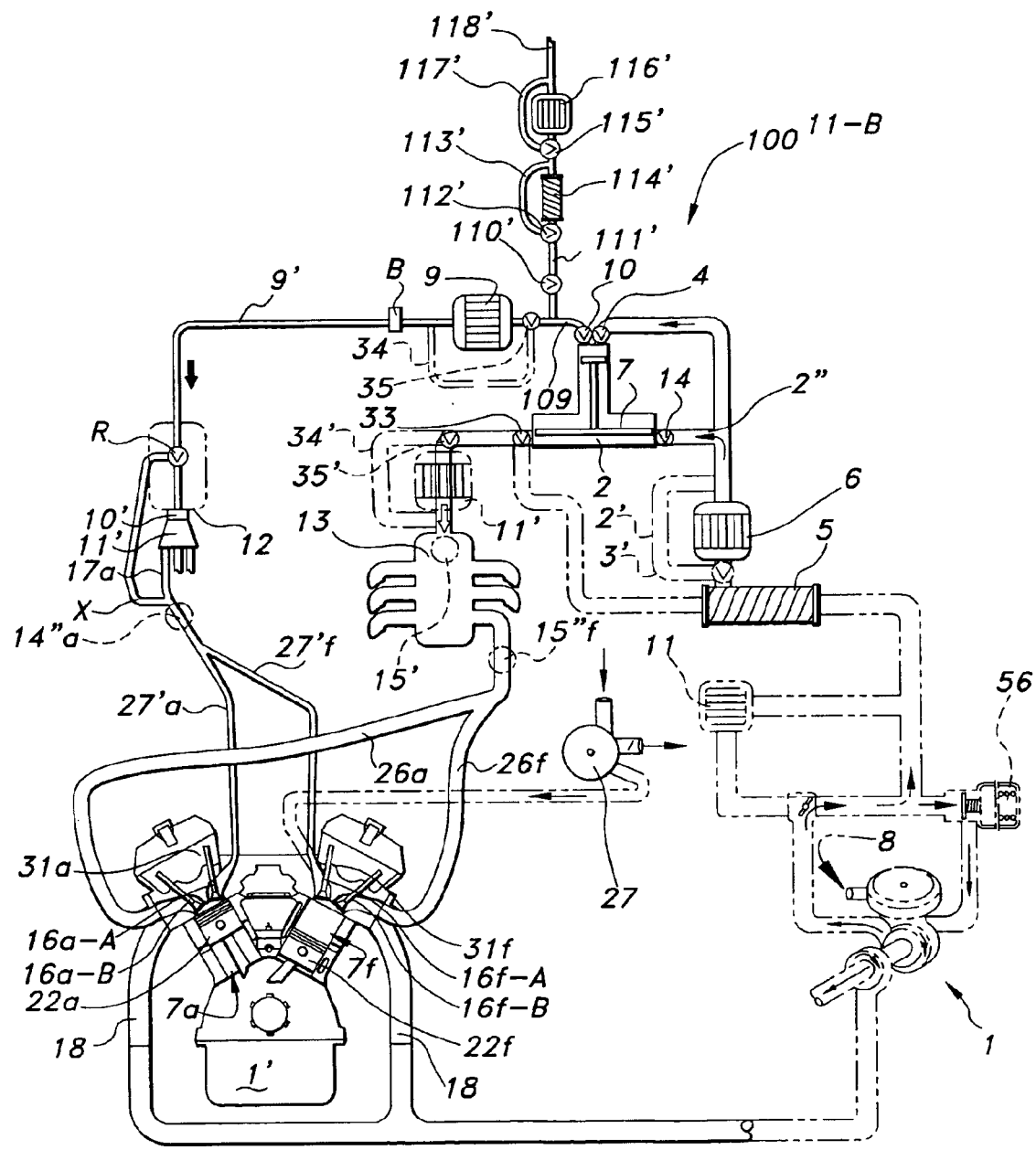
Figure 18:
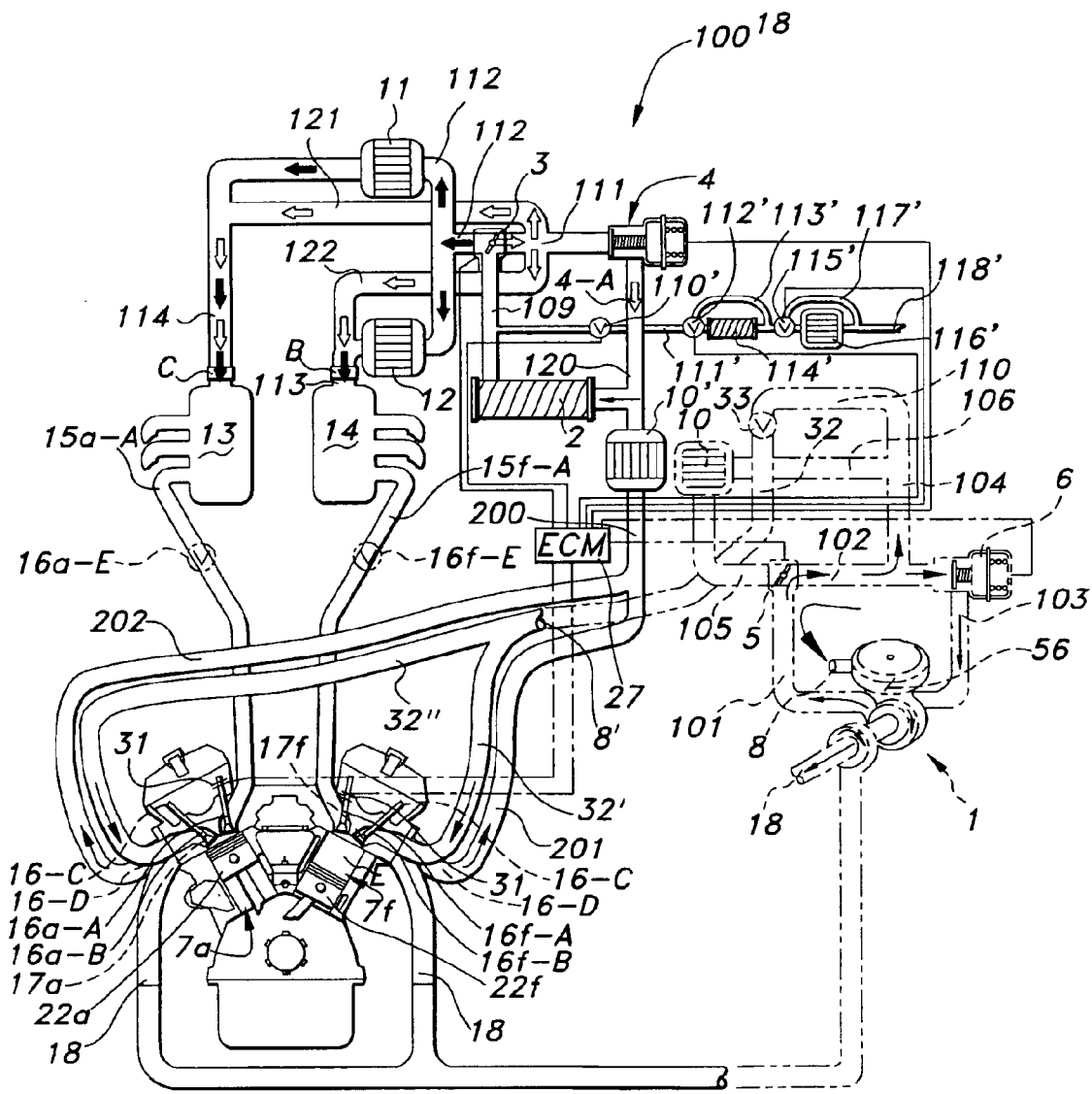
FIG. 18 illustrates a variant design of the split-cycle engine, in which a primary charge at boosted or atmospheric pressure air can supply two more stages of compression, one in the firing cylinder, another in an ancillary compressor. The charge in the compressor is temperature adjusted and then injected into the power cylinder during the last part or the end of the compression stroke near TDC or even during combustion.
Figure 18B:
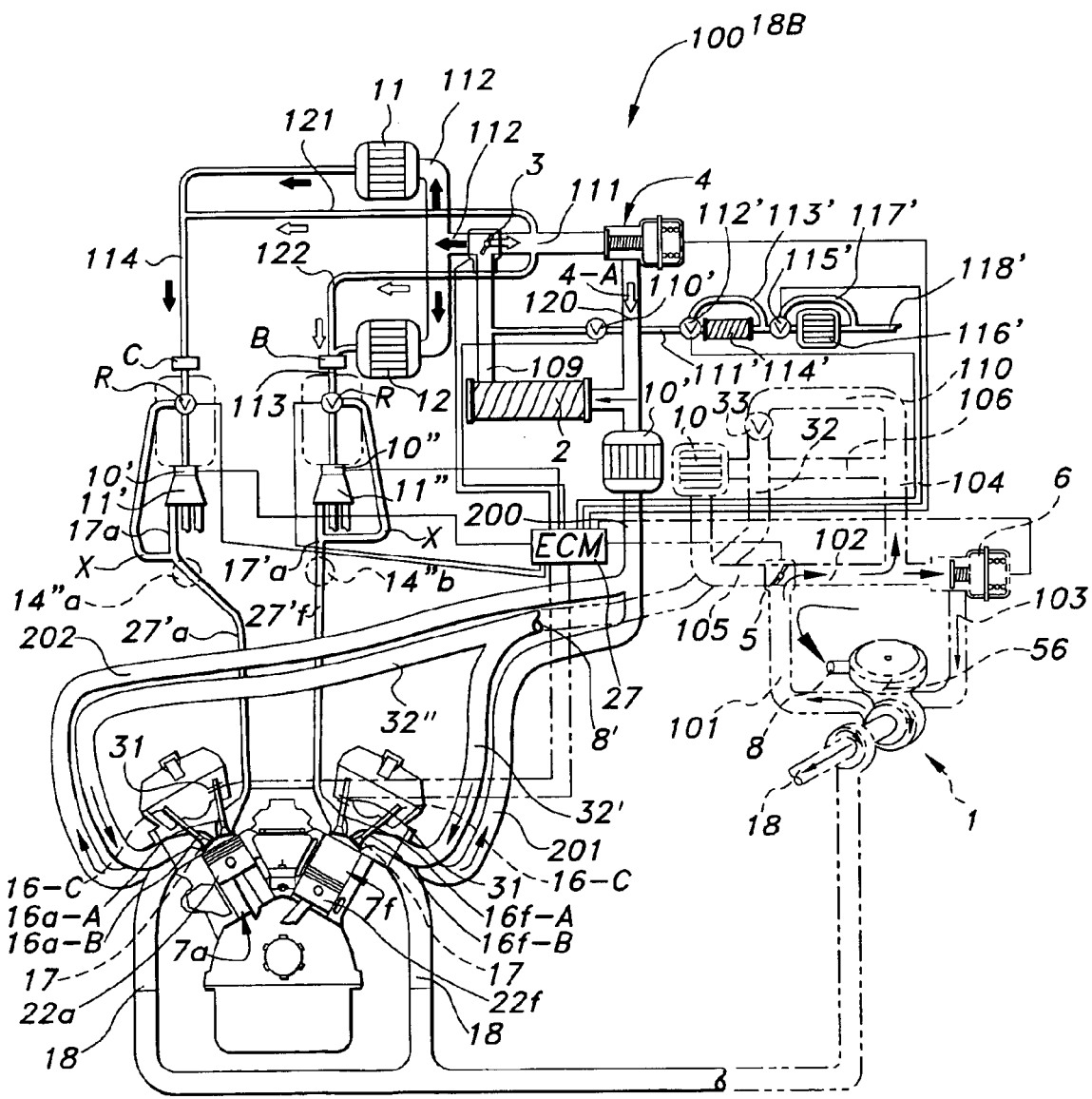
Figure 18C:
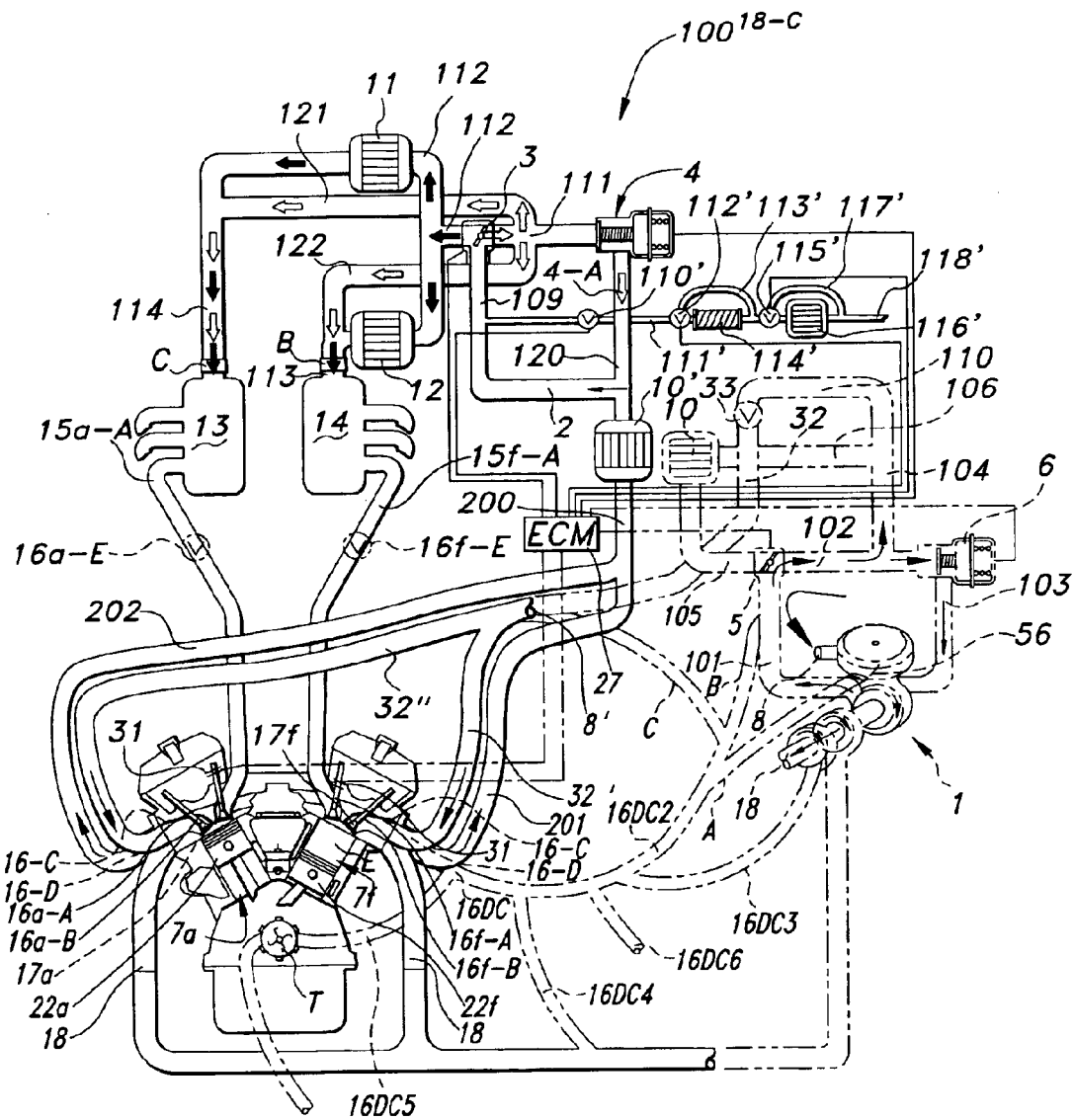
Figure 18D:
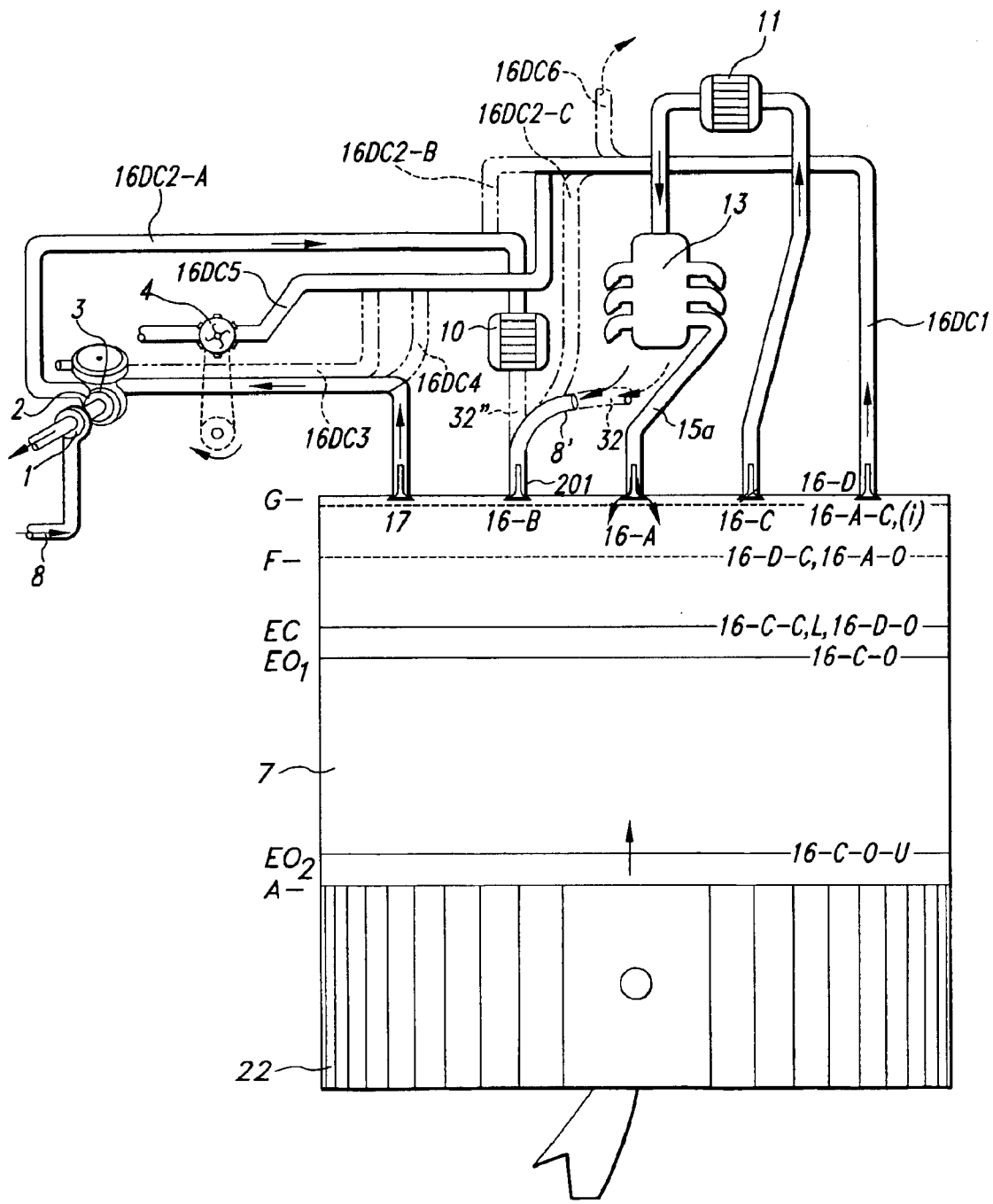
Figure 18E:
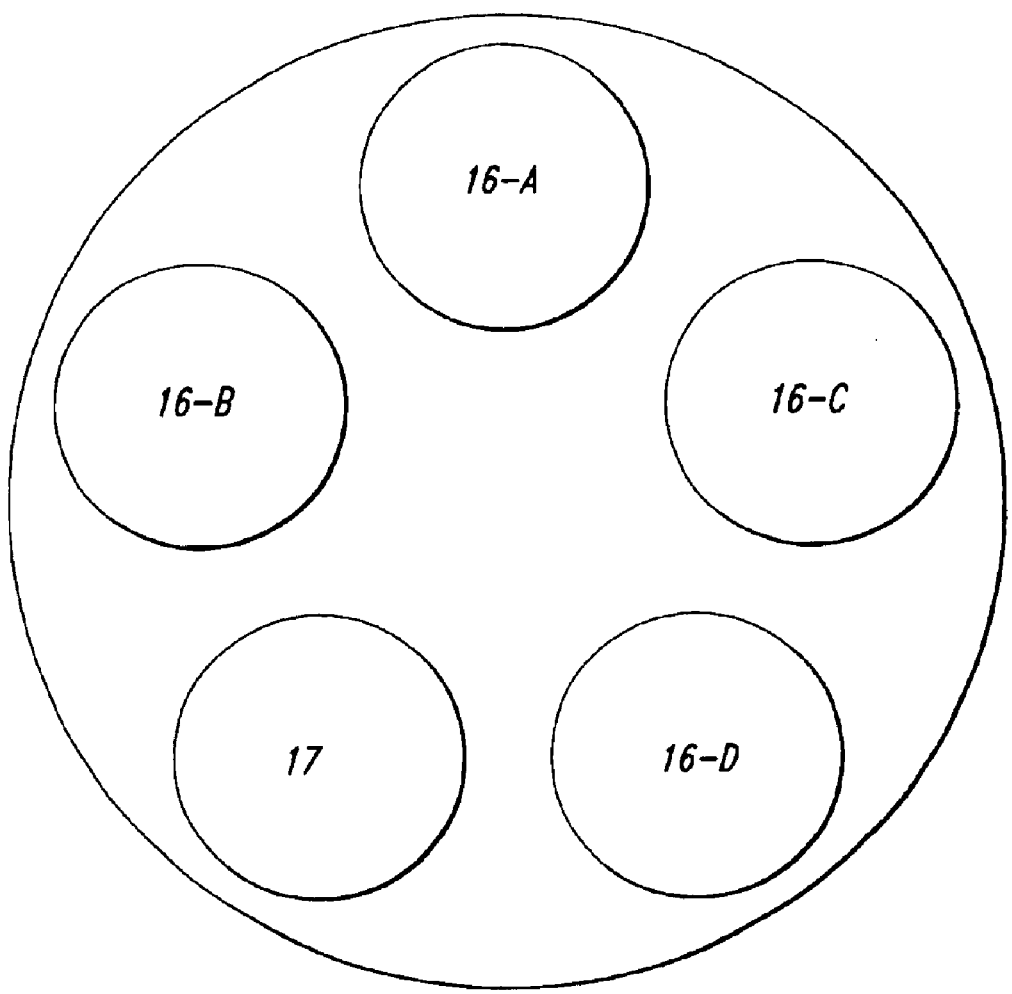

Alternatively, conduit 15-A, FIG. 1 and FIG. 2 may be fitted with compression-expansion valves 10' as illustrated in FIG. 2-B, FIG. 2-D, FIG. 11-B and FIG. 18-B to maximize the cooling abilities of the high pressure charge going to intake valve 16-A, or in one design, FIG. 2-C, the chilled charge is primary and is injected by intake valve 16-B. (Preferably when the air charge is injected by expansion valve 10', the injection takes place during the intake stroke as in FIG. 2-C). Also, the expansion valve 10' can be made variable in size, and/or bypass system R and X (adjustable by ECM-27, FIG. 2-B, FIG. 2-C, and FIG. 2-D) in order to control the cooling and power characteristics of the injected charge, as needed.

In order to maximize the chill cooling effect, the differential pressure of the cylinder and the incoming charge must be significantly in favor of the incoming charge with the cylinder pressure being the lower.

Alternatively, inlet ducts 17-A or 17-B of FIGS. 3, 4, 7 and 10 are placed in the cylinder wall so that part of the high-pressure charge air is injected between cylinder wall 7 and piston 22, preferably above the top piston ring at TDC. This will provide cooling for the engine and sweep the area clean of unburned hydrocarbons and also prevent the formation of formaldehyde High pressure inlet conduits 15-A in the engines of FIG. 1, FIG. 2, FIG. 3 and FIG. 4 and high pressure conduits B in FIG. 5, FIG. 7, FIG. 8, FIG. 9, FIG. 10, FIG. 11, and conduit 9' in FIG. 11-B and conduit 8' in FIG. 13, conduits 15a-A, 15f-A to valve 16a-E and 16f-E of FIG. 18, and conduit 8' in FIG. 19 and FIG. 19-B, in alternative designs are fitted with adjustable expansion valves 10' as in FIG. 2-B, FIG. 2-D, FIG. 11-B and FIG. 18-B to refrigerate the high pressure air going to the high pressure intake valves 16-A, and in FIG. 2-C, refrigerate the air going to the low pressure intake valve 16-B. The latter chills the primary charge air for further improvements in reducing polluting emissions.

Alternatively, in the engine of FIG. 2-C, the air or air/fuel (primary) charge first entering the cylinder 7 or 12 by intake valve 16-B or ports 11 is compressed highly and passed through expansion valve 10', pressure-drop-distributor, 11' and distributor tube (evaporator) 17a, at the beginning of the intake of valve 16-B, which is then closed at BDC for Operational Designs 1 and 2 in which cam profiles are as normal. The intake valve 16-B can close early or late in other designs in regard to the effective compression ratio desired. In this case, when greater power is needed (mode 2 or 3), the cool high pressure air or air/fuel charge is injected by intake valve 16-A at any time during the compression stroke, or even during combustion, after intake valve 16-B has closed in any case.

The expansion valves 10' can alternatively have variable size openings and bypass systems R and X. They are controlled by the ECM-27 to maintain optimum engine temperature and density in regards to polluting emissions and power requirements. Alternatively, the expansion valves may be combined with high-speed cylinder intake valves into one unit.

If the charge air entering expansion valve 10' of engine of FIG. 2-C was at 200 psi pressure, and the expansion valve 10' dropped the pressure going to cylinder 7 to 70 psi, the chilling effect will be high and the pressure boost will be about five atmospheres for great power. If the primary air charge was compressed to 100 psi, it could be expanded by valve 10' to say 15 psig for adequate cooling with a pressure boost of one atmosphere.

Fuel can be carbureted in any of the 4-stroke designs in one or both air inlet streams, with the exception of Design 4 of FIG. 1, FIG. 2, FIG. 2-B, FIG. 2-C and FIG. 18-B where carburetion of fuel must of necessity be done in the high-pressure incoming stream only. Also, the 2-stroke designs should be carbureted by the high pressure inlet air stream only.

Fuel can also be injected in a central-body (not shown), or the fuel can be injected into one or both of the inlet streams of air, injected into a pre-combustion or pre-heater chamber, or injected directly through intake valves 16-A, 16-B (16-B only if 16-B does not remain open past BDC and not at all in Design 4), or it may be injected directly into the combustion chamber at point x during the compression stroke (and during the intake stroke, only if intake valve 16-B closes before or at BDC), or at the time after the piston 22 has reached point x in the compression stroke. The fuel can be injected along with compressed air, compressed cooled air, or with compression-expansion "chilled" accompanying air, the latter as depicted in FIG. 2-B, FIG. 2-C, FIG. 2-D, FIG. 11-B, FIG. 18-B and FIG. 18-C. The fuel can be injected with or without heated or cool accompanying air. In the case of diesel operation, fuel can be carbureted for spark ignition or for the HCCI system, as explained herein.

Alternatively, for modified or true HCCI operation of diesel fueled engines, the fuel can be carbureted, if during compression of the charge, the temperature is kept below the auto-ignition temperature of the fuel-air mixture. Compressing in stages with intercooling makes this system feasible. The air-fuel mixture is kept just below auto-ignition temperatures. The fuel can also be carbureted with the air charge before or after any stage of compression and cooling of charge. In either of these two systems, the charge can be ignited by spark or HCCI at near piston TDC. As an alternative to initial fuel carburetion, the primary air only charge can be compressed to temperatures higher than auto-ignition temperature. A small secondary air charge is then cooled and mixed (carburated) with the entire fuel charge and is injected 10–15 degrees before or at piston TDC for timely ignition. In either of these systems, the high-pressure secondary charge injection will assure homogenization and clean burning of the charge. After the temperature-and density-adjusting-air charge has been injected (mode 2 or 3), compression of the charge continues and with fuel present, is ignited at the opportune time, preferably 10–15° before TDC, for the expansion ($3^{rd}$) stroke. The effective compression ratio is established by the displaced volume of the cylinder remaining after point x (the point where intake valve 16-B closed whether before, at, or after BDC) has been reached on the compression stroke, being divided by the volume of the combustion chamber. Therefore, the compression ratio for Designs 1 and 2 is equal to the compression ratio, and for Design 4, it is zero. The expansion ratio is determined by dividing the cylinders total clearance volume by the volume of the combustion chamber.

Referring now to FIG. 1-C, in engines having only one atmospheric intake conduit, but having different air paths and conduits, such as conduits 15-A and 15-C of FIG. 1, a shunt conduit 202' leading from the exhaust conduit 18 is divided into two shunt conduit portions 203a, 203b, each with a proportioning valve 209a, 209b operating so as to selectively admit exhausted gases to either or both of intake valve 16-B (through conduit 9 and eventually conduit 15-C) and/or to intake valve 16-A (by way of conduit 8 and conduit 1S-A). Each proportioning valve, 209a, 209b would allow either a portion or none of the exhausted gases to enter its respective port, meanwhile restricting entrance of fresh air if necessary. The exhausted gases can be cooled or heated by optionally arranging fins 202a on conduit 202' and/or 203a, 203b and 203c, or by passing the exhaust through an optional intercooler or heater (not shown) before the gases are introduced into the air intake(s) of the engine. A take-off shunt conduit 203d and a proportioning valve 209e leading from shunt 202, which is filled with exhaust gases, along with shunt 203e and proportioning valve 209f, leading from atmospheric air intake conduit 9, with shunt conduit 203d and shunt 203e converging and becoming a single shunt conduit 203f, leading to a compressor 2', which has a conduit 203g leading to a bypass system 209g, 203h and an intercooler or heat exchanger 108, which has a conduit 203i, leading to an outlet conduit 36, which is connected to a preparation or pre-combustion chamber 38' shown in FIG. 19 and FIG. 19-B in combustion chamber of FIG. 19-C and FIG. 19-D.

Figure 19:
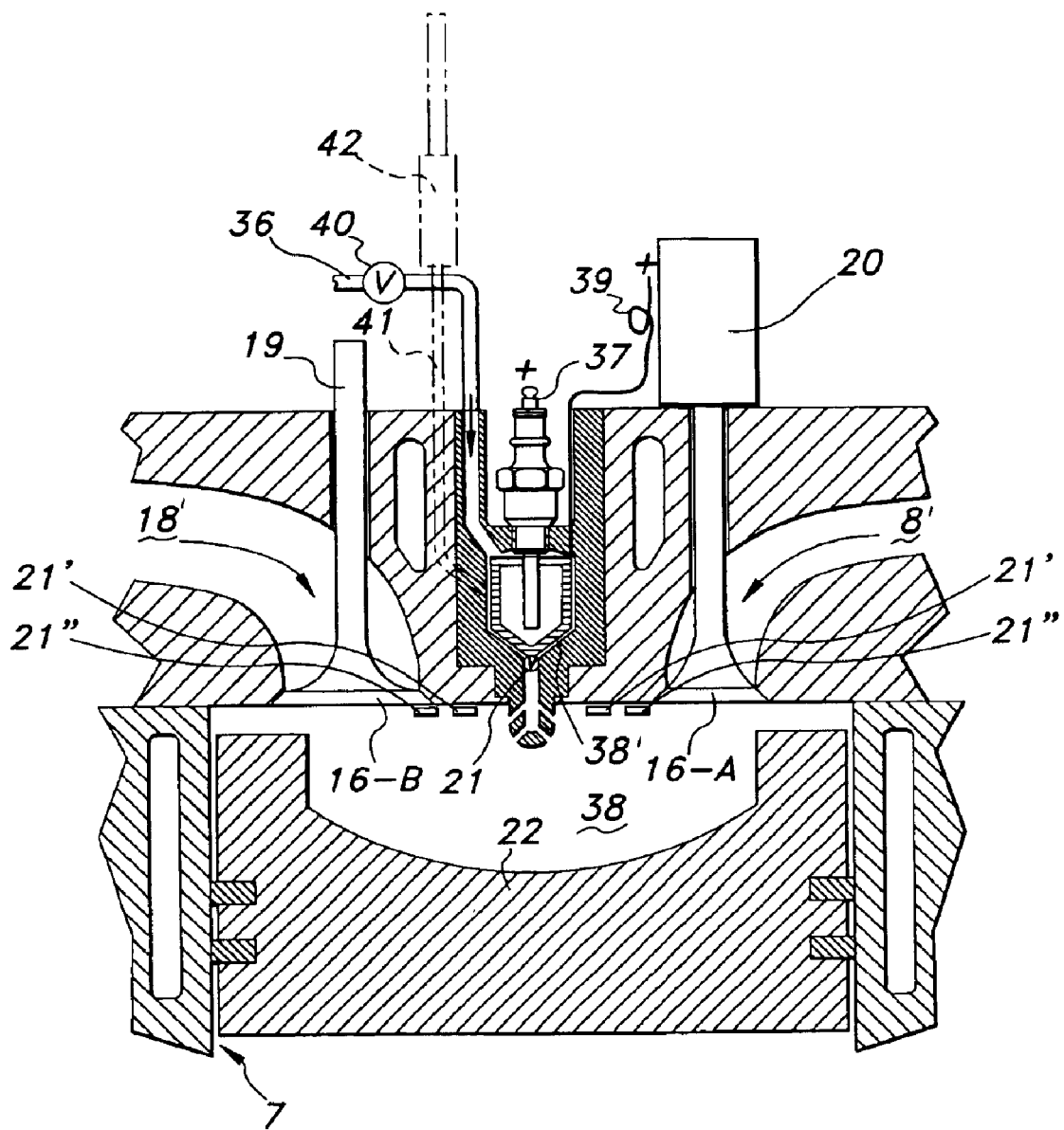
FIG. 19 is a schematic transverse sectional view of a preparation or pre-combustion chamber and a combustion chamber with associated heating elements, inlet conduits, injector pump, ducts, and valving for air and/or fuel suggested for gaseous or liquid fuel operation for the engines of this invention or for any other internal combustion engine for providing spark or compression ignition, modified HCCI, or true HCCI operation.
Figure 19B:
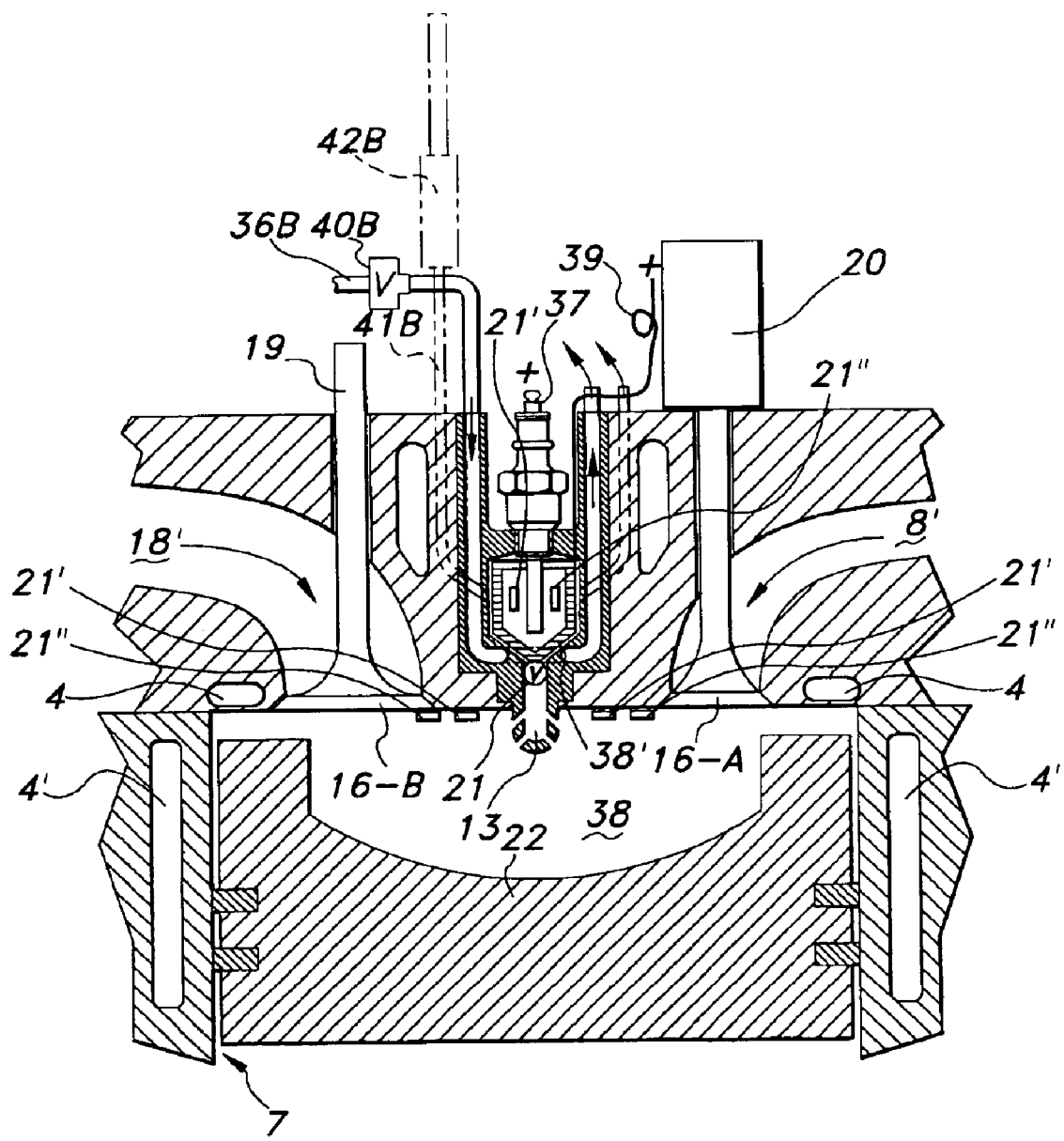
Figure 19C:
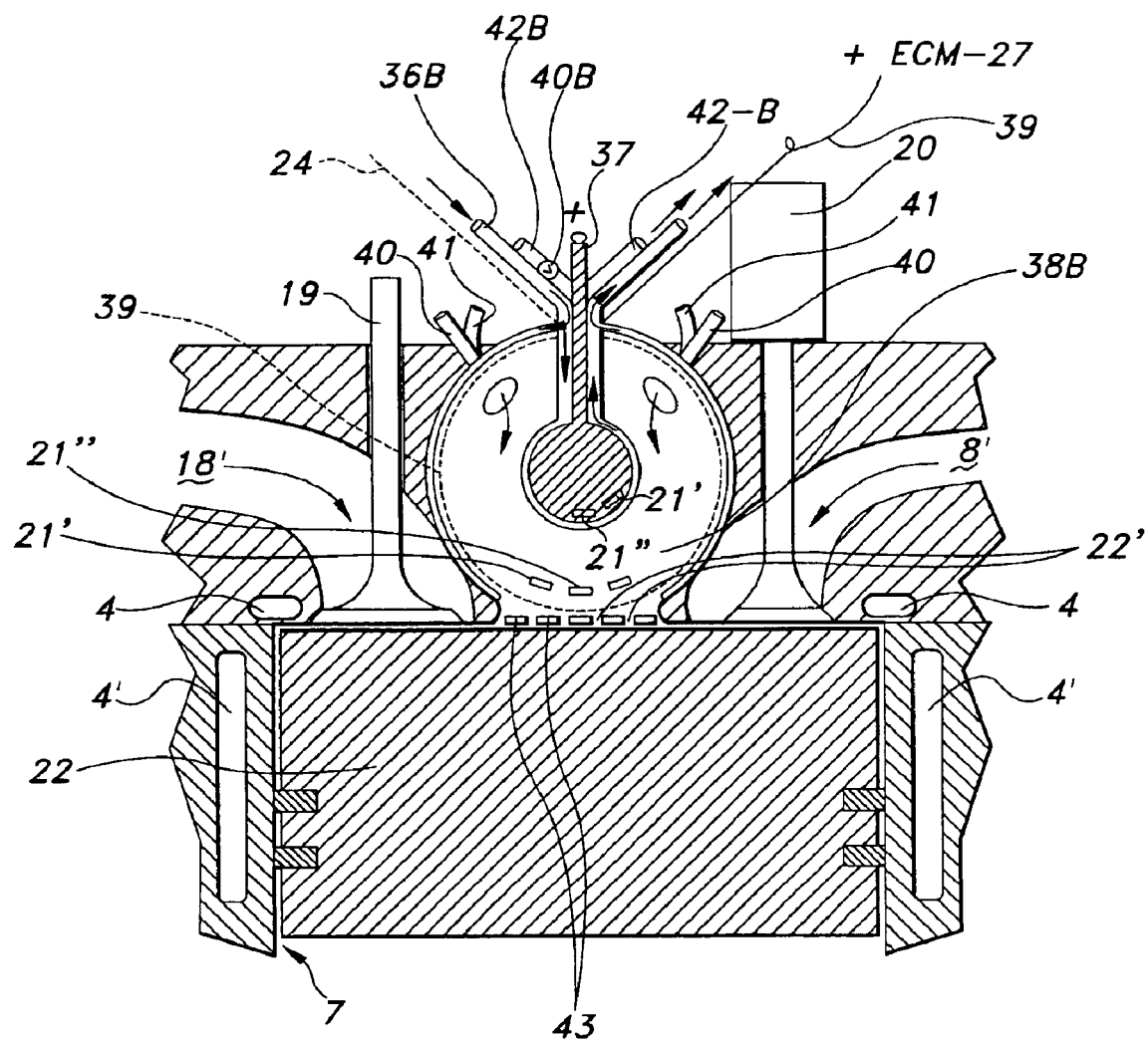
Figure 19D:
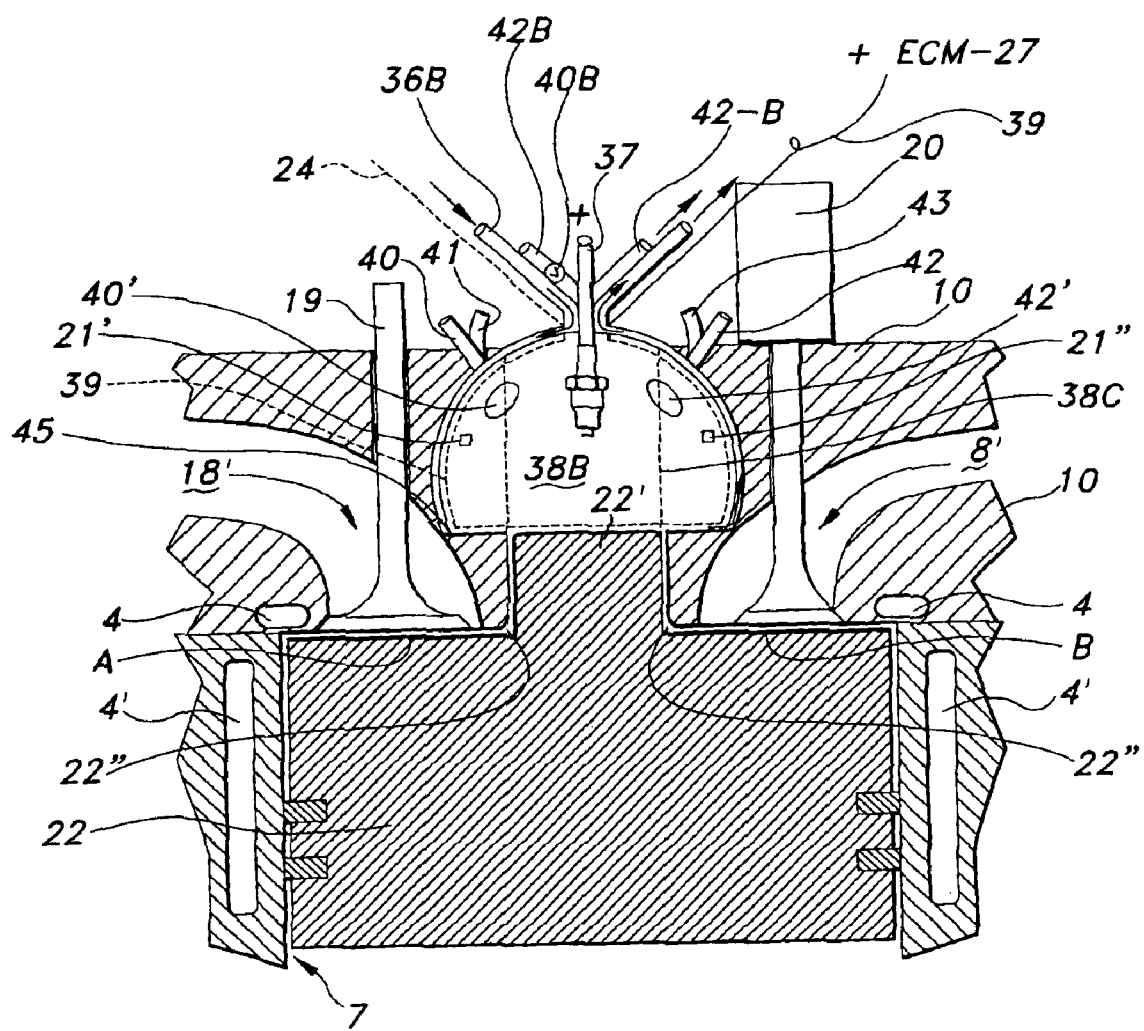

With this arrangement, proportioning valves can direct undiluted exhaust gases or fresh air or any percentage of either, mixed through compressor 2 and optional cooler or heat exchanger 108 to inlet 36 of FIG. 19 and inlet 36-B of FIG. 19-B for the purpose of being used as a catalyst for ignition of the air-fuel charge in pre-combustion chamber 38' or combustion chamber 38.

Alternatively, as shown in phantom on FIG. 1-C, one shunt portion 203a is optionally diverted (shown as 203c) directly to conduit 15-C and provided there with a proportioning valve 209c.

In the engine of FIG. 2 having dual atmospheric air intakes 8, 9, (9 is in phantom) an arrangement similar to that shown in FIG. 1-C is utilized, it being understood, however, that conduit 8 is open to the atmosphere.

In any engines having dual air intake conduits or dual air paths, a portion of exhausted gases can be introduced in any amount necessary, from one to three points and controlled preferably by an engine control module (ECM) for better management of combustion and emissions characteristics.

The Engine $100^2$ of FIG. 2 Operating in Operational Designs 1–6

Referring now to FIG. 2, there is shown a schematic drawing of a six-cylinder engine $100^2$ operating optionally in three modes in a 4-stroke cycle. The engine is similar in structure and operation to the 4-stroke engine of FIG. 1 and shows alternative air induction systems, utilizing air intake 9 or air intake 8. FIG. 2 also shows three intercoolers 10, 11 and 12 and dual manifolds 13 and 14 plus alternative intake manifold 14-B. The need for dual atmospheric air intake (8 and 9 in FIG. 2) can be eliminated by providing air from port 8-B of manifold 14-B directly to air intake conduit 8' shown schematically, in FIG. 2.

Mode 1

One alternate air induction system shown in FIG. 2 supplies unpressurized charge-air to intake valve 16-B of the engine of FIG. 1 and of FIG. 2, by providing atmospheric pressure air to the intake runners 15a-C to 15f-C leading from manifold 14-B in FIG. 1 and FIG. 2, which receives atmospheric air through induction port 9, and then, during an intake ($1^{st}$) stroke of piston 22 distributes the unpressurized air to intake valves 16-B of each power cylinder. Alternatively, the primary charge is boosted by compressor 1 and conduit 32. Then compression ($2^{nd}$) stroke occurs and the air-fuel charge is ignited near TDC for the power ($3^{rd}$) stroke, which is followed by the scavenging ($4^{th}$) stroke to complete a power cycle.

Mode 2

The intake ($1^{st}$) stroke has occurred and for more power for mode 2 or 3 operation, high-pressure, cooled air is injected through intake valve 16-A at anytime after piston 22 reaches BDC on intake stroke, preferably during the compression stroke for Operational Designs 1 and 2 of FIG. 1 and FIG. 2 engine, and for Designs 3 (both methods), Designs 5 and 6, after piston 22 has reached point x during the compression stroke (the point in which intake valve 16-B closes), and near TDC for Design 4. Alternatively, for Designs 3 (both methods) and Designs 5 and 6, intake valve 16-A is opened at any point deemed appropriate in the intake stroke or compression stroke at or after the point at which intake valve 16-B closes. Intake valve 16-A then quickly closes, compression continues in Designs 1, 2, 3, 5 and 6 and fuel is added, if not present. The charge is ignited near (TDC) and the power ($3^{rd}$) stroke occurs in all Design systems including Design 4 where the entire charge is introduced pre-compressed, near TDC of stroke 2 and ignited for the power ($3^{rd}$) stroke, which is followed by the scavenging ($4^{th}$) stroke.

Mode 3 (Steady-State)

Operational modes 1 and 2 are combined in this manner for a more simple operation: Piston 22 takes in air or air-fuel charge on the intake ($1^{st}$) stroke according to the Operational Design chosen. A secondary high pressure air charge is injected by intake valve 16-A preferably during the compression stroke, either later or at the same time that the piston 22 reaches the point at which the intake valve 16-B closes. Intake valve 16-A then quickly closes, compression continues, with the exception Design 4, FIG. 1, where piston 22 is near TDC when valve 16-B closes and the high-pressure valve 16-A charges the cylinder. Fuel is added, if not present and the charge is ignited at the appropriate place, preferably 10–15 degrees before TDC, for the power ($3^{rd}$) stroke. This is followed by the scavenging ($4^{th}$) stroke to complete the power cycle. (In Operational Design 4, intake valve, which is now outlet valve 16-B, closes just far enough before TDC of piston 22 position to allow time for the injection of the entire air or air-fuel charge and its ignition near TDC.

In all operational modes, a third alternate and preferred air induction system shown in FIG. 2 supplies the primary air charge to intake valve 16-B as follows: Charge-air which has been pressurized to a low pressure by compressor 1, perhaps from 0.3 Bar to as much as 2 Bar or more, can selectively (and intermittently or continuously) be supplied to low pressure intake valves 16-B of the engine of FIG. 1 or FIG. 2 by way of conduit 32, leading from conduit 110 to the intake valves (16a-B through 16f-B) which conduit receives charge-air at atmospheric pressure or which has been pressurized and has had its temperature optimized, all controlled by compressor 1 and intercooler 10 with the charge-air paths being controlled by ECM-27 and valves 5 and 6 with the corresponding conduits. In this case the valve 33 is optional. The use of this system also eliminates the need for dual atmospheric air intakes.

A fourth alternate air induction system, shown in FIG. 2, supplies the primary charge-air to the low pressure intake valves 16-B by having charge-air coming selectively from intake system 9, manifold 14-B and intake runners 15-C (shown in phantom) or from conduit 32, which would direct air to power cylinder 7 at whatever level of pressure and temperature was needed at any particular time. With this arrangement, opening valve 33 at such a time that compressor 1 was compressing the charge passing through it, would have the effect of increasing the density of the primary charge-air, which in this case, has its temperature as well as its pressure adjusted by compressor 1 and control valves 5 and 6. A one-way valve 34 would prevent the higher pressure air escaping through conduit 15-C. When less power was needed, compressor 1 could be "waste gated" by opening, partially or completely, control valve 6 and closing shutter valve 5. Alternatively, valve 33 could be closed by the engine control module (ECM-27) and the primary charge-air would be drawn into cylinder 7 at atmospheric pressure through intake duct 9.

Operational Designs of Primary Air Charging and Setting of Compression Ratios for All Modes Described below are six Operational Designs of the new-cycle engine $100^2$ applicable also to operation of engines for FIG. 1, FIG. 2, FIG. 2B, FIG. 2C, FIG. 3, FIG. 4, FIG. 5 and FIG. 7

Depending upon the power requirements of the engine (e.g., differing load requirements), either intake air at atmospheric pressure from inlet 9 or intake air that has been boosted in pressure by compressor 1, as shown in FIG. 2, by conduit 32 and has had its temperature adjusted by bypass systems 5 and 6 and charge-air cooler 10, is drawn into the cylinder 7 by intake stroke through air inlet 8 in FIG. 2 or 2-B, the atmospheric air optionally through manifold 14-B, intake conduits 15-B, and either at atmospheric pressure or boosted, is received by intake valves 16a-B-16f-B, by intake stroke of piston 22. (Inlet port 8 in FIG. 2-C admits air to compressors 1 and 2, intercoolers 10, 11 and 12 and ultimately to both intake valves 16-A and 16-B, the latter by way of conduit 27'a, 27"f going to inlet valve 16-B and conduits 113' and 114' going to inlet valve 16a-A–16f-A.)

Operational Design 1. In this design, intake valving and combustion chambers are as in normal engines. On the primary air intake ($1^{st}$) stroke, the intake valve is left open as normally done to receive as large a charge as possible and closed at the usual time, near (BDC) to capture a full air charge, which produces a normal compression ratio with the expansion ratio being equal to the compression ratio.

Operational Design 2. In Design 2, the primary air intake valving is as in normal engines to capture a full air charge, but the combustion chamber is larger-than-normal for a substandard compression ratio still with the expansion ratio being equal to the compression ratio.

Operational Design 3. There are two methods to this design. In the first method for the primary air intake, the intake valve 16-B is closed early, during the intake stroke before the piston reaches BDC. The small trapped air charge provides a substandard or low effective compression ratio with the expansion ratio being greater than the compression ratio.

In the optional method of Design 3 of primary air charging after the intake stroke is complete, the intake valve 16-B, which can be single or multiple, is left open for a period of time after the piston 22 has passed BDC and is then closed. This pumps part of the fresh air charge back into the intake manifold to again trap a smaller-than-normal air charge producing a substandard or low effective compression ratio with an extended expansion ratio.

Operational Design 4. Design 4 describes another system of primary air charging, which is to hold the intake valve 16-B open on the intake ($1^{st}$) stroke, through BDC to near piston (TDC). Valve 16-B is then closed to trap very little primary air charge for an effective compression ratio of perhaps 2:1 or less with an extended expansion ratio. Optionally, intake valve 16-B is closed at piston BDC and an ancillary valve (not shown) is opened to allow the primary air charge to be pumped through and out of the cylinder for cooling of the cylinder.

Operational Design 5. Design 5 describes an additional method of primary air charging an engine cylinder 7, of engines of FIG. 1, FIG. 2, FIG. 2-B, FIG. 2-C, FIG. 3, FIG. 4, FIG. 5 and FIG. 7 with a smaller-than-normal charge is being captured in cylinder 7, by intake valve 16-B closing early in the intake stroke at piston BDC, or early in the compression stroke, optionally producing a substandard or normal compression ratio which alternatively produces an extended or a normal expansion ratio.

Operational Design 6. Design 6 describes still another alternative method of primary air or air-fuel-charging. In this system, valve 16-B selectively closes early before BDC, or as late as BDC of piston 22, optionally producing a substandard or normal compression ratio for optionally a variable expansion ratio.

General Operation of Operational Designs 1 Through 6

Mode 1

The intake ($1^{st}$) stroke has occurred and the compression ($2^{nd}$) stroke is now underway. Compression begins for a normal compression ratio in Design 1, and for a substandard compression ratio in Design 2, a substandard compression ratio for Design 3 and for a compression ratio of near zero in Design 4. Designs 5 and 6 can produce a normal compression ratio or a substandard compression ratio depending on the point that intake valve 16-B closes. If the effective compression ratio is substandard in Operational Designs 3 through 6, the expansion ratio is extended.

With the substandard compression ratio of Design 2 and with the intake valve 16-B closing early or late in Designs 3 and 4 and alternatively early or late in Designs 5 and 6, lessens the temperature rise of the primary air charge during the compression stroke. In Design 4, there is little or no heat-of-compression, only the cooling of the cylinder by the ejected primary air. At the end of the compressions ($2^{nd}$) stroke fuel is added, if not present, the charge is ignited near TDC. Then, the expansion ($3^{rd}$) stroke occurs, followed by the scavenging ($4^{th}$) stroke. This produces an efficient low emissions operation with normal power, especially if the primary air is boosted in pressure.

Mode 2

Intake valve 16-B has opened and closed for the induction of the primary air charge by piston 22 intake ($1^{st}$) stroke. A secondary compressed, temperature-adjusted air charge is injected into the cylinder 7 by intake valve 16-A, which opens and closes quickly after closure of valve 16-B. This preferably happens during the compression stroke, or even during combustion in all Operational Designs. In all operational designs, the intake valve 16-A will open only at or after reaching the point the intake valve 16-B closes in the primary air charging process, which for Design 4 is near TDC, to inject the secondary air charge. In all cases, the engine of this invention can produce a more dense, homogenized temperature controlled charge in order to provide the torque and power desired of the engine. The later in the compression stroke the secondary air or air-fuel charge is injected, the less is the heat-of-compression for that portion of air also. This fact, coupled with the low heat-of-compression production of the first or primary air or air-fuel charge, assures a very cool compression process in total.

For Operational Design 4, the secondary charge produces virtually no heat-of-compression for the coolest working cycle of all Designs.

Mode 3 (Steady-State)

The engines of the present invention can be simply and efficiently operated in a single mode, mode 3, by combining the operations of mode 1 and mode 2, whereby the secondary air or air-fuel of mode 2 is added in mode 3 without interruption at the same point it would be injected in mode 2, according to the Operational Design of 1 through 6 that is chosen for the particular engine design and duty cycle selected.

Discussion of Various Operating Parameters

In Design 4, after inducting the primary air charge by the intake ($1^{st}$) stroke of piston 22, little air charge is retained on the compression stroke and cylinder 7 is empty, or almost so and near TDC as intake valve 16-B closes after ejecting almost all of its fresh air charge back into the intake system. Close to the end of the $2^{nd}$ stroke and near TDC high pressure "conditioned" air intake valve 16-A opens to inject nearly, or virtually all of the required air or air/fuel charge. (In this system, the primary air charge is pumped in and out of the cylinder, mostly to cool cylinder 7 before the "loading" and firing at TDC for the power ($3^{rd}$) stroke of piston 22. Alternatively, an ancillary exhaust valve 16-C (indicated in FIG. 2, FIG. 2-B and FIG. 2-C, but not shown) or exhaust valve 17 would be opened at the beginning of compression (2$^{nd}$)stroke of piston 22 and closed near piston TDC rather than keeping intake valve 16-B open to near end of compression stroke. This is in order to vent the unused air of the non-compressing (2$^{nd}$) stroke to the exhaust manifold, to be used to cool compressor or engine cylinders or expelled to the atmosphere or for other use.) As soon as the air charge is injected near TDC, fuel is added, if not present. The charge is ignited for a very cool, dense combustion expansion process in the expansion (3$^{rd}$) stroke followed by the scavenging (4$^{th}$) stroke. This completes one power cycle. In this Operational Design, the fuel charge is injected near piston TDC, but early enough that the charge can be placed, the valve 16-B closed and the charge ignited, the latter preferably 10–15 degrees BTDC.

For Design 4, among the various choices available, the engine of either FIG. 2-B or FIG. 2-C could be utilized, offering a choice of thermodynamically chilling either the primary air charge, which only cools the cylinder, or chilling the secondary air charge or chilling both charges with the primary air charge being used to cool the cylinder 7 and its combustion chamber with the secondary charge being a chilled working charge. The primary charge is expelled either back through intake valve 16-B or through an ancillary valve 16-C (not shown) or through exhaust valve 17, FIG. 1 which is again opened at BDC and left open to near TDC.

Operating in mode 2 or steady-state mode 3 when even greater power is required using either of the Operational Designs, the secondary air charge can be increased in density and weight by causing shutter valves 5 and 3 and by-pass valves 4 and 6 to direct all or a greater part of the air charge through compressors 2 and 1 and through coolers 10, 11 and 12 to increase the charge density and/or by increasing compressor speed or by cutting in a third stage of auxiliary compression, thus enabling more air to be pumped in on the backside. Alternatively, the secondary air or air-fuel charge can be compression-expansion chilled by the system shown in FIG. 2-B, FIG. 11-B, FIG. 18-B and items 10', 11", 12, 17a, 27'a, 27'f and 16a-A and 16f-A. In the engine of FIG. 2-C, the primary air charge through intake valve 16-B is compression-expansion chilled with intake valve 16-A, when operating in mode 2 or mode 3, receiving the dense, non-expanded air charge as in engine of FIG. 2-C. The timing of the closing of intake valve 16-B can be optionally altered in Designs 3, 4, 5 or 6, perhaps temporarily, to retain a smaller, or a larger charge.

In all Designs for modes 1, 2 and steady-state mode 3, near the end of the compression stroke, fuel is added, if not present, the charge is ignited by spark, compression, modified HCCI or by HCCI, and combustion produces a large expansion of the combusted gases against the piston 22 for the power (3$^{rd}$) stroke producing great energy in either mode 1, mode 2 or mode 3 for Designs 1, 2, 3, 5 or 6 (Design 4 operates only in mode 3). This energy is absorbed and turned into high torque and power.

Near piston BDC, for modes 1, 2 and 3, the exhaust valves 17a–17f, 17a'–17f' open and the cylinder 7 is efficiently scavenged by the (4$^{th}$) stroke of piston 22, after which valve(s) 17 close (seen in FIG. 1).

Shown in FIG. 2 is a suggested engine control system consisting of an engine control module (ECM) 27, two shutter valves 3 and 5, two air bypass valves 4 and 6, the optional pressure reducing valves 25 (25a–25f) on air conduits 15-B (15a-B–15f-B) There is also a scheme of controlling the pressure, temperature and density separately by controlling air bypass valves 4 and 6 and shutter valves 3 and 5. As illustrated, air bypass valve 4 is closed to allow compressor 2 to fully compress the charge and shutter valve 3 is slightly open, allowing part of the air to flow uncooled (hollow arrows) and some of the air cooled (solid arrows) to the manifolds 13 and 14, all of which could be controlled by the ECM-27 in order to provide an air charge at optimum density, temperature and pressure. The hollow arrow 4-A in conduit 120 shows how ABV 4 can be partially opened to allow some of the air to bypass and return to compressor 2 in order to finely adjust the pressure of the secondary air charge that is injected during mode 2 operation to adjust the charge density, turbulence and temperature. Part or all of the air charge can be directed through the intercoolers 10, 11 and 12 (except that going through conduit 32 to intercooler 10 on the way to intake valve 16-B) or through bypass conduits 121 and 122, to the manifolds 13 and 14. In addition, the temperature and density in cylinder(s) 7 can be controlled over a greater range by utilizing the compression-expansion charge chilling feature depicted and described in FIG. 2-B, FIG. 2-C, FIG. 2-D, FIG. 11-B and 18-B, with the expansion valve opening size and the bypass system alternatively, also being controlled preferably by ECM-27.

In any of the engines of this invention, the problem common to normal engines of incomplete mixing of fuel, air and residual gas, with consequent variation in conditions at the ignition point is minimized and, in some cases, eliminated by the turbulent air charge injection at high pressure and/or by carburetion of fuel-air. This problem, hereby addressed by the present invention, is extreme in current engines when gaseous fuel is injected directly into the cylinder where the spark may occur in mixtures of varying air-fuel ratios, hence with various rates of flame development.

The turbulence produced in mode 2 and steady-state mode 3 by high pressure charge injection during the compression stroke, or later, is not dampened by the compression stroke. In Operational Design 2 through 6, the subnormal compression ratios lessen the heat-of-compression for the first portion of air charge. The later the supplementary, secondary charge is injected, the smaller the volume of charge is required to produce the desired turbulence and less the heat-of-compression development for that portion of charge, also. In any reciprocating internal combustion engine, operating in accordance with the method of the present invention, a very high pressure, temperature-controlled air charge can, selectively, be injected very late in the compression stroke, (and in Operational Design 4 for FIG. 1–FIG. 7 engines, the charge is injected in just far enough before TDC to allow proper charging and ignition.

The use of this system will result in lower maximum cylinder pressures and temperatures. Efficiency should be greater and the detonation limit higher, thus allowing an appreciable increase in efficiency and mean effective cylinder pressure with a given fuel. All of the engines of this invention can, with the exception of Operational Designs 1 and 2, operate with a more complete expansion process, as compared to the typical prior art engines, to provide even further improvements in efficiency and emissions characteristics. In Designs 1 and 2, the compression and expansion ratios are equal.

The fuel can be injected with part, or all, of the air charge in either mode 1, 2 or 3 with the exception of Design 4 which operates only in mode 3. The fuel can also be injected later and, in the case of conventional diesel operation, can be injected into the combustion chamber at the usual point for diesel oil injection, perhaps into a pre-combustion chamber or directly onto a glow plug. In mode 2 or 3, after the temperature-and-density-adjusting-air charge has been injected, if used, compression of the charge continues except, in Design 4 of FIG. 1 engine, where piston is near TDC, and with fuel present, is ignited at the opportune time for the expansion stroke. Now, in all modes, the air-fuel charge has been ignited and the power stroke of piston 22 takes place as the combusted gases expand. Near BDC of the power stroke, the exhaust valve(s) 17 opens and the cylinder 7 is efficiently scavenged by piston stroke 4. If Design 4 of FIG. 1 or FIG. 2 engine is utilized, an outlet valve 16-C (not shown) or exhaust valve 17, FIG. 1 expels almost the entire primary charge, using it only to cool cylinder 7, with a heavier secondary air charge being injected into cylinder 7 by valve 16-A and ignited at or near TDC. Alternatively, intake valve 16-B may be left open through most of the compression stroke for Design 4 in order to express the primary charge back through valve 16-B.

The Engine $100^{2-B}$ of FIG. 2-B Operating in Operational Designs 1–6

Referring now to FIG. 2-B, there is shown a six cylinder reciprocating internal combustion engine $100^{2-B}$ having one atmospheric air intake 9 and is so constructed and arranged that a compressor 1 and 2 receives charge air from manifold 14-B through openings 8-B (shown in FIG. 2) and conduit 8' which air enters through common air intake duct 9 or by way of inlet port 8. Intake conduits 15*a*-C to 15*f*-C or 32, the latter optionally boosted in pressure, distributes the low pressure air to the intake valves 16-B of each power cylinder. This arrangement allows the provision of air to intake valves 16-A and 16-B at different pressure levels since the charge air from conduit 27*a*–27*f* are selectively pressurized by compressor 2 and alternatively, by compressor 1 which also receives the total air charge through intake duct 8. Intake conduits 27*a*–27*f* and 15*f*-C, in which all of the cylinders (only two (7) of which are shown in a sectional view) 7*a*–7*f* and associated pistons 22*a*–22*f* operate in a 4-stroke cycle and all power cylinders are used for producing power to a common crankshaft 20 via connecting rods 19*a*–19*f*, respectively. A compressor 2, in this figure, a Lysholm type rotary compressor, is shown, which with air conduits, as shown, selectively supplies pressurized air to one or more cylinder intake valves 16-A. An air inlet conduit 8' receives atmospheric air from a low-pressure manifold 14-B, which receives atmospheric air through inlet 9. Inlet conduits 15-C, 27*a*–27*f* or 32 separately supply air charge at atmospheric pressure, or optionally boosted slightly if by conduit 32, and air which has been compressed to a higher pressure to separate intake valves 16-A (high pressure) and 16-B (low pressure) opening to the same cylinder (shown here opening to cylinder 7*a* and 7*f*). Intercoolers 10, 11 and 12 and control valves 3, 4, 5 and 6 are used, controlled by ECM-27, in the preferred embodiments, to control the air charge density, weight, temperature and pressure. The intake valves 16*a*-B–16*f*-B, which receive air through manifold 14-B, or inlet port 8 and intake conduits 15*a*-C to 15*f*-C or 32 (in Designs 3 through 6), are timed to control the "effective" compression ratio of the engine $100^{2-B}$ according to the Operational Design 1–6 chosen for the engine. Engines operating in Operational Designs 1 and 2 have compression and expansion ratios that are equal, although Design 2 has a substandard compression ratio set by an oversized combustion chamber. Also, the engine, shown in FIG. 2, is characterized by the ability to provide an extended expansion ratio, and a low "effective" compression ratio in Operational Designs 3 through 6, and all are capable of producing a combustion charge varying in weight from substandard to heavier-than-normal. It is also characterized by being capable of selectively providing a mean effective cylinder pressure higher than can the conventional arrangement in normal engines with lower maximum cylinder pressure and temperature in comparison to conventional engines. Engine Control Module (ECM) 27 and variable valves 3, 4, 5, and 6 on conduits, as shown, provide a system for controlling the charge pressure, density, temperature, and mean and peak pressure within the cylinder, which allows greater fuel economy, production of greater power and torque, with low polluting emissions for spark ignited, compression ignited, modified HCCI, or true HCCI engines.

In alternate embodiments, a variable valve timing system, with the ECM-27, can also control the time of opening and closing of the intake valves 16-A and/or 16-B and the opening size of expansion valve 10' and/or bypass valve R. This system can further provide an improved management of conditions in the combustion chambers to allow for a flatter torque curve and higher power, with low levels of both fuel consumption and polluting emissions. As shown in FIG. 2-B, FIG. 2-C, FIG. 11-B and FIG. 18-B, the engines of this invention and any current technology Otto or Diesel Cycle engine (FIG. 2-D) or any other internal combustion engine, can utilize compression-expansion chilled charge air or air/fuel mixture for greater power and efficiency and to lessen polluting emissions. As depicted in FIG. 2-B, a high pressure charge air or air-fuel mix is expansion chilled by conduits 114 and 113, receiving highly compressed and cooled air. The air is compressed by one or several stages of compression with intercooling, while conduits 114 and 113 convey the cool, dense air or air-fuel charge to and through optional surge tanks below C and B (shown in phantom), to optional bypass system R and X and/or to expansion valves 10' and 10'', pressure-drop-distributors 11' and 11''. It is here where the effluent is divided into distributor tubes (evaporator tubes), tube 17*a* and 17'*a*, conveying the effluent to conduits 27*a* and 27*f* and to intake valves 16*a*-A and 16*f*-A respectively, which open selectively into cylinders 7*a* and 7*f*. These evaporator tubes 17 would of necessity be short or combined with the intake valves 16-A, eliminating conduits 27*a* and 27*f*. The low pressure primary charge intake valves 16*a*-B–16*f*-B may optionally receive "chilled" charge air also on the intake stroke by way of conduits 15*a*-B–15*f*-B and optional pressure control 25*a* leading from conduits 27'*a*–27'*f*.

The air or air-fuel charge can be composed of air and such fuels as gasoline, alcohols, diesel oils, diethyl ether, propane, natural gas, hydrogen, etc. Due to their high density charge and low operating temperature, the Entec Cycle Engine Designs become the most feasible engine for hydrogen fuel operation and for HCCI operations, the only engine for diesel fuel operation.

Brief Description of the Engine $100^{2-B}$ Shown in FIG. 2-B

The new cycle engine $100^{2-B}$ of FIG. 2-B is a high efficiency engine that attains both high power and torque, with low fuel consumption and low polluting emissions. The new cycle is an external compression type combustion cycle. In this cycle, part of the intake air (all of which is compressed in the power cylinders in conventional engines) is selectively compressed by an ancillary compressor 2. The temperature rise at the end of compression is suppressed by subnormal compression ratios (except in Designs 1) and by use of air coolers 10, 11 and 12, which cool the intake air and by the late cylinder injection of temperature-adjusted secondary air charge and alternatively, by expansion chilling the charge air injected at any point deemed desirable, preferably during the compression stroke, after reaching or passing the point intake valve 16-B has closed.

Operation

The operation of engine of FIG. 2-B is the same as that described for the engine of FIG. 1 and FIG. 2, operating optionally and selectively in one to three modes and where the operating parameters are fully explained. The preferred system is mode 3 operation as described for the engines of FIG. 1 and FIG. 2 in which modes 1 and 2 are combined to produce mode 3, providing somewhat simpler controls, always operating with a supplementary, secondary air injection.

Figure 3:
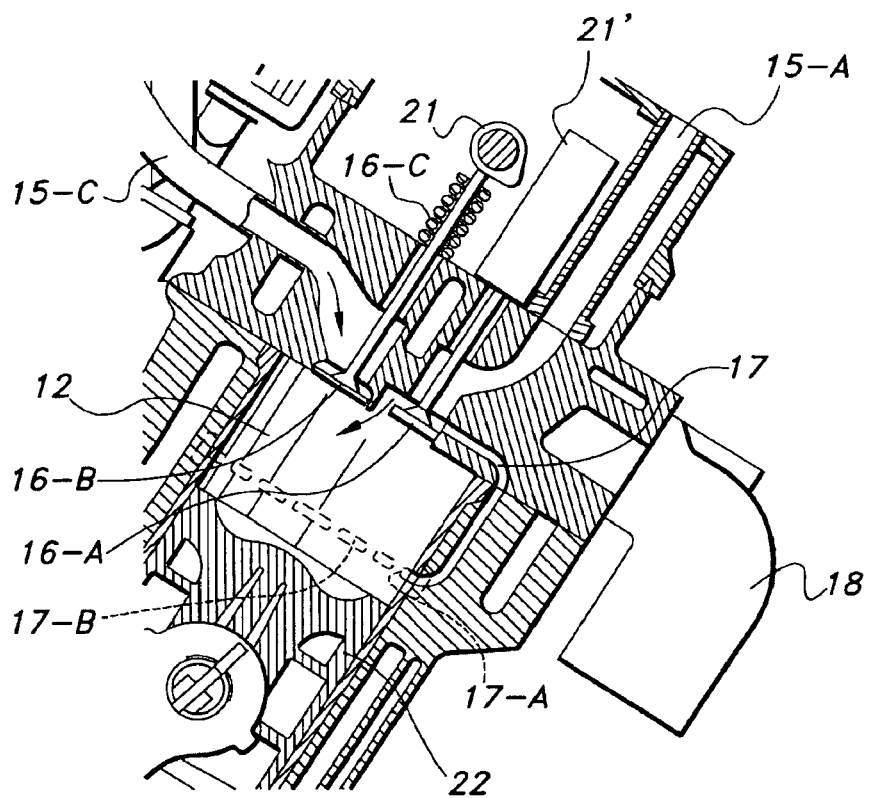
FIG. 3 is a part sectional view through one power cylinder of a 4 stroke engine at the two intake valves, showing an alternative method (adaptable to other embodiments of the present invention) of high pressure air charging. Further, it shows a means of better mixing of fuel and air and of passing air between piston and cylinder wall, in order to prevent formation of formaldehyde and CO, of sweeping unburned fuel out of piston ring crevices for reducing HC, and of closing bottom inlet ports by piston movement.

Primary air charging is the same as the various Operational Designs 1–6 described for engines of FIG. 1 and FIG. 2. The chief difference between engine systems of FIG. 1, FIG. 2 and FIG. 3 is that the secondary air charge added in mode 2 and mode 3 is compression-expansion chilled for greater charge densities and cooler working cycle. This provides greater power and durability along with reduced fuel consumption and lower polluting emissions. Optionally, the primary air charge may also be compression chilled by way of conduit 15-B receiving charge air from conduit 27'*a*.

Engine $100^{2-C}$ of FIG. 2-C Operating in Operational Design 1–6

Referring now to FIG. 2-C, there is shown a six cylinder reciprocating internal combustion engine $100^{2-C}$ so constructed and arranged that a compressor 1 receives and selectively compresses charge air which enters through common air intake duct 8. All of the cylinders (only two (7) of which is shown in a sectional view), 7*a*–7*f* and associated pistons 22*a*–22*f* operate in a 4-stroke cycle and all power cylinders are used for producing power to a common crankshaft 20 via connecting rods 19*a*–19*f*, respectively. The charge air is alternatively mixed with fuel in carburetor 56 and then bypassed or passed partly or wholly through conduit 102 to bypass or pass partly or wholly through bypass valve 6 or to bypass or to push partly or wholly through conduit 105 to intercooler 10 and through conduits 106 and 110 to compressor 2. The compressor 2, in this figure, a Lysholm type rotary compressor, shown with air conduits, selectively, supplies pressurized air to one or more cylinder intake valves 16-A and 16-B at different pressure levels to the same cylinder 7*a*–7*f* (for example, shown here opening to cylinder 7*a* and 7*f*). Intercoolers 10, 11 and 12 and control valves 3, 4, 5 and 6 are used, in the preferred embodiments, to control the air charge density, weight, temperature and pressure. The intake valves 16*a*-B–16*f*-B receive charge air or air-fuel mix through expansion valve 10', pressure-drop-distributor 11' and distributor tube 17*a* leading from high-pressure conduits 114 and 113 and are timed to control the compression ratio of the engine $100^{2-C}$ according to which of the Operational Designs 3–6 is selected. Designs 1 and 2 have fixed compression ratios that are equal to their expansion ratios. Alternatively, the charge density is controlled by either bypass system R and X and/or, by varying the nozzle opening of expansion valve 10', and hence, controlling the density and temperature of the incoming charge to valve 16-B. (Because of noticeable similarities between the engine $100^2$ of FIG. 2 and that of FIG. 2-C, reference will be made as deemed helpful to FIG. 2 for certain common components).

The engine $100^{2-C}$ shown in FIG. 2-C is characterized by the ability to provide equal compression and expansion ratios in Operational Designs 1 or 2 and an extended expansion ratio and a low "effective" compression ratio in Designs 3, 4, 5 and 6, all capable of producing a combustion charge varying in weight from substandard to heavier-than-normal and capable of selectively providing a mean effective cylinder pressure (MEP) higher than can the conventional arrangement in normal engines with lower maximum cylinder temperature in comparison to conventional engines. Engine Control Module (ECM) 27 and variable valves 3, 4, 5, and 6 on conduits, as shown, provide a system for controlling the charge pressure, density, temperature, and mean and peak pressure within the cylinder which allows greater fuel economy, production of greater power and torque, with low polluting emissions for spark ignited, compression ignited, modified HCCI, or true HCCI engines. In alternate embodiments, a variable valve timing system with the ECM-27 can also control the time of opening and closing of intake valves 16-A and/or 16-B and the size of the opening in expansion valve 10', and/or opening and varying passage through bypass system R and X. This further provides an improved management of conditions in the combustion chambers which allows for a flatter torque curve and higher power, with low levels of both fuel consumption and polluting emissions. As shown in FIG. 2-B, FIG. 2-C, FIG. 2-D, FIG. 11-B and FIG. 18-B, the engines of this invention and any current technology Otto or Diesel Cycle engine, or any other internal combustion engine, can utilize compression-expansion chilled charge air for greater efficiency and power and to lessen polluting emissions. As depicted in FIG. 2-C, the low pressure primary charge air, or air-fuel mix to intake valve 16-B, is expansion chilled by conduits 114 and 113, receiving highly compressed and cooled air, compressed by one or several stages of compression with intercooling and conveying the cool dense air or air-fuel charge to expansion valves 10' and 10", pressure-drop-distributors 11' and 11". It is here where the effluent is divided into distributor tubes, tube 17*a* and tube 17*f*, conveying the effluent to intake valves 16*a*-B and 16*f*-B, respectively by way of evaporator tubes 27'*a* and 27*f*, which open selectively into cylinders 7*a* and 7*f* respectively. Conduits 113' and 114' separate, as in conduits 113 and 114, to convey the same highly compressed density and temperature adjusted charge from conduit 113 and 114 and bypasses expansion valve 10' and its associated components, and the very dense, cool effluent is directed, without being expanded, to high pressure intake valve 16*a*-A, 16*f*-A, and to the same cylinders 7*a* to 7*f* respectively, for producing great density and steady-state power. Conduits 113' and 114' may optionally be fitted with pressure regulators D and E as shown in phantom.

The air or air-fuel charge can be composed of air and such fuels as gasoline, alcohols, diesel oils, diethyl ether, propane, natural gas, hydrogen, etc. Due to its high density charge potential and low operating temperature, the Entec Cycle Engine becomes the best reciprocating engine for hydrogen fuel operation and for HCCI operation, the only engine for diesel fuel.

Brief Description of Operation of the Engine $100^{2-c}$ Shown in FIG. 2-C

The new cycle engine $100^{2-C}$ of FIG. 2-C is a high efficiency engine that attains both high power and torque, with low fuel consumption and low polluting emissions. In this cycle, the intake air is selectively compressed by ancillary compressor 2 and alternatively also by compressor 1. The temperature rise at the end of compression stroke is restrained by a substandard compression ratio in all designs except Operational Design 1 (see engine of FIG. 2) and by use of air coolers 10, 11 and 12, which cool the intake air and optionally by using chilled primary charge air and selectively by the late cylinder injection during the compression stroke of cool, temperature-adjusted, dense supplementary, secondary air charge.

Operation

The entire air charge is received through inlet port 8 leading to compressor 1. The air is compressed, cooled and directed to compressor 2 where it is further compressed and has the charge temperature adjusted by intercoolers and bypass system and the high pressure charge is conveyed to conduits 113 and 114. The charge is then divided and one part conveyed through expansion chillers (items 10', 11', 17a and optionally, R and X) to primary air intake valve 16-B while another portion of charge is conveyed to secondary intake valve 16-A optionally, without any expansion of charge, but alternatively, with the pressure regulated by regulators D and E on high pressure conduits 114' and 113'.

Mode 1

During operation, a primary air charge is supplied during the intake ($1^{st}$) stroke to the cylinder 7 through intake valve 16-B, which air or air/fuel has been highly compressed, cooled and expanded through expansion valve 10', pressure-drop-distributor 11' and distributor tube 17a, and conduits 27'a and which is preferably mixed with fuel and carbureted. During the intake stroke, intake valve 16-B closes, specified for either Operational Design 1, 2, 3 or 4, as described for engine of FIG. 2. At BDC of piston 22, intake valve 16-B closes, or is already closed, and the charge is then compressed in the cylinder 7 by piston ($2^{nd}$) stroke. Fuel is added, if not present, and ignited at the appropriate point near piston TDC for the power ($3^{rd}$) stroke, the piston expanding to BDC, after which the exhaust ($4^{th}$) stroke occurs. (The charge density can be from subnormal to as much as 6–7 atmospheres pressure with some designs having an extended expansion ratio, according to the Operational Design selected. All Designs provide high fuel economy and low polluting emissions.) This completes one power cycle in mode 1 and the piston now turns around to begin another cycle. The engine performs with power and low fuel consumption and emissions in this operation mode. The chilled air or air-fuel charge plus the substandard compression ratio of all Operational Designs, except Design 1, assures very low heat-of-compression for this first portion of charge.

Mode 2

The intake valve 16-B has opened and closed on the intake ($1^{st}$) stroke, according to the Operational Design chosen, receiving a chilled primary charge. The piston 22 turns around and begins the power stroke, a secondary (non-expanded) high pressure, dense, cool temperature-adjusted air charge originating from air conduits 113 and 114, by way of conduits 113' and 114', from just below B and C, is introduced, optionally pressure regulated, into the power cylinder 7. This occurs preferably during the compression ($2^{nd}$) stroke of piston 22, even as late as near TDC, by a second intake valve 16-A. This intake valve introduces the cool, high pressure supplementary air charge, at any time after the first intake valve 16-B has closed in order to adjust the temperature and to increase charge density and turbulence of the charge. After the supplementary air charge has been injected, intake valve 16-A, which can be operated hydraulically or electrically or, in some designs, by cam, quickly closes and the compression ($2^{nd}$) stroke continues. (The temperature, pressure, amount and point of injection of the supplementary charge, after piston 22 begins the compression stroke, is adjusted to produce the desired results. The later the secondary charge is injected, the lower will be the compression ratio and the heat-of-compression for that portion of the charge also.)

Near the end of the compression ($2^{nd}$) stroke, fuel is added if not present, the charge is ignited by spark, compression, modified HCCI or HCCI, and combustion produces a large expansion of the combusted gases against the piston 22 for the power ($3^{rd}$) stroke, producing great energy in any of the Operational Designs 1, 2, 3, 4, 5 or 6. This energy is absorbed and turned into high torque and power.

Near BDC of the piston, exhaust valves 17a–17f, 17a'–17f' (see FIG. 1) open and the cylinder 7 is efficiently scavenged by the ($4^{th}$) stroke of piston 22, after which valve(s) 17 close, completing a power cycle.

The air pressure supplied to intake runner-conduit 113'-114', running between conduits 113 and 114 and intake valves 16a-A and 16f-A (FIG. 2-C), is produced at a high level. Not being expanded, as is the primary charge, it remains very dense and cool and may alternatively be pressure regulated. In alternate embodiments, intake valve 16-A is replaced by a fast-acting, more controllable valve such as, but not limited to, a high speed valve (21' of FIG. 4), which performs either mechanically, hydraulically, electrically, Piezo or vacuum operated under the control of an engine control module (ECM)-27. In mode 2 or mode 3, a denser, temperature-adjusted, high-pressure charge, with or without accompanying fuel, can, selectively, be injected, at any time during the compression stroke, or even during the combustion process, in order to adjust the charge temperature and increase charge density, to reduce peak and overall combustion temperatures, and to complete the desired charge mixing before combustion.

In the engine of FIG. 2-C the primary air or air/fuel charge to valve 16-B is chilled in all modes by expansion valve 10' (optionally, some or all of the charge is bypassed by use of R and X) and associated apparatus to cool cylinder and charge and which along with a low compression ratio for that supplementary portion of charge also means low heat-of-compression for both charge portions.

The high pressure cool supplementary charge, entering valve 16-A after valve 16-B has closed, is kept dense in order to produce great power.

The expansion valves 10' can alternatively have variable openings (nozzle(s)), preferably controlled by the ECM-27 to maintain optimum engine temperature and density in regards to polluting emissions and power requirements. For greater power in either mode, expansion valve 10' effluent passage may be further or fully opened to direct a more dense charge into valve 16-B during air intake or, alternatively, valve R may be opened, allowing some or all of the high pressure effluent to bypass expansion valve 10' by way of conduit X, bringing a denser air-fuel charge into intake valve 16-B. Either of these system, or the two systems in conjunction, preferably controlled by ECM-27, which receives command signals from sensors in the combustion chamber of cylinder 7 and perhaps other locations. In this case, intake valve 16-B preferably allows piston 22 to go to BDC in the intake stroke before closing, as either valving system of Designs 1 to 6 of FIG. 2 engine can be employed.

Mode 3

The operation of FIG. 2-C is simplified by combining the operations of mode 1 and mode 2 to operate in a single mode, mode 3, whereby the supplementary, secondary air or air-fuel charge is injected in mode 3 at the same point it would be injected in mode 2 operation, according to the Operational Design of 1 through 6 that is chosen for the particular engine design and duty cycle selected. Thereafter, the engine operates the same as that of mode 2 operation as explained for mode 3 operation in description of FIG. 2 engine. In other words, modes 1 and 2 are not used intermittently. Hence, the engine is operating in the simpler mode 3 continually.

Refrigerated Air Supercharged OTTO and Diesel Cycle Engines Operating in Operational Design 7 4-Stroke Cycle Referring now to FIG. 2-D, there is shown a six cylinder reciprocating internal combustion engine $100^{2-D}$ having one atmospheric air intake 8. It is so constructed and arranged that a compressor 2 receives charge air optionally from air inlet 8 and optionally, compressor 1. All cylinders 7a–7f and associated pistons 22a–22f operate in a 4-stroke cycle and all power cylinders are used for producing power to a common crankshaft 20 via connecting rods 19a–19f, respectively. A compressor 2 in this figure, a Lysholm type rotary compressor and optional compressor 1 are shown, which with air conduits as shown selectively, supplies pressurized thermodynamically chilled air to cylinder intake valves 16a-A–16f-A. Intercoolers 10, 11 and 12 and control valves 3, 4, 5 and 6 are used, in the preferred embodiments, to control the air charge density, weight, temperature and pressure before reaching expansion valves 10' and 10" or valve bypass system R and X. The intake valves 16a-A–16f-A, which receive air through conduits 17a and 17'a, by way of conduits or evaporator tubes 27'a–27'f, are timed to receive and capture all of the air or air-fuel volume possible, with the compression ratio being equal to the expansion ratio as normal, or alternatively, the compression ratio may be varied or may be variable with expansion ratios being inversely varied. Passages of expansion valves 10' and 10" are preferably variable in order to also control the temperature and density of the air charge to the engine. The combustion chambers are sized to establish the compression ratio of the engine which is preferably equal to the expansion ratio. Because of noticeable similarities between the engine $100^2$ of FIG. 2 and that of FIG. 2-D, reference will be made as deemed helpful to FIG. 2-D for certain common components.

The engine $100_{2-D}$ shown in FIG. 2-D, optionally may cause the air intake valve 16-A to close early or late in order to provide alternatively equal compression and expansion ratios or to provide an extended expansion ratio with a substandard "effective" compression ratio. It is optionally capable of producing a combustion charge, varying in weight from substandard to heavier-than-normal, and is optionally capable of selectively providing a mean effective cylinder pressure (MEP), higher than can the conventional arrangement in normal engines with lower maximum cylinder pressure and with lower maximum temperature in comparison to conventional engines. Engine Control Module (ECM) 27 and variable valves 3, 4, 5, and 6 on conduits, as shown, provide a system for controlling the charge pressure, density, temperature and mean and peak pressure within the cylinder which allows greater fuel economy, production of greater power and torque, with low polluting emissions for spark ignited, compression ignited, modified HCCI, or true HCCI engines. (For HCCI operation, Method F of FIG. 19-C or Method G of FIG. 19-D is suggested for combustion chamber temperature control).

In alternate embodiments, optional variable opening expansion valves 10' and 10" along with pressure-drop-distributor 11 and expansion tubes 17a–17'a along with conduits 27'a–27f in conjunction with bypass control valve R and conduit X, provide an additional means of controlling charge density to further provide an improved management of conditions in the combustion chambers to allow for a flatter torque curve and higher power with low levels of both fuel consumption and polluting emissions.

As shown in FIG. 2-D, the engines of this invention and any current technology, Otto or Diesel Cycle engine, or any other internal combustion engine or turbine can utilize compression-expansion chilled charge air for greater power and efficiency and engine durability and to lower polluting emissions. As depicted in FIG. 2-D, the high pressure charge air or air-fuel is chilled by conduits 113 and 114, receiving highly compressed and cooled air, compressed by one or several stages of compression with intercooling. Then, conduits 113 and 114 convey the cool dense air or air-fuel charge to and through optional surge tanks below C and B (not shown) to expansion valves 10' and 10" (with optional variable openings), pressure-drop-distributors 11' and 11". The latter divides the effluent into distributor (evaporator) tubes, tube 17a and tube 17f, conveying the effluent by way of conduits or evaporator tubes 27'a–27'f to intake valves 16a-A and 16f-A, which open selectively into cylinders 7a and 7f respectively. A bypass system composed of control valve R and conduit X, perhaps in conjunction with variable valves 10'-10", permits fine-tuning of the charge density and temperature by allowing the charge to go to intake valves 16-A at different degrees of expansion (perhaps from no expansion to 70 psig), the latter still being a five atmosphere pressure boost in order to control power level and emissions characteristics of engine. These two systems working together alternatively adjust the density and the temperature in order to fine-tune control of the air or air-fuel charge of the engine.

The air or air-fuel charge can be composed of air and such fuels as gasoline, alcohol, diesel oil, diethyl ether, propane, natural gas or hydrogen, etc. Due to its high density charge and low operating temperature, the engine also becomes a superior engine for hydrogen or diesel fuel operation.

If the cooled air or air fuel charge in conduits 114 and 113 was at a level of, say 200 psi, it could be expanded to a very cold 70 psig working charge, which is about a 5 atmospheric pressure boost. If the initial cold charge was 100 psi, it could be expanded to 15 psi gage for a one atmosphere boost, or it could be expanded to a cold charge of less than atmospheric pressure for an extended expansion combustion process.

Brief Description of Operation of the Engine $100^{2D}$ Shown in FIG. 2-D

The new engine $100^{2-D}$ of FIG. 2-D is a high efficiency engine that attains both high power and torque, with low fuel consumption and low polluting emissions. In this engine design, the entire intake air charge is selectively highly pre-compressed by an ancillary compressor 2 and optional compressor 1. The temperature rise at the end of compression is reduced by use of air coolers 10, 11 and 12, which cool the charge air. The air charge is then compression-expansion chilled and injected into the power cylinders which temporarily become "evaporators.".

During operation, an air charge, originating from air conduit 8, by conduits 110 and 109, intercoolers 10, 11 and 12, compressors 1 and 2, conduits 113-114, expansion valve 10', 10", pressure-drop-distributor 11' and 11", and distributor tubes 17a and 17'a in FIG. 2-D, is introduced into the power cylinder 7 by way of conduits 27'a–27'f during the intake stroke by intake valve 16-A, which introduces the expanded chilled air charge in order to adjust the temperature, turbulence and charge density. After the air charge has been injected, intake valve 16-A, which can be operated hydraulically of electrically, or in some designs, by cam, closes at the BDC. The initial air charge may be boosted to a higher pressure by cutting in an optional second ancillary compressor, in series with compressor 2 (see for example, compressor 1 in FIG. 2-D). The main compressor to be used in the engine of FIG. 2-D is the compressor 2, shown in FIG. 2-D, for example as, but not limited to a Lysholm rotary type, between air inlet 8 and conduits 113, 114 with the air being intercooled and optionally expansion chilled.

Alternatively, the air bypass valve (ABV) 6 can be opened to re-circulate charge air back through the compressor 1 in order to relieve the compressor of compression of some of its work during light-load operation. Additionally, compressor 2 work can be decreased or increased by control valve 4 as needed.

Alternately, inlet ports 17-A and 17-B of FIGS. 3, 4, 7 and 10 are placed in the cylinder wall and a portion of the compressed air is directed to inlet ports 17-A, as shown in these figures, and injects air between cylinder 7 wall and piston 22. This will provide cooling for the engine and sweep the area and crevices clean of unburned hydrocarbons and also prevent the formation of formaldehyde. In any of the engines of the present invention, the cooling system in, and described for, FIG. 6 may be used to help control the temperatures perhaps most importantly in military and/or HCCI operation.

The expansion valves 10' can alternatively have variable size nozzles and bypass system, valve R and conduit X, controlled by the ECM-27 to maintain optimum engine temperature and density in regards to polluting emissions and power requirements. Again, alternatively, the expansion valves may be combined with high-speed cylinder intake valves into one unit.

Operation

Atmospheric air is received by duct 8, compressed by compressor 1 where optional carburetor 56 mixes air and fuel and optionally directs charge through intercooler 10. The air is then directed to compressor 2 and bypass valves 3 and 4 where part, or all, of the charge is compressed and directed to intercoolers 11 and 12. This is where part, or all, of the charge is cooled and directed to conduits 113 and 114, leading to expansion valves 10' and 10", pressure-drop-distributors 11' and 11" and distributor tubes 17a and 17'a which distribute the charge, by way of conduits 27'a–27'f, to intake valves 16a-A to 16f-A which receive the cold charge air into cylinders 7a to 7f. Valves 16a-B to 16f-B are exhaust valves leading to exhaust pipes 18 which lead to turbine of optional turbo-charger compressor 1 and to the atmosphere at turbo-charger outlet 18. The engine operates in the conventional manner. Atmospheric air is received through inlet duct 8, compressed by compressor 1, cooled, passed to compressor 2 where it is further compressed, and cooled by intercoolers 11, 12. and sent to expansion chiller system 10', 11' and 17' where the air or air/fuel charge is expanded and ducted to cylinder 7 intake valves 16a-A–16f-A by way of conduits 27'a–27'f. Alternatively, pressure-drop expansion is regulated and perhaps reduced by variable expansion valves 10' and/or partly or wholly bypassed through R-X system and the charge goes to inlet valves at the temperature and density required at any particular time preferably controlled by ECM-27, FIG. 2.

Action

Intake valve 16-A opens and piston begins intake ($1^{st}$) stroke. The expanding charge enters intake valve 16a-A–16f-A of cylinder 7, chilling aided by the low pressure in cylinder. Near or at BDC of piston 22, intake valve closes, piston reverses and ($2^{nd}$ stroke) compresses the cold charge to perhaps 10–15 degrees before, or at TDC, where the charge, fuel being present, or now injected, is ignited, driving the piston in the power ($3^{rd}$) stroke. Near BDC, exhaust valves (17 in FIG. 1) open and piston 22 performs the scavenging ($4^{th}$) stroke. Near TDC, exhaust valves close and intake valve 16-A opens to begin the next cycle.

A single rank of cooler 9, conduit 9', manifold (C and B, not shown), expansion valve 10', pressure-drop-distributor 11' and evaporator tubes 17a and 27a of the air chilling system may be employed for cylinder charging, as shown in FIG. 11-B, rather than the dual systems illustrated for the engine of FIG. 2-D.

Advantages (1) In general, a cold air charge gives greater steady-state power with lower peak temperatures and pressures for lower polluting emissions.

(2) The expanded charge intake valve 16-A can be closed early, or at BDC and the compression ($2^{nd}$) stroke begins for a normal or a substandard compression ratio, the latter providing an extended expansion ratio, for even lower peak pressures and temperatures and higher efficiency.

(3) When using the charge expanded, the charge pressure can be from 5–7 atmospheres more or less or can be expanded to less than one atmosphere for an extended expansion ratio.

(4) Power can be adjusted for power or cruising by adjusting the density and pressure of the initial charge and by adjusting expansion valve 10' nozzle to control chilling versus power and/or alternatively, bypassing part or all of the charge through bypass system, valve R and conduit X. (If all, or most of the charge bypasses expansion valve 10', the pressure of the charge entering cylinder 7, can be regulated by optional pressure control valves D and E).

(5) If the compressed air charge is expanded until it is much colder, but less dense than in normal engines, a larger displacement engine will provide greater power in an even cooler working cycle, with low polluting emissions and much longer engine life—ideal for power generation, pumping, etc.

(6) In any engine designs using compression-expansion air charge-chilling, the pressure of the charge can be adjusted so that after intercooling and expanding, the charge entering the cylinder can be much denser and cooler than in current engines. This produces much greater steady-state power and durability with lower emissions than that of normal engines.

(7) Increased turbulence and cooler charge results in much lower polluting emissions, especially HC, $NO_X$ and particulates.

Figure 8:
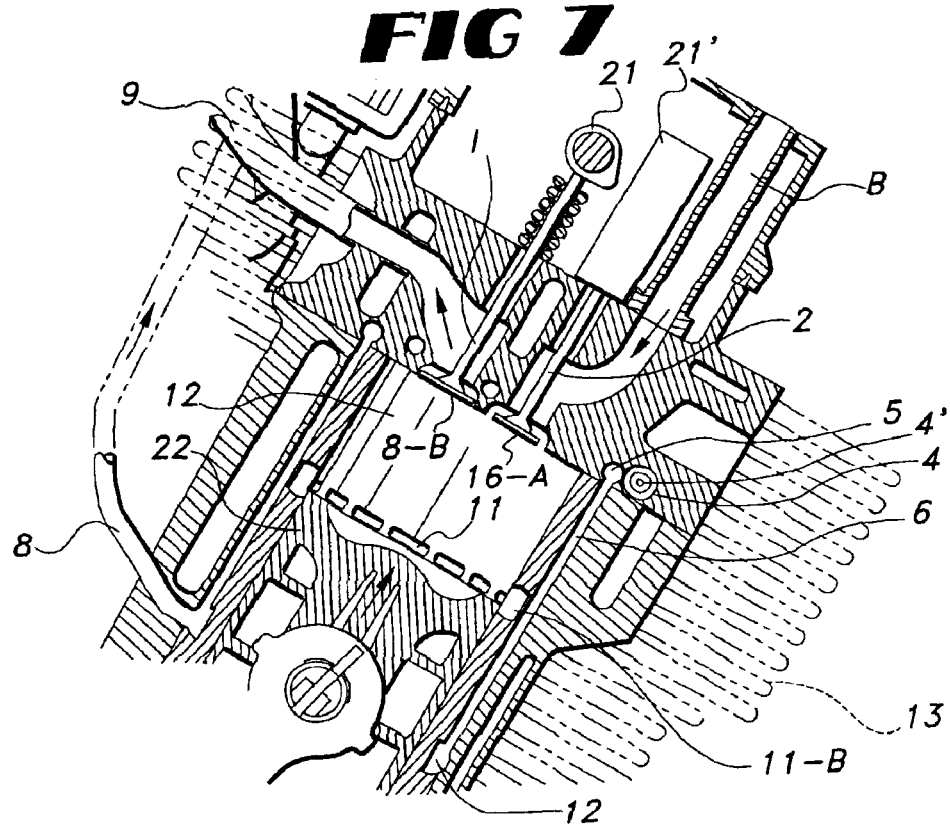
FIG. 8 is a perspective view (with portions in cross-section) of the cylinder block and head of an internal combustion engine, operating in a 2-stroke cycle, and representing a first 2-stroke embodiment of the apparatus of the present invention, from which still another method of operation can be performed and will be described. Among its other components, this embodiment is seen as having high pressure inlet valve to cylinder and also inlet scavenging and charging cylinder ports leading from a low-pressure air-compressor and having an air or a compression-expansion cooling system and conduits and valves to adjust engine temperature according to the invention.
Figure 9:
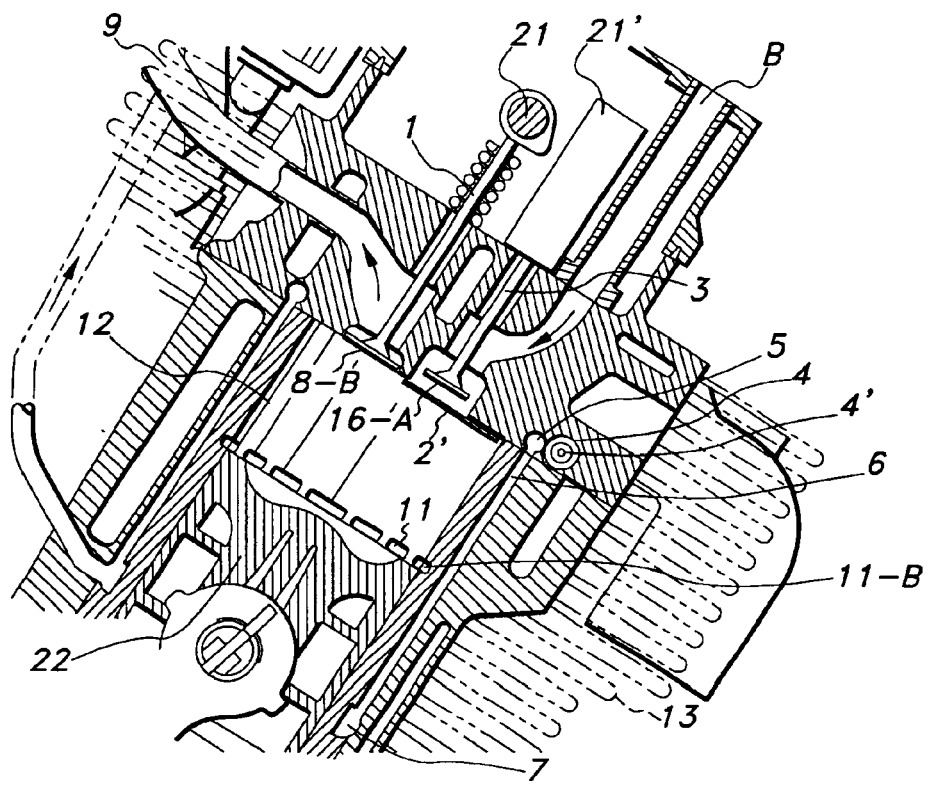
FIG. 9 is a perspective view (with portions in cross-section) of the cylinder block and head of an internal combustion engine operating in a 2-stroke cycle, and representing a second 2-stroke embodiment of the apparatus of the present invention, from which still another method of operation of can be performed and will be described. Among its other components, this embodiment is seen as having an automatic valve and means for closing bottom scavenging and charging inlet ports and upper inlet port, while the popette intake valve is closing. In addition, it is seen as having one high pressure charge-air route to a power cylinder to supply supplementary charge air after compression has begun. Also shown is a common air-rail and cylinder port leading from a compressor (not shown) with low pressure air intake ports and Roots type compressor (not shown) to a power cylinder for scavenging and receiving primary charging air to the cylinder at piston turn around. It is also seen as having an exhaust valve and conduits to the atmosphere from the power cylinder and having control valving means and compressed air expansion cooler system for auxiliary cooling the engine at such time that any liquid cooling system might be compromised.
Figure 10:
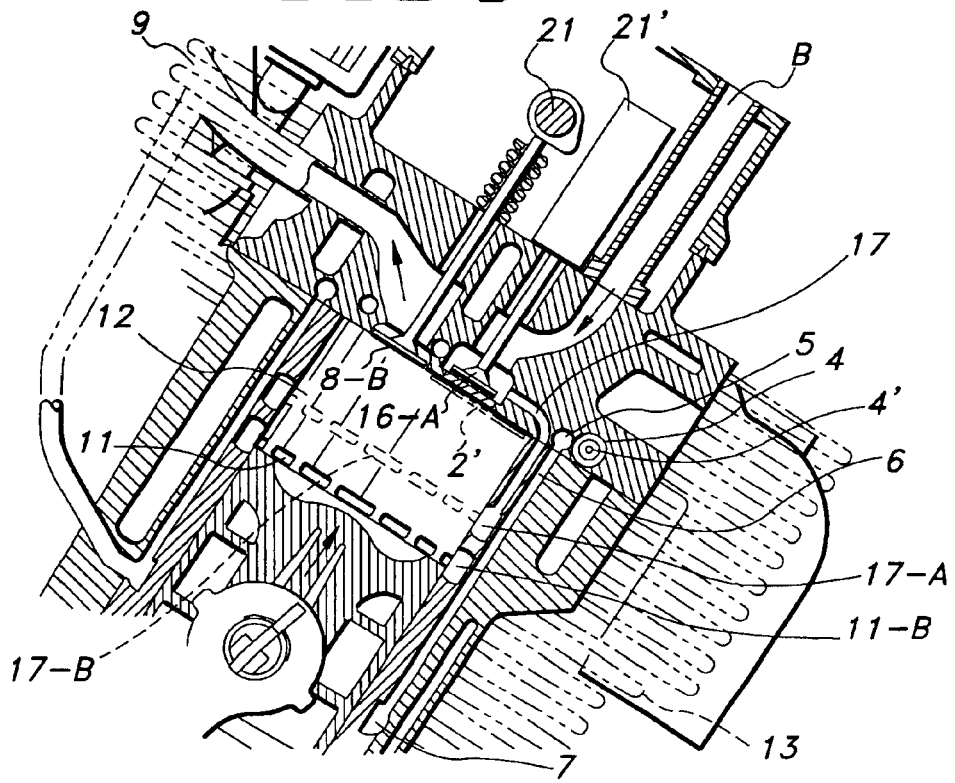
FIG. 10 is a part sectional view through one power cylinder of a 2-stroke engine at the intake and exhaust valves, showing an alternative method (adaptable to other embodiments of the present invention) of injecting a secondary air charge during or near the end of the compression stroke, for increasing charge density and for sweeping out unburned HC and formaldehydes. It also shows an alternative method for preventing charge-air back flow, for automatically adjusting the charge pressure-ratio of the cylinder during the air charging process. There is also shown means for providing auxiliary engine cooling during any loss of engine liquid coolant. There is also shown inlet ports from a Roots type compressor (the compressor is not shown) for scavenging and supplying primary charging of the cylinder at the piston turn-a-round.

(Refrigerated air charge 2-stroke engines are described hereafter for FIGS. 8, 9 and 10).

4-Stroke Engine Operating in Operational Design 1–6

Referring now to FIG. 3, there is shown a part sectional view through one power cylinder of the 4-stroke engine of FIG. 3, at the two intake valves, showing an alternative method (adaptable to other embodiments of the present invention) of high-pressure air charging and showing a means of mixing fuel and air and of passing air between cylinder wall and piston. This is in order to prevent formation of formaldehyde, CO and unburned hydrocarbons (HC), and of closing bottom inlet port(s) 17-B while popette valve 16-A is closing high-pressure inlet from conduit 15-A and top inlet to conduit 17.

The charge air or air-fuel may be compressed and cooled for any of Operational Designs 1 through 6, as described and illustrated for FIG. 1, FIG. 2, FIG. 2-B and FIG. 2-C engines. Additionally and alternatively, compression-expansion chilling may be employed before induction into cylinder 12, the latter system by employing the compression chiller system shown in, and described for FIG. 2-B, FIG. 2-C, FIG. 2-D, FIG. 11-B and FIG. 18-B, items 10', 11', 12, 17a and 27'a, supplying chilled, high-pressure air through intake valve 16-A by one or more compressors, with the engine operation being the same as that described for engine of FIG. 2. Alternatively, the high-pressure conduit can divide, as in FIG. 2-C, and supply air to both inlets 16-B and 16-A, with valve 16-B receiving the compression-expansion chilled primary charge and intake valve 16-A receiving the dense and cooled high-pressure air charge, with the engine operation being the same as that of FIG. 2-C with optional pressure regulator on the secondary air charge inlet conduit 16-A.

Mode 1

The operation of this engine is similar to the operation of the engine of FIG. 2 or FIG. 2-C, operating in either system of Design 1 through Design 6, as described for engine of FIG. 2, with low-pressure air, or alternatively expansion chilled air or air-fuel entering cylinder 12 through intake valve 16-B on the intake ($1^{st}$) stroke in which alternatively, intake valve 16-B may be closed before, at or after BDC to capture either a normal or small air charge, (Designs 1 through Design 4 in FIG. 2). (In closing after BDC, the intake valve may be left open to near TDC on the compression ($2^{nd}$) piston stroke. Therefore, the primary charge would be expelled after cooling cylinder 12 (Design 4 of FIG. 2 engine). At the end of the intake stroke, compression ($2^{nd}$) stroke begins and near TDC of piston, the fuel-air charge is ignited for the power ($3^{rd}$) stroke. Then the scavenging ($4^{th}$) stroke occurs and a new power cycle begins. This produces normal power with low fuel consumption and low polluting emissions.

Optional Mode 2

When more power is needed, intake valve 16-B opens and receives the primary air charge by the intake ($1^{st}$) piston stroke. Then a high density, supplementary air charge is injected as follows: Preferably during the compression ($2^{nd}$) stroke to as far as TDC, high-pressure intake valve 16-A opens (always after valve 16-B closes) and closes quickly, injecting temperature adjusted, high-pressure air from conduit 15-A as described for engines of FIG. 1 or FIG. 2. (The compression ratio and, hence, the amount of heat produced for this second portion of air depends on the point in the compression stroke that the second portion of air is injected). Inlet valve 16-A is preferably activated by valve mechanism represented by 21', which can open and close within 40° crank angle. The valve 16-A can be of any fast-acting type. The incoming air streams 15-A and 15-C can be both carburated (except for Design 4) or alternatively, singularly carbureted, or fuel can be added at any point including cylinder injection for a homogenized air/fuel mixture.

During or at the end of the compression stroke, as inlet valve 16-A opens, part of the inlet air passes into cylinder 12 directly and part of the compressed charge travels past the now open valve 16-A (which can be structured in various ways) into conduit 17 to common air rail (in phantom) 17-A. Here, the charge is directed to inlet port(s) 17-B (which can be singular with air rail 17-A being eliminated).

The high-pressure air or air and fuel enters high pressure cylinder valve 16-A for excellent turbulent mixing of the charge. The compression ($2^{nd}$) stroke continues, piston 22 covers port(s) 17-B and valve 16-A closes, earlier or later, covering both port from conduit 15-A and top open port to conduit 17. The place in the cylinder wall best suited for mixing, cooling, etc. should be chosen for placing inlet port(s) 17-B by experimentation and calculations. The secondary high-pressure air charge mixes any charge in the cylinder, adjusts temperature and adds density to produce greater power, fuel economy and low polluting emissions, with low peak temperatures and pressures, further reducing polluting emissions and providing longer engine life. As the piston 22 continues to rise in the compression ($2^{nd}$) stroke, less heat of compression, and no heat of compression for Design 4 of FIG. 2 engine, reduces $NO_X$ and CO formation. Also, the heat of compression for the secondary air charge is low and the compression ratio of that portion is set by the point in the stroke this air was injected. Particulates are also greatly reduced because of the homogenizing of the charge for more complete combustion. Unburned hydrocarbons (HC) are reduced greatly because of better mixing of fuel and oxygen and, in addition, the gentle air injection between cylinder wall 12 and piston 22 as the piston passes open ports 17-B cleans out piston ring crevices where unburned fuel hides. This also vents and cools space between piston 22 and cylinder 12 walls above the first piston ring where most formaldehyde forms. At near TDC the charge is ignited by spark, compression (glow plug), modified HCCI or HCCI. During the power ($3^{rd}$) stroke, the pressurized air, which is trapped in conduit 17, is released as piston uncovers inlet port(s) 17-B, the trapped compressed air in conduit 17 rushes out 17-B, again cleaning crevices and space between cylinder wall 12 and piston 22 for more complete combustion. The piston 22 now rises in the scavenging ($4^{th}$) stroke and a new cycle begins. (If Design 4 of the engine of FIG. 2 is utilized, an outlet valve 16-C (not shown) or intake valve 16-B stays open until near TDC on the compression stroke and expels the full or almost complete primary charge near TDC using it only to cool cylinder 12 with the supplementary supercharge supplying all charge needed, being injected by valve 16-A near TDC.)

Mode 3

Mode 3 operation constitutes a method of operating the engine of FIG. 3 in a single mode with full power and efficiency by combining mode 1 and mode 2 operations as described for engine FIG. 2, and operating alternatively in any of the Operational Designs described. This mode is simplified by eliminating valving, etc., which are required to operate modes 1 and 2 intermittently.

4-Stroke Engine Operating in Operational Design 1–6

Figure 4:
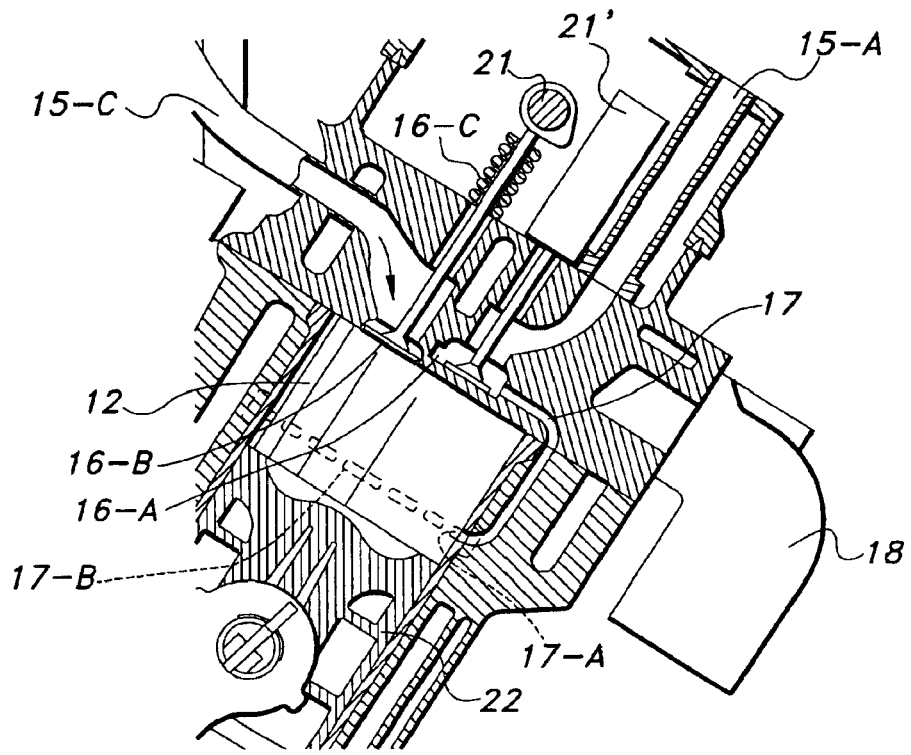
FIG. 4 is a part sectional view through one power cylinder of a 4 stroke engine at the two intake valves, showing an alternative method (adaptable to other embodiments of the present invention) of high pressure air charging and showing another means of mixing fuel and air and of passing air between cylinder wall and piston, in order to prevent formation of formaldehyde and CO. It further shows another method for sweeping unburned fuel out of piston ring crevices and for closing bottom inlet ports while popette valve is closing.

Referring now to FIG. 4, there is shown a part sectional view through one power cylinder similar to the 4-stroke engine of FIG. 1, FIG. 2, FIG. 2-C, and FIG. 3 at the two intake valves, operating in any system of Operational Design 1 through Design 6, as described for engine of FIG. 2. This shows an alternative method (adaptable to other embodiments of the present invention) of supplementary high pressure air charging after the primary air has been induced by the intake ($1^{st}$) stroke. This is a means of increasing charge density and of mixing fuel and air and of passing air (somewhat differently from that of FIG. 2, FIG. 2-C and FIG. 3) between cylinder wall 12 and piston 22 and of cleaning out piston ring crevices in order to prevent formation of formaldehyde, CO, unburned hydrocarbons (HC) and of closing inlet port(s) 17-B while inlet valve 16-A is closing. Low peak temperatures and high turbulence greatly reduce $NO_X$ emissions and particulates.

Mode 1

The operation of the engine of FIG. 4 is similar to that of FIG. 2, FIG. 2-B, FIG. 2-C and FIG. 3, with the primary air charge in all designs except Operational Design 1 of FIG. 2 engine, alternatively having a low compression ratio with cool or chilled, low pressure primary air, or air-fuel charge coming in on the intake ($1^{st}$) stroke of piston 22, which is then compressed ($2^{nd}$ stroke) and, with fuel present, is fired for normal power ($3^{rd}$ stroke) such as cruising with low polluting emissions. The scavenging ($4^{th}$) stroke follows. This completes one power cycle.

Mode 2

When greater power is needed. the operation is thus: following the intake ($1^{st}$) stroke of piston 22, a supplementary, secondary high-pressure air or air-fuel charge is injected during or at the end of the compression ($2^{nd}$) stroke, by intake valve 16-A. The supplementary air entering cylinder 12 is solely from conduit 17, through common air-rail 17-A and inlet port(s) 17-B. This is another means of homogenization, increasing density and adjusting the density and temperature of the charge. (Common air-rail 17-A and all but one of inlet ports 17-B may be eliminated.)

Alternatively, the primary or supplementary charge air or air-fuel charge can be compression-expansion chilled before intake into cylinder 12 through valve 16-B or 16-A respectively by utilizing the expansion valve chiller system depicted in and described for FIG. 2, FIG. 2-C and FIG. 3.

Detailed Operation of Mode 3 (Single Mode Operation)

Intake valve 16-B opens, piston 22 descends in intake ($1^{st}$) stroke to admit atmospheric pressure air or air boosted in pressure, which is alternatively cooled or chilled. The primary charge intake system is either of the Methods of Primary Air Charging of Operational Designs 1 through Design 6, as described for engine of FIG. 2. After the primary charge has been received and intake valve 16-B has closed, the piston 22 reaches BDC and the compression ($2^{nd}$) stroke begins. During the compression stroke of each cycle, intake valve 16-A opens and injects a supplementary, secondary cool or chilled, dense air charge into port 17 and through port 17A or ports 17-B. After port(s) 17-B, which can be of any number or place deemed appropriate within cylinder 12 wall are closed, compression continues and at, or near TDC of piston 22. Ignition then takes place for the power ($3^{rd}$) stroke, followed by the $4^{th}$ or exhaust stroke. In the engine of FIG. 4, compressed air sweeps out ring crevices and space above top piston ring between piston and cylinder wall and some of the compressed air is trapped in conduit 17 during the compression stroke. As piston 22 expands in the power stroke, the residual compressed air in conduit 17 expands against piston 22, again cleaning out crevices and other spaces and then expands into the cylinder, further mixing oxygen and fuel for more complete combustion. Operation is the same as that of Operational Designs 1–6 of FIG. 2, FIG. 2-B. FIG. 2-C and FIG. 3 engines.

Military Model 4-Stroke Air-Cooled Engine Operating in Operational Designs 1–6

Figure 5:
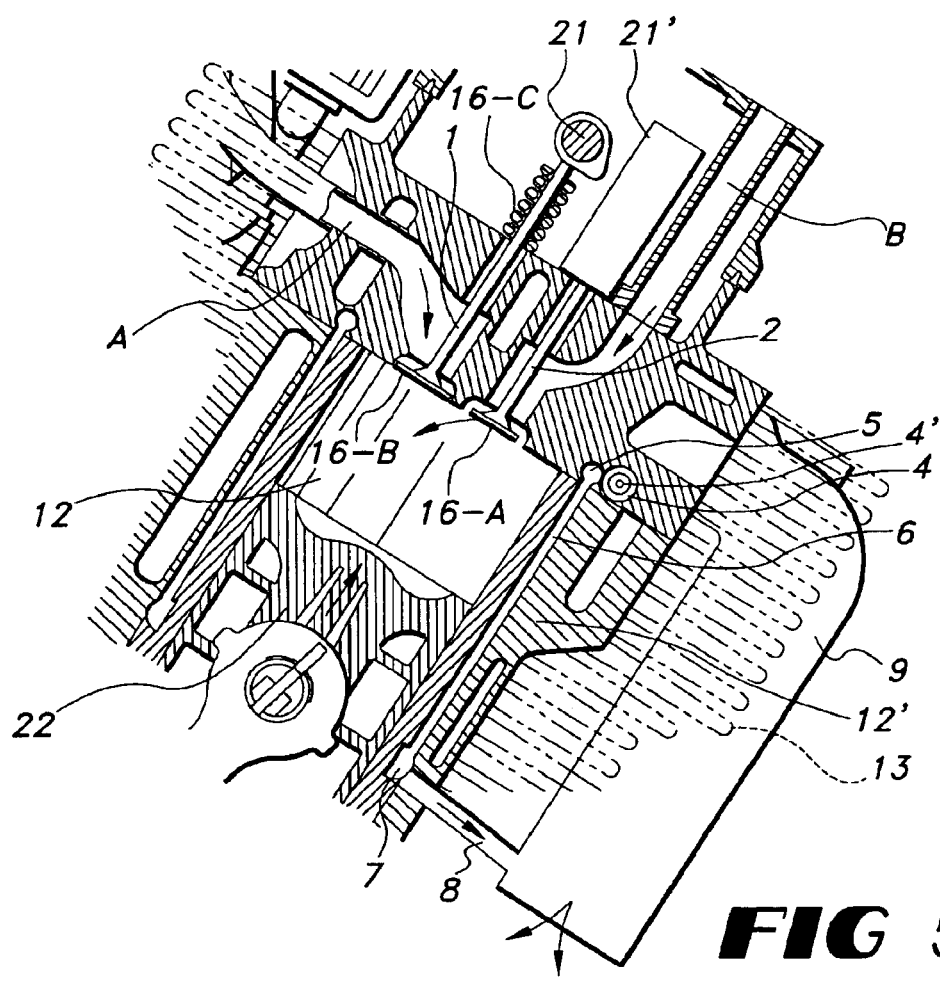
FIG. 5 is a perspective view (with portions in cross-section) of the cylinder block and head of an internal combustion engine, operating in a 4-stroke cycle, and representing a preferred embodiment of the apparatus of the present invention from which a first method of operation can be performed and will be described. Among its other components, this embodiment is seen as having an auxiliary cooling system to alternatively provide engine air cooling or compression-expansion cooling during such time the liquid cooling system, if used, should be damaged.

Referring now to FIG. 5, there is shown a perspective view (with portions in cross section) of the cylinder block and head of an internal combustion engine, operating in a 4-stroke cycle, operating in either system of Design 1 through Design 6, as described for engine of FIG. 2, FIG. 2-B and FIG. 2-C and representing a preferred embodiment of the apparatus of the present invention, from which a first method of operation can be performed and will be described. Among its other components, this embodiment is seen as having an auxiliary cooling system to provide engine cooling during such time as the liquid cooling system should be damaged. Due to the overall cooler working cycle of the engine of this invention air-cooling becomes simple and efficient.

The operation of the engine is the same as the operation of the engine of FIG. 2 with a first mode and optional second and preferred third modes of operation, as described for engine of FIG. 2, FIG. 2-C, FIG. 3 and FIG. 4 with the following alternative arrangements:

The engine of FIG. 5 is fitted with a high performance air compressor, which could be a dedicated compressor (not shown), or the compressor 2 of FIG. 2 or FIG. 2-C and could be fitted with branching conduits, one of which would be fitted with control valve(s) and lead from fittings C and B, FIG. 2-C leading from intercooler(s) 11 and/or 12 of FIG. 2-C, and would be attached to an inlet port in the engine head or engine block, in this case, engine head at port 4. Engine port 4, alternatively, is fitted with an expansion valve 4'. Thus, expanding cool, highly compressed air is sent through ports and passages in engine or alternatively pumped through port 4 and expansion valve 4', sending the expanding air chilled through passages which now become evaporator tubes within the engine head and block. In addition, the compressed cool and chilled air can be directed through cooling channel(s) 6 of FIG. 6 in walls of cylinder sleeve 12 of FIG. 6.

The system for supplying compression-expansion chilled air, which can alternatively be used for both engine operating charge air and engine cooling air is described for engine of FIG. 2-C, FIG. 3 and FIG. 4, in which system any type of efficient compressor system may be employed.

Military Model 4-Stroke New Cycle Engine

Since about fifty percent of combat vehicle engine failures during battle conditions are historically due to loss of the cooling system, the ability to switch to auxiliary cooling will be a boon to the military, allowing the vehicle to continue in its duty and to return home. When running on auxiliary cooling, the engine uses about twice the amount of compressed air as when liquid cooled. For this reason, when switched to air-cooling, fuel economy is slightly compromised, but for the military, under battle conditions, this will be happily tolerated.

There are several designs of the New Cycle Engine that are capable of providing efficient auxiliary cooling at such a time that the liquid cooling system should fail. Described here are only two such designs for a 4-stroke engine and three such designs for a 2-stroke engine.

Operation of 4-Stroke New Cycle Air-Cooled Engine

The operation of the engine is the same as any of Operational Designs 1 through Design 6, as first described for the basic engine of FIG. 2 and which also pertains to engine of FIG. 1 through 7 for greater torque, power, and durability with low fuel consumption and ultra low polluting emissions.

Alternatively and preferably, the operation of the engine of FIG. 5 is the same as the operation of the engine of FIG. 2, FIG. 2-C, FIG. 3 and FIG. 4 with optionally chilled air for primary charge through valve 16-B with the supplementary, secondary air charge being introduced through valve 16-A as a very dense cool charge.

Cooler Working Cycle

In Operational Design 1 through Design 6, described for engine of FIG. 2, the low, or near 2:1 or less compression ratios (the latter being in Design 4) greatly reduces the amount of heat-of-compression in mode 1, which is Design 4 can be near zero.

In mode 2 operation, the injection of cooled, compressed, supplementary supercharging air, which preferably is during the compression stroke, cools the air charge in all six Operational Designs by the heat exchange effect and by the absorption effect of expanding air, as is true of all compressed gases when expanded. In all modes, 1, 2 and steady-state mode 3 for Designs 2 through 6, the primary portion of air charge is heated less as the compression ratio or the "effective" compression ratio is reduced. The density of the air or air-fuel charge is adjusted selectively from less than normal, to normal or to above normal in all Operational Designs by the injection of the supplementary, secondary air charge. For mode 2 and 3, the later the supplementary air charge is injected in the compression stroke in Designs 1 through 3 and 5 and 6, the smaller will be the "effective" compression ratio for that second portion of air, for again, low heat-of-compression and in Design 4, the compression ratio is near 2:1 for little or no heat of compression. Because of the overall cooler-working cycle, the engine can be operated with air-cooling or "compression" air chill-cooling at such a time the liquid cooling system should be damaged.

Auxiliary Cooled Operation

At such a time that the liquid cooling system should be compromised, operation of the engine would continue in the same manner with a few additional steps. This would allow the vehicle to continue to perform in battle and to return home. This cooling system can be also used on any Otto or Diesel Cycle engine.

Pressurized air flow to cylinder head inlet 4 is begun by opening a valve to dedicated compressor and cooler system or by increasing compressor 2 speed in FIGS. 1, 2, and 2-C, where a valved branch (not shown) of high pressure conduit B in FIG. 5 would deliver adequate compressed air to port 4 or alternatively to a metering or expansion valve 4', opening to inlet port 4, and perhaps by cutting in another stage of compression or another compressor.

Figure 6:
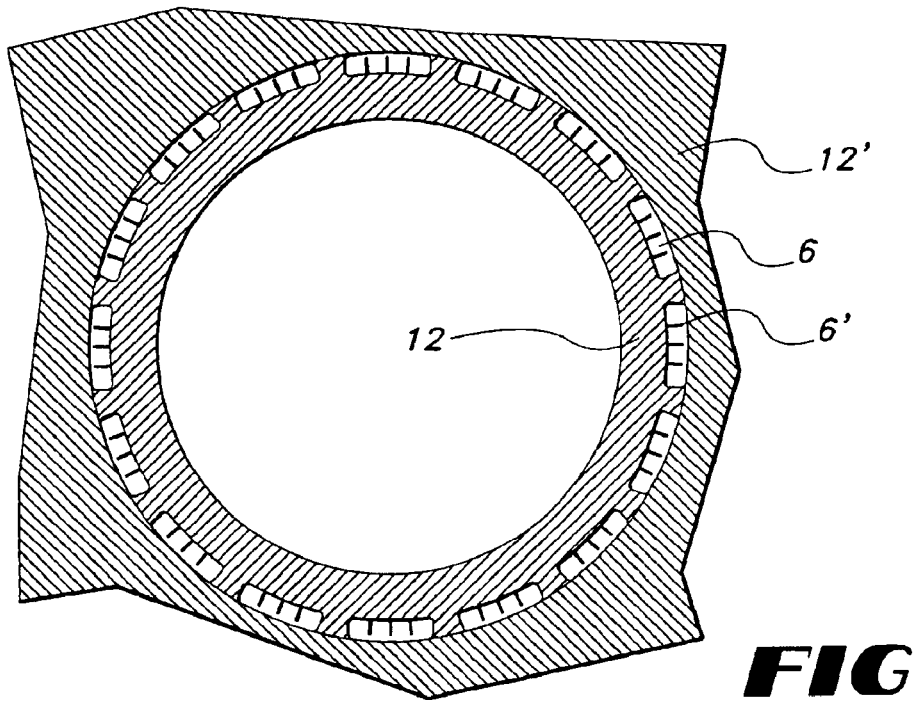
FIG. 6 is a cross-section of a partial engine block and a cylinder liner. The liner is fitted with air-passageways containing splines or metal screens arranged for air cooling or compression-expansion cooling of the cylinder, also useful for controlling the temperature of charge-air in HCCI system of FIGS. 19-B, 19-C and 19-D.

Valves from an air conduit, from C and B on conduits 113 and 114 from coolers 11 and 12, all in FIG. 2-C, to expansion valve 4', opening to inlet 4 of engine of FIG. 5 optionally is opened and compressed air or expanding compressed air chills as it expands internally by the expansion valve 4' from inlet port 4 to air-rail 5. This allows the air to be conducted as it expands and distributes to and through cooling "evaporator" channels 6 of FIG. 5, which are finned 6' in FIG. 6 and situated on the outer side of the cylinder sleeve 12 between the cylinder sleeve 12 and the cylinder block 12' as shown in FIG. 6. The expanding compressed air then is ducted into air rail 7 which collects the air from all channels, and directs it to an air conduit 8 which conducts the air to the atmosphere or to exhaust manifold 9 and to the atmosphere. Part of the expanding air can be sent first through channels around the exhaust valve seat and through other problem areas of the engine. If the air cooling channels suggested for cooling the cylinder liners cool too much, other areas of the engine more appropriate for air cooling channels may be chosen, as one alternate cooling route is depicted by 6 in FIG. 7 and FIG. 10.

While the engine is operating liquid cooled, all of the high-pressure air goes to high pressure conduit B with conduit A being alternatively being fitted with expansion valve 10', going to intake valve 16-B during intake stroke, as in FIG. 2-C. While operating in mode 2 or 3 with compressed secondary supercharging air, injected preferably with pressure adjusted in conduit B, goes directly into the power cylinders through inlet valve 16-A during the compression stroke, even as late as during combustion.

When the liquid cooling system fails, a valve is turned on conduits F and G (not shown) which diverges from conduits 113 and 114 or from conduits 113' and 114' of FIG. 2-C or any other compressed air source, which supplies highly compressed air, which is cooled or chilled. This air is pumped by a conduit branch (not shown) from conduits 113' and 114' or 113 and 114 and preferably into metering or expansion valve 4' at inlet 4 of engine head. Now incoming air, which has been cooled and increased in pressure and density, passes through expansion valve 4' alternatively, which can have a variable size opening, which can be controlled by the ECM-27, at inlet 4, to air rail 5, conduits 6, air rail 7, air conduit 8 and exhaust manifold 9 and to the atmosphere or the air can go from conduit 8 directly to the atmosphere. The engine head and block are then cooled by the compressed air or alternatively by the chilling effect of the absorption of heat by the expanding air, as it does work in expanding through valve 4' or valve 10', pressure-drop-distributor 11 and distributor tubes 17a and 27a, as in FIG. 2-C. Alternatively, the engine is further cooled by the primary air charge injection through expansion valves 10' upline to inlet valves 16-B, as described for FIG. 2-C and FIG. 4, which provide chill cooling, and in the engines of FIG. 3, FIG. 4, FIG. 7 and FIG. 10, optionally having chilled air being injected through cylinder walls, as described for these engines, operating under description for FIG. 2, FIG. 2-C, FIG. 3. and FIG. 4. As more power is needed, the density of charge can be increased by increasing the pressure on the non-expanded charge from conduits 113" and 114" to high pressure inlet valve 16-A. These lines 113' and 114' are alternatively fitted with pressure regulators D and E.

The engine can also be fitted with diminutive cooling fins 13. The cooling fan, if still operating, will assist in the cooling. Also, the fan of any existing heater, FIG. 11 or 11-B, item 27, can divert cool pumped air to the now empty water jacket of the engine. In addition, the pistons may be cooled by splash-oil cooling, in which oil-cooling radiator will be small and can be protected by engine components and armor.

The New Cycle Engine is inherently cooler operating as a study of the working cycle shows and can be cooled very effectively by pumping compressed air or expanding chilled air through conduits in cylinder head and block, as described herein.

The efficiency of the engine is improved by compressing and cooling a large portion of the charge air, all in Design 4, outside of a hot firing cylinder and by more complete combustion because of better mixing of the fuel/air charge. Efficiency is also improved by the extended expansion process in Design 3 through Design 6 and by thermodynamic improvements inherent in a denser air charge. Fuel economy is further improved by a greater power-to-weight ratio.

The engine may be operated preferably in the single mode (3) operation, or alternatively and selectively in mode 1 or mode 2.

Power is increased by the improved thermodynamics of a denser charge, which also allows more fuel to be utilized and by more complete combustion and by reduced compression work.

Emissions are less because of low peak temperatures and pressures and by more complete combustion. In both current and HCCI Diesel engines, particulates (both smoke and nano-particles) are very significantly reduced by the more complete combustion due to the pre-mixing (homogenization) of fuel/air charge before ignition and by the low temperature oxidation process. HC and aldehydes are reduced by injected air sweeping out piston ring crevices and other close tolerance areas between piston and cylinder wall.

Durability is improved by the overall cooler working cycle and low peak temperatures and pressures, and in some duty cycles, lower RPM allowed by higher torque.

Air compressor(s) would be compact, low profiled and armored, with conduits being of high tensile strength. Some of the compressed air can be diverted and expanded in cooling jackets around the compressor(s) and oil cooler, if the latter is used. The chief advantage of optional operation of modes 1 or 2 is that at any time ancillary compressor 2, coolers 11 and 12 are damaged, the vehicle operates in mode 1 to allow the vehicle to continue functioning with adequate power and to return home.

Results
1) Low peak temperatures and pressure
2) A homogeneous combustion charge
3) A denser charge
4) Greater efficiency
5) Greater engine durability Advantages
1) Lower polluting emissions
2) Greater power
3) Greater torque
4) Increased vehicle range
5) Longer engine life
6) Multi-fuel capability
7) Greater reliability The ability to auxiliary-cool the engine on demand, coupled with multi-fuel capabilities and increased vehicle range, greatly reduces logistics problems for the military on both land and sea.

Referring now to FIG. 6, there is shown a cross-section of a partial engine block 12' and a cylinder liner 12 containing passages 6 on the exterior of the cylinder liner 12 between cylinder liner 12 and engine block 12' for passage of pumped or compression chilled air of which passages 6 have fins or wire mesh, 6' arranged for transferring heat from the cylinder liner to the passing expanding air.

4-Stroke, Air-Cooled Engine Operating in Operational Design 1–6

Figure 7:
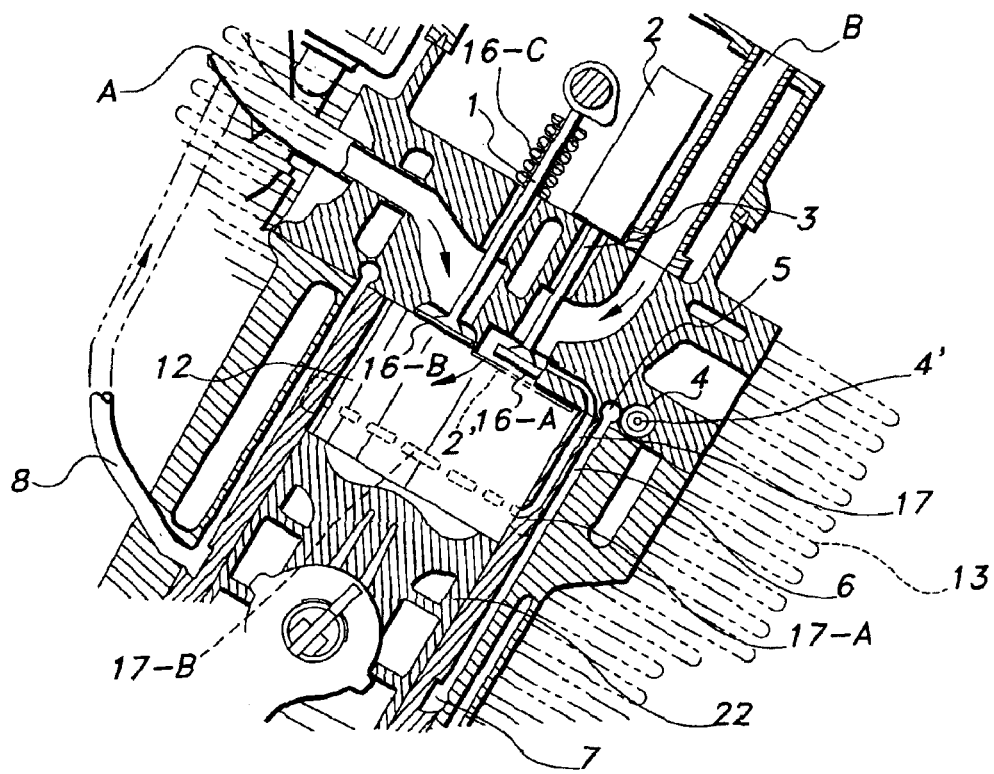
FIG. 7 is a perspective view (with portions in cross section) of the cylinder block and head, similar to the engine of FIG. 3, operating in a 4-stroke cycle and representing a second embodiment of the apparatus of the present invention, from which a second method of operation can be performed and will be described. Among its other components, this embodiment is seen as showing a means of controlling engine temperatures by pumping air or compression-chilled air throughout passages in the engine, at such time liquid cooling system, if used, has failed. A system, similar to FIG. 3, is shown for mixing air charge and for preventing formaldehyde, CO and unburned fuel (HC).

Referring now to FIG. 7, there is shown a perspective view (with portions in cross-section) of the cylinder block and head of engine similar to the engine of FIG. 3, operating in a 4-stroke cycle, operating in either system of Operational Design 1 through Design 6, as described for engine of FIG. 2, FIG. 2-B, FIG. 2-C and FIG. 5 and representing a second embodiment of the apparatus of the present invention from which a second method of operation can be performed and will be described. Among its other components, this embodiment is seen as showing a means of controlling engine temperatures by expanding highly compressed air through port 4 and cooling channels in engine or alternatively through expansion valve 4', as described for expansion valve 10', pressure-drop-distributor 11 and evaporator tubes 17a and 27a in FIG. 2-C and FIG. 11-B, throughout passages in the engine, at such a time liquid cooling system has failed, and showing an optional automatic valve 2', providing means of better mixing of air-fuel charge and of managing initial pressure ratios in the engine and for closing inlet port from conduit B while intake valve 16-A is closing. Alternatively, chilled charge air can be supplied to operate the engine as described for FIG. 2, FIG. 2-C, FIG. 3, FIG. 4, FIG. 5 and FIG. 11-B, using any high-performance compressed-expanded-air cooling system, optionally combined with expansion valve 4' or 10' and associated apparatus as described for engine of FIG. 2-C, FIG. 3 to FIG. 5 and FIG. 2-D for current technology 2-stroke and 4-stroke Otto and Diesel Cycle engines.

Military Model of 4-Stroke Triple Mode Engine

The operation of the engine of FIG. 7 is the similar to that of FIG. 2, FIG. 2-C, FIG. 3 and FIG. 5, with some exceptions. The preferred method of operation is that of FIG. 2-C, operating in any of Operational Designs 1–6 and preferably operating in mode 2 as described for the same engines.

Operation of 4-Stroke New Cycle Engine

The operation of the engine is the same as any design from Design 1 through Design 6 with features described for the engine of FIG. 2, also suitable for FIG. 2-B, FIG. 2-C, FIG. 4 or FIG. 5 for greater torque, power, and durability with low fuel consumption and ultra low polluting emissions. The engine of FIG. 7 operates in a first mode and an optional second mode as described for engines of FIG. 1–FIG. 4.

Mode 2 Operation

Mode 2 is the preferred means of operation of the engine for military duty due to the ease of switching to a more reliable mode of operation at such time that ancillary compressors or intercoolers may become disabled. While operating with greater power (mode 2), switching to mode 1 converts the engine to the same power output as a conventional engine, while still providing reliability and high fuel economy.

Cooler Working Cycle

The New Cycle Engine is inherently cooler operating as a study of the working cycle shows, and can very effectively be air-cooled or chilled air cooled by pumping cool, highly compressed air through inlet port 4 or alternatively through an expansion valve to 4' low pressure conduits "evaporator" in cylinder head, walls and block, as described heretofore in FIG. 5 and FIG. 6.

The efficiency of the engine is improved by compressing a large portion of the air charge outside of a hot firing cylinder, by more complete combustion because of better mixing of the fuel/air charge, by improved thermodynamics of the denser charge and by the extended expansion process in Operational Designs 3 through 6. Fuel economy is further improved by a lighter engine (greater power-to-weight ratio).

Power is increased by the improved thermodynamics of a much denser charge, which also allows more fuel to be utilized, by higher efficiency, by more complete combustion and by reduced compression work. (In all Designs, the supplementary, secondary charge is injected cooled, very dense, not being expanded, and the operation of which is better described for the engines of FIG. 2 and FIG. 2-C.).

$NO_X$ emissions are less because of low peak and overall temperatures and by more complete combustion. In addition, particulates (both smoke and nano-particles) are significantly reduced in both the spark ignited and HCCI engines (fueled by gasoline or diesel oils) by the more complete combustion due to the pre-mixing (homogenization) of fuel/air charge before ignition. In any of the Designs, piston ring crevices and other close tolerance areas between piston and cylinder wall can be cleaned out by injected air (see FIG. 5 or FIG. 11-B) for lower HC and formaldehyde.

Durability is improved by the overall cooler working cycle and low peak temperatures and pressures and by lower RPM allowed by greater torque. Other than the exceptions described for high-pressure supplemental, secondary charge air injection, operation and auxiliary cooling for FIG. 7 are the same as that of FIG. 2, FIG. 2-B, FIG. 2-C engines operating in any of the Operational Designs 1 through 6.

Results
1) Low peak temperatures and pressure
2) A homogeneous combustion charge
3) A denser charge
4) Greater efficiency
5) Greater engine durability Advantages
1) Lower polluting emissions
2) Greater power
3) Greater torque
4) Increased vehicle range
5) Longer engine life
6) Multi-fuel capability
7) Greater reliability The ability to auxiliary chill-cool the engine air charge on demand, coupled with multi-fuel capabilities and increased vehicle range, greatly reduces logistics problems for the military on both land and sea. The expansion valve 10' of FIG. 2-C, and FIG. 5 can be used to cool the engine and to chill the charge air of the 4-stroke (high-pressure stream only for the 2-stroke engine) and in both, can be combined with a fast acting cylinder intake valve into one unit for a two functions-in-one valve.

2-Stroke Air-Cooled Engine Operating in Operational Designs 8(a)–8(d)

Referring now to FIG. 8, there is a perspective view (with portions in cross-section) of the cylinder block and head of an internal combustion engine, operating in a 2-stroke cycle and representing a first 2-stroke embodiment of the apparatus of the present invention from which still another method of operation can be performed and will be described. Among its other components, this embodiment is seen as alternatively having a conventional air charging and engine cooling system for mode 1 operation or having a highly compressed air or compression air chilled air supercharging and engine cooling system (mode 2 operation.)

Military Model 2-Stroke New Cycle Engine

The operation of the 2-stroke engine is somewhat similar to the basic 4-Stroke New Cycle Engine System for greater torque, power, and durability with low fuel consumption and ultra low polluting emissions. The operation of this particular design is as follows:

Operation of the 2-Stroke New Cycle Engine with primary and supplemental, secondary air charge (For Engines of FIG. 8, FIG. 9 and FIG. 10).

The preferred mode of operation is mode 2 in which the engine is capable of immediately switching to mode 1 operation at such time ancillary compressors and/or intercooler systems for producing the supplementary air charge may become inoperative eg., in battle support. In mode 1, a vehicle will still have the power of a conventional engine to continue its mission and to return home safely.

Operational Design 8(a)

Piston 22 is at (BDC) (after power stroke) and high-pressure inlet valve 16-A is closed.

A Roots Type Blower and conduits (not shown) supplies lightly compressed air for scavenging and cylinder charging to inlet ports 11 of cylinder 12, or alternatively, conduit 27'a, as in FIG. 2-C supplies air to inlet ports 11, optionally expanded through expansion valve 10', pressure-drop-distributor 11, evaporator tubes 17a and 27a for exhaust scavenging, cooling and charging of cylinder 12 with fresh chilled air. (If compression chilled, the low pressure charge to intake valve 16-B can be expanded to a cold 5–10 psig pressure, more or less.)

Mode 1

Exhaust valve 8-B is open. Exhaust Blow-Down has already occurred and fresh cooled or optionally chilled air from ports 11 is still entering the cylinders. Piston 22 begins to rise in the compression ($1^{st}$) stroke and as piston 22 closes inlet ports 11, exhaust valve 8-B closes to trap as large volume of air as possible. This produces a normal optionally cool or chilled compression ratio which is equal to the expansion ratio. The compression ($1^{st}$) stroke continues and near TDC, fuel is added, if not present, and the charge is ignited for the power ($2^{nd}$) stroke and at near BDC or the appropriate point, exhaust valve 8-B opens for the exhaust blow-down and fresh scavenging, charging air enters ports 11, now open, and another cycle begins. This completes one normal power cycle.

Optional Mode 2 for Greater power

Exhaust valve 8-B is open. Exhaust blow-down has already occurred and the cylinder 12 has been scavenged and charged by fresh air entering ports 11. Piston 22 begins to rise in the compression stroke, closing ports 11 as exhaust valve 8-B closes. High pressure air inlet valve 16-A opens at any point deemed feasible during compression stroke to inject a dense, cool, high velocity, supplementary, secondary air charge, which is externally compressed in one or more stages as from conduits 113' and 114' in FIG. 2-C and into inlet conduit B in FIG. 8. Compression continues and near TDC, fuel being present, the charge is ignited and the power ($2^{nd}$) stroke occurs for great power and low polluting emissions. At the appropriate point, exhaust valve 8-B opens and the cylinder is scavenged and filled with fresh, cool charge. This completes one very powerful and clean power cycle.

The supplementary supercharging air can be compression-expansion chilled, as from expansion valve 10' and conduit 27'*a*–27*f* of FIG. 2-B. Depending on the temperature and pressure before being expanded, the pressure passing intake valve 16-A during the compression stroke, can be adjusted to as much as a very cold 5–7 atmospheres pressure. If the secondary charge comes from conduits 113' and 114' in FIG. 2-C, with no expansion as described for FIG. 2-C, it would be injected through intake valve 16-A somewhat less cooled, but much greater in density and pressure. The pressure to conduit 16-A may be reduced or may require a pressure control valve D and E on conduits 113' and 114' as in FIG. 2-C.

Optional Mode 3

Modes 1 and 2 are combined by eliminating intake valve 16-A deactivator with the engine always operating with a supplementary, secondary air charge injection.

Operational Design 8(b)

Mode 1

In this design, one power cycle has ended. Exhaust valve 8-B is open. Exhaust Blow-Down has already occurred and fresh cooled air from Roots Blower or similar blower types or air chilled from conduits 27'*a*–27*f*, FIG. 2-C and ports 11 has scavenged and is still charging cylinder 12. Exhaust valve 8-B closes and piston 22 begins to rise in the compression stroke, closing inlet ports 11 and trapping as large a charge as possible. But, in this Design 8(b), the combustion chamber is very large, resulting in a very low (substandard) compression ratio for the cylinder. For example, rather than, say a 20:1 compression ratio, this design would produce a compression ratio of perhaps 10:1 or less. For a gasoline engine, the compression ratio may perhaps be 5:1 or less.

Piston 22 rises in the compression ($1^{st}$) stroke and near piston TDC, fuel is added, if not present. The charge is ignited for the power ($2^{nd}$) stroke and at the proper point in the power stroke, exhaust valve 8-B opens for the exhaust Blow-Down and at bottom of power ($2^{nd}$) stroke ports 11 are uncovered to admit scavenging and charging air to begin another cycle. (With this substandard compression ratio, the heat-of-compression for the primary air charge can be as little as 1/5 that of normal engines for low heat-of-compression and low emissions. This completes one clean power cycle for mode 1 auxiliary operation, e.g., for continuing in battle and returning home safely if auxiliary air compressor-cooler system is damaged. (Mode 1 operation is especially feasible when the primary air charge is boosted significantly in pressure).

Mode 2, Preferred

Exhaust valve 8-B closes, as the compression stroke begins closing cylinder ports 11 and 12 being charged with fresh air. Somewhere during the compression stroke, valve 16-A opens and injects a very dense high-pressure, non-expanded, cooled supplementary, secondary air charge as from conduits 113' and 114' of FIG. 2-C or optionally chilled air from conduit 27*a* of FIG. 2-C. The supplementary supercharging secondary air charge can bring the density of the total charge to that of a normal engine, say with the nominal 20:1 compression ratio. The secondary charge can produce, selectively, even 40:1 compression ratio density or a much greater density and can greatly supercharge the engine with low peak temperatures and pressures, which with the better mixing of the cool charge produces much greater power with ultra low emissions. (The amount of heat-of-compression for the supercharging secondary air charge depends on what point in the compression stroke that portion is injected.) The "effective" compression ratio for the supplementary portion of the charge can be as low as 2:1 or 3:1 for again ultra low compression ratio. Yet, as stated, the charge density can have the density (compactness) of a 40:1 compression ratio or even much higher.

Mode 3

Modes 1 and 2 are combined for simplicity to form mode 3. This is accomplished by eliminating the system for temporarily deactivating intake valve 16-A and/or compressor 2 operation, as is done in mode 1 operation.

Optional Design 8(c). Mode 1

A power cycle is completed and for some distance after closing of ports 11 by piston 22, in the scavenging, charging ($1^{st}$) stroke, the exhaust valve 8-B stays open during the first part of the compression stroke to expel a portion of the fresh air charge in order to trap a smaller-than-normal volume of charge air and then exhaust valve 8-B closes. The compression ($1^{st}$) stroke continues and near piston TDC, fuel is added, if not present and ignited, producing the power ($2^{nd}$) stroke and at near BDC or at the appropriate point, exhaust valve 8-B opens and exhaust Blow-Down occurs by blower or compressor, and cylinder is scavenged and filled with cool, fresh charge air which can be cool or chilled. This completes one cycle for adequate cruising power with an extended expansion process and low polluting emissions.

Mode 2

When more power is needed, the following takes place: After scavenging and charging cylinder 22, at any point in the compression stroke deemed appropriate after closure of exhaust valve 8-B, inlet valve 16-A opens and quickly closes, injecting very dense, temperature adjusted supplementary charge air as from conduits 113' and 114' of FIG. 2-C, or optionally expansion chilled, supplementary, secondary air or air-fuel charge from conduit 27'*a* of FIG. 2-B. The compression stroke continues. Fuel is added, if not present, and near TDC of piston 22, the charge is ignited and the power ($2^{nd}$) stroke occurs for great power with low peak temperatures and with low polluting emissions with the expansion ratio still being greater than the effective compression ratio.

Capturing a subnormal initial charge produces a substandard "effective" compression ratio with a very low heat-of-compression. A denser than normal supplementary, secondary cool air or cold charge produces low heat-of-compression also, and together still produces an extended expansion ratio. As in the 4-stroke engine, the effective compression ratio and hence, the amount of heat-of-compression for the supplementary, secondary charge depends on the point in the compression stroke the secondary charge is injected. The compression ratio for the supplementary, secondary air charge can be as low as 2:1 or 3:1 with a charge density equal to 20:1 or 40:1 or greater.

Should ancillary compressor 1 or 2 or intercooler system become damaged while operating in mode 2, the engine instantly switches to mode 1 operation and continues to operate with normal engine power to continue operation and to return home. This makes mode 2 operation the preferred system for the military.

Mode 3

This method of operation of the engine of FIG. 8)c) is by eliminating the deactivator for intake valve 16-A, thus combining mode 1 and 2 into a simple operating mode 3 system, except for military for which mode 2 is preferred.

Operational Design 8(d), Mode. 1

In another alternative Operational Design, a power cycle is completed and piston 22 continues to rise in the scavenging-charging ($1^{st}$) stroke as exhaust valve 8-B remains open to near TDC, where it closes after cooling cylinder and expelling nearly all of the fresh, cold charge which was induced into cylinder 12 by way of inlet ports 11. At the point near TDC, that exhaust valve 8-B closed, high-pressure intake valve 16-A opens and closes, injecting the entire working air charge which is very dense, cool and of high velocity and either pre-mixed with fuel or injected simultaneously with fuel, with the engine having a cool effective compression ratio of perhaps 3:1 or 2:1 or less. The charge is ignited near TDC as soon as intake valve 16-A closes for the power stroke with an extended expansion ratio. (This Operational Design 4 of FIG. 2 engine is the easiest design in which to air cool the engine structure. The latter system is much like putting a cartridge in a rifle and firing same for each power stroke. The secondary and only air charge in this design can be the highly compressed, cool air as from conduits 113' and 114' of FIG. 2-C or can be expansion chilled as from conduit 27'a as in FIG. 2-B. In Operational Designs 8 through 10, fuel is injected, if not present, at any point deemed proper and near TDC the charge is ignited by spark, compression, modified HCCI or true HCCI.) (The air or air-fuel injection occurs just far enough before piston TDC to allow the charge injection and ignition to occur at the opportune point before or at TDC to produce the most power and efficiency.)

The burning gases depress the piston in the power ($2^{nd}$) stroke for great power with both fuel consumption and polluting emissions greatly reduced. The new Cycle Engine is inherently cooler operating as a study of the working cycle shows and the engine block and head can very effectively be cooled by pumping cool highly compressed air through port 4 or alternatively, first through expansion valve 4' in FIG. 8, to conduits in cylinder head, cylinder walls 6 in FIG. 6 and block, all of which are low pressure, and act as evaporator tubes as described herein for the engine of FIG. 5.

The efficiency of the engine is improved by (a) thermo-dynamic improvements of increased charge density, by (b) compressing all of the air charge outside of a hot firing cylinder, by (c) more complete combustion due to better mixing of the fuel/air charge and by (d) the extended expansion process in Operational Designs 4 and in Operational Design 8(c).

Power is increased by (a) the improved thermodynamics of a denser charge, which also allows more fuel to be utilized, by (b) more complete combustion and by (c) reduced compression work.

Emissions are less because of (a) low peak temperatures and pressures, by (b) more complete combustion and by (c) particulates in Diesel engines (both smoke and nano-particles) being significantly reduced by the more complete combustion due to the pre-mixing (homogenization) of fuel/air charge before ignition.

Durability is improved by the overall cooler working cycle and low peak temperatures and pressures and in some duty cycles, by low RPM allowed by greater torque.

In each of the 2-stroke engines of FIG. 8, FIG. 9, and FIG. 10, the expansion valves 10' which are alternative, can alternatively have variable openings (nozzle(s)), preferably controlled by the EMC-27 to maintain optimum engine temperature and density in regards to polluting emissions and power requirements. For greater power, if utilizing chilled charge air, expansion valve 10' nozzles may be opened further to direct a more dense charge into ports 11, or alternatively, by opening valve R and allowing some or all of the high pressure effluent to bypass expansion valve 10' by way of conduit X as in FIG. 2-C. This will bring a denser and less expanded air or air-fuel charge into valve 16-A, but may require pressure regulator on conduit 27'a–27f, FIG. 2-B. Either of these two systems, either separately or in combination preferably by EMC-27, which receives signals from sensors in the combustion chamber of cylinder 12 and perhaps other locations. (The alternative system of supplying denser, non-expanded, supplementary charge air to intake valve 16-A as in FIG. 2-C to engine of FIG. 8 can be as shown from conduits 113' and 114' of FIG. 2C with, perhaps optional pressure regulators D and E.) In this system the expanded chilled air (scavenging only) is from conduits 27'a–27'f as shown also in FIG. 2-C.

Results
1) Low peak temperatures and pressures
2) A homogeneous combustion charge
3) A denser charge
4) Greater engine durability Advantages
1) Lower polluting emissions
2) Greater power
3) Higher efficiency
4) Greater torque
5) Increased vehicle range
6) Longer engine life
7) Multi-fuel capability
8) Greater reliability The ability to auxiliary-cool the engine on demand or continuously, coupled with multi-fuel capabilities, the ability to continue operation after damage to supplementary air systems and increased vehicle range, greatly reduces logistics problems for the military on both land and sea.

2-Stroke Air-Cooled Engine Operating in Operational Design 9

Referring now to FIG. 9, there is shown a perspective view (with portions in cross-section) of the cylinder block and head of an internal combustion engine operating in a 2-stroke cycle, and representing a second 2-stroke embodiment of the apparatus of the present invention from which still another method of operation can be performed and will be described. Among its other components, this embodiment is seen as having one atmospheric air intake, with one high pressure charge-air route B, a common air-rail and ports 11-B leading from an optional Roots Blower and conduits (not shown), or alternatively, from compressor 1 and conduit 32 to provide an optional air charging system, or alternatively, a charge air cooling system with items 10', 11', 17 and 27'a as in FIG. 2-C to inlet ports 11 of power cylinder 22 of FIG. 9. The high pressure supplementary charge air route conduit B and intake valve 16-A is supplied by conduits 15-A of FIG. 2, or optionally, conduits 114"–113" as in FIG. 2-C or by conduits 27'a–27'f of FIG. 2-B. Other components are an exhaust valve 8-B and conduits 9 to the atmosphere. Also provided are the power and engine head and block air cooler system, including chill cooling by expansion valve 4' as described for FIG. 5, FIG. 7 and FIG. 8.

Military Model of 2-Stroke New Cycle Engine

The operation of the 2-stroke engine, using charging Operational Design 8 through Design 10, is the same as described for the basic 2-Stroke New Cycle of FIG. 8 Engine's four alternate Operational Design systems 8-A through 8-D for greater torque, power, and durability, with low fuel consumption and ultra low polluting emissions. This engine, FIG. 9, offers triple mode operation of the 2-Stroke new cycle engine with primary and supplementary, secondary air charge, the same as engine of FIG. 8 with the exception that an automatic one-way valve offers improvements as described for engine of FIG. 7.

Additionally, auxiliary valve 2', which is automatic, will prevent charge-air back-flow from cylinder 7. This feature will prevent any back-flow from occurring during the compression or expansion strokes of the engine of this invention. This feature can also be used to establish the initial pressure ratio of the engine, either variable or constant. When secondary charge air is being received through intake valve 16-A, the intake valve 16-A can be kept open during the compression stroke to near TDC of piston 22, since automatic valve 2' closes at such time the pressure in cylinder 12 approximates the pressure in intake runner conduit B. Therefore, the pressure differential between cylinder 12 and intake runner B will allow closure of automatic valve 2', even though intake valve 16-A may still be open, allowing the initial pressure ratio of cylinder 12 to be controlled by the pressure of any charge air coming through intake runner B, which in turn is controlled by valves 3, 5, and 6 (as described for engines of FIG. 1 to FIG. 7) and compressor speed for engines having a single stage of pre-compression. Valves 3, 4, 5 and 6 and compressor speed would control the initial pressure ratios for engines having two stages of pre-compression. There are also fast acting intake valves, some of which open and close in 40 degrees crank angle. The new Cycle Engine is inherently cooler operating, as a study of the working cycle shows, and can very effectively be cooled by pumping compressed, cool air or compressed air that is expanded through a expansion valve 4' which chills conduits (evaporator) in cylinder head, walls and block, as described herein for the engine of FIG. 5.

The efficiency of the engine is improved by (a) thermodynamic improvements inherent in greater charge density, by (b) compressing a large portion or all of the air charge outside of a hot firing cylinder, by (c) more complete combustion because of better mixing of the fuel/air charge and by (d) the extended expansion process in Operational Designs 8(c) and 8(d).

Power is increased by (a) the improved thermodynamics of a denser charge, which also allows more fuel to be utilized, by (b) more complete combustion and by (c) reduced compression work.

Emissions are less because of (a) low peak temperatures and pressures, by (b) more complete combustion and (c) particulates (both smoke and nano-particles) in diesel fuel use are significantly reduced by the more complete combustion due to the pre-mixing (homogenization) of fuel/air charge.

Durability is improved by the overall cooler working cycle and low peak temperatures and pressures and by low RPM, the latter allowed by higher torque.

Results
1) Low peak temperatures and pressure
2) A homogeneous combustion charge
3) A denser charge
4) Greater efficiency
5) Greater engine durability Advantages
1) Lower polluting emissions
2) Greater power
3) Greater torque
4) Increased vehicle range
5) Longer engine life
6) Multi-fuel capability
7) Greater reliability The ability to auxiliary-cool the engine on demand coupled with multi-fuel capabilities, much greater power and increased vehicle range greatly reduces logistics problems for the military on both land and sea. In addition, 2-stroke Diesel Cycle engines, of which over fifty different applications are currently used by the military for land and water transportation as well as for stationary use, can be readily retrofitted for the new supplementary cold air supercharged power cycle and compressed air or compression-expansion chilled engine cooling, as described for FIG. 8.

2-Stroke Air-Cooled Engine Operating in Operational Design 10

Referring now to FIG. 10, there is shown a part sectional view through one power cylinder of a 2-stroke engine at the intake and exhaust valves showing an optional method (adaptable to other embodiments of the present invention) of preventing charge-air back flow and of optionally automatically adjusting the charge pressure-ratio of the cylinder during the air charging process, and a system for providing a supplementary, secondary charge air injection directly through valve-in-head and through the cylinder wall for better mixing of charge and reducing formaldehyde formation.

Military Model of 2-Stroke New Cycle Engine

The operation of the 2-stroke engine is very similar to the basic 2-Stroke New Cycle Engine System of FIG. 8 and FIG. 9, for greater torque, power, and durability with low fuel consumption and ultra low polluting emissions. The operation of this particular design is this:

Operation of the 2-Stroke New Cycle Engine

The operation of engine of FIG. 10 is the same as that of the engines of FIG. 8 and FIG. 9 for mode 1 operation, except that in mode 2 and 3 a difference is being able to inject the supplementary, secondary air charge through ports in the cylinder wall and ports 17A and 17B and alternatively to simultaneously inject cold supercharging air through an automatic valve 2' or optionally directly through port 2 in cylinder head at valve 2' with valve 2' (shown in phantom) optionally being absent.

The supplementary, supercharging air charge for mode 2 and mode 3 in this design is compressed and cooled from conduits 113' and 114' of FIG. 2-C or alternatively, compressed and chilled from conduit 27'a, as seen in FIG. 2-B, is injected into the cylinder 12 by inlet valve 16-A, (after cylinder scavenging and charging and ports 11 are closed by piston 22), and by conduit 17-A and inlet port(s) 17-B, which optionally can be one or many, and located in cylinder wall 12 at any place deemed proper for best mixing of charge. (For Operational Design 4 operation, the cooling primary air charge is expelled and at piston near TDC, the entire working charge is injected through intake valve 16-A.) If optional automatic inlet valve 2' and accompanying opening (not shown) to inlet valve 16-A is utilized, the air pressure from intake valve 16-A, when open, would depress valve 2' to inject the high-pressure from the top and back-pressure on the incoming charge by valve 2' would force a substantial part of the incoming charge to enter conduit 17 and 17-A and pass into cylinder 12 through port(s) 17-B for good air-fuel charge mixing. Besides aiding the mixing of the air-fuel charge, the cool high-pressure air from port(s) 17-B will sweep out ring crevices and space between cylinder wall 12 and piston 22 to reduce HC and the formation of formaldehyde.

Optional automatic valve 2', if used, will also increase the velocity of the charge entering the cylinder from directly past valve 16-A and that from lower port(s) 17-B. The New Cycle Engine is inherently cooler operating, as a study of the working cycle shows. It can also be effectively chill-cooled by pumping cool, highly compressed air through port 4 in engine block or optionally, through a metering or expansion valve 4' to inlet port 4 to conduits (the "evaporator") in cylinder head, walls and block, as described for the engines of FIG. 5, FIG. 8 and FIG. 9.

The efficiency of the engine is improved by, (a) compressing a large portion of the air charge outside of a hot firing cylinder during high power operation, by, (b) more complete combustion because of better mixing of the fuel/air charge by, (c) the thermodynamic improvements in greater density of the charge and by (d) the extended expansion process in Operational Designs 8(c) and 8(d).

Power is increased by, (a) the improved thermodynamics of a denser charge and which also allows more fuel to be utilized, by (b) more complete combustion and by (c) reduced compression work.

Emissions are less because of (a) low peak temperatures and pressures, by (b) more complete combustion and (c) a significant reduction of particulates (both smoke and nanoparticles) in diesel fueled engines, resulting from more complete combustion, which in turn, is due to the pre-mixing (homogenization) of fuel/air charge, (in high-pressure supplementary, secondary charge only for 2-stroke engines), before ignition by spark or by HCCI. In this design, the secondary air charge is injected through port(s) 17-B in the cylinder and optionally, through port at 2 or through automatic valve 2 in order to cool, mix, increase charge density and to clean out piston ring crevices where unburned fuel resides and to sweep out other narrow passages between piston and cylinder wall in order to reduce HC and formaldehyde emissions.

Durability is improved by the overall cooler working cycle and low peak temperatures and pressures and by lower RPM, the latter allowed by greater torque.

The operation of the engine of FIG. 10 is the TRIPLE MODE system described for engine of FIG. 8, utilizing either of Operational Designs 8a–8d, with the preferred mode being mode 2. The advantage of mode 2 operation is that should compressors and coolers be damaged as in battle situations, the engine is switched to mode 1 operation and continues to operate and return home, still with the power of normal engines.

Results
1) Low peak temperatures and pressure
2) A homogeneous combustion charge
3) A denser charge
4) Greater efficiency
5) Greater engine durability Advantages
1) Lower polluting emissions
2) Greater power
3) Greater torque
4) Increased vehicle range
5) Longer engine life
6) Multi-fuel capability
7) Greater reliability The ability to auxiliary-cool the engine on demand and to continue to operate in mode 1 if the compression system is damaged, coupled with multi-fuel capabilities and increased vehicle range, greatly reduces logistics problems for the military on both land and sea.

Dual Air Pressure Levels Supplied by Pressure Amplifier

Referring now to FIG. 11, (System A), there is shown a schematic view of a six cylinder engine, 4-stroke or 2 stroke, having both low and high-pressure charge air supplied by one or two initial stages of compression. The pressure in one line, 9' is being amplified by a pressure amplifier and illustrates how one compressor 5 and a pressure amplifier 2 can supply either low or low boosted, and high-pressure air for operation of the new cycle engine or a constant speed engine, such as for power generation, pumping, etc. This pressure amplifier system may be used for any other appropriate need for high pressure gas or other fluids. The compressor-cooler system of the present invention is not limited to any particular type of compressor and cooler system.

The 4-stroke and 2-stroke engines of this invention require a supply of air or air-fuel charge presented to the engine 1' at two different pressure levels and generally at different temperatures. This pressure amplifier system offers an advantage to both 4-stroke and 2-stroke designs.

Supplying and utilizing the pressure amplifier system is using one compressor 5 with proper conduits, valving, intercoolers and high-pressure distributing manifold 12, and a second manifold 13 for distribution of the low pressure (primary) air charge for both 4-stroke and 2-stroke engines. Manifold 12 and 13 have optional pressure regulators indicated by numbers 14' and 15' (shown in phantom). These optional pressure regulators, if desired, or additional pressure regulations, could be placed on conduits 14" and 15" (shown in phantom) between manifolds 12 and 13 and inlet valves 16-B and 16-A, respectively.

An ancillary compressor 1 (in phantom) receives atmospheric air at port 8 which it compresses and sends either through air cooler 11 or, in whole or part, by-passes the air cooler 11 and conducts it to compressor 5 where the charge is compressed and passed through intercooler 6, or cooler 6 is bypassed, in whole or part, by conduit 3' and valve 2'. The air is then divided into two streams at point 2", with part of the compressed air going through the low-pressure side of a pressure amplifier 2, by way of valve 14, and exits at valve 33. The second part of the charge passes through the high-pressure end of the amplifier 2, entering by way of valve 4 and exiting by valve 10, where the high-pressure charge passes through intercooler 9 or, in whole or part, bypass systems 34 and 35 or partly through both cooler 9 and bypass conduit 34, with the system being regulated by valve 35 and optionally controlled by ECM-27' of FIG. 2.

In the amplifier 2, the larger piston 7 with the greater piston face surface is depressed by the expanding air entering valve 14 from compressor 5. Now, a second portion of the compressed air enters valve 4 to the smaller piston, which further compresses by pressure exerted by larger face 7 of piston 2, and expels the second high-pressure part of the charge through valve 10 into conduit and cooler 9 or, wholly or partly, through bypass 34 and valve 35, or partly through each, where the temperature is adjusted to needed temperature for the manifold 12 to supply high-pressure air inlet valve 16-A of engine of FIG. 11. The low-pressure air charge also passes through a cooler or heater 11' or, in whole or part, bypass system 34' and 35' and to manifold 13 and then to low pressure inlet valves 16-B of engine of FIG. 11 or alternatively, to ports 11 of 2-stroke engine of FIG. 8. Means for regulating pressure in manifold 12 and 13 are depicted as items 14 and 15. Thus, pressure amplifier FIG. 11 is supplying high and low-pressure air at different temperatures and should be of value in other industrial functions.

Dual Chilled High-Pressure Air and Low Pressure Air Supply

Referring now to FIG. 11-B, (System B) there is shown a schematic view of a six cylinder engine, 4-stroke or 2-stroke, having both low and high-pressure charge air supplied by one or two stages of pre-compression. The pressure to one line 9' is being amplified by a pressure amplifier 2 and illustrates how one compressor 5 and a pressure amplifier 2 can supply either low or low boosted, and high pressure air, for operation of a constant speed engine of this invention such as for power generation, pumping, etc. The compressor-cooler system of the present engine invention is not limited to any particular type of compressor or cooler system.

The 4-stroke and 2-stroke engines of this invention require a supply of air or air-fuel charge presented to the engine 1' of FIG. 11 or FIG. 11-B or alternatively, to 2-stroke engine of FIG. 8, at two different pressure levels and generally at different temperatures, with the capability of expansion chilling the high pressure charge air. One means of providing such is by use of one compressor 5 with proper conduits, valving, intercoolers and optional high-pressure surge tank 12, expansion valve 10' and pressure drop distributor 11" on the high pressure conduit 9', leading to conduit 27' and intake valve 16-A of engine of FIG. 11-B or FIG. 8, and a manifold 13 for distribution of the low pressure (primary) air charge from valve 33 on low side of pressure amplifier 2, as depicted in FIG. 11-B. (Surge tank 12 and manifold 13 have optional pressure regulators, if needed, indicated by numbers 14"a and 15"f (shown in phantom)). The low pressure air is fed by the low pressure valve 33 on pressure amplifier 2 to cooler or bypass system 11, 34 and 35 to optional manifold 13 and conduit 26, leading to low pressure inlet valve 16-B of engine of FIG. 11-B or alternatively, to low pressure inlet ports 11 of engine of FIG. 8, FIG. 9 or FIG. 10.

Distributor tube 17a receives chilled air from expansion valve 10' and delivers it in equal quantities to distributor tubes 27'a and 27'f to intake valves 16a.-A and 16f-A of engine of FIG. 11-B or alternatively, FIG. 8, FIG. 9 or FIG. 10.

2-Stroke Engines

For the designs of 2-stroke engines FIG. 8, FIG. 9 and FIG. 10, the pressure amplifier system of FIG. 11 and FIG. 11-B will provide similar improvements for these designs by using high-pressure, cooled or chilled charge air going to cylinder input valves 16-A in each design and low-pressure, cooled charge going to cylinder inlet ports 11.

Otto and Diesel Cycle Engines

For FIG. 2-D, current technology 2-stroke and 4-stroke Otto and Diesel Cycle engines, the high-pressure cooled or chilled dense air or air-fuel input to intake valves 16-A would be utilized for performance improvements. The low-pressure output of the pressure amplifier could be returned to suction side of compressor 1 or compressor 2 and would be mandatory if fuel is premixed with the air.

Figure 12:
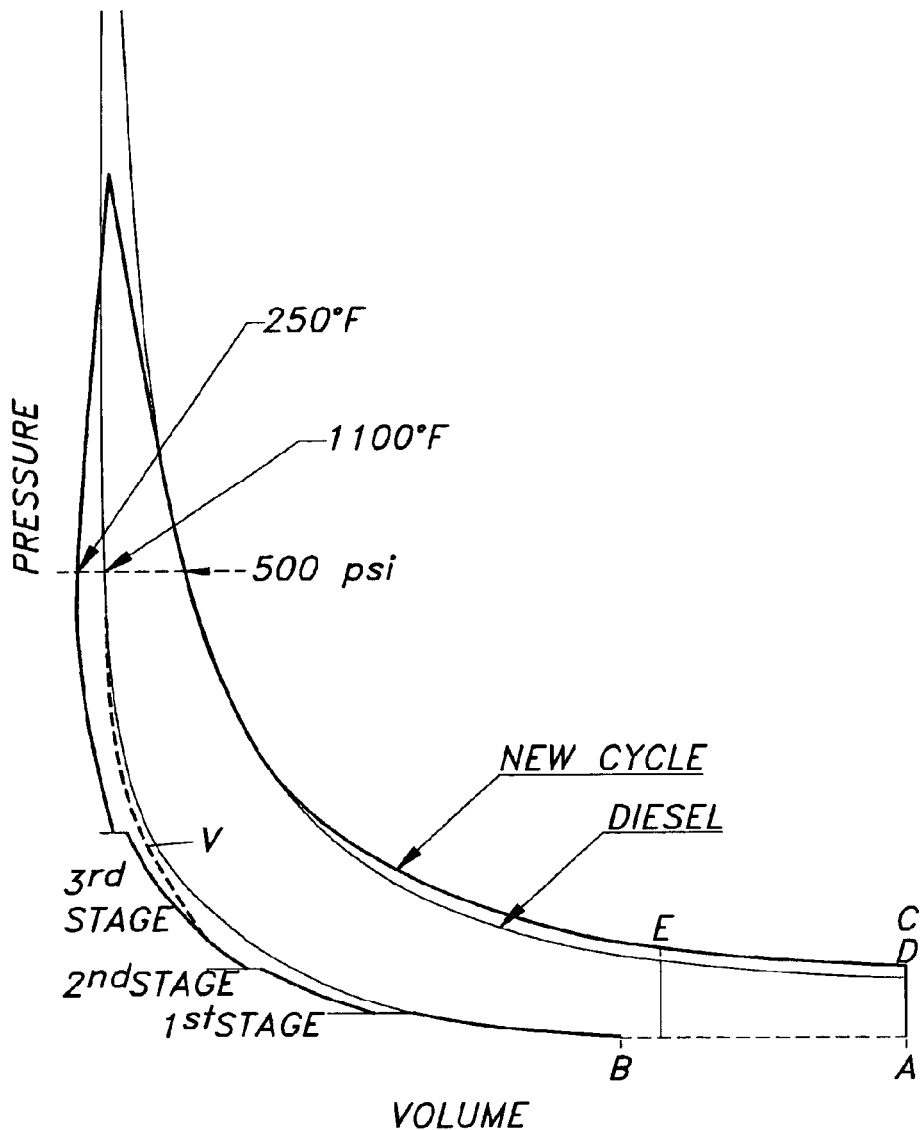
FIG. 12 is a pressure—volume diagram (a compilation of four diagrams) of a high speed diesel engine compared to the extended expansion process engines of this invention. These diagrams show three stages of intercooled compression and a fourth stage of uncooled compression.

Referring now to FIG. 12, there is shown a pressure-volume diagram (which is a compilation of 4 diagrams) for a high-speed Diesel engine, compared to the engines of this invention, showing three stages intercooled compression and a fourth stage of uncooled compression, which arrangement is suggested for optimum power and efficiency for the engine of this invention.

Note 1—In FIG. 12, the travel distance of the line for engine B on the horizontal coordinate, indicates the theoretical volume at the greater density. The density is kept at that level at the actual combustion chamber volume (as shown by dashed line V) regardless of the density, by pumping in more charge at the backside.

There are several features that improve the thermal efficiency of the engine of this invention. Greater power to weight ratios will provide a smaller engine with less frictional losses. Increased torque allows much lower RPM, again reducing frictional loses. The extended expansion ratio results in higher thermodynamic efficiency cycle, which is shown in theoretical considerations. There are also definite efficiency gains in a "staged" compression process, even with external compressors with associated piping, intercoolers and aftercoolers, etc. There is a very significant energy savings when air is compressed in intercooled stages. Less energy is used in compressing a charge to 500 psi in 2, 3 or 4 intercooled stages than is used to compress the hot charge to the same 500 psi in a conventional engine. A normal engine uses approximately 20% of its own energy produced to compress its own air charge. Calculations show a significant energy savings in an engine, if the air is compressed in aftercooled stages. Compressing a charge in only two stages to 531 psi (a 13:1 compression ratio) reduces the energy used by 15.8% over compressing to the same 531 psi level in a single stage, as does the Otto and the Diesel Cycle engines. Three stages of intercooled compression raises the savings to 18%. This is the ideal. Degradation from the ideal should not exceed 25%, which leaves a 13.5% energy savings. This 13.5% energy savings times the 20% of a normal engine's power used for compressing its own charge, is a 2.7% net efficiency improvement by the compression process alone. This is one of the advantages of the engine of this invention, which adds to the other thermal efficiency improvements. The dense charge, along with the large expansion ratio (the latter is several designs) provide improvements in fuel efficiency, greater torque, power and durability, while lowering polluting emissions.

Air Bypass Valve (ABV) Control Operation

An engine control module (ECM) 27 controls the air cooler bypass valves 3 and 5. The bypass valves may be a shutter type valve as illustrated to pass part, all or none of the air charge in either direction, or valves 3 and 5 may be of a helical solenoid or other type of valve which can pass part or all of the air charge through bypass conduits 121 and 122 and part or all through air coolers 10, 11 and 12 for fine control of the temperature and density of the air charge. The ECM receives signals from sensors, such as an engine coolant sensor, a crankshaft position sensor, camshaft position sensor, a manifold absolute pressure sensor, a heated oxygen sensor and pressure and temperature sensors, the latter two preferably placed in the combustion chamber.

To provide optimum air charging pressure for differing engine operating conditions, the ECM-27 sends signals to control air bypass valves 4 and 6. These valves could be on-off solenoid valves, possibly vacuum operated, or they could be helical solenoids or other type of valve, which could remain closed or open part way or all the way in order to optionally re-circulate, part or all, of the air charge back through the inlets 110 and 8 of compressors 1 and 2 in order to optionally reduce or eliminate entirely the pumping pressure of either compressor 1 or compressor 2, or both. Similar arrangements of air pressure control could be used for additional stages of air compression, if additional stages are used.

The operation is thus: The ABV valves 4 and 6 is controlled by signals from the ECM-27 to control the angle of valves 4 and 6 to provide the optimum air charging pressures for various engine loads and duty cycles. When ABV 6 is opened partially, some of the air pumped through compressor 2 is passed back into the intake 8 of compressor 2 to reduce compression pressure. When ABV 6 is opened fully, all of the charge of compressor 2 is passed back through compressor 2. Thus, compressor 2, valves 3 and 4 and ECM-27 can exert fine control of charge air density.

With this arrangement, combined with the arrangement of ECM-27, control of charge-air cooler bypass system for variable valves 3 and 5, and in the optional design of 11-B, the variable expansion valve 10', the temperature, density, pressure and turbulence of the charge-air can be managed to produce the desired power and torque levels and emissions characteristics in the power cylinder of the engine.

Engine conditions that could be monitored by ECM-27 in order to affect proper engine conditions, in regard to control of ABV valves 4 and 6, could include a fuel injection activity sensor, air temperature sensor at various points, manifold absolute pressure sensor, a heated oxygen sensor and/or other sensory inputs known to be used in internal combustion engines. The ECM-27 controls both the shutter valves 3 and 5 and the air bypass valves 4 and 6 in order to maintain the optimum air charging density pressure and temperature at all engine operating duty cycles.

Alternate Combustion Systems

Figure 13:
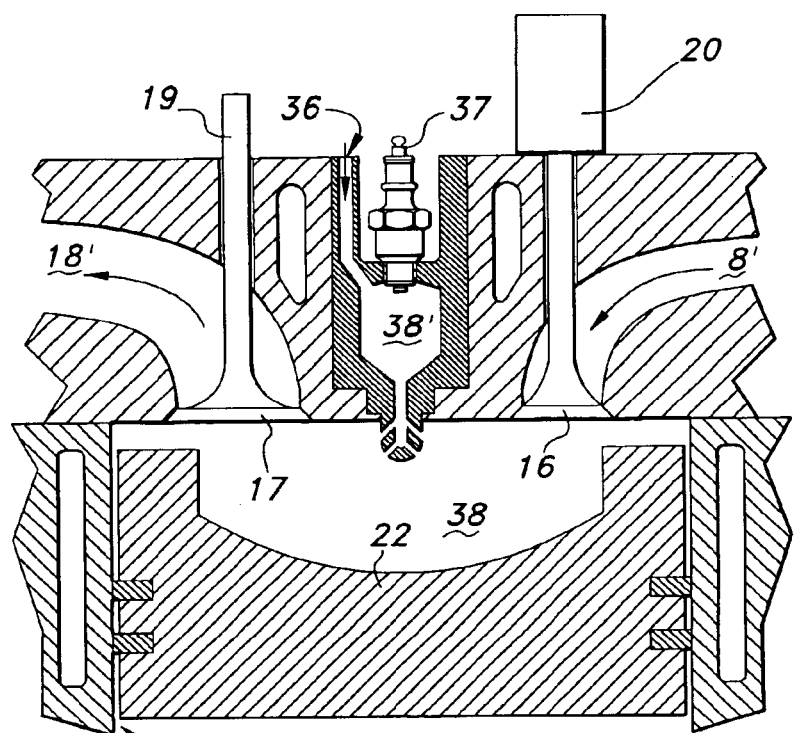
FIG. 13 is a schematic transverse sectional view of a pre-combustion chamber, a combustion chamber, associated fuel and air inlet ducts, and inlet and exhaust valving, suggested for gaseous or liquid fuel operation for the engine of this invention or for any other internal combustion engine.

Referring now to FIG. 13, there is shown a schematic transverse view of a pre-combustion chamber 38', a combustion chamber 38, a piston 22 and associated fuel inlet 36, a sparking or glow plug 37, an air or air/fuel mixture inlet duct 8' intake valve 20, an exhaust duct 18' an exhaust valve 17, suggested for liquid or gaseous fuel operation for the engines of this invention or for any other internal combustion engine.

There are many choices of systems for compression or spark ignition for the engine of this invention, as described in FIG. 1 and FIG. 2. Every fuel from gasoline to heavy diesel fuels, including the alcohols and gaseous fuels can be spark ignited or compression ignited (CI) in this engine, as well as by HCCI. One good system would be similar to the system shown in FIG. 13 or FIG. 19 for compressed natural gas, propane, hydrogen, gasoline, alcohols or diesel fuel. In this system, an extremely fuel rich mixture constituting the entire fuel charge is, preferably, injected into the pre-combustion chamber 38'. The fuel could be injected through fuel duct 36 with or without accompanying heated or cool re-circulated exhaust gases or air. The air charge, some of which can accompany the fuel charge, would be compressed into the pre-combustion chamber 38' by piston 22 during the compression stroke. Additional air, with or without additional fuel, could be introduced into the cylinder proper on the compression stroke through intake conduit 8'. In either case, the second combustion stage in the cylinder proper would be with a lean mixture. The two-stage combustion system shown in FIG. 13 will operate in this manner

Pre-Combustion (First Stage)

Pre-combustion occurs in the pre-combustion chamber 38' when fuel, in an amount much in excess of the amount of oxygen present, is injected through conduit 36 and ignited (injector not shown). This oxygen deficiency, along with the cooler, turbulent charge and lower peak temperatures and pressures, greatly reduces the formation of oxides of nitrogen. The combination of the hot pre-combustion chamber wall and intense turbulence promotes more complete combustion.

Post-Combustion (Second Stage

Post-combustion takes place at lower pressure and relatively low temperature conditions in the space above the piston in the cylinder as the gases expand from the first stage pre-combustion chamber into the cylinder proper. If there is additional fuel in the cylinder proper, the leaner mixture is ignited by this plasma-like blast from the pre-combustion chamber. The low temperature and the admixture of burned gases prevent any further formation of oxides of nitrogen. Excess air, a strong turbulent action, and the extended expansion process assure more complete combustion of carbon monoxide, hydrocarbons, and carbon.

The results of the engine of this invention, using the pre-combustion chamber 38' of FIG. 13, are: higher thermal efficiencies due to the greater expansion and a denser charge, along with a cooler exhaust and a lower level of polluting emissions, including oxides of nitrogen, and in addition, lower aromatics and particulates for diesel fuels.

Variable Compression Ratio and Double Power Designs

In following arrangements, there is shown schematic transverse sectional views of two optional cylinder designs of the engine of this invention which will convert the 2-stroke engine of FIG. 8 through FIG. 10 or any other 2-stroke engine to a one power stroke per piston stroke engine, and will convert the 4-stroke engines of FIG. 1 to FIG. 5 and FIG. 7 or any other 4-stroke engine to operate as a 1 power stroke per cycle engine.

By building any 2-stroke engine with all power cylinders double acting, the power to weight ratio can be doubled over the basic engine. One end of the cylinder fires and the other end is scavenged and charged on each piston stroke for a "nominal" one power stroke for each piston stroke (or two power strokes for each shaft rotation) of the engines of FIG. 8 through FIG. 10. Use of double-acting power cylinders in the 4-stroke engine of FIGS. 1–5 and FIG. 7 converts the engine to a 1 power stroke per shaft rotation engine because two of the functions of a 4-stroke cycle engine are accomplished on each stroke of the piston.

Figure 14:
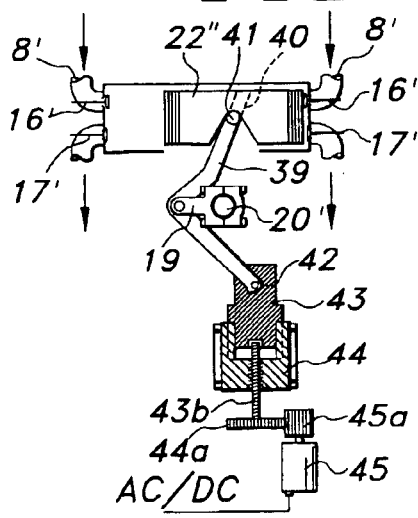
FIG. 14 is a part sectional view through one cylinder of an engine, showing an alternate construction, whereby there is supplied two firing strokes each revolution of the shaft for a 2-stroke engine and one firing stroke each revolution of the shaft for a 4-stroke engine. This engine has a beam which pivots on its lower extremity, a connecting rod which is joined mid-point of the beam and is fitted to the crankshaft of the engine, whereby a means is provided for varying the compression ratio of the engine at will.

Referring now to FIG. 14, there is shown a double-acting cylinder with a means of varying beam 39 length to vary the compression ratio, which is accomplished by the beam end forming a scotch yoke 40 and fitting over the wrist pin 41 of the piston.

The double-ended piston 22" can be linked to the end of a vertical beam 39 that pivots at the lower end 42. A connecting rod 19' is joined between the midpoint of the beam and the crankshaft 20'.

Since the crankshaft 20' does no more than transmit torque, its main bearings will be very lightly loaded. As a result, little noise will reach the supporting casing. Because of the lever action, the crank (not shown) has half the throw of the piston stroke and can be a stubby, cam-like unit with large, closely spaced pins having substantial overlap for strength.

The compression ratio can be changed by slightly lengthening or shortening the effective length of the beam 39. This can be done by the lower pivot plate 42 being attached to a block 43, mounted slidably in a fixed block 44, in which block 43 can be moved slidably by a servo motor 45. The gear 45a rotated by servo motor 45 is much longer than the gear 44a on the screw 43b, which is rotatably attached to block 43 and rotates against threads in block 44, causing gear 44a to slide back and forth on gear 45a, as block 43 reciprocates in block 44. Thus, as a diesel, it could be started at 20:1 ratio and then shifted to a 13:1 ratio for higher efficiency and for less friction and stress on parts. This could also be important to allow use of alternate fuels.

Figure 15:
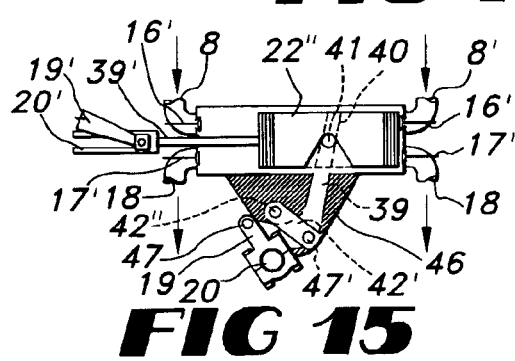
FIG. 15 is a part sectional view through one cylinder of an engine, showing an alternate construction, whereby there is supplied two firing strokes each crankshaft revolution for a 2-stroke engine and one firing stroke each revolution of the shaft for a 4-stroke engine. A beam connecting the connecting rod and the piston pivots at a point between the piston and the piston connecting rod, which is attached to the crankshaft of the engine. Also shown is an alternate preferred means of power take-off from the piston by a conventional piston rod, cross-head and connecting rod arrangement.

Referring now to FIG. 15. This same advantage holds true for this alternate design in which the pivot 47' is between the connecting rod 19 and the piston 22".

The needed variation of the length of the beam 39 (shown in phantom), connecting the piston 22" to the connecting rod 19, can be accomplished by forming a scotch yoke 40 on the beam end fitting over the wrist-pin 41 of the piston 22", or by placing a double pivoting link 42' between the pivot 47' on the fulcrum of beam 39', with the pivot 42" being attached to a non-movable pan 46 of the engine and the terminal end of beam 39' being connected to connecting rod 19 by a pin 47.

Alternatively and preferably, for heavy duty engines (marine propulsion, power production, etc.) the power take off of piston 22" could be with a conventional piston rod 39' being arranged between piston 22" and a crosshead 20', with a connecting rod 19' between the crosshead 20' and the crankshaft (not shown).

Double-acting power cylinders when used in the engine of this invention, or any other engine, will be especially important where great power is desired and cooling water is readily available, e.g., for marine use or for power generation. These double-ended, double-acting cylinders of the engine of FIG. 14 and FIG. 15 can be used in all of the designs of this invention, or in any Otto or Diesel engine.

Double Burn "Dwell" Time

Figure 16:
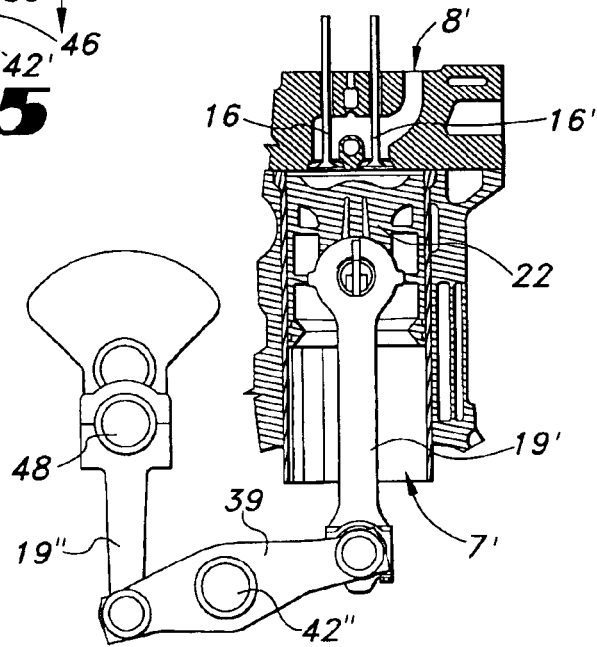
FIG. 16 is a part sectional view through one cylinder of an engine, showing a means of providing extra burn-time each firing stroke in a 2-stroke or 4-stroke engine.

Referring now to FIG. 16. There is shown a schematic transverse sectional view of a crankshaft, two connecting rods 19' and 19" and a beam 39 showing a means of providing extra loading and burn "Dwell" time at TDC of a conventional 2-stroke or 4-stroke engine and especially for the engine designs of the present invention, namely 4 stroke engines of FIGS. 1 through 7 and FIGS. 18 through 19-B. The system of Double Burn Time of FIG. 16 is also important in 2-stroke engines of FIGS. 8 through 10.

This layout for any engine provides for double the piston 22 turnaround time of a normal engine during the critical burn period. This is because piston 22 TDC occurs at BDC of the crank 48. At this point, crank pin motion around piston 22 is subtracted from the straightening movement of the connecting rod 19', instead of being added to it, as in conventional engines. Reversing the usual action slows piston travel around this point, resulting in more complete combustion and further reducing emissions. This system allows more complete fuel burn and heat energy conversion into peak pressure before the power stroke begins. This enhances power per unit of fuel consumption and brake specific fuel consumption (BSFC), and reduces polluting emissions. It also allows the engine to operate under lean burn conditions.

The extra burn time, provided by the design of FIG. 16, can be important in the engines of this invention and to any Otto or Diesel cycle engine.

Operation of the engine, constructed and arranged with the additional burning time, would be the same as the other engines of this invention, providing high charge density, low compression-ratios in some designs, with a mean effective pressure higher than conventional engines, but with more combustion time than other engines, while producing even less polluting emissions.

Since the crankshaft 48 in FIG. 16 does no more than transmit torque, its main bearings will be very lightly loaded. As a result, little noise will reach the supporting casing. Because of the lever action, the crank can have as little as half the throw of the piston stroke (depending on the point of the fulcrum), and can be a stubby, cam-like unit with large, closely spaced pins having substantial overlap for strength. This layout provides for twice the combustion time of the engine of this invention during the critical loading and burn period. This is because piston TDC occurs at BDC of the crank.

Constant Speed Engines

Figure 17:
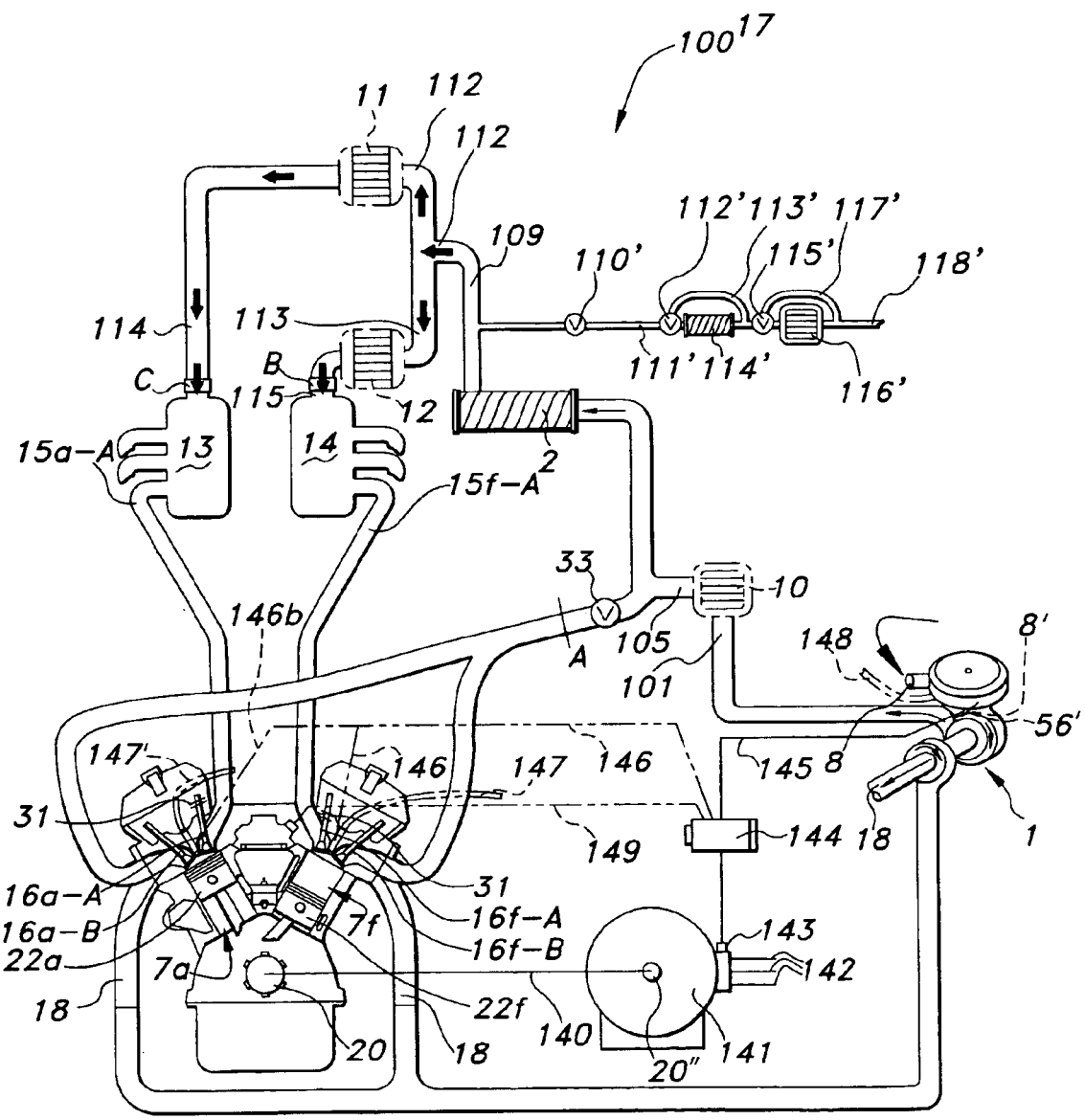
FIG. 17 is a schematic drawing, representing any of the engines of the present invention depicted in an alternate embodiment, which is configured to operate as a constant speed engine. This constant speed engine embodiment of the present invention is shown as including both a primary and an ancillary compressor with optional intercoolers for providing two stages of pre-compressed charge air, either optionally intercooled or adiabatically compressed.
Figure 17B:
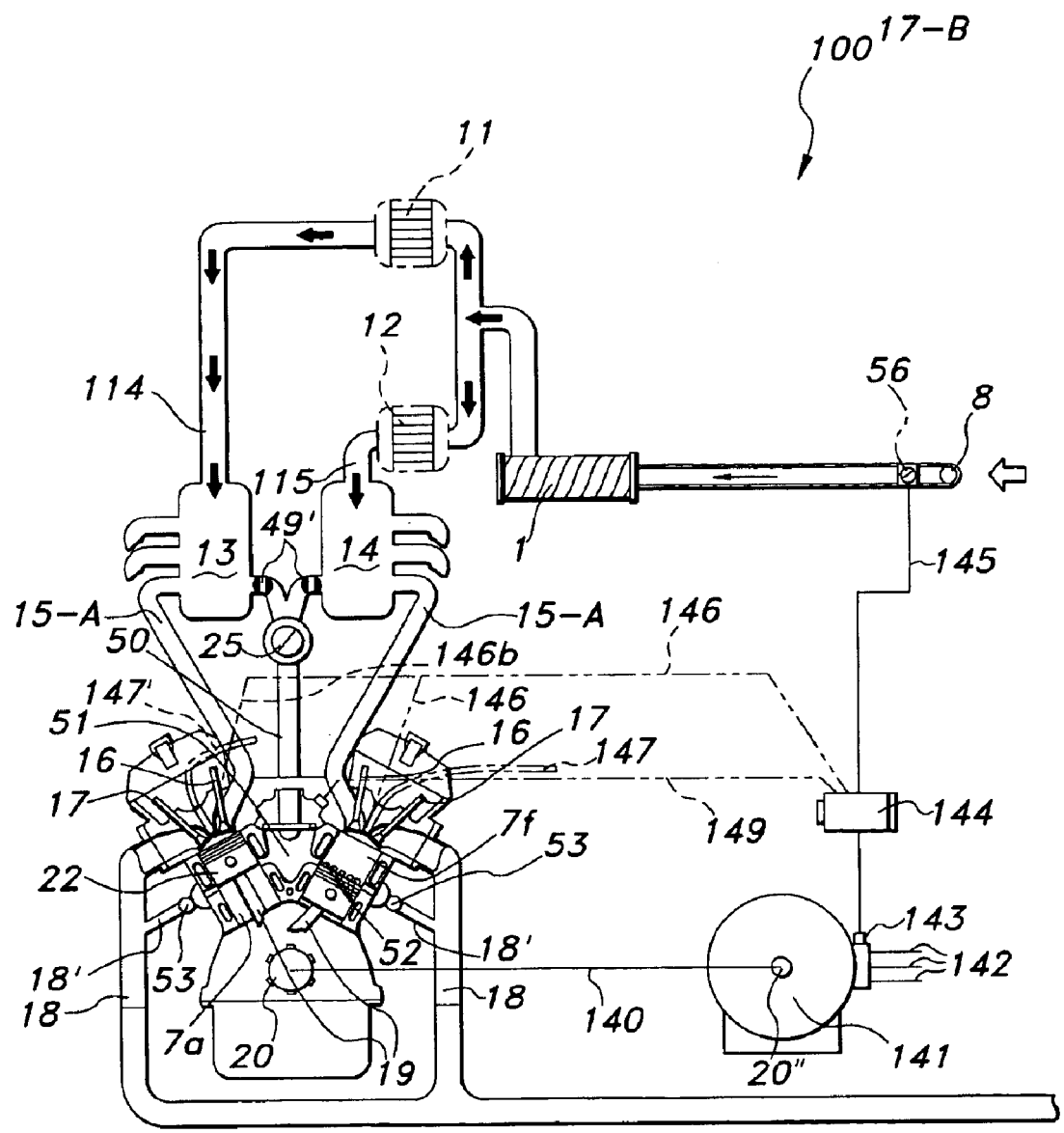

Whereas the preponderance of the foregoing specification describes embodiments and representative engines of the present invention which are optimized for duty cycles in vehicles such as automobiles, trucks, buses, tanks, trains and airplanes and describes systems and methods for varying power, torque and speed. The present invention finds useful application for obtaining high power and torque, while maintaining optimum fuel economy and low polluting emissions in less complex systems, such as constant speed engines, for example. FIG. 17 depicts alternate embodiments of the present invention which are representative of constant speed engines such as electric power generators, pumps and compressors, outfitted in accordance with the principles of the present invention.

The Engine of 100[17]

Referring now to FIG. 17, there is shown is a schematic presentation of an engine which represents any of the 4-stroke or 2-stroke engines of the present invention, outfitted for constant speed operation. The basic components of the engine 100, such as compressors 1, 2 and optional intercoolers 10, 11, 12 (shown in phantom) and their necessary associated conduits are preferably, designed for optimum operating parameters, having only the basic components. The various controls, shutter valves, air bypass valves and their associated bypass conduits, such as those in previously described embodiments, are preferably eliminated in order to reduce weight, cost and complexity of operation. In FIG. 17, the engine 100 is shown, as outfitted, with a first ancillary compressor 1 and a second ancillary compressor 2, optional intercoolers 10, 11, 12 (shown in phantom) and interconnecting conduits, all operating as would be understood with reference to the previous detailed descriptions and operating with two stages of pre-compression of the charge-air, intercooled or adiabatically compressed.

FIG. 17 shows a preferred setup for power generation with any of the engines of this invention. The power output shaft 20 of the engine 100 is coupled schematically by line 140 to power input shaft 20" of generator 141 which has electric power output lines 142. As the shaft 20 of the engine 100 rotates the shaft 20" of generator 141, the amount of electric power produced by generator 141 is detected by sensor 143 and relayed to control unit and governor 144. With various relays and integrated circuits, their overall purpose is to quantify and adjust the fuel input, power output and speed. To do this, they will:
1) Send messages by line 145 to fuel/air control (not shown) on fuel line 148 and speed control 56.
2) Spark control by line 149 in order to advance or retard the spark in spark-ignited engines
3) Send messages through lines 146 and 146b for engines having fuel injection systems, e.g. for natural gas, gasoline or diesel fuel, or to fuel/air controls.

Control unit 144 also sends signals to control the proportioning valve 201, (not shown) and to proportioning valves 209a, 209b, 209c, 209d, 209e, 209f and 209g shown in FIG. 1-C to control the amount, if any, of exhaust gases re-circulated by these valves for re-burn in any engine of this invention utilizing this feature. Further explanation of the components and operation with the engines of the present invention is deemed unnecessary, as it would be understood by those skilled in the art having reference to the present disclosure.

The optional intercoolers 10, 11, 12 (shown in phantom) are preferably reduced in number or cooling capacity in the compression-ignited engine. This is made possible by a cooler working cycle and by low peak pressures and temperatures in the engines of this invention. The constant speed engine would be designed to produce the combustion chamber temperature desired at TDC of piston 22 which may require some of the air bypass systems and controls of the other engine designs.

The Engine of $100^{17-B}$

Referring now to FIG. 17-B. There is shown an engine illustrated as a 2-stroke engine, but representing any of the engines of the present invention, 2-stroke or 4-stroke, which is coupled schematically by line 140 with an electric generator 141. The engine and arrangements are similar in structure and operation as those shown and described for the engine of FIG. 17, with the exception that engine of FIG. 17-B, operating as either 2-stroke or 4-stroke cycle engine 100, has only a single stage of pre-compression, optionally intercooled by intercoolers 11, 12 (shown in phantom), of the charge air. As with the engine of FIG. 17, intercoolers 11, 12 are preferably reduced in cooling capacity in compression-ignited versions of the engine 100 of this invention. Also, as with the engine 100 of FIG. 17, the governor, and other controls and the operation of the engine and generator would be understood by those skilled in the art having reference to the present disclosure. This engine also may require some of the bypass systems for compression and intercoolers illustrated for other engine designs of the present invention.

Ultra Low Emissions Engine with Extended Expansion Ratio Operating in Operational Design 11

Referring now to FIG. 18. There is shown a schematic drawing of a six cylinder dual mode engine $100^{18}$ operating in a 4-stroke cycle which can be spark, compression or homogeneous charge compression ignited (HCCI).

Brief Description of Operational Designs 11 and 12

Operational Design 11, FIG. 18. The engine is similar in structure to the 4-stroke engine of FIG. 2 and shows an alternative air compression system utilizing air intake 8 (in phantom) or air intake 8'. FIG. 18 also shows four intercoolers 10, 10', 11, and 12, and dual manifolds 13 and 14. The alternate air induction system 8' shown in FIG. 18 supplies unpressurized charge-air to low pressure intake valves 16-B of the engine of FIG. 18 by providing atmospheric pressure air to the intake runners 32' and 32" and to intake valves 16-B of each power cylinder. Optionally, a second air induction system also shown in FIG. 18 where air inlet 8 inlets atmospheric air to a turbo-charger 1 and cooler system 10 (all in phantom) to boost the pressure and cool the initial charge that is then directed optionally to conduit 32 and low pressure intake valves 16-B where the charge is received compressed while expelling a large portion of the charge into compressing and cooling system, compressor 2 and intercoolers 11 and 12 and is then admitted to the inlet valve 16-A of power cylinders 22 after piston 22 has passed point "E" in the last part of the power stroke.

Operation

In this concept, air at atmospheric pressure (from inlet 8'), or pressure boosted by compressor 1 and cooled by intercooler 10 and through conduit 32. FIG. 18, is received by the intake ($1^{st}$) stroke of piston 22 through intake valve 16-B and then piston 22 turns around and the compression ($2^{nd}$) stroke begins. Then, during the compression ($2^{nd}$) stroke, much of the total charge, now being compressed, is expelled (this is part A of charge) through outlet valve 16-C (indicated, but not shown) which quickly opens and closes at piston position E into a compression-cooling circuit system consisting of conduits 201, 202, intercooler 10', compressor 2, bypass system 3, 4, intercoolers 11, 12, to manifolds 13–14, conduits 15-A, later to be injected by high-pressure intake valves 16-A. That portion of the air charge (part A) is now further compressed and cooled with pressure buildup in manifolds 13–14. (The compression stroke of piston 22 continues toward TDC, now compressing part B of the charge, that remaining in cylinder 7 after piston 22 passes point E and valve 16-C has opened and closed). The cool dense A charge, now accumulated in the compression-cooling circuit, is then re-injected through high-pressure intake valve 16-A above piston 22 crown after piston 22 has reached or passed the point (E) during the compression stroke and can be injected as late as during combustion. The charge A has been injected, cylinder compression of the now total air charge (B that remaining in cylinder after passing point E plus A, the injected portion.) continues, which is Operational Design 11. Near TDC of piston 22, fuel is added, if not present, and the charge is ignited for the power ($3^{rd}$) stroke followed by the scavenging ($4^{th}$) stroke, as exhaust valve 17 opens, and another power cycle begins. This produces a denser extended expansion ratio charge with great power, low fuel consumption and low emissions.

The compression ratio of the cylinder is alternatively much greater (with, of course, much smaller combustion chamber compared to the volume of cylinder 7) due to the necessity of retaining the improved density of the charge. The latter is allowed by the lower heat-of-compression allowed by the low "effective" compression ratio of both A and B portions of charge air or fuel-air. The charge portion A, which is highly compressed and cooled before re-injecting and igniting, has an "effective" compression ratio which can be as low as 2:1 to 5:1 for very low heat-of-compression and producing ultra low polluting emissions, especially $NO_X$. This is also true for portion B of charge.

In this Operational Design (11), although the "effective" compression is extremely low, the actual compression ratio, which is very high, equals the expansion ratio, with much improved power and efficiency per unit of fuel-air charge.

The system optionally operates in this fashion: The cylinder 7 has, say, an expansion ratio of 20:1 and the "effective" compression ratio is much less. Consider that the cylinder has a compression ratio of 20:1, at two-thirds of piston 22 stroke distance (point E), outlet valve 16-C opens to expel air charge A at a low compression state since there is a pressure blow-down due to suction of compressor 2 which receives the expelled portion (A) of the charge. Piston 22 continues the compression stroke on B, the remainder of the charge, producing about a 5:1 "effective" compression ratio on B, the portion of charge remaining in the cylinder. The charge A received by the compressor 2, which is pre-cooled by intercooler 10', is highly compressed now and again cooled by intercoolers 11 and 12. This cool, dense charge is, after pressure build-up, re-injected into cylinder 7 above piston 22 after the piston has passed point E in which outlet valve 16-C has closed and can be as late as TDC. Therefore, piston 22 is compressing the B portion of charge, that remaining in cylinder after expulsion of a portion A of charge through outlet valve 16-C. The "effective" compression ratio of that portion is as stated, perhaps about 5:1. The highly compressed cool charge A re-injected could have an "effective" compression ratio of less than 4:1 since the distance from injection (after point E) to TDC is perhaps only 30% of piston travel distance. The total charge (A+B) then ignited near TDC to produce the power stroke, is cool, very dense and has an "effective" compression ratio of about 5:1 or less. Yet, piston 22 is depressed in the power stroke with the density of, and the expansion ratio of a 20:1 to 40:1 combustion ratio engine, depending on the volume of the combustion chamber. This system produces a more dense charge than does a 10:1 compression ratio engine, but with much superior power and efficiency with very low polluting emissions including particulates. This system also eliminates problems with spark-knock and pre-ignition. Fuel-air mixes can be used with diesel oils with spark ignition or HCCI operations.

Operational Design 11-B, FIG. 18: As in Operational. Design 11, atmospheric or pressure boosted air (the latter cooled by intercooler 10) is received by cylinder 7, by intake valve 16-B during intake ($1^{st}$) stroke of piston 22. At BDC, valve 16-B closes. Then, compression ($2^{nd}$) stroke begins. Ancillary valve 16-C, which is alternatively automatic, opens quickly during the compression ($2^{nd}$) stroke near piston TDC with nearly all of the compressed charge being expelled into a cooling circuit (like that described for Design 11.) Outlet valve 16-C is then closed. At the same time, high pressure intake valve 16-A opens (after valve 16-C closes) and temperature adjusted cooled air, which has been building in pressure by rotating the crank shaft or is stored and is cool and stored in the compression cooling circuit, is now injected into combustion chamber 7' near end of compression stroke TDC. Intake valve 16-A now closes. Fuel is added, if not present, and the charge is ignited at or near TDC and the power ($3^{rd}$) stroke occurs, followed by the scavenging ($4^{th}$) stroke, as exhaust valve 17 opens and another power cycle is complete. The effective compression ratio in this Design is near zero, perhaps 2:1 or less for extremely low heat-of-compression, thus providing ultra low polluting emissions, but with power and low fuel consumption.

Shown in FIG. 18 is the compression and cooling system and a suggested engine control system, all consisting of an engine control module (ECM) 27, two shutter valves 3 and 5, two air bypass valves 4 and 6, four intercoolers 10, 10', 11 and 12, two compressors 1 and 2 and a scheme of controlling the pressure, temperature and density by controlling air bypass valves 4 and 6 and shutter valves 3 and 5 and intake valves 16-B and 16-A and exhaust valve 17 (not shown.) Also indicated, but not shown, is an ancillary outlet valve 16-C, positively or automatically activated. As described, the air pressure and temperature can be managed as desired. Air bypass valve 4 is alternatively closed to allow compressor 2 to fully compress the charge and shutter valve 3 is shown slightly open to demonstrate allowing part of the air to flow uncooled (hollow arrows) and some of the air cooled (solid arrows) to the manifolds 13 and 14, all of which could be controlled by the ECM-27 in order to provide an air charge at optimum density, temperature, and pressure. The hollow arrow in conduit 121 and 122 show how air bypass valve 4 can be partially opened to allow some of the air to bypass and return to the compressor 2 in order to finely adjust the pressure of the doubly compressed and cooled air charge that is injected in order to adjust the charge density and temperature to that desired. Alternatively, all of the air charge can be directed through the intercoolers 10', 11, and 12 (and 10 for pre-compression), or partly through bypass conduits 121 and 122, to the manifolds 13 and 14 for fine control of temperature. These controls could provide any air-fuel mixtures desired.

Results:
1) Adjusts the temperature of the entire charge.
2) Thoroughly mixes the charge (fuel, if not present is injected).
3) Increases the density of the charge.
4) Produces an expansion ratio greater than the "effective" compression ratio or with equal compression and expansion ratios.
5) Produces great turbulence.

Advantages:
1) Ultra low emissions.
2) Greater power.
3) Increased fuel economy.
4) Increased engine durability.
5) Multi-fuel capability.

Both designs have expansion ratios greater than the effective compression ratio. In either of the Operational Designs 11 or Design 11-B, blocking valve 16-E (shown in phantom on conduits 15*a*-A and 15*f*-A in FIG. 18) could be closed when starting the engine in order to more quickly build-up design pressure in manifolds 13 and 14. Also, external or stored compressed air could be used to build up operational design pressure for quicker power build-up, The engines of this design may be ignited, even with diesel fuels, by spark, modified HCCI or HCCI as described herein.

Ultra Low Emissions Engine Operating in Operational Design 12

Referring now to FIG. 18-B, there is shown a schematic drawing of a six-cylinder engine $100^{18\text{-}B}$ operating in a 4-stroke cycle engine. The engine, which is depicted in FIG. 18-B, is similar in structure to the 4-stroke engine of FIG. 18. It can be operated in system of Design 11 or Design 11-B, as desired. FIG. 18-B shows that it has a variant alternative, enhanced air cooling system useful for providing compression-expansion chilled engine charge air or air-fuel mix. It further shows two air compressors 1 and 2, four intercoolers 10, 10', 11 and 12, with controls to alter charge density and temperature, each separate from the others, controlled by ECM-27. Conduits 121, 122, 113 and 114 lead from the compressor-cooling system to expansion valves 10' and 10" of FIG. 18-B, pressure-drop-distributors 11' and 11" and distributor tubes 17a and 17'a, which tubes distribute expanding air to conduit 27'a–27'f and to intake valves 16a-A and 16f-A of engine power cylinders 7a and 7f of the engine of FIG. 18-B. The expansion valve 10'–10" passages are optionally variable, and along with bypass value R to conduit X, are controlled by ECM-27 as indicated to provide management of pressure and temperature levels.

The operation of engine of FIG. 18-B is the same as the operation of the engine of FIG. 18, utilizing Operational Designs 11 or 12, with the primary air charge being optionally pre-compressed and cooled and when operating in Design 11 or Design 11-B with a large portion of the charge, always being highly compressed and cooled. Additional benefits are having broader control of pressure and temperature of both portions of the air charges. By utilizing variable expansion valves 10', 10" and bypass system R and X, chilled air temperature, pressure and density output can be variably controlled by ECM-27 to provide a dense, cooler charge for more power and lower polluting emissions.

The operating parameters and the advantages of this engine are the same as those described for the engine of FIG. 18 and FIG. 18-B, using either Operational Design 11 or Design 12, with the added benefits provided by compression-expansion cooling of the charge air as described for engine of FIG. 2-B.

The expansion of the chilled charge to high-pressure intake valve 16-A can be varied from less than 1 atmospheric pressure to 5–6 atmospheric pressures to no expansion at all, as expansion valve 10' can be opened to varying sizes or can be bypassed, partly or wholly, for a very dense, cool secondary air or air-fuel charge, always with great turbulence. (The latter may require pressure control valves 14"a–14"b on conduits 27'a or 27'f).

Ultra Low Emissions Engine with In-Cylinder Compression Operating in Operational Design 13

Referring now to FIG. 18-C, there is shown a schematic drawing of a six cylinder engine 100$^{18-C}$ operating in a 4-stroke cycle which can be spark, compression or homogeneous charge compression ignited (HCCI). This new cycle engine can produce and utilize an air or air-fuel charge, having the density (compactness) of a 40:1 compression ratio and greater, with an "effective" compression ratio as low as 2:1 to 5:1 with very low fuel consumption and peak temperatures with ultra low polluting emissions. In this engine, except for initial pre-compression, all compression occurs in-cylinder.

Brief Description

The engine is similar in structure to the 4-stroke engine of FIG. 18 which shows and describes a charge air compression system with three stages of compression. With the exception of optional pre-compression of the primary air charge by compressor 1, all compression occurs within the power cylinder, with charge cooling of the first two stages for a denser than normal charge and with an extended expansion process. The system utilizes air intake port 8 (in phantom) or air intake port 8'. FIG. 18-C engine also shows four intercoolers 10, 10', 11 and 12 and dual manifolds 13 and 14. One air induction system of using inlet port 8' shown in FIG. 18-C supplies unpressurized charge air to intake valves 16-B of the engine of FIG. 18-C by providing atmospheric pressure air to the intake conduits 32' and 32", which then distributes the low pressure air to intake valves 16-B of each power cylinder. An alternate air induction system also shown in FIG. 18-C is where air inlet 8 inlets atmospheric air to a turbo-charger 1 and an intercooler 10 system (all in phantom) to pre-compress and cool the entire air charge that is admitted to cylinder 7 by the intake valves 16a-B–16f-B of power cylinders 7a–7f.

Referring now to FIG. 18-D: In this concept (Engine of FIG. 18-C), air, atmospheric or pressure boosted by turbocharger 1, and which has been cooled by intercooler 10, optionally with temperature and pressure adjusted by control valves 5 and 6, is received through intake valve 16-B by cylinder 7 during the intake ($1^{st}$) stroke of piston 22 while piston 22 travels from G to A in cylinder 7 of FIG. 18-D. During the compression ($2^{nd}$) stroke which now occurs, the major portion of the charge, portion A, being compressed, is expelled through outlet valve 16-C of FIG. 18-D. Valve 16-C opens and quickly closes at the appropriate piston position points $EO_1$ and EC in FIG. 18-D. Now part of the charge has been compressed through valve 16-C, FIG. 18-C into a cooling circuit system, composed of conduits 200, 201, 202, intercoolers 10', 11 and 12, conduits 109, 113 and 114, manifolds 13, 14 and conduits 15a-A–15f-A and, after pressure build-up is returned to intake valves 16a-A–16f-A of cylinders 7a–7f (FIGS. 18-C and 18-D).

During the compression ($2^{nd}$) stroke, at the point EC that outlet valve 16-C closed, FIG. 18-D, outlet valve 16-D opens for pressure blow-down as piston 22 travels from position EC to position F in FIG. 18-D. At point F of piston travel, the in-cylinder pressure being significantly reduced by Blow-Down and optionally vacuum of suction line 16-$DC_2$-A or B, valve 16-D closes and intake valve 16a-A–16f-A opens and closes quickly, re-injecting the A portion of the air or air-fuel charge into cylinder 7 after piston point F. With valve 16-A now closed, compression continues and near TDC, fuel is added, if not present, and the charge is ignited for the power ($3^{rd}$) stroke. At near BDC of piston 22, exhaust valve 17 opens to expel exhausted gases into exhaust conduit 18 of FIG. 18-C, which optionally conveys the exhaust gases to inlet of turbo charger 1 which optionally pre-compresses the incoming charge air.

An alternate means of operating outlet valve 16-C is as follows: Intake valve 16-B opens during the intake ($1^{st}$) stroke of piston 22 while piston 22 travels from G to A in cylinder 7 of FIG. 18-D. During the compression ($2^{nd}$) stroke which now occurs, the major portion of the charge, portion A, being compressed, is expelled through automatic outlet valve 16-C of FIG. 18-D. Valve 16-C opens at $EO_2$ near piston BDC and closes at the appropriate piston position point EC in FIG. 18-D. Now, the major part of the charge has been compressed through valve 16-C, FIG. 18-C into a cooling circuit system, composed of conduits 200, 201, 202, intercoolers 10', 11 and 12, conduits 109, 113 and 114, manifolds 13, 14 and conduits 15a-A–15f-A and, after pressure build-up is returned to intake valves 16a-A–16f-A of cylinders 7a–7f (FIGS. 18-C and 18-D). During compression stroke of piston 22 at piston position EC, automatic valve 16-C closes and is held closed through the remainder of the compression stroke and through the scavenging and air intake strokes. As piston 22 turns around to begin the compression stroke at point $EO_2$, valve 16-C is again opened by pressure differential. As the compression stroke takes place, valve 16-C again closes at position EC and is again held closed until the next compression begins. At point $EO_2$, valve 16-C becomes automatic.

During the compression ($2^{nd}$) stroke, at the point EC that outlet valve 16-C closed, FIG. 18-D, outlet valve 16-D opens for pressure blow-down as piston 22 travels from position EC to position F in FIG. 18-D. At point F of piston travel, the in-cylinder pressure being significantly reduced by Blow-Down and optionally vacuum of suction line 16-DC2-A or B, valve 16-D closes and intake valve 16a-A–16f-A opens and closes quickly, re-injecting the A portion of the air or air-fuel charge into cylinder 7 at piston point F. With valve 16-A now closed, compression continues and near TDC, fuel is added, if not present, and the charge is ignited for the power ($3^{rd}$) stroke. At near BDC of piston 22, exhaust valve 17 opens to expel exhausted gases into exhaust conduit 18 of FIG. 18-C, which optionally conveys the exhaust gases to inlet of turbo charger 1 which optionally pre-compresses the incoming charge air.

Operation of Engine FIG. 18-C Shown Schematically in FIG. 18-D

1) Intake valve 16-B opens. The piston performs the intake ($1^{st}$) stroke going from G to A which is BDC.
2) Piston 22 reverses and begins compression ($2^{nd}$) stroke.
3) At point $EO_2$ outlet valve 16-C opens and closes at point EC during the compression stroke.
4) Outlet valve 16-D opens at point EC as soon as outlet valve 16-C is closed.
5) Piston 22 continues for pressure blow-down between point EC and point F optionally with suction on conduit $16\text{-}DC_2$-A or B.
6) At point F, outlet valve 16-D closes and intake valve 16-A opens, the latter injecting the now cooled, compressed charge above piston 22 crown and quickly closes as piston 22 continues the compression stroke.
7) At near TDC, fuel is added, if not present, and the charge is ignited.
8) The expansion ($3^{rd}$) stroke occurs.
9) Piston 22 reverses and scavenges the cylinder through valve 17 and conduit 18 by the ($4^{th}$) stroke to complete one cycle.
10) Piston 22 draws in fresh air and at BDC, outlet valve 16-C begins to function by pressure differential.

Operating Principles

When outlet valve 16-C opens at point $EO_2$, a large portion of the air charge is compressed into the cooling storage circuit while piston 22 travels between points $EO_2$ and EC (where valve 16-C closes) to cool and build proper pressure charge for re-injecting into cylinder 7 above piston 22 at point F. Between points EC and F, the pressure in cylinder blows down optionally out through valve 16-D, aided by vacuum line 16-DC2-A. (At this point [EC], the cylinder pressure must be reduced significantly in order to allow introduction of the compressed air or fuel-air [cooled or chilled by valve 16-A, being optionally an expansion valve], at point F). If the air charge contains fuel, the discharged air-fuel charge through outlet valve 16-D is directed by conduit 16-DC to conduit 16-DC2 which goes alternatively to A) suction side of turbo-charger, to B) suction conduit 105 or to C) intake port 8' of conduit 32"–32'. In any case, the fuel-air charge cannot be expelled into the atmosphere. Some of the work of compressing the part of the charge expelled could be restored with little back-pressure in cylinder 7. Some of the alternative systems are: (See FIG. 18-C).
1) Directing conduit 16-DC to drive a section of a dual turbine on the turbo charger (conduit 16-DC3.)
2) Directing conduit 16-DC to empty into exhaust conduit 18 by way of conduit 16-DC-4 to help drive the single turbine-turbo charger.
3) Directing conduit 16-DC to a turbine (T) geared to the engine crank shaft or drive shaft by way of conduit 16-DC-5.
4) Directing conduit 16-DC to the atmosphere by conduit 16-DC-6.

A means of quickly building operating pressure is by closing optional shut-off valves 16a-E to 16f-E as the rotating crank shaft quickly builds pressure. Alternatively, the engine is quickly started by stored compressed air as is the case in some large engines.

Additional operating principles are:
1) Assume the volume of the cylinder divided by the volume of the combustion chamber is 20:1. (We will use these figures for simple calculations, but actually the combustion chamber is preferably made smaller, perhaps 40:1).
2) Therefore, the expansion ratio in this estimation will always be 20:1.
3) An air charge is received by cylinder 7 through intake valve 16-B ($1^{st}$ stroke). Piston 22 reverses and begins compression ($2^{nd}$ stroke). Assume the compression ratio is 14:1 at point EO and the charge is pressed into valve 16-C cooling system., FIG. 18-D. There, valve 16-C closes at point EC and valve 16-D opens.
4) A pressure blow-down occurs between points EC and F, optionally aided by vacuum to make room for re-injection of charge after pressure builds.
5) Assume the pressure now in-cylinder at point F is negligible.
6) When intake valve 16-A opens at F, as valve 16-D closes, the cylinder above piston 22 at point F is quickly filled with air or air-fuel charge which has the density of a charge which is close to 14:1 compression ratio, but has little or no heat-of-compression.
7) This cooled, dense charge now in combustion chamber of cylinder 7 is compressed further with a low "effective" compression ratio (perhaps 2:1 to 5:1) in the reduced volume—"diminutive" combustion chamber where it can be compacted to a much denser state than that of conventional engines with, again, small amount of heat-of-compression.
8) At or near piston TDC, the air-fuel charge is ignited for the full expansion which for this basic assumption is a 20:1 expansion ratio.
9) The scavenging ($4^{th}$) piston stroke completes one working cycle.
10) If the injected charge has a density of 12:1 to 14:1 compression ratio is cool and is further compressed by 6:1 compression ratio, the density of the charge is 12×6 for a density of 72:1 or 14×6 for a density equal to an 84:1 compression ratio with very small heat-of-compression.
11) Therefore, the denser charge is inherently more powerful and efficient than a normal engine's charge and having great turbulence, produces much lower amounts of polluting emissions.
12) Although the charge weight has been reduced, the greater density coupled with the extended expansion ratio provides improved efficiency that will offset the waste of energy required to compress that portion of the charge lost in the "blow-down" of pressure at point EC. In this new working cycle, there is a net gain in both power and efficiency.
13) Some of the energy lost in the cylinder blow-down process can be recovered by directing the expelled portion of charge to the turbo-charger 1 drive inlet, or to drive turbine T, as shown in FIG. 18-C. If the fuel is pre-mixed with air, the charge expelled to point $F_0$ must be returned to the intake system as described herein.

Shown in FIG. 18, FIG. 18-B and FIG. 18-C is a suggested engine control system, which also pertains to FIG. 18-D. This control system consists of an engine control module (ECM) 27, two shutter valves 3 and 5, two air bypass valves 4 and 6 and a scheme of controlling the pressure, temperature and density by controlling air bypass valves 4 and 6 and shutter valves 3 and 5. A control example illustrates that air bypass valve 4 is partly closed to optionally re-circulate part of the compressed charge. Shutter valve 3 is slightly open, allowing part of the air to flow uncooled (hollow arrows) and some of the air cooled (solid arrows) to the manifolds 13 and 14, all of which is preferably controlled by the ECM-27 in order to provide an air charge at optimum density, temperature and pressure. The hollow arrow in conduit 120 shows how air bypass valve 4 can be partially opened to allow some of the air to bypass and return in order to finely adjust the pressure of the super-compressed air charge that is injected to adjust the charge density, temperature and perhaps a stoicheometric air fuel mixture. Alternatively, all of the super-compressed portion of the air charge can be directed through the intercoolers 10', 11 and 12 to the manifolds 13 and 14.

Outlet valve 16-C should be large to reduce fluid flow friction while open and intake valve 16-A is optionally doubled in size or number. In one optional design, the cylinder 7 diameter may be smaller in respect to the piston 22 stroke length. This provides farther piston travel to allow a longer travel time between points A and E and to give more time for valve 16-C to open and close. In addition, the smaller diameter cylinder allows more charging and burning time as piston 22 travels from F to G and returns from G to A, the latter producing an extended expansion ratio.

Alternatively, double burn (dwell) time is allowed by utilizing the cylinder-piston drive arrangement shown in FIG. 16 as described herein.

Results and advantages of the engine $100^{18-C}$ and FIG. 18-D with the primary air charge being boosted in pressure.
Results
1) Low peak temperatures and pressures
2) Homogeneous combustion charge
3) A denser, cooler charge
4) Greater efficiency
5) Greater engine durability
Advantages
1) Lower polluting emissions
2) Greater power per unit of charge
3) Greater torque
4) Increased vehicle range
5) Multi-fuel capabilities
6) Longer engine life Homogeneous Charge Compression Ignition (HCCI) Basic Operating Principals The basic HCCI operation, that of controlling charge temperatures and timely ignition, is similar for both 4-stroke engines (FIG. 1 to 7 and FIG. 18, 18-B and FIG. 18-C) and for 2-stroke engines (FIG. 8, 9 and 10). In the 2-stroke engine, the primary air charge used generally comes through ports 11 in the wall of cylinder 12. The valving is by ports 11 being closed and opened by piston 22. In 4-stroke engines, the primary air charge comes from intake valve 16-B. In both 2-stroke and 4-stroke engines, the supplementary air charge generally comes through intake valve 16-A.

For engines designed for HCCI operations using Methods A through G and engine Operational Designs 1 through 13, as depicted and described herein, for the present invention, are recommended.

Operational Designs 1 through 6 pertain particularly to 4-stroke engines of FIG. 1, FIG. 2-B, FIG. 2-C, FIG. 3 to FIG. 5 and FIG. 7. Engine of FIG. 2-D utilizes Operational Design 7 in either 4-stroke or 2-stroke engines. Operational Designs 8 through 10 pertain particularly to 2-stroke engines of FIG. 8 through FIG. 10. Operational Designs 11, 12 and 13 pertain particularly to 4-stroke engines of FIG. 18, FIG. 18-B and 18-C.

Description of subsequent Methods, A through G of HCCI operation will be limited almost entirely to the methods of control of charge density, temperatures and the means and timing of charge ignition, with reliance on the instructions for operating the engine as being explicit in the instructions and suggestions for the HCCI methods and also with reliance on references to the various engine designs and their corresponding Engine Operational Designs.

The spark ignition operation of any of the Operational Designs requires similar control of charge density, temperature and ignition timing with much less stringent control of temperatures, the most important being that the temperature of the fuel-air mix must be lower than auto-ignition until the point of ignition, with ignition generally occurring a few degrees before piston TDC. The chief advantage of this system of spark ignition being that low auto-ignition fuels like diesel oils can selectively be compressed to a much denser and more powerful charge, although already mixed with air, than that of the Diesel cycle engine, while also eliminating pre-mixed burning. The latter is the cause of diesel smoke and and smaller particulates. In addition, this system of keeping the combustion and peak temperatures low greatly reduces or eliminates $NO_X$ and some other polluting emissions.

HCCI and Spark Ignition Methods A–G

Referring now to FIG. 19, FIG. 19-B and FIG. 19-C, there is shown schematic transverse sectional views of preparation or pre-combustion chambers 38' and combustion chamber 38 and 38-B with some variance of shapes in the different figures with associated inlet conduits, injector pump, ducts, jackets and valving for fluids (gaseous or liquid) and electrical elements, all pertaining to producing and maintaining temperature desired for gaseous or liquid fuel operation of the engines of this invention, 2-stroke, 4-stroke, or rotary, or for any other internal combustion engine for providing spark or compression ignition, modified HCCI or true HCCI in a timely fashion, and for which methods are described herein. All components named will be identified and described in regard to the method of ignition to which they pertain.

The cool, dense air-fuel charge, either premixed or instantaneously homogenized, of the engine of this invention lends itself readily to conventional spark or compression ignition. The charge can also be ignited by modified HCCI or true HCCI systems as described herein. Since ignition by spark or compression is well known in the art, the following describes only the latter two systems. HCCI is accomplished in this manner: FIG. 19 illustrates primary air at atmospheric pressure, or pressure boosted and cooled, entering cylinder 7 through channel 18' on the intake ($1^{st}$) stroke through intake valve 16-B with a second cool or optionally chilled high pressure air charge entering later during the compression stroke through inlet 8' and intake valve 16-A where the two charges mix above piston 22. Temperature and pressure sensors 21' and 21" and optional pressures sensors therein signal ECM-27 to adjust flows to the proper order to produce an air-fuel mixture which has proper density and is at a temperature at near piston TDC, preferably at or just below that which would cause the charge to auto-ignite at piston 22 TDC, depending upon the particular method of charge ignition selected.

Figure 2D:
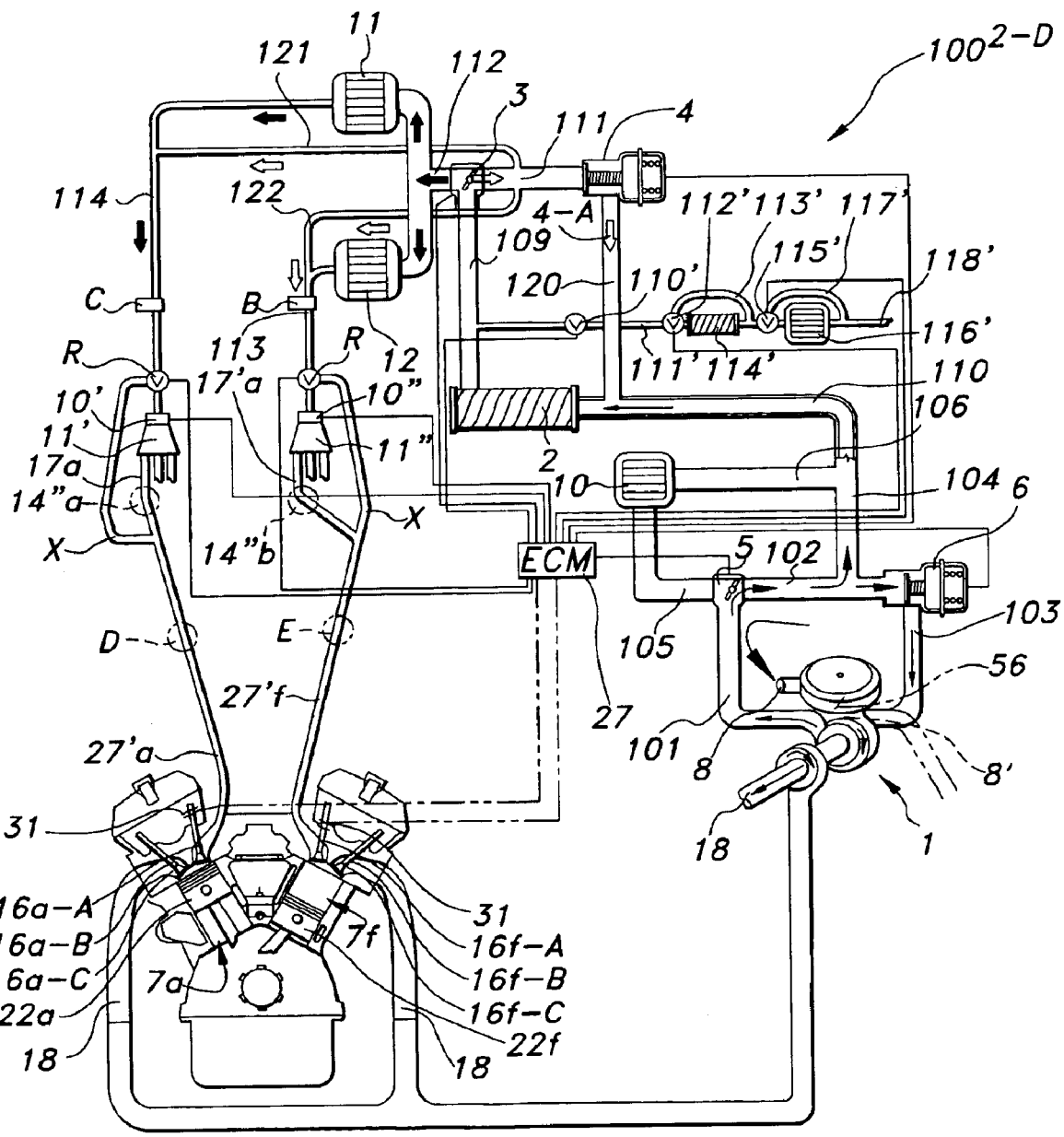
FIG. 2D is a schematic drawing of a six cylinder, 4-stroke engine, representing yet another embodiment of the apparatus of the present invention, also adaptable to 2-stroke engines. It represents another method of operation which can be performed, using alternative systems of inducting a high pressure chilled supercharging air charge, which will be described. Among its other components, this embodiment is seen as having three air coolers and dual manifolds and the means of controlling the temperature, density and pressure of the charge by an engine control module and by valving variations. In addition.

Engine Control Module ECM-27 of FIG. 2 or FIG. 2-C, along with compressor(s) 2 and optionally 1 and coolers 10, 10' and/or 11 and 12 with variable valves 3, 4, 5 and 6 on conduits as shown, along with pressure, temperature, oxygen, crank angle, and other sensors, provide a system, in conjunction with heat-of-compression, for controlling the charge pressure, density and temperatures, each separately, within the cylinder at the point and time desired for ignition. Intake valves 16-B and 16-A which can be hydraulically or electrically operated, as shown in FIG. 19, FIG. 19-B, FIG. 19-C and FIG. 19-D, managed by ECM-27 with appropriate activators, can also control the time and quantity of high and low pressure charge admitted to cylinders in order to aid in turbulence, density, pressure and temperature management. Alternatively, control of temperatures in the combustion chamber may be enhanced by the use of compression-expansion chilling of air and air-fuel charges, as depicted and described in and for FIG. 2-B, FIG. 2-C, FIG. 2D, FIG. 11-B, FIG. 18-B and FIG. 18-C. This system directs compressed air to expansion valve 10' pressure-drop-distributor 11, conduit or evaporator tube 27'a–27f, leading to inlet ports 18' and 8' and valves 16-B or 16-A of engine of FIG. 19, FIG. 19-B, FIG. 19-C and FIG. 19-D, as seen in FIG. 2-C and FIG. 2-B, respectively. Alternatively, the cool or chilled air may be directed to a chamber cooler system, consisting of either conduit 36-B, valve 40-B or conduit 42-B, both of FIG. 19-B, FIG. 19-C and FIG. 19-D, which conduits form cooling and heating jackets for combustion chamber 38', 38 and 38-B.

The pressure and density of the contents of cylinder 7 is adjusted to provide the torque and power required of the engine for the present duty cycle. A computer in the ECM-27 calculates the values received preferably from at least two sensors for each combustion chamber for monitoring temperature (21') and pressure (21"). It then computes the mean values in a single cylinder or for all cylinders of an engine and signals controls in the ECM to arrange the opening and closing of shutter and by-pass valves to adjust the density and temperature desired in each. In either engine of FIGS. 2-B, 2-C, 11-B, 18, 18-B, 18-C, 18-D, 19, 19-B, 19-C and 19-D, the optionally variable expansion valve 10' (see description of FIGS. 2-B, 2-C, FIGS. 11-B, 18-B, 18-C, 19-B and 19-C) and with control valves 3, 4, 5 and 6 and compressor speed all controlled by ECM-27, produces and maintains, in conjunction with heat-of-compression, the desired charge density and temperature at piston near or at TDC. Other sensors known and used in the art can monitor pressure oxygen, crank angle, etc. values and signal ECM-27 to adjust controls for best engine performance, with the ignition point preferably being 10–15 degrees before or at piston TDC. Closer temperature control may be achieved by utilizing compressed heated gases from conduit 36, FIG. 1-C or from conduit 118' of FIG. 2, with temperatures adjusted as described, being ducted through conduits 40, 40-B or 36 or 36-B in chambers 38' 38 or 38-B of FIGS. 19, 19-B, 19-C and 19-D. Also utilizing the cooling or expansion chilling or even heating of cylinder walls as described and depicted for FIG. 6 and FIG. 5 by use of expansion valves 4', FIG. 5 as well as expansion valve 10' and associated apparatus in FIGS. 2-B, 2-C, 11-B, 18-B, 18-C, 19-B, 19-C and 19-D. all controlled by ECM-27 and activators, all in conjunction with heat-of-compression, can assist in fine control of temperature at piston TDC. Heating elements 37, 39' in FIGS. 19, 19-B, 19-C and 19-D, also controlled by ECM-27, are used to regulate charge temperature at piston TDC.

In FIGS. 19-B, 19-C and 19-D, conduits 36-B and 41-B with their corresponding optional valves, 40-B and 42-B are alternatively, both or singularly, for injecting ignition enhancing pilot fluids (in which case conduits 36-B and/or 41-B open and end in combustion chamber 38-B or in preparation chamber 38) or one or both are conduits and jackets to receive and utilize fluids to assist in adjusting charge temperatures to facilitate spark, HCCI or modified HCCI engine operation.

Preparation (1) The fuel is preferably mixed with high air content by carburation of one or both incoming air streams (supercharging secondary air stream for 2-stroke designs), as described herein, for the engines of the present invention (Operational Designs 1 through 13) and for Otto and Diesel Cycle engines.
(2) It can also have a well mixed air-fuel charge by central-body injection (similar to throttle-body injection) of fuel.
(3) The fuel may be injected into the air stream(s) before entering the cylinder 7.
(4) The fuel may be injected through the valve ports 18' and/or 8' with or without accompanying air.
(5) The fuel may be injected directly into the cylinder, where the air is already present with the tremendous turbulence created by the injection of the high pressure secondary air charge into the cylinder, causing instantaneous homogenization of the charge. The supplemental, secondary air charge injection systems of FIGS. 3, 4, 7, 9, 10, 18, 18-B and 18-C, which can be supplied alternatively through an expansion chiller valve 10' and accompanying chilling apparatus, can be utilized to cool and sweep out the space between piston and cylinder wall, especially above the top piston ring at piston TDC or perhaps all of piston ring crevices to reduce unburned hydrocarbons (HC) and prevent formation of formaldehyde emissions. A gentle blast of compressed air, alternatively through one or multiple ports 17-B of the Figures having such ports, could be used to prevent removing the oil-film from cylinder walls.

HCCI—Method A, Modified HCCI Operational Design 14, FIG. 19, FIG. 19-B Heated Pre-Combustion Chamber Intake valve 16-B takes in a primary charge, piston 22 reverses direction and begins the compression stroke. Sometime during the compression ($2^{nd}$) stroke a supercharging fuel-air charge is injected by valve 16-A and compression continues. Now, with the air-fuel charge homogenized at the proper density and the temperature being near, but below auto ignition near piston TDC, the ignition system works in this manner: At near piston TDC, the charge is ignited by spark or for HCCI. Pre-combustion or preparation chamber 38' has an optional blocking valve 21 (FIG. 19 and FIG. 19-B) for HCCI, which separates chamber 38' from combustion chamber 38 and with piston 22 at or near TDC, blocking valve quickly opens. The air-fuel mix in combustion chamber 38 is instantly compressed into empty pre-combustion chamber 38', heating elements 37 and/or 39 immediately raise the temperature of the propulsion-fuel mixture above the auto-ignition temperature of the fuel-air mixture. It almost instantly combusts, expanding into combustion chamber 38, further mixing and catalyzing combustion of the entire fuel-air charge. This causes piston 22 (or rotor FIGS. 24–34) to be pressed into the power ($3^{rd}$) stroke which is followed by the scavenging ($4^{th}$) piston stroke.

For spark ignition, item 37 is a sparking plug and preparation chamber 38' and valve 21 are eliminated in all FIGS.

19–19-C and Methods 1–7. In spark ignition, the fuel-air charge is simply kept somewhere below auto-ignition temperature, making the system also feasible for diesel fuel since the charge can be kept below that which would cause auto-ignition (below 8:1 compression ratio temperature).
In Operational Design 1 to Design 6, as described for 4-stroke engines of FIGS. 1 through 7 engines, and for 2-stroke engines of FIG. 8 through FIG. 10, the four principal Operational Designs are here reiterated briefly:

Design 1: Intake valving and combustion chamber are as normal for a normal compression ratio with a normal expansion ratio.

Design 2: Intake valving is as normal, but the combustion chamber is enlarged for a subnormal compression ratio, but still with an expansion ratio equal to the compression ratio.

Design 3: The intake or exhaust valve closes early or late to capture a small air-fuel charge for a low "effective" compression ratio and an extended expansion ratio.

Design 4: The exhaust valve stays open during the compression stroke to near piston TDC, expelling most of the fresh primary charge from cylinder 7 or 22 (FIGS. 2–10), which is to cool both chambers 38' and/or 38 and to produce an "effective" compression ratio of perhaps 2:1 or less with an extended expansion ratio. At near piston TDC, the entire working charge is injected. This produces an "effective" ratio of 2:1 to zero.

In all cases, a supplementary cool, dense air charge is injected, preferably late, during the compression ($2^{nd}$) stroke. At piston TDC, the charge is ignited for the power ($3^{rd}$) stroke, followed by the scavenging ($4^{th}$) stroke to complete a power cycle.

Method A, Detailed Operation

Piston 22 has just completed the scavenging ($4^{th}$) stroke and is at TDC. Intake valve 16-B opens as piston 22 begins the intake ($1^{st}$) stroke, taking in our atmospheric or pressure boosted and cooled air or air-fuel charge. Piston 22 reverses and with insulated valve 21 closed to temporarily prevent flammable air-fuel propulsion charge entering pre-combustion chamber 38' prematurely, piston 22 begins and continues the compression ($2^{nd}$) stroke toward TDC. (The primary air-fuel charge would optionally produce a sub-standard or sub-normal compression ratio charge for low heat-of-compression for that portion of the charge).

During the compression ($2^{nd}$) stroke a supplemental, supercharging, highly compressed, dense, temperature-adjusted air charge is injected into cylinder 7 above piston 22. The supplemental, secondary air charge can be added at any point after the port intake valve 16-B closes on the intake ($1^{st}$) stroke and can be as late as during charge combustion. The supplemental, secondary charge can be injected at such point in the compression stroke that it will also have a very low compression ratio in all Operational Designs, again for very low heat-of-compression. In addition, the supplemental, secondary air charge can be either a major or minor portion of the entire air-fuel charge versus the primary charge which has the same capabilities. (Sensors in chamber 38' have signaled ECM-27 information which it uses to use control valves 3, 4, 5 and 6 and optionally valve 10', including the heat-of-compression to adjust charge temperatures near piston TDC to be just below auto-ignition temperature. Compression continues until piston is very near TDC. At that point, blocking valve 21 opens quickly and receives the compressed fuel-air propulsion charge being compressed into chamber 38'. Heating elements 37 and/or 39 plus the heat-of-compression raise the temperature of the fuel-air mix above the auto-ignition of the fuel, causing the charge to begin oxidation. (If the temperature in pre-combustion can be controlled sufficiently, blocking valve 21 may be eliminated.) The hot swirling charge expands past valve 21 into combustion chamber 38, catalyzing the rapid oxidation of the entire fuel-air charge. The expanding charge depresses piston 22, or rotor 2 or 2-B, into the power ($3^{rd}$) stroke. At BDC, piston 22 reverses and scavenges the cylinder with ($4^{th}$) stroke in preparation for another working cycle. This completes one power cycle of the engine.

The preferred method of operation is for the primary air charge to be boosted in pressure. All Operational Designs, except Design 1 and Design 2, have selectively extended expansion ratios, with low effective compression ratios. When operating in HCCI methods, valve 21, opening to preparation chamber 38', may stay open through the piston power ($3^{rd}$) stroke, the exhaust ($4^{th}$) stroke and the piston ($1^{st}$) stroke, closing at the start of the start of the compression ($2^{nd}$) stroke. Should proper HCCI temperatures be controllable or spark ignition be employed, valve 21 may be eliminated.

Note that in Operational Design 4, the cool primary charge is expelled through valve 16-C (not shown) which can open into chamber 38 or 38' or through exhaust valve 17 and is used only to cool chambers 38 and 38' after which the expelled charge is returned, if fuel is present, to suction conduit 110 of compressor 2 or to suction port 8' of FIG. 2. If Operational Design 4, as described for engine of FIG. 2, FIG. 2-B, FIG. 2-C, FIG. 8-FIG. 10 or FIGS. 24–32, is utilized, the primary air charge may be free of fuel since that air is used only for cooling cylinder 7 or 12, preparation chamber 38' and/or combustion chamber 38 or 38-B, the latter of FIG. 19-C or FIG. 19-D. As the cooling charge without fuel is pressed through outlet valve 16-C (not shown), or through valve 40 or 42 of FIG. 19-C, it is expelled into the engine exhaust or into the atmosphere.

HCCI—Method B, Operational Design 15 Hot, Non-Flamable Gas Injection

An initial air-fuel propulsion charge is prepared and drawn into cylinder 7 on the intake ($1^{st}$) stroke and is compressed by piston 22 in the second stroke after piston turnaround. The temperature of a supplemental supercharging air charge plus heat-of-compression has been adjusted to produce at piston TDC somewhat less than auto-ignition temperature for (a) spark ignition and only slightly less than auto-ignition temperature at near TDC of piston 22 for (b) modified HCCI operation, as in Method A. At any point found to be most appropriate during the compression ($2^{nd}$) stroke, intake valve 16-A opens and closes quickly, injecting the supplemental temperature-adjusted air-fuel charge. Inlet valve 40 restrains hot compressed gas (from conduit 36 of FIG. 1-C and/or from conduit 118' of FIG. 2 through FIG. 2-D, FIGS. 11, 11-B, FIGS. 17, 18, 18-B and 18-C) to insulated conduit 36, of FIGS. 19-B, 19-C or 19-D, which leads to preparation chamber 38' or combustion chamber 38 or 38-B. Heating elements 37 and 39 within preparation chamber 38' or 38-B can optionally be present and heated in order to help manage charge temperature with heat and other sensors within chamber 38' or 38-B and controlled by ECM-27. The compression ($2^{nd}$) stoke of piston 22 nears completion and the propulsion air-fuel charge is now compressed above piston 22 and fills combustion chamber 38 and/or preparation chamber 38'.

Near TDC of piston 22, optional valve 40 or 40-B, if present, opens and closes quickly. The charge of hot, highly compressed gas from conduit 36 or 36-B, which can be part of (a) the engines secondary highly compressed air charge from conduit 109, FIG. 2, with part or all of the heat of compression retained, or the charge may be further heated by heater 116' in FIGS. 2, 2-B, 2-C, 11, 11-B, 18, 18-B and 18-C or (b) recycled hot exhaust gas, or a mixture thereof from conduit 203i of FIG. 1-C or other nonflammable gases. This hot, compressed gas, which has been optionally superheated by heating elements 37 and/or 39, perhaps assisted by compressor 2' and by heater 108 in FIG. 1-C, blasts into the preparation chamber 38', mixing and instantly catalyzing the ignition by raising the temperature of the swirling charge above the auto-ignition temperature of the propulsion fuel. The ignited charge now expands into combustion chamber 38 where the homogenized air-fuel charge is still mixing from the injection by valve 16-A. With the ignited charge being expanded from chamber 38' and mixed with the rest of the charge in combustion chamber 38, combustion will be broadly spontaneous and more complete with very low unburned hydrocarbons (HC) and low CO, $CO_2$, $NO_X$ and particulates. As mentioned earlier, part of the high pressure supplemental, secondary air charge, sans fuel, may be directed to conduit 36 FIG. 19, FIG. 19-B, FIG. 19-C and FIG. 19-D from conduit 109 FIG. 2 to FIG. 2-D by way of conduit 111' to compressor 114' and heater/cooler 116' (both optional), and/or, wholly or partly, through bypass systems 112' and 113', 115' and 117'. It is then directed to conduit 118' which leads to charge distributor (similar to 11' of FIG. 11-B) where it divides and conveys part or all of the hot air charge, or combined with hot effluent from conduit 203i, FIG. 1-C, to conduit 36, FIG. 19 or 36-B of FIG. 19-B or FIG. 19-C of each of the engines cylinders, in order to catalyze ignition of the propulsion charge near TDC.

Alternatively, for non-flammable gas, valve 40 on conduit 36 of FIG. 13, FIG. 19, FIG. 19-B and FIG. 19-C, which can be close to pre-combustion chamber 38', can be kept closed to restrain the hot gas until piston 22 nears TDC in the compression stroke, preferably at 10–15 degrees before piston TDC. At that point, valve 40 is opened to inject a small amount of the hot gas, which originates from conduit 203i, conduit 109, FIG. 2, FIG. 2-B or FIG. 2-C, through conduits 111' and optional compressor 114' and heater 116' and conduit 118' or from any other source, to enter and mix with the small amount of air-fuel within the pre-combustion chamber 38'. The hot gas instantly raises the temperature of the air-fuel mix in the pre-combustion chamber 38' catalyzing the ignition whereby the burning mixture expands into the combustion chamber 38, catalyzing and further oxidizing the entire charge.

Alternatively, the gases can originate from conduit 203i, as in FIG. 1-C from exhaust, from a mixture of hot exhaust and air or any other appropriate gas. The gas is compressed by compressor 2', if necessary, or any other type compressor. If the gas is not hot enough, it is heated by passing the gas through heater 108 (108 can optionally be a cooler if charge is too hot) or bypassed, wholly or in part, through bypass system 203h' and 203h, FIG. 1-C. The hot gases can be mixed with engine fuel within pre-combustion chamber 38', ignited and expanded into combustion chamber 38 as described in number 3 above.

Direct Combustion Chamber Ignition

Alternatively, pre-combustion chamber 38' is eliminated in this system and for HCCI. Hot gases are now directed through insulated conduit 203i, FIG. 1-C (or through conduit 118', FIGS. 2-2-D) which is fitted with an effluent distributor (not shown), of which a distributor tube goes directly to, and can intrude into combustion chamber 38 or 38-B, FIGS. 19, 19-B, 19-C and 19-D of each power cylinder of the engine. A valve 40 on conduit 36 opens and closes quickly at perhaps 10–15 degrees, before piston TDC, to inject the compressed hot gases directly into the turbulent air-fuel charge in combustion chamber 38. As stated, these hot gases can be a portion of the engines high-pressure supplemental, secondary air charge (without fuel) with the heat-of-compression retained and heated or cooled, if needed, or they can be re-circulated hot or heated exhaust gases, heated air or a mixture thereof from conduit 36, FIG. 19, FIG. 19-B and FIG. 19-C. When the hot gases enter combustion chamber 38, they disperse throughout the charge, raising the temperature of the fuel-air charge above the auto-ignition temperature of the charge, catalyzing the ignition of the charge which then expands driving the piston. Any compressed hot, flammable or non-flammable gas would be a good catalyst for low auto-ignition fuels, such as gasoline or diesel fuel. If diesel propulsion fuel were used, the New Cycle Engines of this invention would compact the air-fuel charge to a far greater density than would a current diesel engine with the air-fuel charge temperature being lower than the auto-ignition temperature of diesel oils-air mixture. (Diesel oil-air mix would auto-ignite at a compression ratio of about 8:1 in any normal diesel or current technology HCCI engine, reducing power and efficiency. As already stated, compressed natural gas, with or without air, should be a good pilot fuel for diesel oil fuels, but preferably without being mixed with air.

Optionally, the hot gases may be injected into either preparation chamber 38' or combustion chamber 38 from two or more injection lines. For example, conduit 41-B of FIG. 19-B and valve 42-B and other entrance systems may be utilized to surround the propulsion fuel to initiate oxidation, especially useful in FIG. 19-B, FIG. 19-C and FIG. 19-D arrangement.

(a) In all options, ignition occurs and the power ($3^{rd}$) stroke now takes place.
(b) At the end of the power stroke, piston 22 rises in the scavenging ($4^{th}$) stroke to scavenge the cylinder 7.
(c) Another cycle begins.
(d) In all options, the engine's fuel-air charge is near auto-ignition at near piston TDC before ignition is catalyzed. For optional spark ignition, low-auto-ignition fuels need only to be below auto-ignition temperatures before spark ignition.

The described method for producing extremely dense charge while suppressing temperature to below auto-ignition temperatures allows spark ignition for diesel oils without smoke and other pollutants. This is because smoke in Diesel engines is caused by pre-mixed burning and in this system the air and fuel are a homogeneous mixture. The fuel-air mixture is ignited by (a) spark plug 37 in pre-combustion chamber 38' as in FIG. 19, FIG. 19-B and FIG. 19-C or (b) the plugs can be used with the electrodes exposed directly to the combustion chamber 38 or 38-B as in conventional, spark ignited engines and is shown if FIG. 19, FIG. 19-B, FIG. 19-C and FIG. 19-D. In each instance, spark plugs are optional and for an emergency backup system except where spark ignition is more desirable.

A good system of supplying hot gases for catalyzing ignition in any of the engines of this invention is depicted in FIG. 1-C. Various proportioning valves operated and controlled by ECM-27 remain closed or open, fully or partly, according to desired results, to take either fresh air from air intake 9 or re-circulated exhaust gas from exhaust conduit 18 or any percentage (0 to 100 percent) ad infinitum of each for conveying to conduit 36 or 36-B of pre-combustion chamber 38' or combustion chamber 38 respectively, for catalyzing charge ignition. The ensuing mix or pure gas is taken through conduits 203*d* and 203*e* and passed through proportioning valve 203*f* to pass, wholly or partly, through compressor 2' or, wholly or partly, through bypass conduit 203*h*' to proportioning valve 203*g*' and caused to pass wholly or partly through heater/cooler 108 or pass, wholly or partly, through bypass conduit 203*h*, both routes leading to conduit 203*i* which in turn leads to effluent distributor and distributor tubes (not shown) leading to conduit 36 or 36-B of each of the cylinders of the engine design being selected. Other suitable gases, such as natural gas (perhaps CNG) can be directed into conduit 111 of FIG. 2 or conduits 203*d* and 203*e*, FIG. 1-C either optionally or directing to conduit 36 or 36-B of FIG. 19 and FIG. 19-B respectively. The various valves are controlled by ECM-27 and are adjusted to provide the gas with the concentration and temperature desired for proper ignition catalyzation, the various conditions of which are related to ECM by proper sensors throughout the system.

Proper sensors in each engine cylinder inform ECM-27 of the conditions in individual cylinders and ECM-27 makes adjustments, such as temperatures and crank angles, for timely ignition in each.

Further instruction for engine operation for HCCI Method B is found under HCCI Method A with references to the advantages of the various engine designs. The HCCI ignition system only has been described above. The engine working cycle is described in HCCI Method A, utilizing any of Operational Designs 1 through 13.

HCCI operation of the engines of this invention optionally produces an extended expansion ratio in Operational Design 3 through Operational Design 13 for improved fuel economy and low polluting emissions with great power. Because of the low temperature working cycle and homogenized air-fuel charge, all thirteen Operational Designs produce extremely low polluting emissions.

The advantages of this new engine cycle are:
Higher efficiency.
Greater power and torque.
Longer engine life.
Multi-fuel capabilities.
Greater reliability.

Method C—Modified HCCI, Operational Design 16 Flammable Fluid (Gas or Liquid) Pilot Fuel The air intake ($1^{st}$) stroke, the compression ($2^{nd}$) stroke has occurred and the supplementary air-fuel charge has been injected. With the air-fuel propulsion charge homogenized and the temperature of the mix when compressed at near piston TDC being adjusted to near auto-ignition temperature, with combustion chamber 38, 38-B and preparation chamber 38' or 38'B filled with propulsion fuel above piston 22, the system works in this manner: The fuel air charge is ignited by (a) spark as in conventional engines and (b) for HCCI operation. Conduit 41 with fuel injector 42 (both in phantom), receives and contains pilot fuel or air-fuel mix, perhaps from a common fuel-rail, which can be any liquid or flammable gaseous product, such as CNG-air mix, dimethyl ether-air mix or preferably CNG or pilot fuel or dimethyl ether alone. All would be appropriate as pilot fuel for diesel-air propulsion fuel, as all have a higher auto-ignition temperature than does diesel oil-air mix. Both natural gas and dimethyl ether can be heated to an even higher temperature, if injected devoid of air.

At near completion of compression ($2^{nd}$) stroke and near TDC of piston (preferably 10–15 degrees before), a small amount of heated pilot fuel in line 41, with temperature adjusted to above auto-ignition temperature of the propulsion fuel-air mix, but below auto-ignition of the pilot fuel, is injected by fuel injection pump 42 into preparation chamber 38', the fuel injected having been further heated, if needed, by heater 37 and/or 39' or by a heater of any type. (such as 108 in FIG. 1-C and 116' in FIGS. 2 through 2-D and FIGS. 17, 18, 18-B and 18-C). This higher temperature pilot fuel then ignites the small quantity of propulsion fuel by raising its temperature in chamber 38' which then, in turn, ignites the pilot fuel and together expands into combustion chamber 38, raising the temperature of the air-fuel propulsion mix, instantly catalyzing the reaction by quickly raising the temperature to above auto-ignition level. In the compact combustion chamber, with the fuel-air premixed (homogenized) and with the turbulence of the new engine system, the combustion will be far more complete than in a compression ignited (CI) engine where much of the fuel burns prior to mixing. The expanding charge drives piston 22 in the power ($3^{rd}$) stroke which is followed by the scavenging ($4^{th}$) stroke of piston 22.

An ideal hot flammable gas for igniting low ignition fuels would appear to be natural gas, sans air, which can be heated to temperatures higher than the auto-ignition temperature of pure gasoline or diesel oils or other low auto-ignition fuels. When injected into gasoline or diesel oil and air mixtures, the higher temperature natural gas will ignite the lower auto-igniting gasoline or diesel oil and air mixture, which in turn will ignite the natural gas pilot fuel, supplying any oxygen needed for burning the pilot fuel. The pilot fuel can always be heated to a higher temperature if it is not mixed with air before injecting into propulsion fuel. (In this working cycle, the temperature of the propulsion fuel-air mixture in the combustion chamber at TDC will be lower than its auto-ignition temperature at the time of the hot pilot fuel injection.)

Figure 20:
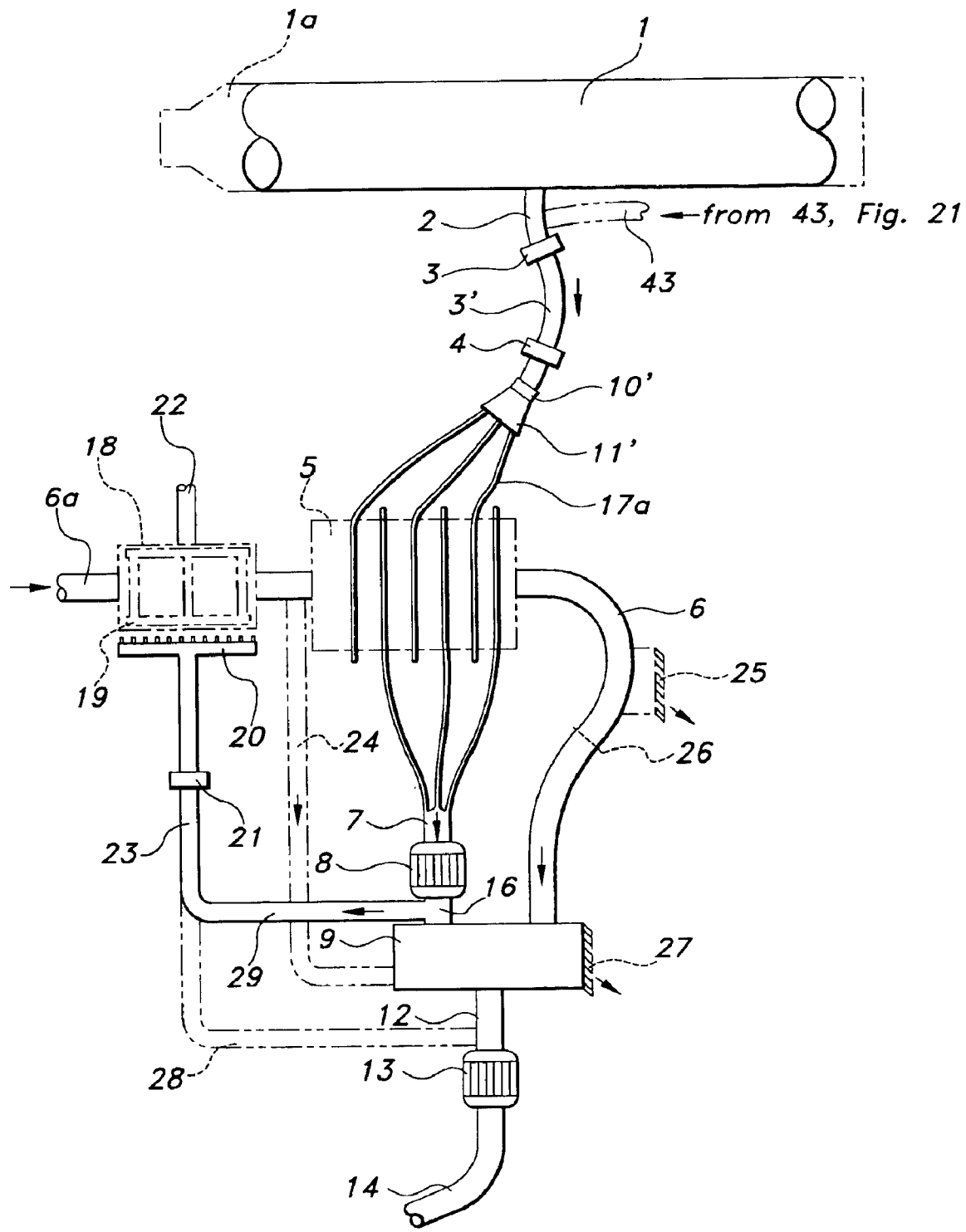
FIG. 20 is a schematic drawing, depicting a new co-generation system, providing means of extracting work from compressed natural gas (CNG), or hydrogen ($CH_2$), or any other compressed gas, when contained at high pressure in a storage tank or pipeline. Illustrated is a means of utilizing gas (in this case CNG or $CH_2$), pressure-drop-distributor and evaporator tube(s) to expand the gas, to provide (compression) chilling for a refrigerator or air conditioner and to chill charge air for internal combustion engines or for a rotary turbine. When the gas is flammable, the expanding gas is then collectively directed, by separate distribution tubes, to where the gas is combusted to power an internal combustion engine, rotary turbine, or gas fired absorption chiller, or to heat a furnace for a steam turbine, or for a space heater or any other purpose needed.
Figure 21:
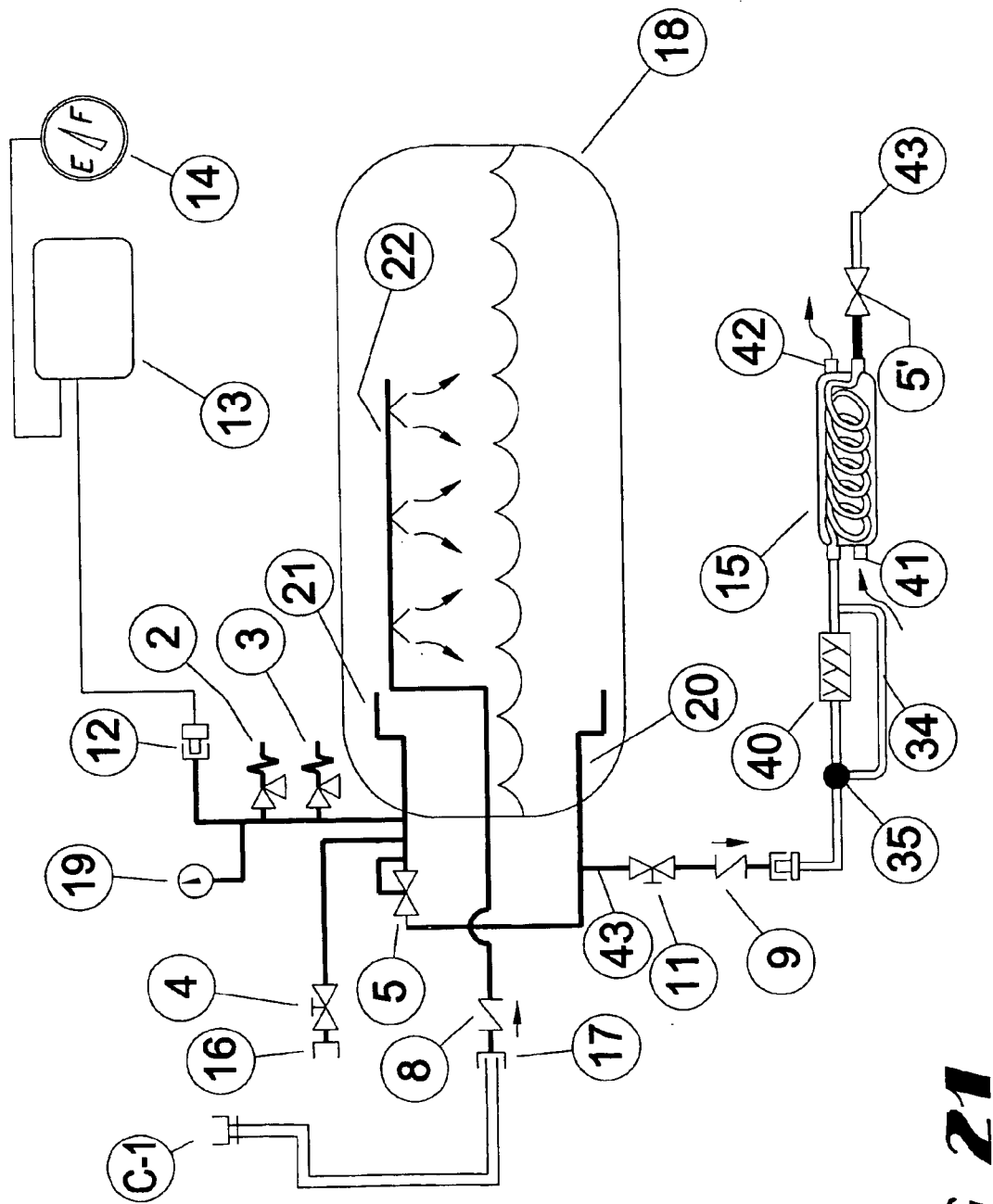
FIG. 21 is a schematic drawing, depicting a means of preparation and presentation of liquefied gases for the extraction of work from either liquefied natural gas (LNG), hydrogen ($LH_2$) or any liquefied gas. The boil-off gas from the top of the tank or boil-off gas from a container of pumped LNG or $LH_2$ is directed to send the LNG or $LH_2$ through outlet conduit 43 to inlet 4 of flexible duct 4'—FIG. 23 to first cool superconductor electric cable 3 or directly to conduit 2 of FIG. 20, then to a metering or expansion valve and to pressure drop distributor and distributor tube(s). This will cool a chiller-refrigerator, air-conditioner or cool charge air for an internal combustion engine or rotary turbine. The expanded gas is then channeled collectively, or in separate tubes, to fuel an internal combustion engine, a gas turbine combustion system, a gas fired absorption chiller, or a furnace for a steam turbine, or a space heater burner thereby ultimately consuming the gas to provide additional work.

If the pilot fuel is a flammable hot gas, it originates from a storage tank or supply pipe line, item 1 and 1*a*, FIGS. 20 or from conduit 43 of FIG. 21. From there, it proceeds as suggested in method B for non-flammable gas. The flammable gas, which is hotter than the propulsion mix, catalyzes the ignition of the propulsion gas which, in turn, catalyzes ignition of the pilot gas which has a higher auto-ignition temperature.

Direct Combustion Chamber Ignition

Alternatively, with piston 22 near TDC, with preparation chamber eliminated, the charge is ignited by spark or alternatively, conduit 41 is extended directly into and can intrude fully and directly into combustion chamber 38. Then at the proper moment, a charge of the pure pilot fuel or air-fuel mix in line 41 is injected optionally by injector 42 into the combustion chamber 38 and mixed with the air-fuel propulsion mix within the chamber 38. Ignition is catalyzed by temperature increase by the higher temperature of the higher auto-ignition temperature pilot fuel, catalyzing ignition of the lower auto-ignition temperature propulsion fuel, (pilot fuel could be dimethyl ether or natural gas (CNG) for diesel or gasoline fueled engines), whereupon the propulsion fuel ignites the pilot fuel and this combusting charge expands to drive piston 22 in the power stroke. The scavenging stroke then occurs, completing a power cycle.

Alternatively, or in addition, for either pre-combustion chamber 38' or for combustion chamber 38, 38-B injection systems other than conduit 41 and injector pump 42 are employed. For example, conduit 36, 36-B and injector 40 or 40-B are also used to inject the pilot fuel from two or more systems, especially important for FIG. 19-B and FIG. 19-C systems.

In the engine of this invention, when diesel fuel is used, the density of the air-fuel charge can reach and even far exceed that which is obtainable in any Diesel Cycle engine, while maintaining a temperature before combustion, lower than the auto-ignition temperature of a diesel oil-air mixture which is produced by about an 8:1 compression ratio, thus making practical spark ignition, modified HCCI or true HCCI.

Further instruction for engine operation for HCCI Method C is found under HCCI Method A with references to the advantages of the various engine designs. The HCCI ignition system only has been described above. The engine working cycle is described below and in HCCI Method, A. HCCI Method C operates in any of the thirteen Operational Designs of the engine of this invention.

HCCI operation of the engine of FIG. 1 to FIG. 18-D operates selectively with an extended expansion ratio (with the exception of Operational Designs 1 and 2). All Operational Designs provide:

Higher efficiency.

Greater power and torque.

Longer engine life (due to lower RPM allowed by higher torque).

Multi-fuel capabilities.

Greater reliability.

All Methods after ignition of charge the power stroke take place in 4-stroke or 2-stroke engines, followed by scavenging process.

Method D HCCI, Operational Design 17 Pilot Fuels with Low Auto-Ignition Temperature The primary propulsion charge is taken into cylinder according to any of the Operating Designs 1 through 13. The compression stroke continues or takes place with the supplementary supercharging charge being injected and with the propulsion air-fuel homogenized and the temperature of the fuel-air mix at piston TDC adjusted to near auto-ignition, but the air-fuel propulsion charge is at a higher temperature than that of the auto-ignition temperature of the pilot fuel.

The propulsion air-fuel charge is now compressed stroke in cylinder 7 by piston 22 with preparation chamber 38' and combustion chamber 38 containing the entire propulsion charge above piston 22, at near auto-ignition temperature, at near TDC. The fuel-air charge is ignited by conventional spark plug or by HCCI for HCCI operation. Conduit 41, with fuel injector pump 42, (in phantom), FIG. 19 through FIG. 19-B, receives and contains pilot fuel, perhaps from a common fuel-rail. The pilot-fuel is an air-fuel mixture where the pilot fuel is one that has a lower auto-ignition temperature than that of the auto-ignition temperature of the fuel or air-fuel mix which powers the engine. Diesel fuel or diesel-air mix could be an appropriate pilot fuel for gasoline-air, dimethyl ether-air, natural gas-air or some of the alcohols as propulsion fuel operation.

The small amount of the engine's propulsion fuel mix in combustion chamber 38, is at a temperature less than its own auto-ignition temperature, but higher than the auto-ignition temperature of the pilot fuel, and is now pressed into pre-combustion chamber 38' near piston TDC. Simultaneously, a small amount of pilot fuel or pilot fuel-air mix in line 41 is injected by fuel injection pump 42, FIG. 19, into pre-combustion chamber 38'. (Alternatively, the pilot fuel or pilot air-fuel mix can be injected through conduit 36 with valve 40, FIG. 19, controlling the injection.) The propulsion fuel-air mixture, now in pre-combustion chamber 38', which is hotter than the auto-ignition temperature of the pilot fuel, which is alternatively sans oxygen or pilot fuel-air mix, catalyzes the ignition of the pilot fuel which then causes oxidation of the engine's propulsion fuel and all expands into combustion chamber 38 where it raises the temperature of the entire air-fuel propulsion mix, broadly catalyzing the reaction, and causes oxidation of the entire charge by quickly raising the temperature of the air-fuel mix propulsion in combustion chamber 38. Piston 22 is pressed into the power stroke. (In the compact combustion chamber with the fuel air premixed (homogenized) and with the turbulence of the new engine system, the combustion will be far more complete than in a compression ignited (CI) engine).

Direct Combustion Chamber Combustion

Again, the charge can be ignited by spark or alternatively, ignition can be catalyzed in the following manner: The pre-combustion chamber is eliminated, fuel pump injector 42 has an inlet conduit 41, FIG. 19, which is directly connected with combustion chamber 38 (not shown) and may intrude into chamber 38. After completion of the compression stroke and near TDC, with the entire propulsion charge being above piston 22 in combustion chamber 38, a small amount of pilot low-self-ignition-point fuel or air-fuel mix, which itself is at a temperature lower than auto-ignition, is injected by fuel pump 42 directly into the combustion chamber 38 of cylinder 7. The temperature of the propulsion air-fuel mix in combustion chamber 38, being higher than that which will cause the pilot or pilot air-fuel to auto-ignite, raises the temperature of the pilot fuel injected and catalyzes the ignition of the pilot fuel which in turn catalyzes the oxidation of the entire air-fuel charge in combustion chamber 38. The power stroke then takes place.

Detailed Methods

More detailed operating methods are discussed in method A.

True HCCI Method E, Operational Design 18 Universal Spontaneous Combustion

Referring now to FIG. 19-B, cylinder 7 is fitted with a combustion chamber 38 or, in addition, a pre-combustion chamber 38'. The fuel-air charge can be ignited by spark or by HCCI. For HCCI, either or both chambers have sensors to detect conditions in the chamber, e.g., temperature sensor 21', density sensor 21", and any other sensors needed to monitor other conditions such as oxygen levels, crank angle etc. These sensors relay messages to ECM-27, FIGS. 1 through FIG. 10, FIGS. 18, 18-B and 18-C which contains a computer to send messages to activators to operate various controls. These controls then adjust fluid flows and valve happenings and to either increase or decrease electrical energy, charge air density, in regard to the duty cycle of the engine, and to adjust the valving 3, 4, 5 and 6, along with heat-of-compression and to control the charge temperature near piston (TDC). The latter will be just above the temperature to cause the air-fuel charge to self ignite at TDC. The controls and methods are described in the descriptions for FIG. 19, FIG. 19-B, FIG. 19-C, FIG. 19-D, FIG. 1 and FIG. 2.

Optionally, each cylinder can have separate controls if needed. For multi-cylinder engines, as described under FIG.

19, FIG. 19-B and FIG. 19-C descriptions, each combustion chamber 38 or 38-B or pre-combustion chamber 38' can have at least two temperature sensors 21' and two pressure or density sensors 21". The computer of ECM-27 receives the message from each cylinder, finds the mean value of each, sums up the values individually or collectively, and calculates the mean values. ECM-27 then instructs the various heat and valving controls to adjust the density and temperature (in conjunction with the cylinders heat-of-compression) of the engine air-fuel charge in each cylinder near piston TDC to produce a proper density charge and temperature, which would be at auto-ignition temperature at piston TDC for the air-fuel propulsion mixture fueling the engine. The charge should ignite preferably at 10–15 degrees before or at TDC as detected by crank angle sensor. The arrangement, described for FIG. 16, provides double the "bum" time at piston TDC for many advantages in any engine.

In using the pre-combustion chamber 38', the temperature sensors 21' in combustion chamber 38, sense the temperature and relay the message to various controls to adjust conditions, including electrical heating or fluids in cooling ducts, to produce a temperature at that of auto-ignition, preferably at 10–15 degrees before or at piston TDC. Sensors 21' in pre-combustion chamber 38' relay a message to ECM-27 to adjust the controls of heating elements 37 and 39 in FIG. 19-B and/or to adjust cooling fluid flows, FIGS. 19-B, 19-C and 19-D to the proper temperature for catalyzing auto-ignition of the air-fuel charge in the pre-combustion chamber at that point. This will start the engine running and maintain smooth operation. The ancillary individual cylinder cooling system of FIG. 6 and FIG. 5, in which cooling is provided by cool air or by air chilled by expansion valve 4', all controlled by ECM-27, may be employed in temperature control.

After the engine is in operation, the heat of combustion will likely supply all of the needed heat plus some in excess. In order to reduce the heat level of either the pre-combustion chamber 38' or the combustion chamber 38, chill cooling channel 36-B and/or 41-B with control valves 40-B and/or 42-B and the appropriate cooling or heat control jackets and conduits arranged surrounding the chambers 38 and/or 38', as shown in FIGS. 19-B, 19-C and 19-D can be utilized, perhaps in conjunction with temperature control of FIGS. 6 and 5. The proper temperature and density air-fuel charge can be supplied by an arrangement similar to compressors 1, 5 and 2" and intercoolers 6, 9 and 11 of FIG. 11-B, with conduit 9', alternatively leading directly to valve 40 on conduit 36-B, FIGS. 19-B, 19-C and 19-D or alternatively to expansion valve 10', pressure-drop distributor 11', optional bypass system R-X and evaporator tubes 27'a–27'f, leading to valve 40-B on conduit 36-B of FIG. 19-B, FIGS. 19-C and 19-D. Water cooling may also be used, either in addition to air or chill air cooling, or alone. The water can also be pumped through channel 41-B, FIGS. 19-B, 19-C and 19-D with any optional pilot fuel taking a different route (not shown), if conduit and fluid jacket 36-B are occupied, to chamber 38', 38'B or to combustion chamber 38 or 38-B of FIG. 19-C or 19-D.

Optional Operating Modes

Particular engine working cycles and Operational Designs are described under HCCI method A.

True HCCI Method F, Operational Design 19
Universal Spontaneous Combustion

Referring now to FIG. 19-C, there is shown a hemispheric-plus (perhaps 300 degrees, more or less), shaped combustion chamber 38-B, containing all of the ducts, jackets, valves and controls pictured and described for FIG. 19-B which are operated and controlled in the manner suggested for FIG. 19-B system. The shape of the combustion chamber allows control of charge temperatures by the charge being surrounded by combustion chamber 38 and piston crown and by being fitted with a centralized temperature control 37 which are surrounded by the same channels 36-B and 41-B and heat elements 24 and 37. Accurate control of the temperature of the air-fuel charge near piston TDC in combustion chamber 19-C allows spark ignition or HCCI operation which is the auto-ignition and general simultation oxidation of the air-fuel propulsion charge. In FIGS. 19-B, 19-C and 19-D, the sensors 21' and 21" signal ECM-27, which in turn signals various valves, one being a variable opening expansion valve 40-B for expanding chilled high pressure air through the evaporator coil or jacket of 36-B of FIG. 19-B, FIGS. 19-C and 19-D. The sensors also adjust the appropriate air and/or water controls and the electric heater controls to balance the temperature at the required level to spontaneously ignite the charge at the time piston is near or at TDC. After starting and warming up, ECM-27 may alternatively begin using chill cooling with the aid of water cooling, if needed, to maintain auto-ignition temperature in the combustion chamber 38 of FIG. 19-B, FIG. 19-C or FIG. 19-D and the cylinder, FIG. 6, as needed. If combustion chamber 38-B, FIG. 19-C or 19-D requires cooling between firing strokes, the primary fresh or chilled charge air can be pulled through inlet intake valves 40 and/or 40' of chamber 38-B, FIG. 19-C or FIG. 19-D and through channel 22', instead of through intake valve 18'. Alternatively, fresh cool air may be inducted by conduit 41 and 41' of chamber 38-B and out through cylinder inlet channel 22' of chamber 38' of FIG. 19-B or 38-B of FIG. 19-C or FIG. 19-D by the intake ($1^{st}$) stroke of piston 22. In either case, the inlet valves would close after receiving the desired initial charge of air according to the Operational Design chosen.

Control of heating elements 37 and 39 in FIGS. 19-B, 19-C and 19-D, also controlled by ECM-27 in balance with cooling and/or heating system 41-B and 36-B, in conjunction with the heat-of-compression and combustion heat keeps the charge heat at auto-ignition at piston 22 TDC. The cooling system for FIG. 6, with expansion valve 4' of FIG. 5, also controlled by ECM-27, can regulate the temperature of the charge in-cylinder to keep it below auto-ignition temperature until the charge is out of the cylinder and in the combustion chamber.

Engine Operational Design 4 of FIG. 2 could be used in some engines to help control the temperature. In this design, cylinder 7 and pre-combustion chamber 38' of FIG. 19, FIG. 19-B and FIG. 19-C or combustion chamber 38-B, FIG. 19-C and FIG. 19-D can receive and pump through a fresh, cool or expansion chilled air charge between each firing cycle, pulling fresh or chilled primary air through inlet valves 40 and/or 40' or through conduits 36-B or 41-B, which can optionally be present in engine design of FIG. 19-C and FIG. 19-D also and out the lower passage 22 on the intake stroke of piston 22. Then this cool or chilled primary charge air can be pumped through and out of cylinder 7, and out exhaust valve (not shown) or through combustion chamber 38-B or preparation chamber 38' of FIGS. 19-B, 19-C or 19-D, out ancillary outlet valve 40 and/or 40' and/or back out conduit 36-B or 41-B, FIG. 19-B, FIG. 19-C or FIG. 19-D or ancillary outlet valves 40 or 40' (not shown) in chamber 38' or 38-B.

As stated, in any of HCCI Designs A through G, cylinder 7, combustion chamber 38 and 38-B and preparation chamber 38', if the latter is present, can also be cooled between firing strokes, if necessary, by inducing and expelling a fresh cool or expansion chilled air charge. Methods are described for Design 4, of the engine of FIG. 2, and for FIG. 2-C, FIG. 11-B, FIG. 18-B and FIG. 18-C.

Further instruction for engine operation for HCCI Method F is found under HCCI Method A with references to the advantages of the various engine designs. The engine working cycle is described for engines Operational Designs 1 through 13. HCCI Method F operates in all Operational Designs 1 through 13.

The advantages of this engine cycle are:

Higher efficiency.

Greater power and torque.

Longer engine life.

Multi-fuel capabilities.

Greater reliability.

The operation of the engine is the same as the basic engines of FIG. 1 to FIG. 5 and FIG. 7 and FIGS. 8–10 and FIG. 18, FIG. 18-B and FIG. 18-C, utilizing either of engine Operational Designs 1 through 13 for greater torque, power, and durability with low fuel consumption and ultra low polluting emissions.

Advantages:

Ultra low emissions.

Greater power.

Increased fuel economy.

Increased engine durability.

Multi-fuel capability.

True HCCI Method G, Operational Design 20
Universal Spontaneous Combustion

Referring now to FIG. 19-D, there is shown a hemispheric-plus (perhaps 300 degrees, more or less, shaped combustion chamber 38-B, containing all of the ducts, jackets, valves and controls pictured and described for FIG. 19-B and FIG. 19-C which are operated and controlled in the manner suggested for FIG. 19-B, FIG. 19-C system. The shape of the combustion chamber allows control of charge temperatures by the charge being surrounded by combustion chamber 38 and piston crown. Alternatively, the combustion can be cylindrical as indicated by phantom lines 38-C. Accurate control of the temperature of the air-fuel charge near piston TDC in combustion chamber 19-D allows spark ignition or HCCI operation which is the auto-ignition and general simulation oxidation of the air-fuel propulsion charge. In Designs, FIGS. 19-B, 19-C and 19-D, the sensors 21' and 21" and any other sensors required, signal ECM-27, which in turn signals various valves, one being a variable opening expansion valve 40-B for expanding chilled high pressure air through the evaporator coil or jacket of 36-B of FIGS. 19-B, 19-C and 19-D. The sensors also adjust the appropriate air and/or water controls and the electric heater units 39 and 37 (37 being both optional spark plug 37 and central heater optionally combined as needed), in conjunction with heat-of-compression, to balance the temperature at the required level to spontaneously ignite the charge at the time piston is near or at TDC. After starting and warming up, ECM-27 may alternatively begin using chill cooling with the aid of water and cooling, if needed, to maintain auto-ignition temperature in the combustion chamber 38-B of FIG. 19-B or FIG. 19-C and FIG. 19-D and the cylinder (FIG. 6), as needed. If combustion chamber 38-B, FIGS. 19-B, 19-C and 19-D requires cooling between firing strokes, the primary fresh or chilled charge air can be pulled through inlet valves 40 and/or 40' of chamber 38-B, FIGS. 19-C and 19-D. Alternatively, fresh cool air may be inducted through conduit 41-B and its cooling jacket of chamber 38-B of FIGS. 19-B, 19-C and 19-D and through cylinder inlet channel 13 of chamber 38' of FIG. 19-B or channel 22' of FIGS. 19-C and 19-D by the intake ($1^{st}$) stroke of piston 22. In either case, the inlet valve 40 or 40' would close after receiving the desired initial charge of air according to the Operational Design desired.

Control of heating elements 37 and 39 in FIGS. 19-B, 19-C and 19-D, also controlled by ECM-27 in balance with cooling system 41-B and 36-B in conjunction with the heat-of-compression, and combustion heat keeps the charge heat at auto-ignition level at piston 22 TDC. The cooling system for FIG. 6, with inlet orifice or expansion valve 4' of FIG. 6, also controlled by ECM-27, can regulate the temperature of the charge in-cylinder to keep it below auto-ignition temperature until the charge is out of the cylinder and in the combustion chamber.

Engine Operational Design 4 of FIG. 2 could be used in some engines to help control the temperature. In this design, cylinder 7 and pre-combustion chamber 38' of FIG. 19 and FIG. 19-B or combustion chamber 38-B of FIG. 19-C and FIG. 19-D can receive and pump through a fresh, cool or expansion chilled air charge between each firing cycle, pulling fresh or chilled air on the intake stroke through inlet valves 40 and/or 40' or through conduits 36 or 41, which can optionally be present in engine design of FIG. 19-C and FIG. 19-D also and out the lower passage 22" on the intake stroke of piston 22. Then this cool or chilled primary charge air can be pumped through and out of cylinder 7, and out exhaust valve (not shown) or through combustion chamber 38-B or preparation chamber 38' of FIG. 19-B, out ancillary outlet valve 40 and/or 40' and/or back out conduit 36-B or 41-B, FIG. 19-B-FIG. 19-C or ancillary outlet valves (not shown) in chamber 38', 38 or 38-B.

As stated, in any of HCCI Designs A through G, cylinder 7, combustion chamber 38, 38-B and preparation chamber 38', if the latter is present, can also be cooled between firing strokes, if necessary, by inducing and expelling a fresh cool or expansion chilled air charge. Methods are described for Design 4, of the engine of FIG. 2, and for FIG. 2-C, FIG. 11-B, FIG. 18-B and FIG. 18-C.

Further instruction for engine operation for HCCI Method G is found under HCCI Method A with references to the advantages of the various engine designs. The engine working cycle is described for engines Operational Designs 1 through 13. HCCI Method G operates in all Operational Designs 1 through 13.

The advantages of this engine cycle are:

Higher efficiency.

Greater power and torque.

Longer engine life.

Multi-fuel capabilities.

Greater reliability

Method G

Operation of the HCCI Engine

The operation of the engine is the same as the basic engines of FIG. 1 to FIG. 5, FIG. 7, FIGS. 8 to 10, FIG. 18, FIG. 18-B and FIG. 18-C, utilizing any of engine Operational Designs 1 through 13 for greater torque, power and durability with low fuel consumption and ultra low polluting emissions.

The means on initial temperature control is described above and for method G consisting of adjusting charge temperature at a level just below auto-ignition temperature of the fuel-air propulsion mix. Auto-ignition is accomplished by a last moment, sudden increase in heat-of-compression at near piston TDC with an alternative and optional means of spark ignition, the latter to insure reliability.

Ignition

Charge density has been adjusted to the requirements of the duty cycle of the engine. The charge temperature has been adjusted to a level less than auto-ignition for spark ignition and at near TDC, the charge is ignited in that manner.

The HCCI operation charge temperatures are adjusted by means described in method 1, FIGS. 19, 19-B, 19-C and 19-D. At near TDC, for example, at the point projection 22' on piston 22 enters port 22" of combustion chamber 38-B, sensors 21' and 22" with perhaps other sensors sense and signal the temperature and density levels to ECM-27 to adjust flow rates by way of valves 3, 4, 5,6 and 10' to produce the conditions of the air-fuel charge desired at that particular point.

This temperature is slightly lower than auto-ignition temperature. As piston 22 completes the compression stroke, the outer face of the piston rises to nearly flush with the face of the engine head 10 and piston projection 23 has entered port 24 of head 4 and is now flush with the lower part of combustion chamber 38-B (chamber 38-B may be semi-hemispherical or cylindrical in shape as illustrated by 38-B and 38-C [the latter in phantom] of FIG. 19-D).

As piston crown A approaches face of engine head 4, piston projection 22' enters and continues to travel in the restricted space of combustion chamber port 22". (There are no pressure sealing rings on piston projection 22'). This means that as piston crown A approaches engine head face 4, all of the fuel-air charge above the full piston crown is compressed toward and into port 22" and escapes confinement in the cylinder 7 by being forced through the small space surrounding projection 22' traveling up into combustion chamber 38-B or optionally 38-C. As pressures above piston crown A and in chamber 38-B attempt to equilibrate, vortical motion occurs in the fluids in the narrow passages between 22' and 22" and throughout chamber 38-B, further stirring and mixing the fuel-air charge. This produces equilibration in fuel, air and temperature of mixture and assures absence of cyclic variations as combustion occurs.

The sudden rise of temperature in the fuel-air charge at this time, caused by the short projection 22' producing instantaneous pressure and heat increase. causes a uniform low temperature universal oxidation of the charge which is true HCCI operation.

The engine can be alternatively started up by spark plug 37 firing at TDC which is the last position for firing and obtaining maximum efficiency. In a few moments, the temperature in chamber 38-B will become conducive to spontaneous ignition and ECM-27 tells spark plug to cease firing.

Optionally, ECM-27 tells the electronic ignition system each time a cylinder should fail to fire, then spark plug 37 will spark just after auto-ignition should fail to occur. This assures reliable cylinder firing.

Alternatively, spark plug 37 may continue firing at TDC. This is a little later than optimum ignition timing. Therefore, at such a time that auto-ignition should fail to occur, then only perhaps 5 degrees crank angle later, spark plug 37 fires to ignite the charge, assuring fail-safe and smooth engine ignition.

Refrigeration Cooling and Powering by
Compressed or Liquified Natural Gas or Hydrogen Briefly noted, there is shown three schematic drawings, (FIG. 20, FIG. 21 and FIG. 23) representing yet another embodiment of apparatuses useful in the field of air conditioning, power generation and heating, from which yet other methods of operation can be performed and will be described. Six alternative systems are depicted, utilizing highly condensed gas, such as compressed natural gas or hydrogen or liquefied natural gas or liquefied hydrogen for, (1) compression refrigeration before the gas is combusted by being consumed for (2) gas fired absorption chillers, or (3) burned in reciprocating or rotary turbine engines or (4) consumed for furnace for steam turbines or (5) consumed for space heating. For liquefied natural gas, the first task is optionally cryocooling which is then followed by the several succeeding tasks.

Co-Generation Using Compressed Natural Gas or
Compressed Hydrogen for Compression-Expansion
and Absorption Chilling or Fueling Other
Combustion Tasks with Only Combustion
Consuming the Gas Referring now to FIG. 20, shown is a schematic sectional view of a natural gas or hydrogen transmission pipeline, 1 or a compressed natural gas or hydrogen gas storage tank 1a, (in phantom). Both of these have an associated outlet conduit 2, a conduit (in phantom) from conduit 43, FIG. 21, optional pressure regulator 3, conduit 3' optional pressure regulator 4, metering or expansion valve 10', pressure-drop-distributor 11', distributor tube(s) or evaporator coils 17a, freezer-chiller box 5, air inlet conduit 6a, air outlet conduit 6, collective conduit 7, optional gas heater/cooler or compressor 8, and box 9. Apparatus 5 in FIG. 20 represents a compression-expansion refrigeration system for various cooling tasks, including space cooling, engine intake air cooling, refrigerator or freezer, etc. Box 9 represents a gas fueled refrigerator (absorption chiller) or a gas fueled and cooled internal combustion engine (ICE) or a gas fueled and cooled gas rotary turbine engine or a gas fueled steam turbine or a gas fueled boiler furnace, or a gas fueled furnace space heater, or any other system operated or fueled by gas, natural or hydrogen or by any other suitable flammable gas. Associated with item 9 are a vent or exhaust pipe 12, optional heat exchanger 13 and vent or exhaust line 14. All of these are designed for utilizing compression cooling, absorption cooling and fueling by compressed natural gas (CNG), compressed hydrogen ($CH_2$) or as depicted and described for FIGS. 21 and 22 for liquefied natural gas (LNG) or liquefied hydrogen (LH) to perform work before the gas is consumed as fuel in 9 of FIG. 20.

In addition, optional components in FIG. 20 (in phantom) are: a desiccant system 18, desiccant wheels containing silica gel or other desiccants 19, drying heater 20, drying vent 22, gas supply line 23 leading from conduit 16, to fuel control-pressure regulator 21 (optional), optional hot exhaust line 28 leading to desiccant dryer 20, for drying desiccant, chilled air outlet register 25, optional conduit 6 line block 26 (in phantom) and chilled air outlet register 27.

Figure 23:
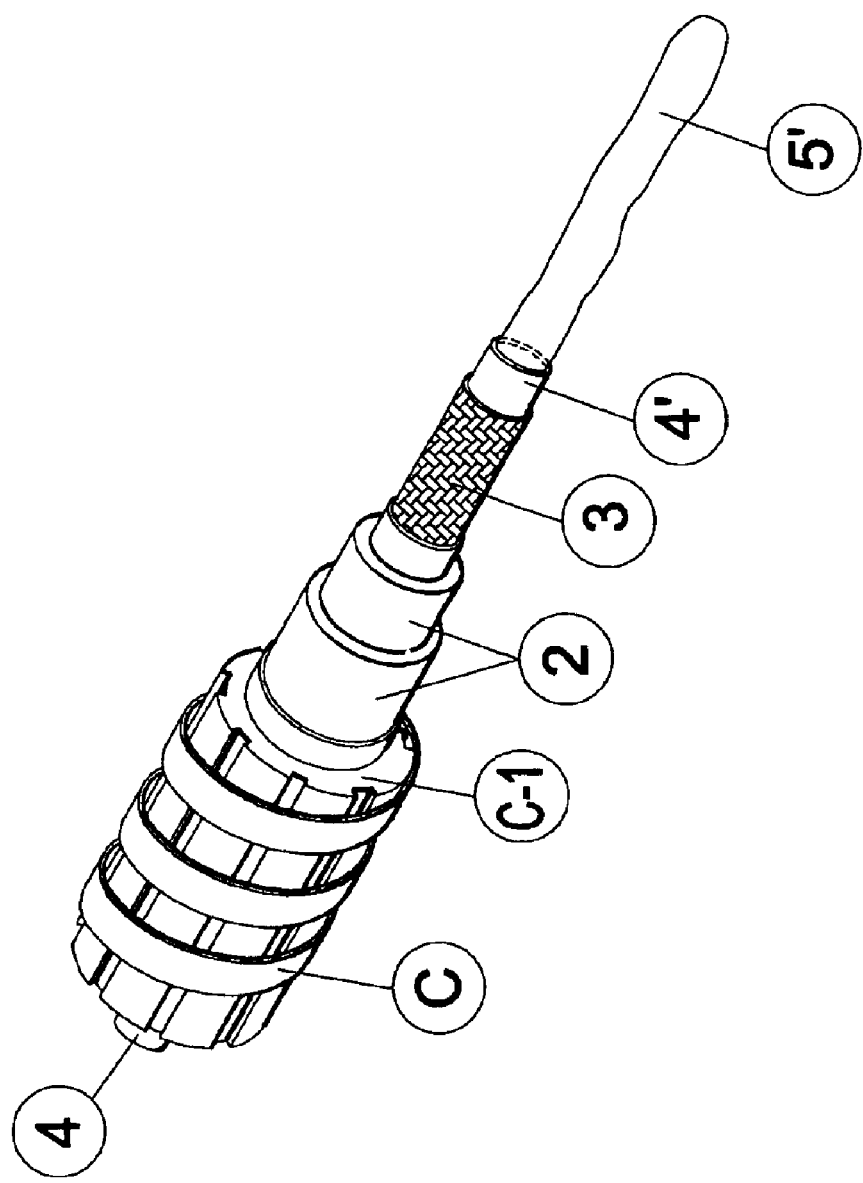
FIG. 23 is a two-dimensional drawing depicting a means of extracting work from liquefied natural gas (LNG), or liquefied hydrogen ($LH_2$) after first using it for cryo-cooling electric superconductor cables. This constitutes a new co-generation system. At the end of its use in cooling, the pumped LNG or $LH_2$ is directed to send the LNG or $LH_2$ through an optional pressurizer unit and then to conduit 2 of FIG. 20 to a metering or expansion valve, then to pressure drop distributor and distributor tube(s). This will cool a chiller-refrigerator, an air-conditioner or a cooling charge air for internal combustion engines or rotary turbine(s). The same expanded gas is then channeled collectively, or in separate tubes, to fuel an internal combustion engine system, a gas turbine combustion system, a gas fired absorption chiller, or a furnace for a steam turbine or a space heater burner, thus, ultimately burning the gas to provide further work.

Co-Generation Using Liquefied Natural Gas (LNG)
or Liquefied Hydrogen (LH) for Cryogenic Cooling
Compression-Expansion Cooling, Absorption
Cooling and Fueling Tasks Referring now to FIG. 21, there is shown a schematic sectional view of a storage tank 18, containing liquefied gas, such as liquefied natural gas (LNG) or liquefied hydrogen (LH), with associated liquid outlet withdrawal tube 20, flow economizer regulator 5, associated conduit fuel shut off valve 11 and associated conduit leading to excess flow valve 9 with associated conduit leading to optional cryogenic pump 40. Optional pump 40 has an optional bypass system comprised of bypass valve 35 and conduit 34, to be used at any time cryogenic pump 40 is not required. A conduit 43 conveys liquefied gas to optional pressurizer 15 through which the conduit optionally forms coils and exits to an optional shut-off valve 5' on associated conduit 43. Pressurizer 15 receives the LNG or LH effluent in a conduit 43 which coils inside the pressurizer casing in order to expose the coil to an optional fluid which is optionally pumped through, and then, after operating pressure builds in pressurizer 15, the LNG or LH exits to conduit 43 outlet. An inlet port 41 to the pressurizer 15 can optionally conduct fluid (air or liquid) through and around pressurizer 15 coils. The warming fluid is then expelled through duct or port 42, optionally to the atmosphere. The LNG or LH is slightly warmed in 18 or 15, if necessary, to raise boil-off vapor pressure in tank 18 or in pressurizer 15 to expel the liquefied gas through conduit 43 which is alternatively connected to conduit 2 in FIG. 20. Conduit 43 is first alternatively connected to inlet of flexible duct 4 within electric superconductor cable 3 of FIG. 23 with the exit port 4' of duct 4 being now connected to conduit 2 in FIG. 20. (When liquefied gas is used first to super cool electric power cable 3, FIG. 23, the liquefied gas tank 18 or pressurizer 15 is kept cold and not heated, but pumped from tank 18 by cryogenic pump 40 and out conduit 43 and first through conduit 2, FIG. 20 and to succeeding apparatuses.) This provides two preferred means of supplying LNG or LH at a volume and pressure needed to alternatively push the liquefied natural gas or hydrogen through (a) cryocooling tube 4 in FIG. 23 for sub-cooling electric superconductor power cable 3, as depicted in FIG. 23 and then into a pressurizer, as 15, FIG. 21, to build pressure required for (b) compression-expansion refrigeration shown in FIG. 20. These two refrigeration systems can be accomplished with no chemical change in the gases. Another use of the same gas can be for a third refrigeration system which is labeled here as (c) absorption-refrigeration, a system which consumes the gas as fuel. Therefore, the gas can be used for two tasks before being consumed in a third task, thus providing a co-generation system in which one volume of gas performs three services. Other optional tasks for this chemically unchanged fuel are (d) firing a gas turbine for producing power, (e) firing steam turbine for electric power production, (f) engine (ICE or turbine) charge air chilling, (g) firing a reciprocating ICE for electric power production and (h) firing space heating furnace and other apparatuses, depicted in FIG. 20. These latter described operations are accomplished and fueled by CNG or LNG, or $CH^2$ or LH and associated apparatuses. System (c) to (g) consume LNG or LH as operating fuels after the LNG or LH has already performed tasks (a) and/or (b), indicated above. As indicated above, the same units of liquefied gas can supercool electric superconductor cable 3, air-condition the power plant (after exiting the cable duct), spin an impulse turbine and fuel a gas turbine or ICE which produces the electric power, or alternatively provided absorption chilling, steam turbine, heating furnace, etc.

Operation of LNG or LH Fuel Tank

Boil-off vapor pressure in fuel tank 18, with back pressure up o 280 psi, presses the liquefied gas out liquid withdrawal tube 20 through valves 11 and 9, through valve 35, bypass conduit 34, through optional pressurizer 15 and out conduit 43, which in use is alternatively connected to inlet port 4 of cryogenic cooler tube 4 of electric superconductor cable 3, shown in FIG. 23 and which outlet 4' of tube 4 is alternatively connected to conduit 2 in FIG. 20. Alternatively, outlet 43 of FIG. 21 is connected directly to conduit 2 in FIG. 20 when cryogenic cooling is not needed. If the boil-off pressure in tank 18 is too low, bypass valve 35 optionally directs the LNG or $LH_2$ from tank 18 to cryogenic pump 40 which pumps the effluent through conduit 43. If needed and cryogenic cooling is not required, atmospheric air or other fluid is pumped into inlet duct 41 of pressurizer 15 and circulates around conduit 43 and the exists through port 42 after imparting slight heat to the liquefied gas, causing pressurizer 15 to build desired pressure. Alternatively, boil-off vapor pressure is allowed to build in tank 18 by inducing slight heat in tank and/or by restraining the boil-off pressure until desired operating pressure is attained to express the liquefied gas from conduit 4. At the point the boil-off pressure is to drive the vanes of the turbine, the liquefied gas is completely vaporized, optionally in a system such as vaporizer 15 of FIG. 23. When an impulse turbine is to be driven by compressed or vaporized liquid gas, it is a driver solely or in a co-generation system and is fitted into the scheme at the place in the system that the compressed gas or the liquefied gas vapor is best suited as an impeller. Then the gas is collected for further use.

The LNG or LH in tank can be kept at the desired temperature and the liquefied gas is pressed out conduit 43 outlet, and, in the case of the first use suggested, into inlet 4 of superconductor conduit and through conduit 4 of FIG. 23. Then after cooling superconductor cable 3, it exits an outlet duct or valve 4', FIG. 23 into a system to re-liquefy or store what now may be partial gas effluent, or alternatively into conduit 2 of FIG. 20 by way of conduit (in phantom) depicted as being from 43 of FIG. 21. Hereafter, it can operate any or all of the apparatuses depicted and described for FIG. 20 and alternatively driving a turbine. Alternatively, the LNG or LH from conduit 43 may go directly from conduit 43 of FIG. 21 to conduit 2 of FIG. 20, or to any or all of the apparatuses depicted and described for FIG. 20. For example, it can go directly to fuel the turbine or ICE 9 of FIG. 20 which is preferable to the engine producing the electric power going through electric superconductor cable 3. Alternatively, expansion valve 10' of chilled system of FIG. 20 creates back-pressure needed in pressurizer 15 or LNG or $LH_2$ tank 18, to build operating pressure (ideally 200–280 psi) for expansion chilling of item 5 (in this case, a refrigerator) of FIG. 20, or to drive a turbine, also represented by item 5, whether conduit 43, FIG. 21, leads first to conduit 2 of FIG. 20, or to conduit 4 of FIG. 23.

The boil-off pressure in tank 18 can be sufficient to present the amount of liquefied gas needed to supply the equipment depicted in FIG. 23 and FIG. 20. Alternatively, valve 35, FIG. 21 is closed to bypass conduit 34 and the liquefied gas is pumped by cryogenic pump 40 through the pressurizer 15, where the liquefied gas builds pressure, if needed, to the desired level within pressurizer 15 and then, at the pressure desired, expels the LNG or LH out conduit exit port 43 into conduit 2 of FIG. 20 or alternatively, (without the temperature being changed and preferably at minus 260° F. or lower) through inlet 4 of conduit 4' of FIG. 23 and from outlet of conduit 4' FIG. 23. From there, the liquefied gas can be optionally ducted to conduit 2 of FIG. 20 and/or to any of the other apparatuses described. Cryogenic pump 40 prevents any unwanted pressure escaping the pressurizer 15 back into LNG or LH tank 18, if the pressure in 15 is greater than that desired in tank 18. Ideally, boil-off vapor pressure in storage tank 18 will present the LNG or LH to conduit 43 bypassing cryogenic pump 40, by bypass system 35 and 34 when the level of pressure in tank 18 is that desired. The temperature in tank 18 is determined by the pressure of the LNG or LH stored in the tank and which pressure can be adjusted as also in pressurizer 15 (As stated earlier, the pressure desired in tank 18 can be produced by exerting back pressure on the tank 18 until working pressure is attained or by slight heating of contents).

If necessary, the pressure is produced in pressurizer 15 by passing fluid in inlet port 41, through casing of pressurizer 15 and out port 42. The temperature adjusting fluid in casing of 15 can be a fluid such as liquid or other type of coolant or preferably return or ambient temperature-air from cooled or heated space such as a building, or even ambient temperature atmospheric air. In either case, the chilled fluid exiting port 42 can be directed to supplement other means of chilling or provide primary chilling for a truck-cab or bus, etc. Not much heat is required to raise the pressure of LNG or LH in tank 18 or 15. The former generally is stored at 260° below zero F. temperature. LH is stored at minus 460 degrees Fahrenheit For expansion chilling with LNG or LH, the temperature in 18 or 15 could be as low as minus 168° F., or lower, and for compressed gas, perhaps a pressure of 260 psi or even lower. (A passenger bus powered by CNG, LNG, CH or LH can very economically provide air conditioning for the passengers and then use the chemically unaltered gas to power the bus engine.) This system can also be utilized for refrigerated trucks, etc.)

Using a conventional air-conditioning system, a fifty passenger bus would require about 50 horse power of energy to air-condition the vehicle. This amount of fuel can be conserved by utilizing a co-generation system in which expanding gas produces work as described herein.

Operation Method

Compressed gases, such as natural gas and hydrogen are obtained from a storage tank such as tank 1a or from pipeline 1, of FIG. 20. Liquefied gases are provided by tanks as in FIG. 21, item 18. In the case of compressed gas, it can be stored at pressures of 3,600 psi, and can be obtained by pipeline at nearly the same pressures. Liquefied gases can super-cool and afterward develop working pressure and perform work and the same gas can then be consumed as fuel. Described here are methods of utilizing the super-cooling ability of liquefied gas and the pressure drop of liquefied or compressed gas, in either case, to perform work before the gas is consumed as fuel.

Item 4, FIG. 23 is a flexible duct for (a) cryo-cooling an electric super-conductor cable. Box 5, FIG. 20 represents (b) a refrigerator/freezer or air conditioner or (c) an impulse turbine. Box 9 represents one or more additional tasks which can be performed in which the same gas can now be consumed as fuel. These are (1) gas fueled absorption chiller, (2) a gas fueled internal combustion engine (ICE), (3) a gas fueled rotary turbine, (4) a gas fueled steam turbine, (5) a gas fueled space heating furnace, or any other system fueled by gas, natural or hydrogen. The gas can be used as in FIG. 20 and FIG. 23 for one or more chilling systems or to drive an impulse turbine and then, as shown in conduits 16 and 29, the gas can then be directed to one or more other tasks, or conduit 16 can have any number of division into conduits to supply any or all of the systems (1) through (5) suggested herein.

System (A), in which LNG or LH alternatively is ducted first for (a) supercooling superconductor cable 3 through flexible duct 4, FIG. 23 and then by conduit 2 through optional pressure regulators 3 or 4, FIG. 20 for optionally adjusting the mixture of liquid and gaseous gas volume and pressure to that ideal for performing the next task, in which the fuel is expanded by expansion valve 10' for the second task, (b) freezing, chilling or air conditioning, (c) driving an impulse turbine and (d) providing fuel needed for the third task, absorption chilling or fueling a gas turbine or any other system described for 9 of FIG. 20. First, the liquefied gas is channeled into flexible duct opening 4 of superconductor electric cable 3 and out end of duct 4' to go collectively with other gases already used for super-cooling to be re-liquefied or alternatively directed to conduit 2, FIG. 20 to first provide "expansion" chilling or optionally, if the pressure is too low, to pressurizer similar to item 15, FIG. 21, if necessary, to build operating pressure. It is then directed through conduit 2 of FIG. 20 or, alternatively, the affluent goes directly from conduit 43 of FIG. 21 to conduit 2 of FIG. 20. It then goes to metering or expansion valve 10', pressure-drop-distributor 11' and distribution tubes (evaporator coils) 17a. The LNG gaseous mixture or LH gaseous mixture expands in expansion valve 10', pressure drop distributor 11, evaporator coils 17a, thus forming a refrigerator system, alternatively providing chill cooling for space air-conditioner, freezer-chiller, or for chilling through-put dry air or for driving an impulse turbine, all represented by 5, FIG. 20. Alternatively, the air is dried by 19 before chilling in 5 and the chilled air with increased flow is then passed to 9 where the air is further chilled by 9 (as 9 here represents an absorption chiller). Alternatively, the chilled air in duct 6 from chiller 5 is blown through register 25 for servicing one purpose. In this case, duct 6 is blocked at 26 and absorption cooler receives dry air from duct 24, off of duct 6a from desiccantor 18, after drying by desiccant 19 in 18. The air from duct 24 is then chilled in absorption chiller 9 and blown through register 27, to fulfill the same purpose or a different one from the chilled air that emitting from duct 25.

Alternatively, the compressed or liquefied gas is directed from the first chosen task to any task or tasks suggested and is not necessarily used in the order suggested.

After the liquefied gas has been used to a) cryogenically cool superconductor cable 3 and after the gas has emerged from b) the task of chiller box 5 (intake charge air for a gas turbine, or ICE, or refrigerating/freezing or providing air conditioning 25), the chemically unaltered gas is collected and directed by duct 7 through 8 which is a heat exchanger for heating the gas as for fueling a gas turbine or alternatively, 8 is a compressor for recompressing the gas fuel, and for suction to enhance cooling, and for c) fueling ICE or gas turbine 9. The gas is ducted by conduit 16 to fuel absorption cooler 9 or for one or more of the other tasks mentioned that consumes gaseous fuel, such as gas turbine, steam turbine, internal combustion engine (ICE), steam engine, space heating, etc.

The description of the desiccantor 18 system, FIG. 20, that air passes through for drying contains wheels 19', containing a desiccant, such as silica gel through which the air passes. The desiccant is dried by gas or electric burner 20 which is alternatively supplied gas fuel through tubing 23, fed from conduit 16. The dry air is then passed through chiller 5 and alternatively to register 25 where the cold air is dispersed to a room, etc., with duct 26 being closed. Alternatively, a second portion of dry air is fed absorption chiller 9 by conduit 24 where it is chilled by absorption chiller 9 and blown through register 27 for more cooling of perhaps another or same place or for another task. After firing (fueling) absorption chiller 9, the combusted gases are passed through vent or stack 12 through heat exchanger 13 where heat can be extracted for some other task. Alternatively, some of it is directed by duct 28 to the desiccator 18 to dry the desiccant, eliminating the need for burner 20.

System (B). Chilling charge air for internal combustion engines (ICE) in which 9 is an ICE or turbine and in which CNG, LNG or CH, LH both chills air charge and fuels engines. As in system (A), the liquefied and/or gaseous fuel (LNG, CNG, LH or CH), optionally cryocooling superconductor electric cable 3, is ducted by conduit 2 through optional pressure regulator 3 or 4 for adjusting the gas volume and pressure to the pressure needed for compression-expansion refrigerator 5 or impulse turbine and then the gas performs the end task of fueling an ICE 9, in which the fuel is consumed after first providing air charge cooling (by refrigerator 5) needed for the duty cycle of the system. First, the liquefied gas is channeled alternatively from conduit 43 of FIG. 21, optionally through superconductor duct 4, out duct exit 4' and to conduit 2 of FIG. 20 and to metering or expansion valve 10', pressure drop distributor 11' and distribution tubes (evaporator coils) 17a. As the gases expand in expansion valve 10', pressure drop distributor 11', the evaporator coils 17a perform task listed heretofore as that of chilling through-put dry air in chiller 5 through which duct 6a and 6 conducts air, alternatively dried by desiccantor 18, which air enters 9, here representing an internal combustion engine (ICE) wherein the chilled air charge is inleted into the air intake system or a carburetor or central port, or any place deemed appropriate.

The gases have been channeled, expanding through the evaporator 17a of chiller 5. The gases are then received collectively by conduit 7 and passed through item 8, which is a fuel heater, or a suction pump-compressor for recompressing the gas fuel for turbines, if found necessary. The gaseous fuel is then introduced and mixed with the chilled air from duct work 24, in item 9, now an ICE, preferably in the carburetor or air intake or at any place known to those in the art. The fuel is ignited in the engine to produce greater-than-normal power. The exhaust valve (not shown) opens and the exhaust gases are expelled through exhaust line 12, heat exchanger 13 and exhaust pipe 14 to atmosphere.

System (C) Chilling Air Charge for Rotary Turbine, where 9 in FIG. 20 is a gas fired turbine engine and 8 is an optional gas reheater or compressor, if needed. After cryocooling electric cable, the partly liquefied and/or gaseous fuel chills incoming charge air by chillers, drives an impulse turbine and fuels gas turbine. Alternatively, after the gaseous fuel has emerged from the task of expansion-chilling intake air for a turbine engine 9, it is collectively directed by duct 7 through 8, which is a heat exchanger for heating the gas, as for fueling a turbine. Alternatively 8 is a compressor for optionally recompressing the gas charge for fueling turbine, 9. The cold charge air is then mixed with the turbine fuel and combusted for a more dense charge. Chilling the air charge for a turbine produces greater steady-state power and hence will also change the factors for calculating the de-rate value when operating the turbine in a hot climate or high altitude.

System (D). The high pressure partly liquefied and/or gaseous fuel, after cooling superconductor electric cable 3, provides both compression chilling such as for air conditioning and/or as an impulse turbine in 5, FIG. 20 and also fuels boiler furnace for a steam turbine 9.

System (E). The high pressure partly liquefied and/or gaseous fuel, after cooling superconductor electric cable 3, provides compression chilling, such as for air conditioning and to drive an impulse turbine in 5, FIG. 20 and also fuels space heating furnace 9 or, alternatively fuels absorption chiller, also represented by 9.

Compressed or Liquefied Natural Gas or Hydrogen for Refrigeration Systems, Continued Discussion The percentage of natural gas or hydrogen mixed in the air charge for fueling an engine is as high as 15% of the total charge. If the first task in a co-generation is refrigeration or air conditioning, the pressure of the liquefied or compressed gaseous fuel, (natural gas, hydrogen, etc.) is adjusted to the ideal pressure, perhaps 280 psi, more or less, for most efficient expansion cooling and to be then used mixed with the air for fuel requirements.

Triple or quadruple co-generation of LNG or LH can provide (a) cryo-cooling superconductor electric cables, (b) compression expansion chilling and/or (c) driving an impulse turbine and (d) absorption chilling. Alternatively, it then provides for fueling of the associated power generator turbines for which the liquefied gas is serving as electric cable cryo-cooler or fueling any of the systems suggested for item 9 of FIG. 20.

Dual or Triple Use (Co-Generation) of Liquid Super-Coolant for Superconductor Cable Referring now to FIG. 23, there is shown an electric superconductor cable used for transferring electric current without resistance in the conductor. FIG. 23 shows skid wires C for protecting the cable. C-1 is electrical insulation; 2 is two layers of thermal insulation; 3 is superconductor tape (electric wire); 4 is the entrance port to flexible duct 4' for liquid coolant; 5 is liquefied natural gas (LNG) or liquefied hydrogen (LH) or, alternatively liquefied nitrogen (LN). In a co-generation system, liquefied nitrogen is capable of performing the first two tasks, that of cooling superconducting cable and compression expansion refrigeration as described herein for co-generation systems using liquefied natural gas or liquefied hydrogen. After task two, the nitrogen can be expelled into the atmosphere or can be re-liquefied.

Co-Generation

Either LNG or LH is a very efficient coolant for superconductor electric cables. LNG has a temperature of minus 296° F. while the temperature of liquid hydrogen is minus 423° F. Either can be used as (a) an efficient electric superconductor coolant and at the power plant (or taken off at sub-stations and piped to point of use), the exiting LNG or $LH_2$ can be utilized for (b) expansion cooling. (Liquefied nitrogen can perform tasks a and b only.) The same flammable gas, chemically unaltered, can be used for (c) driving an impulse turbine and thereafter for any of the following: (1) fueling gas fired absorption cooling, for (2) fueling gas fired engines (ICE generator), for (3) fueling gas fired turbine generator, for (4) fueling gas fired steam turbine generator and/or for (5) fueling gas fired heating boilers, etc. These uses are depicted and described for FIG. 20 through FIG. 23. The triple or quadruple service use of the LNG or LH is in cooling superconductor cable 3 in FIG. 23, then channeling the liquefied gas to an expansion chiller 5 in FIG. 20 and then for spinning a fueling or for gas fired absorption chiller 9, also in FIG. 20 or alternatively, for fueling (having consumed for) one or more tasks (a), (e), (f) and (g) above. Therefore, the same LNG or LH provides cryocooling and two other types of chilling FIG. 20 on the same volume of gas. In addition, the same coolant gas can first turn a turbine and then any or all of the following: fuel engines, turbines and boilers as described above and in FIG. 20 and FIG. 21.

To reiterate briefly, the coolant LNG, or LH can be put into flexible duct 4 of superconductor cable 3, FIG. 23 at the sub-stations and taken off at the power plant or taken off at other substations and piped collectively to the power plant and used there to chill (expansion) cool and drive the impulse turbine and then fuel the generators or gas turbines or ICE generators and/or be used as fuel for further chilling absorption. After using to super cool electric cable 3, the coolant liquefied gas can be ducted off at the power station or at a sub-station and transported to the plant in a conduit formed under another layer of insulation 2 and can be used or stored at any convenient place for use in cooling, firing turbines, etc., or can be stored, re-liquefied or sold. Alternative liquefied gas, after use as sub-coolant, can be taken off flexible duct 4' and ducted collectively in a separate conduit to the power plant or to whatever point the gas can be used or stored.

[1]Liquid nitrogen, boiling point of 77K (−320 degrees F.), can efficiently perform the first two tasks: (a) cryocooling superconductor electric cable and (b) provide expansion cooling as described above for LNG or $LH_2$ for FIG. 20 to FIG. 23. The nitrogen can then be vented to the atmosphere at conduit 29, FIG. 20 or may be re-liquefied.

[1]New Scientist, 13 Oct. 2001, vol. 172 #2312

A British publication[1] in an article entitled *The Big Chill* discusses the need for and the progress of transmitting electric power long distance by way of superconductor cables, which improves the efficiency of electrical transmission by at least ten percent. Among other statements, they say "Superconducting cables can carry at least three times the power of the copper it replaces" and "We are at the point where it is worth running superconductors, and everyone is beginning to realize it".

[1]New Scientist, 13 Oct. 2001, vol. 172 #2312

They further discuss the very significant progress made in researching the technology and have performed a large test project in Frisbie, a neighborhood in Detroit, Mich. In this system, the superconductor cables must be kept very cold. In the wrap-up of the article they state: "The remaining problem is that the refrigeration technology needed to keep the superconductor cable supplied with liquid nitrogen is not ready for commercial use. The cryogenic shed at Frisbie is reliable, but it was put together specifically for this project. It has lots of back-up systems to ensure that the project doesn't fail simply for lack of coolant, which means that it wouldn't be economical for general use."

The invention described for FIG. 20, FIG. 21 and FIG. 23 provides a very reliable answer to the problem of the cooling of superconductor cables with the added benefit of providing a system of co-generation, whereby liquefied flammable gases (and also compressed gases) can be used for many other purposes after being used for cooling the superconductor electric cables or compression chilling, etc. Also, compressed gases form a co-generation system as described for FIGS. 20 through 23.

Cold Air Supercharged Epitrochoid Rotary Engine Operating in Any of Operational Designs 1, 2, 3 or 4

Figure 24:
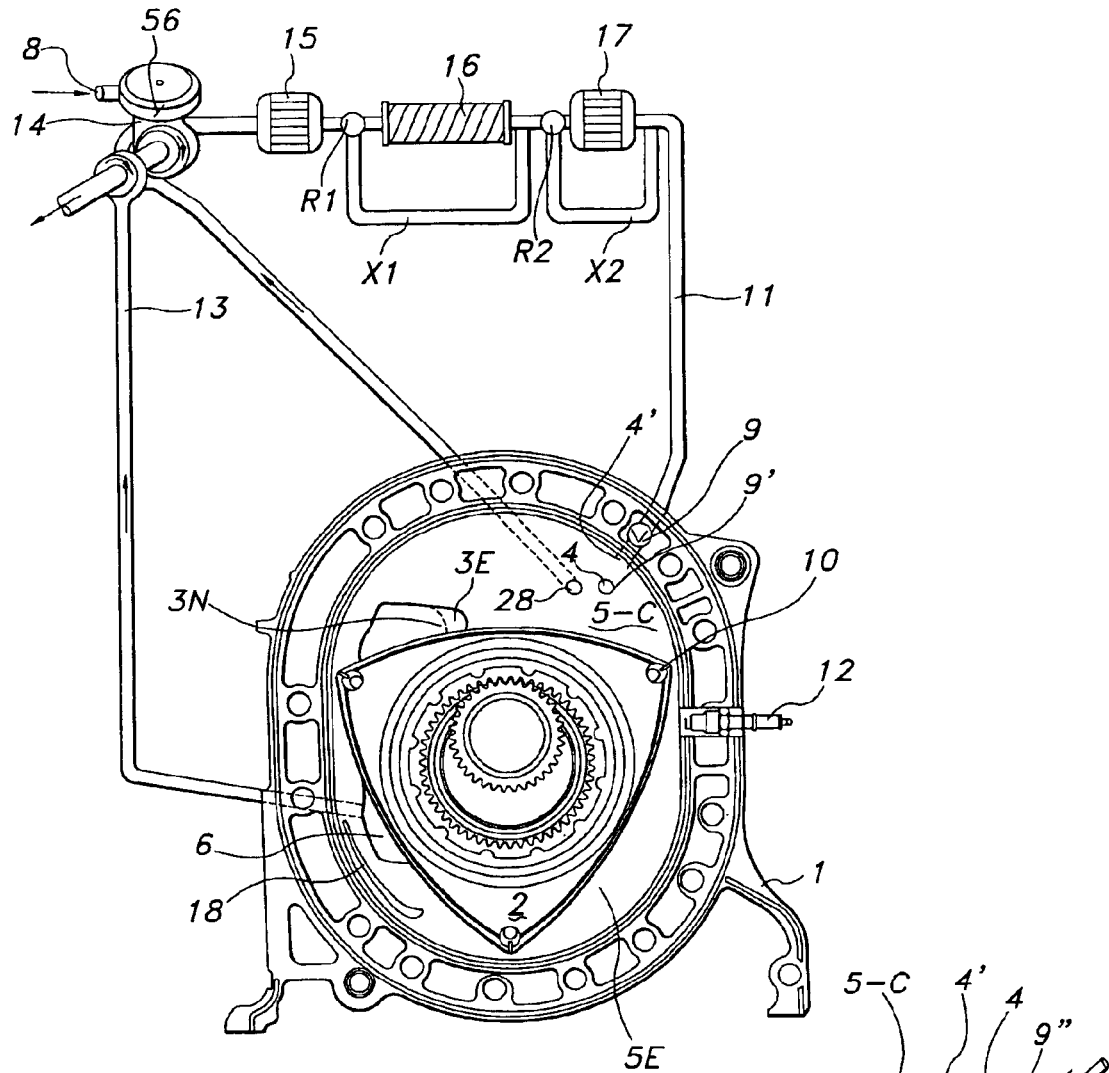
FIG. 24 is a perspective view (with portions in cross section or shown schematically) of a cold air supercharged rotary internal combustion engine in which the rotor rotates in a epitrochoid (Wankel) type motion, operating in a novel working cycle characterized by having a cool or chilled and more dense fuel-air charge for greater power and torque and efficiency and describes methods of supercharging the engine during the compression process and obtaining the advantages described.

Referring now to FIG. 24, there is shown a perspective view (with portions in cross-section and schematically) an improved epitrochoid (Wankel) type rotary internal combustion engine which is cold air supercharged and operating optionally in any of the four Operational Designs as described for engines of FIG. 2.

Figure 24B:
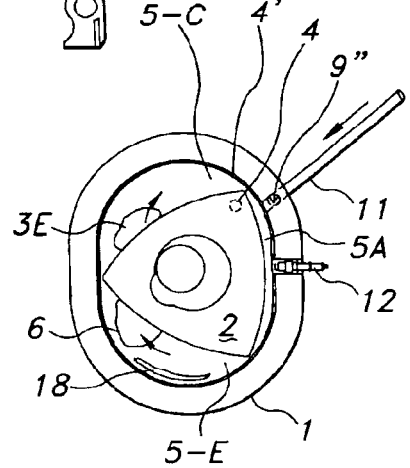

These Designs briefly described are:

Operational Design 1: In this Design, intake port 3N (dotted line) FIG. 24 with normal port size, the quantity of a primary air charge drawn into compression chamber 5-C through port 3N by rotor 2, is as in the normal Wankel rotary engine with the engine receiving as large amount of air or fuel-air charge as possible, which with the combustion chamber being of normal size, produces normal compression and expansion ratios. Compression of the charge begins as the following rotor lobe covers port 3N. During the compression process, a dense, cooled or chilled supplementary supercharging charge of air or fuel-air (received, compressed and cooled externally) is injected by valve 9 through port 4' or port 9', which optionally is fitted with an expansion valve 4, into the compression chamber 5-C, preferably late in the compression process. This provides cooling along with increased charge density and turbulence. Compression continues as rotor 2 continues motion until combustion chamber 5-A is at or near TDC, FIG. 24B. There, the charge is ignited, expanding into expansion chamber 5-E, producing rotor movement for the power, scavenging, air intake and compressing functions of rotor 2 lobes for great power, torque and efficiency with low polluting emissions. With exhaust port 6 placed in the wall of stator 1 end plate 18' and away from the periphery of the end plate as the expansion chamber is scavenged through port 6, centrifugal force spins the heavier fuel fumes away from and past the exhaust port 6 to be returned to combustion chamber 5A with the new air charge for further combustion. In this Design, compression and expansion ratios are equal.

Operational Design 2: In Design 2, the primary air or fuel-air drawn in the port 3N is again as normal for the epitrochoid rotary engine, to capture again a full charge, but the combustion chamber 5-A of FIGS. 24 and. 24-B is significantly larger in volume than that of current engines, thus producing a low substandard compression ratio for low heat-of-compression for the initial portion of charge. Also, in this Design, compression and expansion ratios are equal.

During the compression process of the primary air drawn through inlet port 3-N, a dense cooled or chilled air or fuel-air charge, which was received, compressed and cooled or chilled outside of the engine, is injected by valve 9, through port 4' or port 9', which can be an expansion valve 9'. Since the initial (primary) charge is a very low compression ratio, it produces small heat-of-compression. The cooled supercharging air or fuel/air charge, depending on the point it is injected into the compression stroke, also has a low "effective" compression ratio and combined with the cool initial charge, produces very small heat-of-compression for very low peak temperatures and pressures. Compression continues and at combustion chamber 5-A, near or at TDC, the charge is ignited causing the power, scavenging, compression and intake action of rotor 2, thus providing great power, torque and efficiency with ultra low polluting emissions, completing a power cycle.

Operational Design 3: In Design 3, the air intake port 3N has been elongated and is now port 3E (solid line) of FIG. 24. The port 3-E is significantly elongated so that when the rotor 2 passes the port, it begins to draw the air or fuel-air charge into the compression chamber 5-C at a later point in its travel, thus pulling in significantly less charge than that received by normal epitrochoid rotary engines. Hence, it produces a low, subnormal effective compression ratio, which in this Design results in an extended expansion ratio.

Now, the rotation of rotor 2 pulls in a light air or fuel-air charge and during the compression process, which begins when intake port 3E of FIG. 24 is closed by a trailing lobe of rotor 2 of FIG. 24, an externally pre-compressed, cooled air or fuel/air charge is injected by valve 9, through inlet port 4' or port 4, which is optionally an expansion valve 9'. Compression continues and when the combustion chamber 5-A is at TDC, the charge is ignited, causing rotor 2 to rotate producing great power and torque to the drive shaft, producing higher efficiency with ultra low polluting emissions. This Design is also selectively supercharged to any desired level even though the effective compression ratio is very low.

The inlet port 3N of FIG. 24 is optionally constructed in such a manner that it is selectively variable in length. The port is alternatively made as long or even longer than that of 3E as illustrated in FIG. 24. And FIG. 24-B. Alternatively, a sliding panel (dotted line 3N, FIG. 24) is so positioned behind port 3E that it can be moved by a servo system, controlled by ECM-27. Thus the length can be manipulated selectively from a normal inlet port length, as 3N of FIG. 24, to any length of 3E desired. This allows the "effective" compression ratio of the engine to be equal to the expansion ratio or it can be reduced to any desired compression ratio. The compression ratio can be varied infinitely and inversely to the expansion ratio. Port 3E of FIG. 24 is an illustration of the means of reducing the volume of primary air charge since the charge intake suction is delayed for low effective compression ratio for very low heat-of-compression and an extended expansion ratio. Also, the compression ratio is alternatively varied by fitting a variable control orifice control valve in outlet port 28 with proper activator, controlled preferably by ECN-27 of FIG. 2. By using normal intake port 3N and by opening outlet valve 28 and varying the percentage of fresh charge pumped in by rotor 2 which is expelled through port 28, the compression ratio can be varied from normal (compression ratio equal to the expansion ratio) to an effective compression for that portion of charge as low as 2:1 or 3:1. Then the very dense supercharging air, having a similar effective compression ratio, produces very low heat-of-compression with an expansion ratio which is extended inversely to the effective compression ratio.

Because of the cool or chilled air charge, the compression ratio can be varied from as much as 40:1 or higher to an effective compression ratio of 3:1 or 2:1 with the expansion ratio being inversely extended.

Operational Design 4: Design 4 describes another means of charging the engine and combustion chamber 5-A. Whereby inlet port 3 can be normal (3N) or elongated (3E), but using port 3N, the initial intake charge is pulled in and then during the majority of the compression process, is pumped out through an ancillary outlet valve 28. If mixed with fuel, the charge, which is expelled, is conducted from conduit 28 to the suction side of either compressor 14 or compressor 16 of FIG. 24, preventing the pollution of the air or the wasting of fuel. Optionally, a bypass valve $R_1$ and conduit $X_1$ are used to partly bypass compressor 16 and a similar bypass system, $R_2$ and $X_2$, together allow control of charge pressures and temperatures, preferably controlled by ECM-27 of FIG. 2, making spark, compression ignition or HCCI operation feasible for all fuels, including diesel.

In any Operational Design, the dense, cooled or chilled supercharged air is alternatively injected directly into the combustion chamber as depicted in FIGS. 24-B and 25-B where conduit 11 and injector valve 9" inject the air or fuel-air directly into combustion chamber 5-A. In this case, combustion chamber 5-A already contains the residual low effective compression effective ratio air or fuel-air charge, thus producing a doubly cool initial combustion process.

As most of the initial charge is expelled and ancillary port 28 is closed, preferably by rotor 2, inlet valve 9 (optionally, an expansion valve 9') opens and injects the pre-compressed cooled or chilled air or fuel/air charge into the compression process above the combustion chamber as it swings into TDC position to be sealed and ignited. Now, the charge is ignited by spark or HCCI, thereby depressing the rotor into the power, scavenging, intake and compression processes to complete a power cycle.

In this system, the pumping through an initial air or fuel-air charge is helpful in cooling the combustion chamber 5-A, making the task of controlling charge temperatures simpler, especially in HCCI engine operations.

The supplemental charge injection in this system is cold and has an "effective compression ratio of perhaps 2:1 to zero and being the entire working charge, is very adequate in density to provide superior power and torque with ultra low emissions.

Referring now to FIG. 24-B, there is shown a schematic illustration of the engine of FIG. 24, to show the combustion chamber 5-A in firing position and the optional methods of inducing air charges through ports 3E (charge B) and 4 (charge A) respectively for any Operational Design, the latter injected from conduit 11, combined and now in the combustion chamber 5-A. And also depicting the heavy unburned hydrocarbons 18 being moved to the outer side of the exhaust port 6 by centrifugal force and how they are sent along with the fresh charge to pass again through combustion chamber and ignition. In addition, FIG. 24-B shows an alternative scheme for injecting the supercharging air through conduit 11 into the primary charge in the combustion chamber 5-A. In this system, the secondary charge is injected directly by conduit 11 and valve 9" into combustion chamber 5-A of FIG. 24-B as combustion chamber 5-A rotates into TDC position.

Bypass system valve $R_1$ and conduit $X_1$ are optionally used to bypass wholly or partially compressor 16 or to through-put the entire charge. A similar bypass system, valve $R_2$ and $X_2$, offer optional through-put of charge or to wholly or partially bypass charge going through intercooler 17. Thus, charge pressure, temperature and density may be closely controlled by a control unit such as ECM-27 of FIG. 2. With ECM-27 monitoring temperatures and pressures in combustion chambers and adjusting all activator systems to the optimum for the ignition system used, allows spark ignition, compression ignition or HCCI operation for all fuels including diesel oils.

Figures 25, 25B:
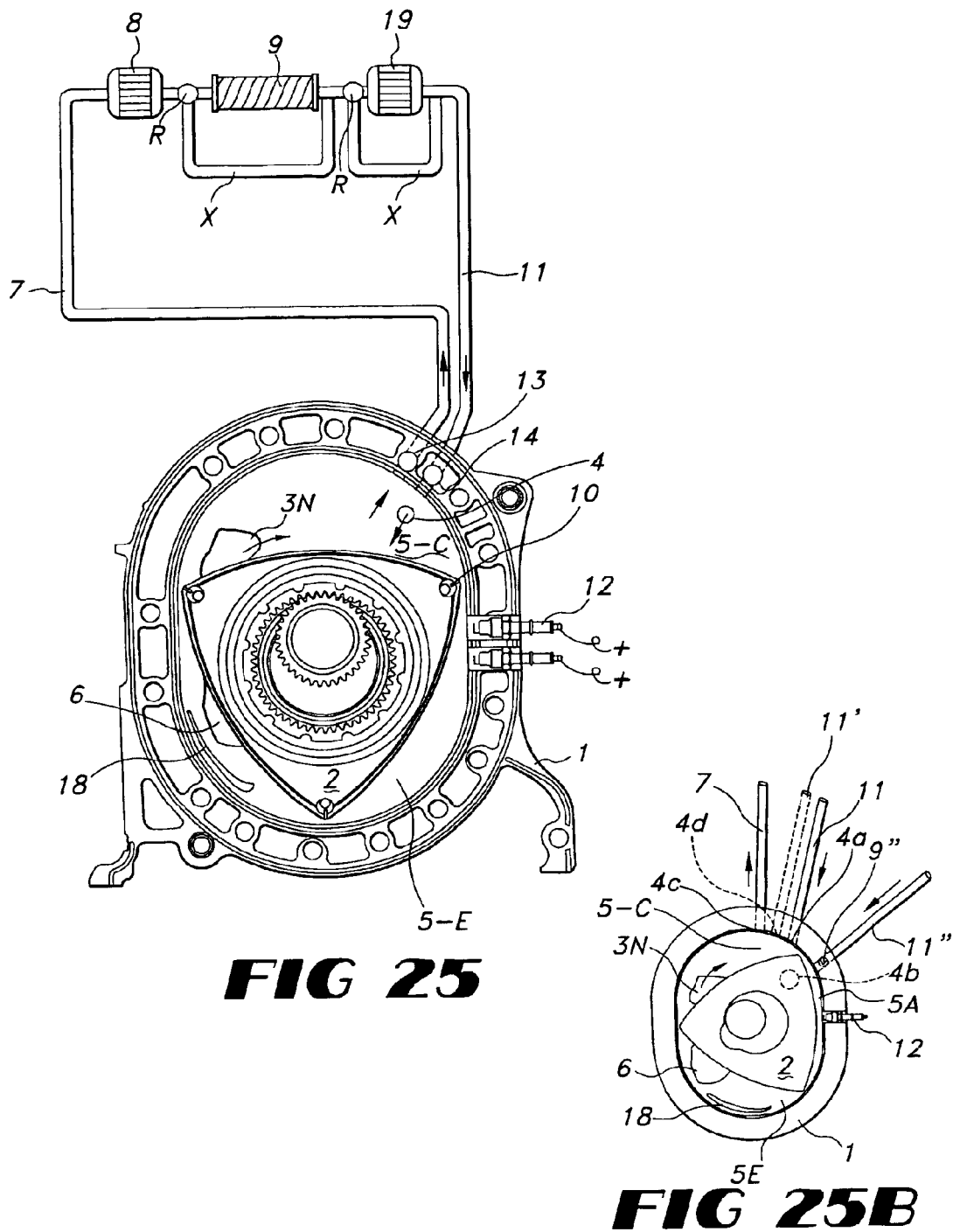
FIG. 25 is a perspective view (with portions in cross section or are shown schematically) of a rotary internal combustion engine in which the rotor rotates in a epitrochoid (Wankel) type motion and describes operating in a novel working cycle, characterized by double compressing and cooling of the fuel-air charge and describes methods of increasing charge fuel-air density and reducing its overall temperatures.

As described earlier and depicted in FIG. 24-B and FIG. 25-B, the supplementary charge is alternatively injected directly into combustion chamber 5-A by diverting or channeling conduit 11, carrying the cool dense supplementary charge to go directly to the chamber 5-A, being injected by valve 9", which is alternatively is an expansion valve after the order described for FIG. 2-B or FIG. 2-C.

As described heretofore, in this system, the homogenized diesel fuel/air mixture temperature is kept below auto-ignition temperatures until combustion chamber TDC position and is then ignited by spark or HCCI.

By keeping the charge temperature below the temperature[2] which will cause auto-ignition of diesel-air mixture (normally about 8:1 compression ratio), the increased density of the charge permits spark ignition with much increased power.

[2] The auto-ignition temperature of diesel fuel/air mixtures in current engines is that produced at about 8:1 compression ratio. The engines of the present invention, rotary or reciprocating design keeps the mixture temperature below that point until the point that ignition is desired.

In any of the Designs of the epitrochoid rotary (Wankel) type of FIGS. 24–25-B or the straight rotary engines of FIGS. 26–32, the supplementary and selectively supercharging air or fuel/air charge is optionally injected through inlet valve 9 which alternatively is an expansion valve 9' injecting compression "chilled" charge whose system provides an even cooler working cycle. Expansion valve 9' is discussed as expansion valve 10 in great detail, both means and methods in FIGS. 2-B, 2-C, 2-D, 6–10, 11-B, 18-B, 19-C and 19-D. The improvements of the new working cycle of the engines of FIGS. 24–32 is discussed in detail under the description of engine of FIG. 2 and includes:

Results
1) Low peak temperatures and pressures.
2) A denser charge.
3) Greater efficiency.
4) Greater power and torque.
5) Improved engine durability.

Advantages
1) Lower polluting emissions.
2) Increased vehicle range.
3) Longer engine life.
4) Greater reliability.
5) Lower RPM. (Due to greater torque, the engine of this invention will develop power and torque at one-half of the RPM of current technology epitrochoid rotary engines).

Supercharge density is selectively much greater than that of state-of-art engines, providing greater power and torque with increased efficiency while producing ultra low polluting emissions.

Referring now to FIG. 25, there is shown a perspective view (with portions in cross-section and schematically), a epitrochoid (Wankel) type rotary internal combustion engine operating in a variant system, different from the Wankel engine and the engine of FIG. 24. Optionally, the air or fuel-air charge is doubly compressed and cooled and with a much smaller than normal compression chamber 5-A, produces a significantly denser charge.

Operation

Epitrochoid engine 1 receives into compression chamber a normal or pressure boosted air or fuel-air charge through the normal size inlet port 3N. As soon as the charge is pulled in by rotor 2, port 3N is closed by rotation of trailing lobe of the rotor 2 and compression of charge begins.

Ancillary valve 13 is opened by pressure differential and allows the charge being compressed to exit and pass through conduit 7, intercooler 8, compressor 9, intercooler 19 (items 9 and 19 optional) and conduit 11 to return to inlet valve 14 and port 4 or to conduit 11" and valve 9" of FIG. 25-B. Inlet valve 14 remains closed until proper engine operating pressure has built in cooling compressing system 13 to 14. Compression continues on the small charge remaining in combustion chamber 5 after outlet port 13 is passed by rotor 2 and optionally with valve in port 13 closed. As soon as operating pressure has built in compressed cooling system 13-4, inlet valve 14 (which is optionally an expansion valve 10 in FIG. 2-B) injects the doubly compressed and cooled air or fuel-air charge into the compression chamber 5-C, adding this denser portion late to that charge remaining in the compression chamber 5-C, as soon as valve 13 is closed or passed by rotor 2, or at any time later, optionally even during combustion. (The latter case requires the charge to be injected into combustion chamber 5-A. Any of the ports of 4a–14 are optionally constructed through wall of stator 1 or through end plate 18 of stator 1).

Alternatively, compressor 9 and intercooler 19 may be eliminated and the primary simply cooled and reinjected into compression chamber 5-C or into combustion chamber 5-A through valve 9" of FIG. 25-B.

At the usual point that the current epitrochoid rotary engine is ignited (TDC), the charge is ignited by spark or HCCI. Because of the charge density and temperature control possible, the engine of this invention can be fueled by diesel-air mix and is ignited alternatively by spark or HCCI. HCCI is feasible due to the possibility of keeping the density up and the charge temperature under control by ECM-27 (see HCCI systems in FIGS. 19–19-D). For a denser charge, the inlet air is pressure boosted. Intercooler 19 is utilized or optionally partly bypassed through bypass system valve R and conduit X by which the charge temperature is adjusted and controlled preferably by ECM-27, FIG. 2.

At ignition, the extremely dense and temperature adjusted charge expands into expansion chamber 5-E turning the rotor and producing more power, torque and efficiency while reducing polluting emissions. Again, exhaust port 6, being placed in the end-plate of the stator and at a proper distance from the periphery of the end-plate, allows any unburned liquid fuel to be centrifuged along the outer edge of end-plate 19, FIG. 25-B and past exhaust port 6 to pass along with the fresh charge through combustion again to further reduce HC emissions.

In the engine of FIG. 25, the effective compression ratio is greatly reduced, producing an extended expansion ratio, but with normal to heavier charge-weight.

Referring now to FIG. 25-B, there is shown a perspective of the engine of FIG. 25, showing alternate inlet ports for the doubly compressed and cooled charge air or fuel-air mix. The air inlet port 3N is as in a normal epitrochoid rotary engine. Outlet port 13 to conduit 7 is placed near the end of rotor travel in compression chamber 5-C. Inlet port 4-C shows one choice with the charge leaving the chamber 5-C through port 4-C and conduit 7. Port designated 4-d provides a later point of ejection. Conduit 11 shows the conduit opening into port 4a in stator wall or alternatively, into port 4b (in phantom) before diminutive combustion chamber 5-A is TDC and now blocked by rotor 2 being in firing position. An alternative point of introducing the doubly compressed charge is to have port 4a from conduit 11 lead to the combustion chamber 5-A at the point that ignition is occurring.

The advantages of the engine of FIG. 25 and FIG. 25-B are the same as those of FIG. 24 engine, but producing somewhat less power.

Figure 26:
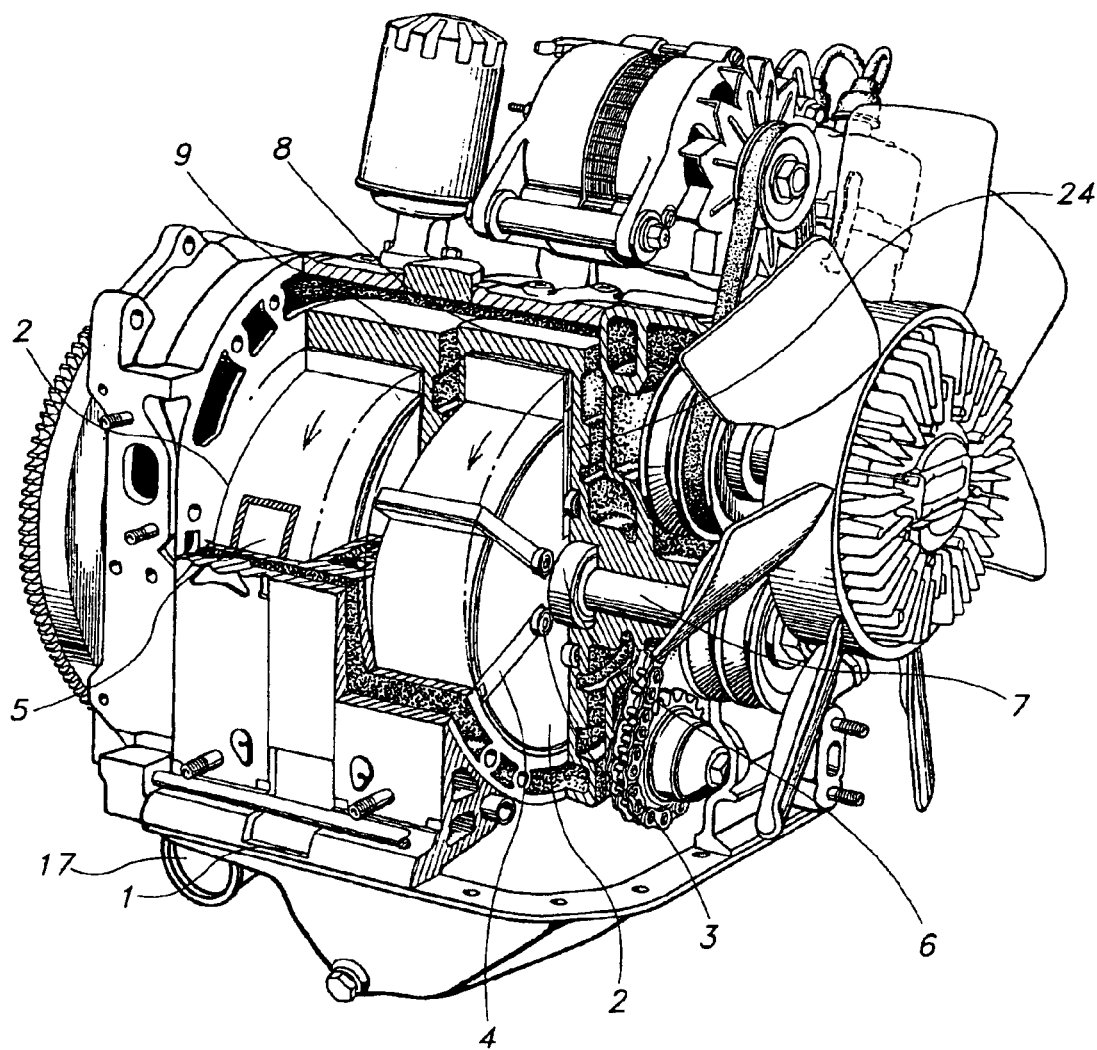
FIG. 26 is a perspective view (with portions shown cut away) of a cold air supercharged rotary internal combustion in which the rotor(s) rotates on a central axis, operating in a unique working cycle, characterized by reducing compression temperatures, increasing power, torque and efficiency with ultra low polluting emissions.

Referring now to FIG. 26, there is shown in perspective and cut-away view of a rotary internal combustion engine in which vanes 4 in compressing and expanding, rotate on a central axis. Illustrated in this figure is the complete engine with the principal components shown. The engine is comprised of FIGS. 26, 27, 28 and 29 which will be described in detail as well as will the method.

There is shown engine housing 1, compressor rotor 2, expander rotor 2-B, vanes 4, vane seals 24, vane guide rollers or "trucks," 3, compressor stator 8, expander stator 9, combustion chamber 5, exhaust port 17, main bearing 6, drive shaft 7. Other principal components are illustrated and disclosed in FIGS. 27, 28 and 29.

Figure 27:
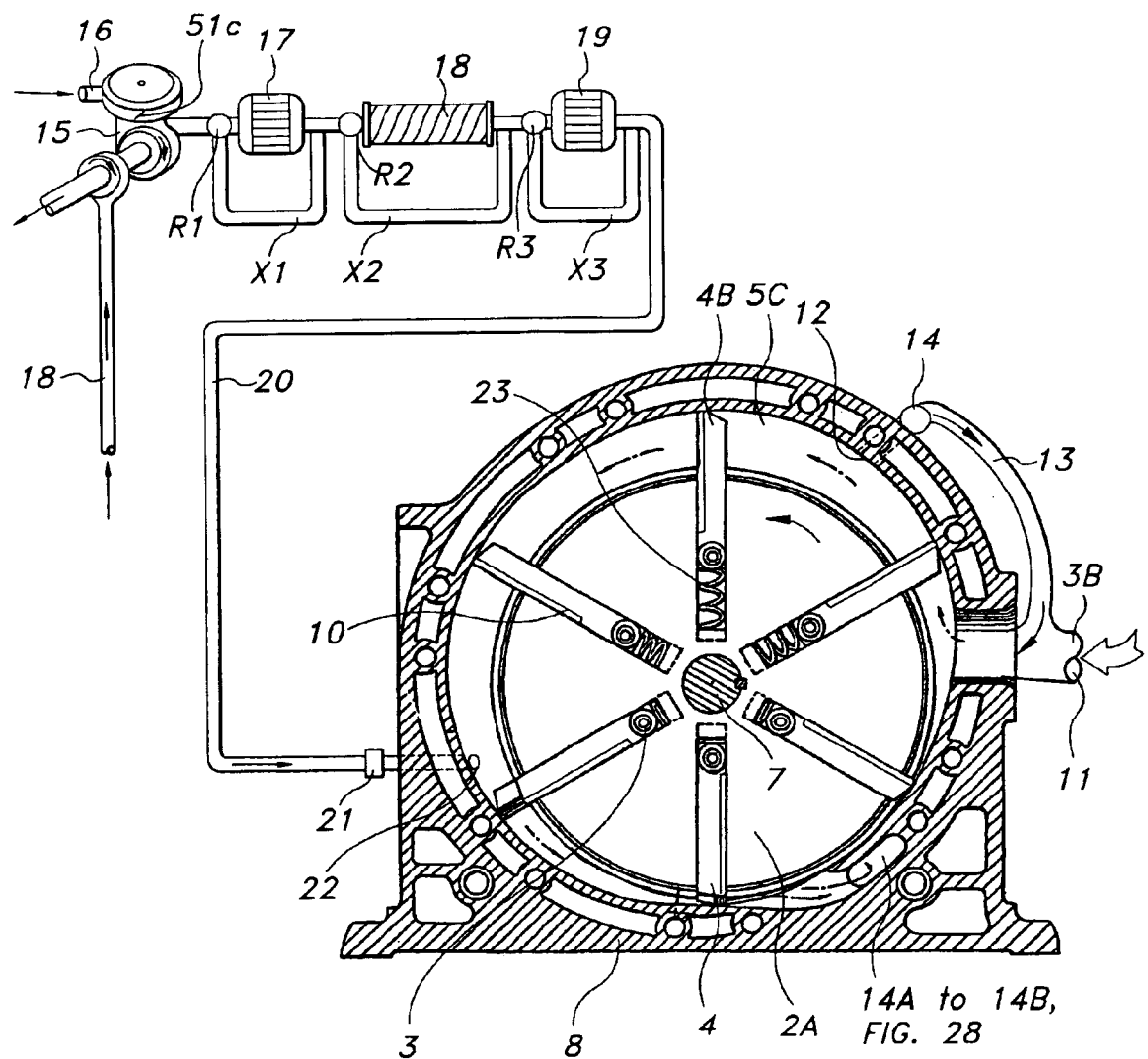
FIG. 27 is a cross sectional view of a compression section of the engine of FIG. 26, showing means and methods of reducing and varying "effective" compression ratios and of selectively extending the expansion ratio and of cold air supercharging the engine during the compression process and relieving valve tips from rubbing friction.

Referring now to FIG. 27, there is shown in a cross-section and a partially schematic view of the compressor section of the rotary internal combustion engine of FIG. 26. The important components are compression chamber 5-C, stator 8, rotor 2-A, central shaft 7, vanes 4, vane seals 10, vane guide rollers 3, air intake port 11, compression ratio adjustment port 12, valve for compression ratio adjustment conduit, compression ratio adjustment conduit 13, air intake port 3-B, vane loading springs 23, exhaust conduit 18 from 18 of FIG. 28, turbocharger 15, air intake 16, carburetor 51-C, intercooler 17, compressor 18, intercooler 19, intercooler bypass system valve $R_1$, conduit $X_1$, compressor bypass system valve $R_2$ conduit $X_2$, intercooler bypass system valve $R_3$ conduit $X_3$, conduit 20, injection valve (optionally an expansion valve 21), supercharging air injection port 22, outlet port 14-A, leading to optional valve 14-B in FIG. 28, leading to combustion chamber 5-A and port 14-C, leading to combustion chamber 5' in rotor 2-B.

Figure 28:
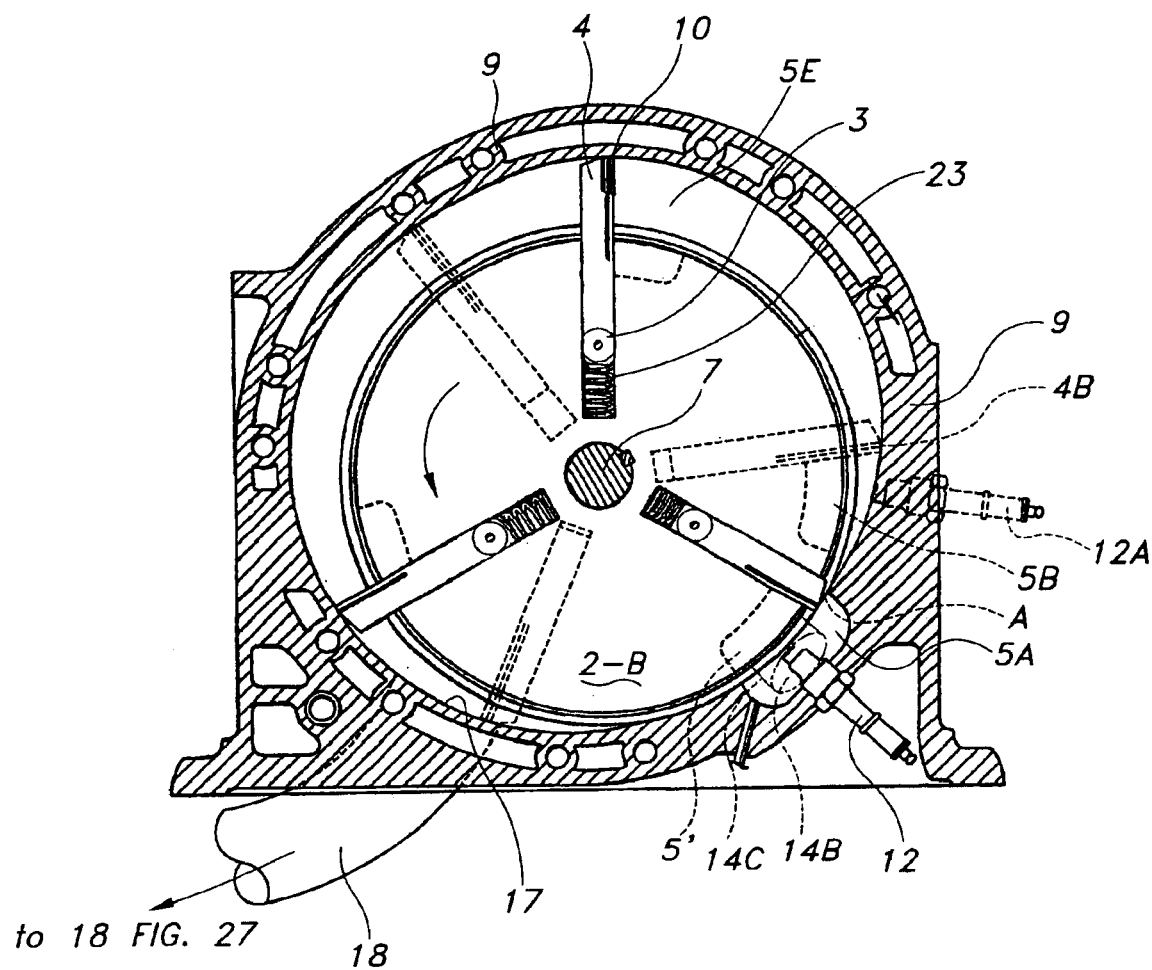
FIG. 28 is a cross sectional view of the expansion rotor and combustion chambers of the engine of FIG. 26, showing means and methods of sealing the combustion chambers and obtaining three power pulses for each rotor rotation

Referring now to FIG. 28, there is shown a cross-section of the expansion rotor assembly of the rotary internal combustion engine of FIG. 26. The principal components are intake valve 14-B receiving air or fuel/air charge from port 14-A in FIG. 27, spark plug 12, optional spark plug 12A, rotor combustion chamber 5', alternative combustion chamber 5-B, rotor 2-B, vanes 4, alternative vanes 4-B, vane seals 10, vane guide rollers 3, vane loading springs 23, exhaust port 17 and exhaust conduit 18 (goes to conduit 18 of FIG. 27).

Method of Operation

Compressor section of FIG. 27 receives charge air or fuel-air charge from two sources 1) Port 3-B and conduit 11 receives primary air or fuel/air mix at atmospheric or boosted pressure. 2) A secondary supercharging charge portion of air is inducted through a compressor in this figure, a turbo-charger 15, which receives atmospheric air through port 16 which is optionally mixed with fuel which is optionally carbureted by 15-C. The supercharging air or fuel-air charge taken in and compressed by compressor 15 now passes through a conduit to intercooler 17. Then after cooling, it is received and highly compressed by compressor 18 and then conveyed to intercooler 19 to conduit 20 and to high pressure valve 21 and to intake port 22, to be injected by intake valve 21 into the primary air charge while it is being compressed. Intake valve 21 is alternatively an expansion valve such as valve 10 of FIG. 2-B.

Now, the primary air intake port 3-B is fitted with an adjustable volume air return which is used to adjust the compression ratio of the engine from normal (equal to the compression ratio) to a compression ratio which is less than the expansion ratio. The purpose of this system is to selectively and alternatively adjust valve 14 to allow conduit 13 to return some part of the air or fuel-air charge back into suction port 3-B as rotary rotor vanes 4 pull in atmospheric pressure or pressure boosted air. This, when used, further reduces the "effective" compression ratio for the primary charge.

As vanes 4 rotate, compression of the primary charge begins at inlet conduit 11 of port 3-B, if valve 14 is closed. If valve 14 is open at all, the "effective" compression ratio of this initial portion of charge is low which creates small heat-of-compression for this primary charge. (The number of vanes 4 in compression rotor 2-A would be of any magnitude above one and would probably be three or four in number).

Rotor 2-A continues the compression process toward high pressure intake valve 21, which is alternatively an expansion valve on the order of valve 10 of FIG. 2-B engine. As a vane 4 approaches port 22 and at the appropriate moment before vane 4 passes port 22, intake valve 21 injects the very dense, cooled or optionally "chilled" air or fuel-air "supercharge" into the compression chamber 5-C, bounded on the backside by a vane 4 and which charge is rotatably compressed and expelled out port 14-A, which is optionally closed by valve 14-B between port 14-A of FIG. 27 and combustion chamber 5-A of FIG. 28. The charge then goes through port 14-C, FIG. 28, which optionally constitutes a sliding valve between stator combustion recess 5-A and rotor combustion chamber 5'. In this case, combustion chamber 5-A is charged and ignited as it rotates past port 14-C.

Combustion System A: Now, in FIG. 28, optional outlet valve 14-B opens and closes at such a time that vane 4 seals the front side of combustion chamber 5' and the back side of the combustion chamber 5' is sealed by close proximity between stator 9 and rotor 2-B. This is described in detail for FIG. 30. The fuel-air charge is ignited by spark plug 12 for the power pulse while combustion chamber 5' is open to plug 12.

Combustion System B: As described for engine of FIG. 30, compression chamber 5-B accepts a charge as it rotates past port 14-C. As back side of combustion chamber 5-B is sealed by close proximity to rotor with back side of combustion chamber 5-B, spark plug 12-A ignites charge for power pulse. In System B, the charge is ignited, preferably by spark, the exploding gases now expand against leading vane 4 with the pressure contained on the back side by the closeness of the surface of stator 9 surface to the surface of the rotor 2-B which can sealed by a sliding seal on rotor or stator. Therefore, the only expansion that can occur is against vane 4 as it extends as the space increases in expansion chamber 5-E on the lead side. The volume of expansion space increases until vane 4 passes exhaust port 17 as the exhaust gases are expelled. The difference between compression ratios and the expansion ratio can be adjusted by changing the amount of air which is passes back from outlet port 12 to inlet port 3-B of FIG. 27. The engine of FIG. 26 always operates with equal compression and expansion ratios, except when valve 14 of FIG. 27 allows part of the primary charge to return to inlet port 3-B.

The engine can be supercharged far beyond the density allowed by conventional engines while producing, with great turbulence, low peak temperatures and pressure, assuring very low polluting emissions.

The temperature and pressure to and in the combustion chamber 5' and 5-B can be adjusted by speed control of compressor 18, FIG. 27, the amount of charge sent through or bypassed coolers 17 and 19 and compressor 18, selectively utilizing bypass systems of components, with R valves being controlled by ECM-27. Friction is reduced to near zero due to close tolerance rollers and guide grooves and extension springs. Vane tips, which are preferably only three per rotor, will not touch stator surfaces, traveling with two mils clearance. Vane seals 10 are alternatively used with very light rubbing friction. The system described eliminates problems with rubbing surfaces. The engine of FIG. 26 provides all of the advantages stated for the epitrochoid rotary engine of FIG. 24.

Figure 29:
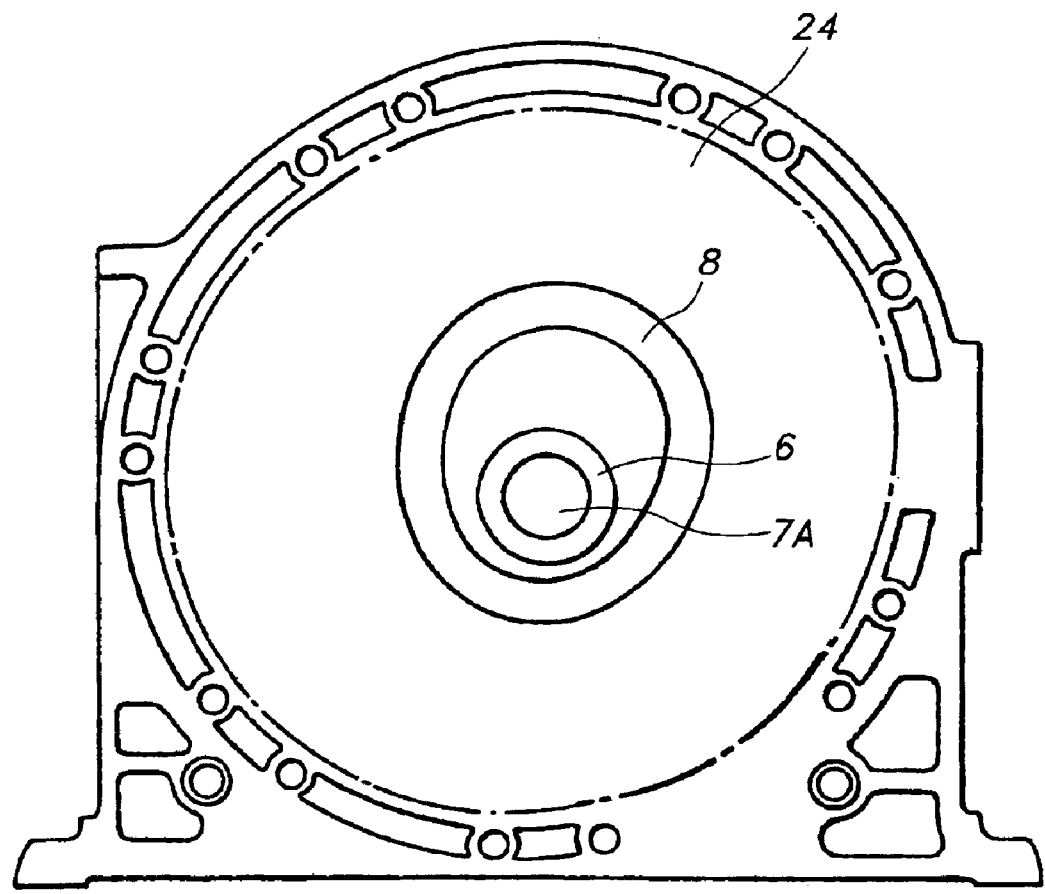
FIG. 29 is a perspective view of one of two compressor section end-plates, showing track that valve guide rollers follow to prevent valve tips from rubbing the inside of the stator of the engine of FIG. 26.

Referring now to FIG. 29, there is shown a perspective view of one of two stator side or end-plates 24 of the internal combustion rotary engine of FIG. 26, showing vane guide roller guide track 8, drive shaft opening 7 and bearing assembly 6.

Figure 30:
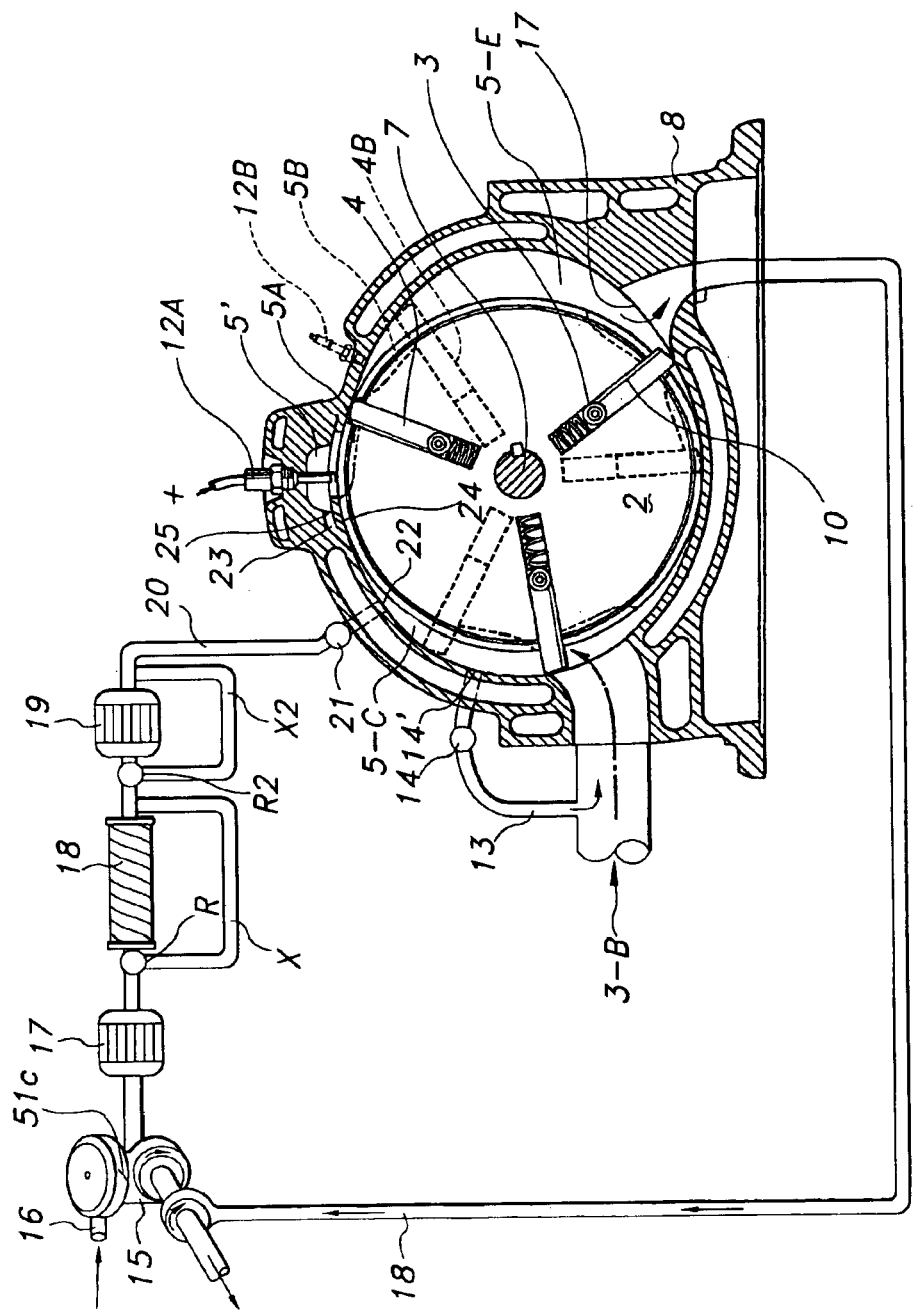
FIG. 30 is a perspective view (with portions in cross section and schematically) of a cold air supercharged rotary internal combustion engine in which rotors rotate on a central axis, the vane tips traveling, guided in an elliptical path and showing means and methods of supercharging the engine during the compression process after the engine has received an initial low "effective" compression ratio fuel-air charge.

Referring now to FIG. 30, there is shown a perspective view, with sections in cross-section and other sections schematically, of an internal combustion engine with rotor(s) rotating on a central axis having an elliptical stator and an elliptical path for vane tips which are guided to prevent rubbing against stator housing and which provide charge intake, compression, combustion and scavenging in a single rotor and stator for each power unit.

The engine takes in a primary fuel-air charge characterized by having a low "effective" compression ratio and low heat-of-compression for that portion of charge followed by the injection of a supplementary, supercharging air portion late in the compression stroke. The secondary charge, also having a low "effective" compression ratio for low heat-of-compression producing totally very low heat-of-compression.

Method of Operation

The engine 1 receives the air or fuel-air mix in two portions from two different sources and are introduced at different times.

1) For the supercharging air, a compressor 15 receives air through inlet port 16 and optionally mixes the air with fuel in carburetor 51-C. The air or fuel-air charge is directed by conduit through intercooler 17, through compressor 18, intercooler 19, conduit 20 to injection valve 21 which is alternatively an expansion valve such as 10 in FIGS. 2-B and 2-D. The secondary, supercharging air is highly compressed, cooled or "chilled" before injecting by valve 21 into the primary air stream late in the compression process of the primary air or fuel-air in compression chamber 5-C. The late injection of the cool, high pressure, supercharging charge into the relatively cool primary charge assures great charge density, turbulence and efficiency for economical and enduring operation with ultra low polluting emissions.

2) For the primary air, atmospheric or pressure boosted air of fuel-air mix is drawn into compression chamber 5-C by way of air inlet port 3-B by suction action as vane 4 rotates past air inlet 3-B. If valve 14 on air return 13 is closed, compression begins as soon as vane 4 passes inlet port 3-B.

If valve 14 is slightly or somewhat open, part or all of the charge passed before vane 4 is returned to suction inlet of 3-B, thus reducing the "effective" compression ratio even further than illustrated.

The compression chamber 5-C of the elliptical stator 8 is illustrated as being of lower volume than that of the expansion chamber 5-E, therefore, always producing an "effective" compression ratio lower than the expansion ratio. Alternatively, both compression chamber 5-C volume and expansion chamber 5-E volume are equal for equal compression and expansion ratios. Any variation of these two volumes are within the scope of the invention. Air return conduit 13 and adjustable valve 14 allow the selective choice of compression ratios on engines with equal volumes of the two chambers or any variation ad infinitum.

Combustion Systems

Preparation and presentation of the air or fuel-air charge to a combustion chamber is similar for two different combustion systems.

Combustion System A: The primary air charge is received and compression begins and continues as rotor 2 rotates preferably with the very low "effective" compression ratio described here for low heat-of-compression. During the compression process in chamber 5-C, a vane 4, in compressing its air charge, approaches inlet of 22 injector valve 21, which is alternatively an expansion valve of type 10, FIG. 2-B or 2-D. Valve 21 opens and injects through port 22 a dense, cooled or "chilled" supercharging air into the flow of the cool primary air or fuel-air charge, just before vane 4 passes. Compression continues and as vane 4 nears outlet port 23, which is fitted with a valve 25 which optionally is a one-way valve. The entire charge, initial and supercharge combined, is pressed through port 23 and valve 25 into combustion recess 5'. (A seal 24 created by close proximity of rotor 2 and stator 8, prevents compressed charge passing between rotor 2 and stator 8, forcing it to pass into port 23 through valve 25). As rotor motion continues, vane 4 rotates past stator recess 5' and combustion chamber 5-A in rotor 2 as the charge is ignited by spark plug 12-A or HCCI while chamber 5-A is open to chamber 5'. The combustion chamber 5-A, as it passes opening to combustion recess 5' and is ignited, is sealed on its following side by seal 24. The forward end of combustion5-A is sealed against pressure leak by the extending vane 4 and its optional vane seals 10. The charge expands against vane 4 in chamber 5-E, producing power, scavenging, air intake and compression of charge.

Combustion System B: An alternate method of introducing and igniting the fuel-air charge of engine of FIG. 30 is as follows: The chief difference in combustion system B is that the combustion chamber 5-B (in phantom) in rotor 2 rotates past opening of combustion recess 5' in stator 8 until the combustion chamber 5-B is filled with charge and the back side sealed by proximity with rotor 2 (see FIG. 30) and the charge is ignited by plug 12-B.

Both air charges have been prepared and during the compression process, the primary air charge has been combined with the supercharging air and together have been made more dense and cool by the injection of the supercharging air. Together, they have been pumped through port 23 into combustion recess 5', ready for induction into combustion chamber 5-B. The combustion chamber 5-B of FIG. 30 (in phantom) in rotor 2-B is immediately behind and opens on its leading end against vane 4-B (also in phantom). Vane 4-B rotates past combustion chamber opening 5' which opens to face of rotor 2 and opening of combustion chamber 5-B, to inject charge into 5-B. In this system, spark plug 12-A, combustion chamber 5-A and vane 4 are replaced by their counterparts 12-B, 5-B and 4-B or can function in conjunction with them if spaced equal distance apart. Chamber 5' in stator 8 is open on the underside or has a port 5" slideably in contact with the outer surface of rotor 2, which with the underside of chamber 5' being sealed by its proximity with rotor 2, injects fuel-air charge into combustion chamber 5-B as in rotating vane 4-B passes port 5" to chamber 5' which opens to combustion chamber 5-B to inject charge from port of chamber 5'. Now, in the alternate system B, combustion chamber 5-B has passed the opening to chamber 5' with the following end of combustion chamber 5-B being sealed by close proximity of stator 8 inter surface and rotor 2 top surface, just after closure of chamber 5-B by stator 2. The leading end of combustion chamber 5-B is sealed by further extension of vane 4-B. At the point where the back-side of chamber 5-B is sealed by the proximity of stator inter facing, the fuel-air charge is ignited by spark plug 12-B, producing the power surge by providing pressure against vane 4-B which has a larger surface area than the back side of combustion chamber 5-B and is movable. Rotor 2 rotates with vane(s) 4-B extending further into expansion chamber 5-E, providing optionally an extended expansion ratio.

Method of Operation

Air is received by engine of FIG. 30 from two sources and put into the engine combustion chamber at two different times and at two different pressure levels and temperatures.

The primary charge enters compression chamber 5-C of stator 8 at inlet port 3-B as vane 4-B rotates by inlet port 3-B, drawing in air or fuel-air charge. If valve 14 in conduit 13 is open, even partly, some or all of the air pumped to that point is returned to inlet port 3-B, further reducing the "effective" compression ratio of the engine, which when ignited, expands the charge to a larger than normal volume, producing an extended expansion ratio. The compression chamber 5-C can be smaller than the expansion chamber as shown in FIG. 30 or the two chambers can optionally be equal in volume or the compression chamber 5-C may be of larger volume. The first situation producing an expansion ratio greater than the compression ratio and with the equal volume chambers producing equal compression and expansion ratios, excepting that with equal or larger volume compression chamber 5-C, if valve 14 is wholly or partly open, the compression chamber will selectively produce an "effective" compression ratio less than the expansion ratio for an extended expansion ratio.

(The "effective" compression ratio is derived by dividing the volume of the expansion chamber by the volume of charge that produces heat during compression. That is, the volume of the compressing charge at the point where it begins to be compressed (producing heat), divided into the volume of the expansion chambers).

The preferably low compression air or fuel-air charge is being compressed in compression chamber 5-C. Some time during the compression process, preferably late, at a point before vane 4-B passes supercharge inlet port 22, a very dense, cooled or chilled air or fuel-air charge is injected into the compression chamber 5-C ahead of vane 4-B. Compression continues and the entire charge is compressed into port 23 through optional valve 25. Adjacent surfaces of rotor 2 and stator 8 are sealed against gas pressure at point 24 to just past port to to combustion recess 5' and combustion chamber 5-B, which follows adjacent to vane 4-B, is filled with high pressure charge as rotor turns. In combustion system A, a one way valve 25 at channel 23 allows the charge to be ignited at the point the back side of combustion chamber 5-A is sealed at point 24 by proximity of stator and rotor surfaces. The leading side of combustion chamber 5-A is always sealed by extension of vane 4. In combustion system B, the one way valve in channel 23 is optionally eliminated, allowing vane 4-B to rotate past combustion recess 5' outlet 5" and combustion chamber 5-B to be filled and the charge ignited as soon as back-side of combustion chamber 5-B is sealed by stator 8 and rotor 2 inner surfaces meeting. The charge in system B is now expanding against the larger and less resistant surface vane 4-B for the power pulse.

In system A or B, the rotor is now rotating with vanes 4, or 4-B, extending further into compression chamber 5-E. Then at near the point the vanes are completely retracted, the stator 8 and vanes 4 come together with rotor 2 and scavenge the power chamber of exhausted fuel-air charge through port 17 and conduit 18. The exhaust is now preferably ducted by exhaust conduit 18 to drive turbine on turbo-charger 15 which pumps air into the engine's supercharging system.

The total charge is now more dense than that of current engines, and with low "effective" compression ratios for both portions of charge is much cooler, producing greater power and torque and efficiency with ultra low polluting emissions.

The supercharging portion of air may be "compression chilled" by expanding through an expansion valve 10 as described for engines of FIG. 2-B and FIG. 2-C. This further reduces polluting emissions and increases power.

In all Designs, the first stage of compression of the supercharging air is followed by (a) air intercooler with optional bypass system consisting of a valve R and conduit X and (b) another compressor with its optional bypass system and (c) another intercooler with its optional bypass system. These are followed by a conduit 20 to convey the now dense and cool supercharging air or fuel-air charge to an injector valve 21 which injects the supercharging air through port 22 into the cool primary air charge during the compression process.

Control valves R and injector valves 21 or 10 in all Designs are alternatively operated and controlled by signals received by ECM-27, FIG. 2 which then adjust valve controls to produce charge density and temperatures to that required for spark ignition or HCCI operation.

The value of the new working cycle of the engine of FIG. 30 has been discussed under the description of the engine of FIG. 25 and 26 which produce the following results and advantages:

Results
1) Low peak temperatures and pressures.
2) A cool and much denser fuel-air charge.
3) Higher efficiency.
4) Greater torque.
5) Improved engine durability.

Advantages
1) Lower polluting emissions.
2) Increased vehicle range.
3) Longer engine life.
4) Greater reliability.
5) Lower RPM (due to increased torque)

The engine of this invention will selectively develop greater torque and power than engines of current technology while providing increased fuel efficiency and lower polluting emissions.

Figure 31:
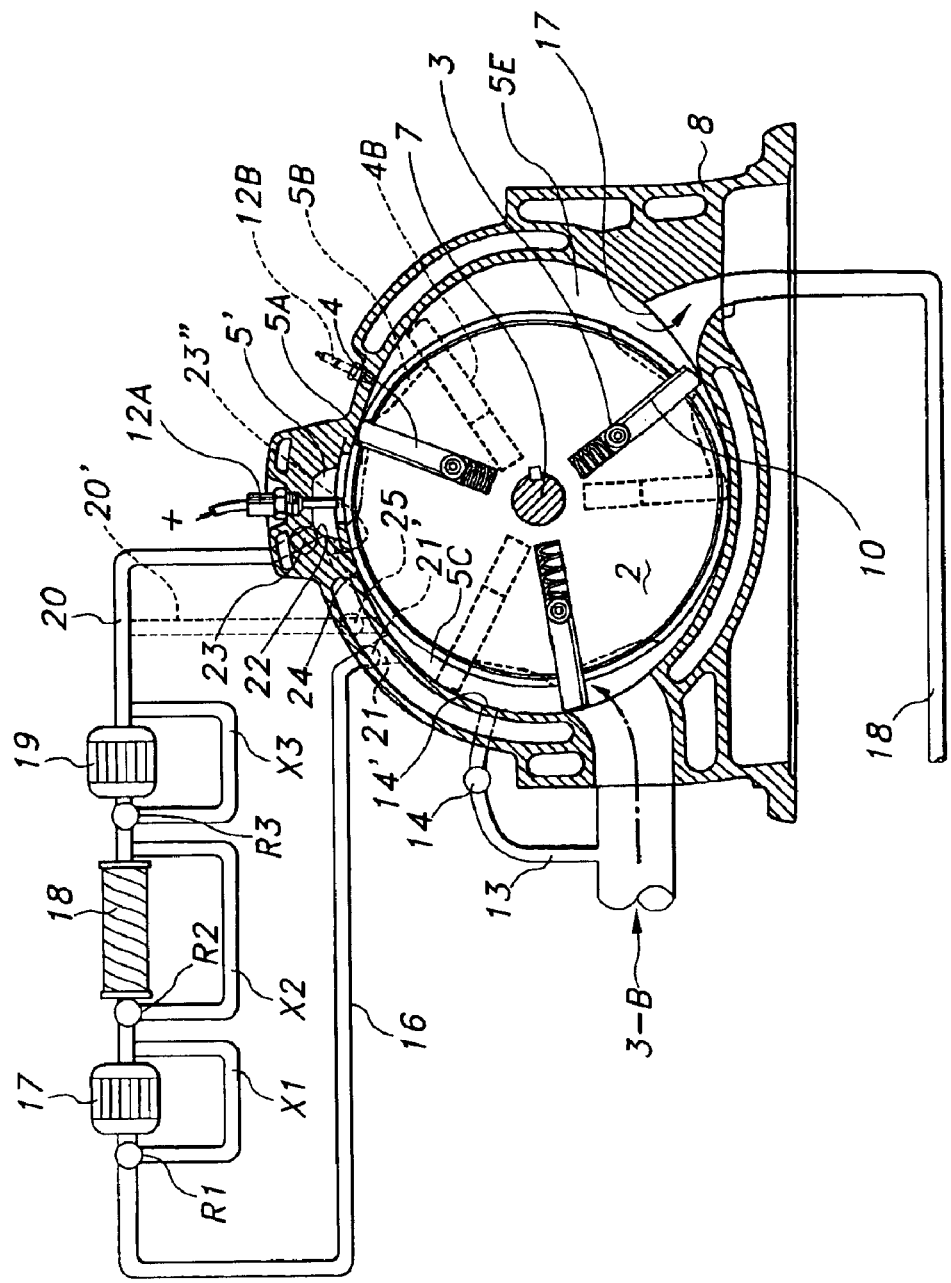
FIG. 31 is a perspective view (with portions in cross section and schematically), showing means and methods by which an air charge is received by an engine and cooled during the compression process is cooled and compressed and cooled a second time and then introduced into the combustion chamber and fired with an extended expansion ratio.
Figure 32:
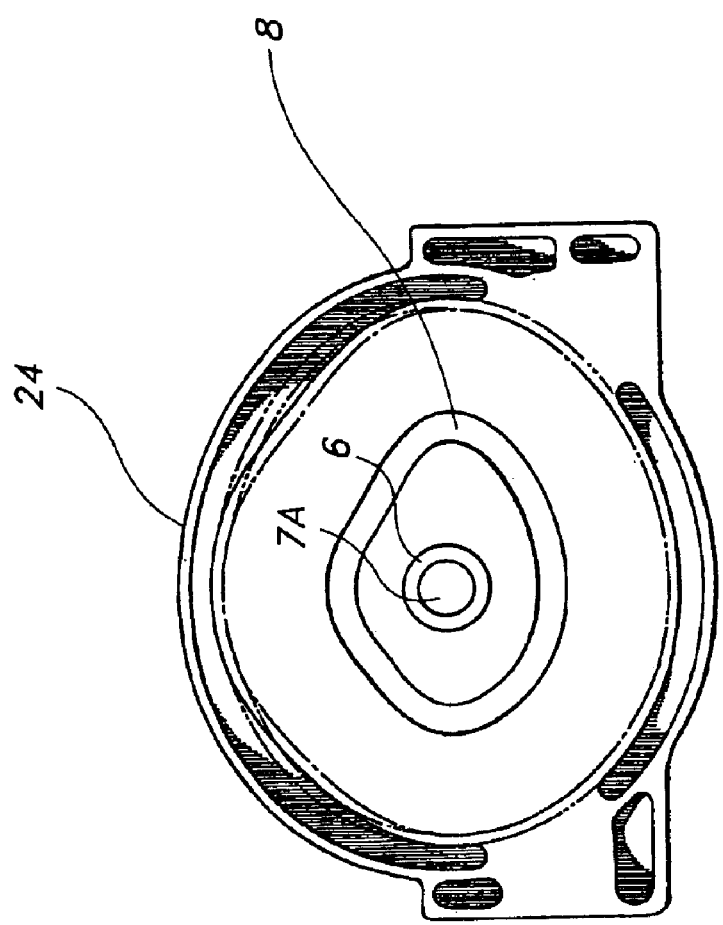
FIG. 32 is a perspective view of one of two end-plates of the stator of engines of both FIG. 30 and FIG. 31, showing the "raceway" or guide groove for the vane guide rollers.

Referring now to FIG. 31, there is shown a perspective view, with portions in cross-section and others schematically, of an air injected rotary engine in which a rotor 2 rotates on a central axis, having an elliptical stator 8 and an elliptical path for the vane 4 tips to follow. Vane tips 4 are chastened by track 6, FIG. 32 which guides the vane tips within 2–3 mils of the stator's inner surface, thus preventing any "rubbing" friction in the engine. As in engine of FIG. 30, vane seals are lightly spring loaded. The engine operates much in the fashion of engine of FIG. 30 in that an adjustable compression ratio system provides variation in volume of the compression chamber 5-C as compared to the volume of the expansion chamber 5-E, whether or not volumes of compression chamber 5-C and expansion chamber 5-E are equal, which volume ratios are optional.

Doubly Compressed—Doubly Cooled

The chief difference in the engine construction operation from engine of FIG. 30 is that only one source of air 3-B is provided and the first stage of compression is accomplished in the engine compression chamber. In this engine, the compression chamber 5-C is preferably the same volume or even greater than that of the expansion chamber 5-E with port 14" and valve 14 with conduit 13 selectively varying the "effective" compression ratio in regard to power, torque, efficiency and emissions characteristics demands of the engine, all preferably controlled by ECM-27 as described for engine of FIG. 2. The expansion of this engine can be selectively varied from less than the compression ratio to much greater than the effective compression ratio.

The engine is alternatively supercharged by pre-compressing the air entering inlet port 3-B or by constructing the compression chamber with a much larger volume than that of the expansion chamber. Thus, the engine is supercharged while operating with valve 14 closed. If the port 14' is at a point of equal volume fully open, the compression ratio and expansion ratio would be equal. If volume of compression chamber 5-C is higher and outlet port 14' is higher, opening valve 14, more or less, variably or selectively, produces equal compression and expansion ratios or a low "effective" compression ratio with extended expansion ratio.

In an alternate design, compressor 18 and intercooler 19 are eliminated and the charge, compressed in a single stage, is directed as shown after intercooling to compression recess through inlet valve 23' or by way of conduit 20' (in phantom) tp compression chamber 5-C where the charge, now cooled, will be recompressed, perhaps with effective compression ratio of 2:1 or 3:1. The entire charge is then compressed into combustion recess 5' by way of port 23", also in phantom. The charge is then introduced into combustion chamber 5-A or 5-B, according to instructions for combustion systems A or B for engines of FIG. 30 and FIG. 31.

Operation

Air or fuel-air charge is taken in at port 3-B by suction of vane 4 on rotor 2 as the vane is rotated past port 3-B. The "effective" compression ratio is selectively chosen by (a) the volume of the compression chamber 5-C in regard to the need and the volume of the expansion chamber 5-E, by (b) the point where port 14' is placed in the compression chamber or by (c) whether valve 14 is open and to what extent.

If valve 14 is closed, compression begins as soon as vane 4 passes port 3-B. If port 14 is open, compression begins after that point, and depending on how much charge is returned, compression continues and the entire charge is compressed into outlet and optional valve 21 to conduit 16, which in turn conveys the charge to intercooler 17, compressor 18, intercooler 19, by conduit 20 to air injector valve 22, and the entire charge now being doubly compressed and intercooled is injected into recess 5' for induction into combustion chamber 5-A or 5-B and ignited as described for alternate combustion systems A and B of engine of FIG. 30.

Also in this system, bypass valves $R_1$, $R_2$ and $R_3$ with conduits $X_1$, $X_2$ and $X_3$ are in the manner of valves 3, 4, 5 and 6 of engine of FIG. 2, controlled by ECM-27 to produce optimum temperature at the point of charge ignition for spark ignition or HCCI operation.

In any engine of this invention, fuel is optionally carbureted or injected at any point feasible. After the air or fuel-air has been introduced into chamber 5', the operation of the engine of FIG. 31 is the same as that of engine of FIG. 30, utilizing alternate combustion system A or system B with components spark plug 12-A, combustion chamber 5-A and vane 4 being replaced by counter parts spark plug 12-B, combustion chamber 5-B and vane 4-B. The two systems can be in conjunction with each other if spaced properly.

In operating in system A in both FIGS. 30 and 31, valve 23, which is optionally one-way, prevents charge back-flow or backfiring at the time charge ignition. Combustion chamber 5-A and vane 4 are in the position shown and with combustion chamber 5-A filled, the charge is ignited for the power surge, which also scavenges the chamber, induces and compresses a new charge which is pressed into chamber 5'.

In alternate system B, operation in engine of FIGS. 30 and 31, the charge is introduced into combustion chamber 5-B as it passes bottom port of chamber 5' and as shown with backside of combustion chamber 5-B, sealed by proximity of stator and rotor interfaces and with vane 4-B, by extension sealing the leading side of combustion chamber 5-B, the charge is ignited by spark plug 12-B for the power surge, producing three power surges per revolution and is scavenged, receives fresh air charge, compresses charge and loads chamber 5' for the next ignition.

In either combustion system, A or B, there is an alternate system for engine of FIG. 31 of introducing the charge from conduit 20 to combustion recess 5'. Alternatively, conduit 20, valve 23 and port 22 open into compression chamber 5-C just after valve-port 21 and before port 23 in FIG. 30. Now, optional port 23" in engine of FIG. 31 conveys the air or fuel-air charge from compression chamber 5-C into combustion recess 5'. This is the same means of introducing the charge to recess 5' as done in engine of FIG. 30. Thus, the doubly compressed and intercooled charge is now further compressed for perhaps an effective compression ratio of 2:1 or 3:1.

The advantages of this engine are the same as those for engine of FIG. 30 with only a little less power than that of engine receiving the supercharging portion of air from the external source.

As described and depicted earlier for the engines of FIGS. 24, 24-B, 25 and 25-B, the secondary or supplementary or doubly compressed air or fuel-air charge is alternatively as sole or supplementary charge, injected directly into the combustion chambers of engines of FIGS. 24, 25, 26, 30 and 31 for all Operational Designs of the engines of this invention.

It will be seen by the foregoing description of a plurality of embodiment of the present invention, that the advantages sought from the present invention are common to all embodiments.

While there have been herein described approved embodiments of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

While the embodiments of the present invention which have been disclosed herein are the preferred forms, other embodiments of the present invention will suggest themselves to persons skilled in the art in view of this disclosure. Therefore, it will be understood that variations and modifications can be effected within the spirit and scope of the invention and that the scope of the present invention should only be limited by the claims below. Furthermore, the equivalents of all means-or-step-plus-function elements in the claims below are intended to include any structure, material or acts for performing the functions as specifically claimed and as would be understood by persons skilled in the art of this disclosure, without suggesting that any of the structure, material or acts are more obvious by virtue of their association with other elements.

What is claimed is:

1. A method of operating an internal combustion engine having a crankshaft driven by at least one piston moving through at least a compression stroke and an expansion stroke aided by combustion taking place within a cylinder, said method comprising the steps of introducing air through a first port into a cylinder;

closing the first port at a point selected from the group consisting of a point prior to the beginning of the compression stroke and a point after the compression stroke has begun, thereby capturing a first, light air charge in the cylinder and thereby defining an effective compression ratio lower than or equal to the expansion ratio;

compressing air outside the cylinder;

cooling the compressed air outside the cylinder; and introducing the cooled, compressed air through a second port into the cylinder at some point after compression has begun, wherein the second port is open only while the first port is closed.

2. The method of claim 1, further comprising the step of:

varying the point-in-time during travel of the piston at which the cooled, compressed air is introduced through the second port during at least two of the power cycles.

3. The method of claim 2, wherein the step of varying the point-in-time includes the steps of:

introducing cooled, compressed air through the second port during a first of the plurality of power cycles when the piston is at a first point in its compression process; and introducing cooled, compressed air through the second port during a second of the plurality of power cycles when the piston is at a second point in its compression process, the second point being closer to top-dead-center than the first point.

4. The method of claim 1, wherein the step of introducing air through a first port includes the step of introducing during each power cycle air through the first port into the cylinder;

wherein the step of introducing cooled, compressed air includes introducing during each power cycle cooled, compressed air through a second port into the cylinder, including the steps of varying the volume of the air introduced through the first port and varying the pressure at which the cooled, compressed air is introduced into the second port during at least two of the power cycles.

5. The method of claim 1, further comprising the steps of:

expelling from the cylinder, during the compression stroke, at least a portion of any air in the cylinder;

after the expelling step, introducing the cooled, compressed air into the cylinder after compression has begun within the cylinder;

mixing the air charge with fuel; and igniting the mixture near top dead center of the compression process.

6. The method of claim 5, wherein the introducing step includes the step of introducing the cooled, compressed air at the end of the compression process.

7. The method of claim 5, wherein the cylinder is devoid of air immediately before the cooled, compressed air is first introduced.

8. The method of claim 5, wherein there is no appreciable pressure in the cylinder when the cooled, compressed air is first introduced.

9. The method of claim 5, wherein the pressure in the cylinder is approximately ambient at the moment the cooled, compressed air is first introduced.

10. The method of claim 1, wherein the second port is open only during the compression stroke.

11. The method claim 1, wherein the second port is open during a compression stroke of the piston.

12. The method of claim 1, wherein said second port opens during the compression stroke, including at the beginning of the compression stroke or at any time thereafter during the compression stroke.

13. The method of claim 1, wherein said second port opens prior to the beginning of the compression stroke and closes after the compression stroke has begun.

14. The method of claim 1, wherein introducing the cooled, compressed air includes opening the second port and closing the second port; and wherein the method further comprises varying the point in time during travel of the piston at which the second port is closed during at least two of the power cycles.

15. An internal combustion engine, comprising an engine block defining at least one cylinder therein, a first inlet port and a second inlet port communicating between said cylinder and a source of air, an exhaust port through which exhausted gases are expelled from said cylinder, a piston movably mounted within said cylinder, at least one compressor in fluid communication via a conduit between said source of air and at least said second port; said second port being open only while said first port is closed, said engine further comprising a cooler operatively connected between said second port and an outlet to said at least one compressor; and said engine being further characterized by a power cycle having an effective compression ratio lower than or equal to the expansion ratio and by the presence in the cylinder of a cool, dense, heavy air charge which charge was pre-compressed and pre-cooled outside the cylinder and was introduced into the cylinder at some point after the compression process has begun.

16. The engine of 15, wherein said piston moves through at least an intake stroke and a compression stoke, said engine further comprising control mechanism selectively timed to close said first port prior to completion of the piston intake stroke.

17. The engine of claim 15, wherein said piston moves through at least an intake stroke and a compression stoke, said engine further comprising control mechanism selectively timed to close said first port only after the compression stroke has begun.

18. The engine of claim 15, further comprising means for directing low pressure air through said first port and into said cylinder and for directing air highly compressed by said at least one compressor through said second port and into said cylinder during a compression stroke of said piston.

19. The engine of claim 15, wherein said second port is open only during a compression stroke of said piston.

20. The engine of claim 15, wherein said second port is open only after compression has begun during a compression stroke of said piston.

21. The engine of claim 15, wherein said second port opens during the compression stroke, including at the beginning of the compression stroke or at any time thereafter during the compression stroke.

22. The engine of claim 15, wherein said piston moves through at least an intake stroke and a compression stroke, said engine further comprising control mechanism configured to selectively vary the point in time during travel of the piston at which the second port is closed during at least two of the power cycles.

23. A method of operating an internal combustion engine having a crankshaft driven by at least one piston moving through at least a compression stroke and an expansion stroke aided by combustion taking place within a cylinder, said method comprising the steps of supplying air through a first port into a cylinder;

compressing air outside the cylinder;

cooling the compressed air outside the cylinder; and supplying the cooled, compressed air through a second port into the cylinder, wherein the second port is open only while the first port is closed and wherein the step of supplying the cooled, compressed air includes the steps of opening the second port prior to the beginning of the compression stroke and closing the second port after the compression stroke has begun.

24. An internal combustion engine, comprising an engine block defining at least one cylinder therein, a first inlet port and a second inlet port communicating between said cylinder and a source of air, an exhaust port through which exhausted gases are expelled from said cylinder, a piston movably mounted within said cylinder, at least one compressor in fluid communication via a conduit between said source of air and at least said second port; said second port being open only while said first port is closed, said engine further comprising a cooler operatively connected between said second port and an outlet to said at least one compressor; and wherein said piston moves through at least an intake stroke and a compression stoke, said engine further comprising control mechanism selectively timed to close said first port at a point selected from the group consisting of a point prior to the completion of the piston intake stroke and a point after the compression stroke has begun.

25. An internal combustion engine, comprising an engine block defining at least one cylinder therein, a first inlet port and a second inlet port communicating between said cylinder and a source ol air, an exhaust port through which exhausted gases are expelled from said cylinder, a piston movably mounted within said cylinder, at least one compressor in fluid communication via a conduit between source of air and at least said second port; said second port being open only while said first port is closed, said engine further comprising a cooler operatively connected between said second port and an outlet to said at least one compressor; and, wherein said second port is open during at least a portion of an intake stroke of the piston.

26. The engine of claim 25, wherein said piston moves through at least an intake stroke and a compression stroke, said engine further comprising control mechanism selectively timed to open said second port during the intake stroke.

27. An internal combustion engine, comprising an engine block defining at least one chamber therein, a first inlet port and a second inlet port communicating between said chamber and a source of air, an exhaust port through which exhausted gases are expelled from said chamber, a piston movably mounted within said chamber, at least one compressor in fluid communication via a conduit between said source of air and at least said second port; said second port being open only while said first port is closed, said engine further comprising a cooler operatively connected between said second port and an outlet to said at least one compressor, wherein said chamber is defined by at least one chamber wall and by the piston, and wherein said first inlet port and said second inlet port communicate with said chamber through separate apertures formed in said chamber wall.

28. The engine of claim 27, wherein said chamber wall includes at least a cylinder wall portion and a head wall portion, and said first inlet port communicates with said chamber through an aperture in said cylinder wall portion.

* * * * *

US006951211C1

(12) INTER PARTES REEXAMINATION CERTIFICATE (0149th)
United States Patent
Bryant

(10) Number: US 6,951,211 C1
(45) Certificate Issued: Mar. 2, 2010

(54) COLD AIR SUPER-CHARGED INTERNAL COMBUSTION ENGINE, WORKING CYCLE AND METHOD

(75) Inventor: Clyde C. Bryant, Alpharetta, GA (US)

(73) Assignee: Entec Engine Corporation, Atlanta, GA (US)

Reexamination Request:
No. 95/000,135, Mar. 13, 2006

Reexamination Certificate for:
| | |
|---|---|
| Patent No.: | 6,951,211 |
| Issued: | Oct. 4, 2005 |
| Appl. No.: | 10/385,588 |
| Filed: | Mar. 11, 2003 |

Related U.S. Application Data

(63) Continuation-in-part of application No. 10/206,847, filed on Jul. 26, 2002, now abandoned, which is a continuation-in-part of application No. 09/632,739, filed on Aug. 4, 2000, which is a continuation of application No. 08/863,103, filed on May 23, 1997, now Pat. No. 6,279,550, which is a continuation-in-part of application No. 08/841,488, filed on Apr. 23, 1997, now abandoned, application No. 10/385,588, which is a continuation-in-part of application No. 10/206,847, filed on Jul. 26, 2002, now abandoned, which is a continuation-in-part of application No. 09/757,772, filed on Jan. 9, 2001, now abandoned, which is a continuation-in-part of application No. 08/863,103, filed on May 23, 1997, now Pat. No. 6,279,550, application No. 10/385,588, which is a continuation-in-part of application No. 10/206,847, filed on Jul. 26, 2002, now abandoned, which is a continuation-in-part of application No. 10/029,224, filed on Dec. 20, 2001, now abandoned.

(60) Provisional application No. 60/022,102, filed on Jul. 17, 1996, provisional application No. 60/023,460, filed on Aug. 6, 1996, provisional application No. 60/029,260, filed on Oct. 25, 1996, provisional application No. 60/040,630, filed on Mar. 7, 1997, provisional application No. 60/175,597, filed on Jan. 11, 2000, provisional application No. 60/259,727, filed on Jan. 4, 2001, provisional application No. 60/278,030, filed on Mar. 22, 2001, provisional application No. 60/284,711, filed on Apr. 18, 2001, provisional application No. 60/296,620, filed on Jun. 7, 2001, provisional application No. 60/297,663, filed on Jun. 12, 2001, provisional application No. 60/340,728, filed on Oct. 22, 2001, provisional application No. 60/340,609, filed on Dec. 14, 2001, and provisional application No. 60/374,392, filed on Apr. 22, 2002.

(51) Int. Cl.
| | |
|---|---|
| *F02B 29/04* | (2006.01) |
| *F02B 51/00* | (2006.01) |
| *F02B 41/04* | (2006.01) |
| *F02B 33/00* | (2006.01) |

(52) U.S. Cl. ................. 123/559.1; 123/316; 123/432
(58) Field of Classification Search ................. None
See application file for complete search history.

(56) References Cited

U.S. PATENT DOCUMENTS 883,240 A    3/1908    Sabathe (Continued)

FOREIGN PATENT DOCUMENTS

AT                003134         10/1999

(Continued)

OTHER PUBLICATIONS

Lilly, Diesel Engine Reference Book, 1984, pp. 2/29–34, 3/7, and 22/7–8.

(Continued)

*Primary Examiner*—David O. Reip

(57) ABSTRACT

Working cycle for internal combustion engines, with methods and apparatuses for managing, combustion charge density, temperature, pressures and turbulence (among other characteristics). At least one embodiment describes a supercharged internal combustion engine in which a supercharging portion of air is compressed, cooled and injected late in the compression process. A sub-normal compression ratio or low "effective" compression ratio initial air charge is received by a cylinder/compression chamber on the engine intake process, which during compression produces only a fraction of heat-of-compression as that produced by a conventional engine. During compression process, dense, cooled supercharging air charge is injected, adding density and turbulence above that of conventional engines with low "effective" compression ratio for this portion of air charge also. Compression continues and near piston top dead center, the air charge being mixed with fuel is ignited for power pulse followed by scavenging.

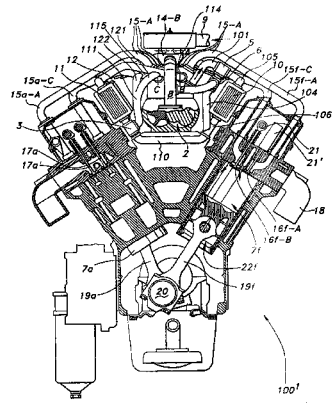

U.S. PATENT DOCUMENTS

| | | |
|---|---|---|
| 982,251 A | 1/1911 | Coffee |
| 1,033,939 A | 7/1912 | Robb et al. |
| 1,316,977 A | 9/1919 | Ricardo |
| 1,610,888 A | 12/1926 | Sauer |
| 1,629,327 A | 5/1927 | Waldo |
| 1,781,147 A | 11/1930 | Zaikowsky |
| 1,792,028 A | 2/1931 | Peterson |
| 1,825,817 A | 10/1931 | Patterson |
| 1,893,006 A | 1/1933 | Trechsel |
| 1,963,780 A | 6/1934 | du Bois |
| 2,126,616 A | 8/1938 | Cayabyab |
| 2,170,974 A | 8/1939 | Parkins |
| 2,189,106 A | 2/1940 | Garve et al. |
| 2,344,993 A | 3/1944 | Lysholm |
| 2,391,176 A | 12/1945 | Mallory |
| 2,400,247 A | 5/1946 | Miller et al. |
| 2,484,009 A | 10/1949 | Barber |
| 2,484,109 A | 10/1949 | Meinecke |
| 2,522,456 A | 9/1950 | Mallory |
| 2,614,547 A | 10/1952 | Meinecke |
| 2,633,698 A | 4/1953 | Nettel |
| 2,739,440 A | 3/1956 | Seifert et al. |
| 2,768,615 A | 10/1956 | Taylor et al. |
| 2,780,053 A | 2/1957 | Cowland |
| 2,780,912 A | 2/1957 | Miller |
| 2,817,322 A | 12/1957 | Miller |
| 2,818,931 A | 1/1958 | Mallory |
| 2,832,324 A | 4/1958 | Barber |
| 2,910,826 A | 11/1959 | Mansfield |
| 2,991,616 A | 7/1961 | Miller |
| 3,015,934 A | 1/1962 | Miller |
| 3,029,594 A | 4/1962 | Miller |
| 3,113,561 A | 12/1963 | Heintz |
| 3,144,749 A | 8/1964 | Miller |
| 3,180,327 A | 4/1965 | Neir |
| 3,182,645 A | 5/1965 | Wilson |
| 3,232,042 A | 2/1966 | Sarra |
| 3,257,797 A | 6/1966 | Lieberherr |
| 3,336,911 A | 8/1967 | Steiger |
| 3,355,877 A | 12/1967 | Chafflotte |
| 3,413,965 A | 12/1968 | Gavasso |
| 3,416,502 A | 12/1968 | Weiss |
| 3,591,958 A | 7/1971 | Nebgen |
| 3,595,013 A | 7/1971 | Brille et al. |
| 3,665,905 A | 5/1972 | Brille et al. |
| 3,686,972 A | 8/1972 | McWhorter |
| 3,735,740 A | 5/1973 | Hunt |
| 3,774,399 A | 11/1973 | Nohira et al. |
| 3,795,231 A | 3/1974 | Brille |
| 3,877,848 A | 4/1975 | Solem |
| 3,919,986 A | 11/1975 | Goto |
| 3,921,403 A | 11/1975 | McInerney et al. |
| 3,938,483 A | 2/1976 | Firey |
| 3,963,006 A | 6/1976 | Firey |
| 3,977,195 A | 8/1976 | Treuil |
| 3,986,351 A | 10/1976 | Woods et al. |
| 3,995,606 A | 12/1976 | Firey |
| 4,003,347 A | 1/1977 | Sasaki |
| 4,009,574 A | 3/1977 | Melchior |
| 4,009,694 A | 3/1977 | Firey |
| 4,009,695 A | 3/1977 | Ule |
| 4,016,839 A | 4/1977 | Morton |
| 4,022,167 A | 5/1977 | Kristiansen |
| 4,058,096 A | 11/1977 | Brown |
| 4,075,986 A | 2/1978 | Keck |
| 4,075,990 A | 2/1978 | Ribeton |
| 4,084,557 A | 4/1978 | Luria |
| 4,084,568 A | 4/1978 | Sato et al. |
| 4,138,973 A | 2/1979 | Luria |
| 4,153,016 A | 5/1979 | Hausknecht |
| 4,157,079 A | 6/1979 | Kristiansen |
| 4,169,451 A | 10/1979 | Niggemeyer |
| 4,174,683 A | 11/1979 | Vivian |
| 4,192,265 A | 3/1980 | Amano et al. |
| 4,196,593 A | 4/1980 | Froeliger |
| 4,215,659 A | 8/1980 | Lowther |
| 4,231,225 A | 11/1980 | Aya |
| 4,232,641 A | 11/1980 | Curtil |
| 4,235,077 A | 11/1980 | Bryant |
| RE30,565 E | 4/1981 | Kristiansen |
| 4,261,307 A | 4/1981 | Oldberg |
| 4,276,865 A | 7/1981 | Hamai |
| 4,280,451 A | 7/1981 | Moore |
| 4,282,933 A | 8/1981 | Suganami et al. |
| 4,299,090 A | 11/1981 | Deutschmann |
| 4,305,352 A | 12/1981 | Oshima et al. |
| 4,327,676 A | 5/1982 | McIntire et al. |
| 4,350,013 A | 9/1982 | Yoshiba |
| 4,364,341 A | 12/1982 | Holtmann |
| 4,367,662 A | 1/1983 | Greene |
| 4,385,496 A | 5/1983 | Yamane |
| 4,387,672 A | 6/1983 | Crocker |
| 4,400,945 A | 8/1983 | Deutschmann et al. |
| 4,416,115 A | 11/1983 | Iida |
| 4,421,077 A | 12/1983 | Ruggeri |
| 4,426,848 A | 1/1984 | Stachowicz |
| 4,426,985 A | 1/1984 | Kanesaka |
| 4,438,737 A | 3/1984 | Burandt |
| 4,446,821 A | 5/1984 | Cataldo |
| 4,490,971 A | 1/1985 | Hedelin |
| 4,494,506 A | 1/1985 | Hayama et al. |
| 4,498,429 A | 2/1985 | Satow et al. |
| 4,507,066 A | 3/1985 | Duffy |
| 4,530,318 A | 7/1985 | Semple |
| 4,537,173 A | 8/1985 | Norris |
| 4,539,946 A | 9/1985 | Hedelin |
| 4,539,948 A | 9/1985 | Toepel |
| 4,539,951 A | 9/1985 | Hara et al. |
| 4,550,568 A | 11/1985 | Deutschmann et al. |
| 4,552,112 A | 11/1985 | Nagao et al. |
| 4,553,385 A | 11/1985 | Lamont |
| 4,563,132 A | 1/1986 | Grimmer |
| 4,570,442 A | 2/1986 | Deutschmann et al. |
| 4,576,127 A | 3/1986 | Doi et al. |
| 4,577,597 A | 3/1986 | Tomita |
| 4,582,029 A | 4/1986 | Masuda et al. |
| 4,584,974 A | 4/1986 | Aoyama et al. |
| 4,589,380 A | 5/1986 | Coad |
| 4,592,310 A | 6/1986 | Hitomi et al. |
| 4,592,319 A | 6/1986 | Meistrick |
| 4,592,329 A | 6/1986 | Yunick |
| 4,598,611 A | 7/1986 | Frank |
| 4,608,951 A | 9/1986 | White |
| 4,622,167 A | 11/1986 | Heath et al. |
| 4,633,403 A | 12/1986 | Asmus |
| 4,641,613 A | 2/1987 | Delesalle |
| 4,651,684 A | 3/1987 | Masuda et al. |
| 4,667,636 A | 5/1987 | Oishi et al. |
| 4,672,813 A | 6/1987 | David |
| 4,700,684 A | 10/1987 | Pischinger et al. |
| 4,702,218 A | 10/1987 | Yoshioka et al. |
| 4,714,063 A | 12/1987 | Oda et al. |
| 4,716,863 A | 1/1988 | Pruzan |
| 4,722,315 A | 2/1988 | Pickel |
| 4,738,110 A | 4/1988 | Tateno |
| 4,753,198 A | 6/1988 | Heath |
| 4,756,285 A | 7/1988 | Pischinger |
| 4,770,060 A | 9/1988 | Elrod et al. |
| 4,771,742 A | 9/1988 | Nelson et al. |
| 4,777,916 A | 10/1988 | Holmer |
| 4,798,184 A | 1/1989 | Palko |

| | | | | | |
|---|---|---|---|---|---|
| 4,805,571 A | 2/1989 | Humphrey | 5,377,631 A | 1/1995 | Schechter |
| 4,821,695 A | 4/1989 | Freudenstein | 5,389,051 A | 2/1995 | Hirate et al. |
| 4,836,161 A | 6/1989 | Abthoff et al. | 5,390,492 A | 2/1995 | Levendis |
| 4,852,353 A | 8/1989 | Holmer | 5,392,740 A | 2/1995 | Teramoto et al. |
| 4,860,704 A | 8/1989 | Slaughter | 5,396,874 A | 3/1995 | Hitomi et al. |
| 4,862,841 A | 9/1989 | Stevenson | 5,398,502 A | 3/1995 | Watanabe |
| 4,864,984 A | 9/1989 | Blish | 5,404,844 A | 4/1995 | Schechter |
| 4,876,988 A | 10/1989 | Paul et al. | 5,417,186 A | 5/1995 | Elrod et al. |
| 4,878,464 A | 11/1989 | Richeson, Jr. et al. | 5,417,189 A | 5/1995 | Regueiro |
| 4,885,911 A | 12/1989 | Woollenweber et al. | 5,419,301 A | 5/1995 | Schechter |
| 4,916,903 A | 4/1990 | Holmer | 5,421,296 A | 6/1995 | Hitomi et al. |
| 4,917,058 A | 4/1990 | Nelson et al. | 5,421,308 A | 6/1995 | Hitomi et al. |
| 4,917,066 A | 4/1990 | Freudenstein et al. | 5,425,239 A | 6/1995 | Gobert |
| 4,928,648 A | 5/1990 | Schatz et al. | 5,426,936 A | 6/1995 | Levendis et al. |
| 4,930,315 A | 6/1990 | Kanesaka | 5,427,078 A | 6/1995 | Hitomi et al. |
| 4,934,344 A | 6/1990 | Perr | 5,429,100 A | 7/1995 | Goto et al. |
| 4,936,263 A | 6/1990 | Tamba et al. | 5,433,180 A | 7/1995 | Hitomi et al. |
| 4,945,870 A | 8/1990 | Richeson | 5,440,880 A | 8/1995 | Ceynow et al. |
| 4,957,069 A | 9/1990 | Mederer | 5,443,050 A | 8/1995 | Hitomi et al. |
| 4,958,606 A | 9/1990 | Hitomi et al. | 5,445,116 A | 8/1995 | Hara |
| 4,961,406 A | 10/1990 | Burandt | 5,452,694 A | 9/1995 | Hara |
| 4,964,375 A | 10/1990 | Takeyama et al. | 5,456,224 A | 10/1995 | Riley |
| 4,982,567 A | 1/1991 | Hashimoto et al. | 5,456,225 A | 10/1995 | Oikawa et al. |
| 5,002,022 A | 3/1991 | Perr | 5,465,702 A | 11/1995 | Ferrenberg |
| 5,005,652 A | 4/1991 | Johnson | 5,469,818 A | 11/1995 | Yoshioka et al. |
| 5,020,327 A | 6/1991 | Tashima et al. | 5,488,970 A | 2/1996 | Cippitani |
| 5,033,268 A | 7/1991 | Hitomi et al. | 5,492,103 A | 2/1996 | Goto |
| 5,036,663 A | 8/1991 | Akagi et al. | 5,493,798 A | 2/1996 | Rocke et al. |
| 5,050,378 A | 9/1991 | Clemmons | 5,494,008 A | 2/1996 | Ohkawa et al. |
| 5,054,439 A | 10/1991 | Akagi et al. | 5,494,009 A | 2/1996 | Yamada et al. |
| 5,076,248 A | 12/1991 | Schatz | 5,495,830 A | 3/1996 | Wu |
| 5,083,543 A | 1/1992 | Harada et al. | 5,497,737 A | 3/1996 | Nakamura |
| 5,090,202 A | 2/1992 | Hitomi et al. | 5,509,394 A | 4/1996 | Hitomi et al. |
| 5,103,645 A | 4/1992 | Haring | 5,518,818 A | 5/1996 | Kidai et al. |
| 5,107,802 A | 4/1992 | Yagi et al. | 5,531,193 A | 7/1996 | Nakamura |
| 5,117,790 A | 6/1992 | Clark et al. | 5,535,704 A | 7/1996 | Paul |
| 5,121,733 A | 6/1992 | Goto et al. | 5,535,716 A | 7/1996 | Sato et al. |
| 5,131,229 A | 7/1992 | Kriegler et al. | 5,549,080 A | 8/1996 | Uchikawa |
| 5,131,354 A | 7/1992 | Richeson | 5,549,095 A | 8/1996 | Goto et al. |
| 5,138,839 A | 8/1992 | Hitomi et al. | 5,553,573 A | 9/1996 | Hara et al. |
| 5,140,953 A | 8/1992 | Fogelberg | 5,557,983 A | 9/1996 | Hara et al. |
| 5,140,955 A | 8/1992 | Sono et al. | 5,558,060 A | 9/1996 | Horie et al. |
| 5,142,866 A | 9/1992 | Yanagihara et al. | 5,560,207 A | 10/1996 | Ramsden et al. |
| 5,161,497 A | 11/1992 | Simko et al. | 5,564,275 A | 10/1996 | Codan et al. |
| 5,186,139 A | 2/1993 | Matsura | 5,586,527 A | 12/1996 | Kreuter |
| 5,189,998 A | 3/1993 | Hara | 5,586,540 A | 12/1996 | Marzec et al. |
| 5,201,907 A | 4/1993 | Hitomi et al. | 5,588,411 A | 12/1996 | Kreuter et al. |
| 5,203,311 A | 4/1993 | Hitomi et al. | 5,590,632 A | 1/1997 | Kato et al. |
| 5,205,251 A | 4/1993 | Conklin | 5,606,942 A | 3/1997 | Tsuzuku et al. |
| 5,205,265 A | 4/1993 | Kashiyama et al. | 5,607,010 A | 3/1997 | Schonfeld et al. |
| 5,215,061 A | 6/1993 | Ogawa et al. | 5,611,202 A | 3/1997 | Sumser et al. |
| 5,216,987 A | 6/1993 | Clarke | 5,611,303 A | 3/1997 | Izuo |
| 5,219,397 A | 6/1993 | Jones | 5,615,554 A | 4/1997 | Gobert |
| 5,230,320 A | 7/1993 | Hitomi et al. | 5,617,726 A | 4/1997 | Sheridan et al. |
| 5,233,831 A | 8/1993 | Hitomi et al. | 5,622,053 A | 4/1997 | Freen |
| 5,233,948 A | 8/1993 | Boggs et al. | 5,622,144 A | 4/1997 | Nakamura et al. |
| 5,235,940 A | 8/1993 | Nakatani | 5,623,896 A | 4/1997 | Kato et al. |
| 5,239,960 A | 8/1993 | Sasaki et al. | 5,626,109 A | 5/1997 | Yasumura et al. |
| 5,249,484 A | 10/1993 | Matsuoka et al. | 5,632,255 A | 5/1997 | Ferrenberg |
| 5,253,622 A | 10/1993 | Bornstein et al. | 5,645,020 A | 7/1997 | Yamada |
| 5,255,637 A | 10/1993 | Schechter | 5,657,630 A | 8/1997 | Kjemtrup et al. |
| 5,255,654 A | 10/1993 | Karlsson | 5,660,155 A | 8/1997 | Taue et al. |
| 5,271,359 A | 12/1993 | Teramoto et al. | 5,661,835 A | 8/1997 | Kato et al. |
| 5,279,273 A | 1/1994 | Nakata et al. | 5,664,528 A | 9/1997 | Kato et al. |
| 5,293,741 A | 3/1994 | Kashiyama et al. | 5,664,529 A | 9/1997 | Kato et al. |
| 5,309,756 A | 5/1994 | Osawa et al. | 5,671,600 A | 9/1997 | Pischinger et al. |
| 5,341,771 A | 8/1994 | Riley | 5,678,515 A | 10/1997 | Kato et al. |
| 5,357,936 A | 10/1994 | Hitomi et al. | 5,692,464 A | 12/1997 | Kimura |
| 5,365,895 A | 11/1994 | Riley | 5,704,316 A | 1/1998 | Fujimoto et al. |
| 5,365,896 A | 11/1994 | Hara et al. | 5,711,154 A | 1/1998 | Baechle et al. |
| 5,367,990 A | 11/1994 | Schechter | 5,713,317 A | 2/1998 | Yoshioka |

| | | | |
|---|---|---|---|
| 5,713,330 A | 2/1998 | Hitomi et al. | |
| 5,724,927 A | 3/1998 | Suzuki | |
| 5,732,554 A | 3/1998 | Sasaki et al. | |
| 5,762,480 A | 6/1998 | Adahan | |
| 5,771,868 A | 6/1998 | Khair | |
| 5,775,099 A | 7/1998 | Ito et al. | |
| 5,775,283 A | 7/1998 | Sawai et al. | |
| 5,778,674 A | 7/1998 | Kimura | |
| 5,791,146 A | 8/1998 | Dungner | |
| 5,794,445 A | 8/1998 | Dungner | |
| 5,806,308 A | 9/1998 | Khair et al. | |
| 5,819,702 A | 10/1998 | Mendler | |
| 5,845,613 A | 12/1998 | Yoshikawa | |
| 5,848,529 A | 12/1998 | Katoh et al. | |
| 5,854,988 A | 12/1998 | Davidson et al. | |
| 5,855,192 A | 1/1999 | McCowan et al. | |
| 5,857,437 A | 1/1999 | Yoshioka | |
| 5,862,790 A | 1/1999 | Dai et al. | |
| 5,875,743 A | 3/1999 | Dickey | |
| 5,924,395 A | 7/1999 | Moriya et al. | |
| 5,927,075 A | 7/1999 | Khair | |
| 5,949,146 A | 9/1999 | VandenBerghe | |
| 5,950,582 A | 9/1999 | Stein | |
| 5,957,096 A | 9/1999 | Clarke et al. | |
| 5,960,755 A | 10/1999 | Diggs et al. | |
| 5,992,361 A | 11/1999 | Murata et al. | |
| 5,992,390 A | 11/1999 | Moyer | |
| 5,996,560 A | 12/1999 | Schechter | |
| 6,041,602 A | 3/2000 | Dickey | |
| 6,058,348 A | 5/2000 | Ohyama et al. | |
| 6,079,378 A | 6/2000 | Taue et al. | |
| 6,085,705 A | 7/2000 | Vorih | |
| 6,112,523 A | 9/2000 | Kamo et al. | |
| 6,234,144 B1 | 5/2001 | Yamaguchi et al. | |
| 6,260,523 B1 | 7/2001 | Nakamura et al. | |
| 6,266,957 B1 | 7/2001 | Nozawa et al. | |
| 6,276,316 B1 | 8/2001 | Arai et al. | |
| 6,286,482 B1 | 9/2001 | Flynn et al. | |
| 6,295,816 B1 | 10/2001 | Gallagher et al. | |
| 6,298,300 B1 | 10/2001 | Ohyama et al. | |
| 6,311,493 B1 | 11/2001 | Kurihara et al. | |
| 6,332,447 B1 | 12/2001 | Kimura et al. | |
| 6,338,244 B1 | 1/2002 | Guenther et al. | |
| 6,338,245 B1 | 1/2002 | Shimoda et al. | |
| 6,343,473 B1 | 2/2002 | Kanesaka | |
| 6,354,254 B1 | 3/2002 | Usko | |
| 6,394,051 B1 | 5/2002 | Filipe et al. | |
| 6,405,694 B2 | 6/2002 | Sato | |
| 6,460,337 B1 | 10/2002 | Olofsson | |
| 6,474,323 B1 | 11/2002 | Beck et al. | |
| 6,502,551 B2 | 1/2003 | Antonioli et al. | |
| 6,513,319 B2 | 2/2003 | Nozawa et al. | |
| 6,516,264 B2 | 2/2003 | Ohyama et al. | |
| 6,591,795 B2 | 7/2003 | Janak | |
| 6,609,315 B1 | 8/2003 | Hendron et al. | |
| 6,637,386 B2 | 10/2003 | Murata et al. | |
| 6,640,754 B1 | 11/2003 | Iida | |
| 6,662,552 B1 | 12/2003 | Gunther et al. | |
| 6,679,207 B1 | 1/2004 | Leman | |
| 6,725,647 B2 | 4/2004 | Pfeifer et al. | |
| 6,732,507 B1 | 5/2004 | Stanglmaier et al. | |
| 6,739,125 B1 | 5/2004 | Mulligan | |
| 6,925,976 B2 | 8/2005 | Israel et al. | |
| 6,928,807 B2 | 8/2005 | Jacob et al. | |
| 6,955,144 B2 | 10/2005 | Sakai et al. | |
| 7,004,122 B2 | 2/2006 | Cornell et al. | |
| 7,007,650 B2 | 3/2006 | Harmon | |
| 7,222,614 B2 | 5/2007 | Bryant | |
| 7,281,527 B1 | 10/2007 | Bryant | |
| 2002/0011233 A1 | 1/2002 | Shiraishi et al. | |
| 2002/0026913 A1 | 3/2002 | Ariga | |
| 2002/0062799 A1 | 5/2002 | Murata et al. | |
| 2002/0117126 A1 | 8/2002 | Kaneko | |
| 2003/0106542 A1 | 6/2003 | Aoyama et al. | |
| 2003/0164163 A1 | 9/2003 | Lai et al. | |
| 2003/0213463 A1 | 11/2003 | Coleman et al. | |
| 2004/0237507 A1 | 12/2004 | Duvinage et al. | |
| 2005/0087159 A1 | 4/2005 | Harmon | |
| 2005/0098162 A1 | 5/2005 | Bryant | |
| 2005/0183692 A1 | 8/2005 | Weber et al. | |

FOREIGN PATENT DOCUMENTS

| | | |
|---|---|---|
| AT | 003205 | 11/1999 |
| AU | B1-33 707/78 | 4/1982 |
| AU | A-15966/83 | 6/1983 |
| CH | 236463 | 6/1945 |
| DE | 286050 | 7/1915 |
| DE | 1 001 049 | 1/1957 |
| DE | 1 576 255 | 4/1970 |
| DE | 2 125 368 | 12/1971 |
| DE | 2457208 | 6/1976 |
| DE | 28 09 473 | 9/1978 |
| DE | 2734715 | 2/1979 |
| DE | 78 03 641 U1 | 8/1979 |
| DE | 28 14 343 | 10/1979 |
| DE | 29 24 926 | 1/1980 |
| DE | 2926327 | 1/1981 |
| DE | 29 30 124 | 2/1981 |
| DE | 2942326 | 4/1981 |
| DE | 3006619 | 8/1981 |
| DE | 30 22 688 | 12/1981 |
| DE | 32 28 680 | 2/1984 |
| DE | 34 18 361 | 10/1984 |
| DE | 33 47 567 | 7/1985 |
| DE | 35 26 532 | 2/1986 |
| DE | 34 37 330 | 4/1986 |
| DE | 3716947 | 3/1988 |
| DE | 37 25 448 | 2/1989 |
| DE | 3730001 | 3/1989 |
| DE | 37 37 822 | 5/1989 |
| DE | 37 37 820 C2 | 8/1989 |
| DE | 37 37 823 | 8/1989 |
| DE | 39 08 475 | 9/1989 |
| DE | 38 24 133 | 1/1990 |
| DE | 39 31 379 | 3/1990 |
| DE | 3835333 | 4/1990 |
| DE | 40 04 806 | 8/1991 |
| DE | 40 07 516 | 9/1991 |
| DE | 4115008 | 11/1992 |
| DE | 42 16 759 | 2/1993 |
| DE | 692 06 718 | 3/1993 |
| DE | 43 12 085 | 10/1993 |
| DE | 43 12 205 | 10/1993 |
| DE | 43 32 604 | 3/1994 |
| DE | 44 16 670 | 2/1995 |
| DE | 195 11 320 | 10/1995 |
| DE | 44 39 940 | 5/1996 |
| DE | 19514500 | 10/1996 |
| DE | 19515325 | 10/1996 |
| DE | 196 10 277 | 10/1996 |
| DE | 195 17 590 | 11/1996 |
| DE | 196 16 555 | 11/1996 |
| DE | 19648337 | 6/1998 |
| DE | 19905636 | 3/2000 |
| DE | 199905636 | 3/2000 |
| DE | 100 09 180 | 9/2001 |
| DE | 101 59 801 | 4/2003 |
| EP | 0 095 252 A2 | 11/1983 |
| EP | 0 291 792 A2 | 11/1988 |
| EP | 0 344 780 A2 | 12/1989 |
| EP | 0 269 125 | 8/1991 |
| EP | 0 440 314 A2 | 8/1991 |

| EP | 0 560 476 | 9/1993 | JP | 59-158321 | 9/1984 |
| EP | 0 568 214 | 11/1993 | JP | 59-211720 | 11/1984 |
| EP | 0 596 855 | 5/1994 | JP | 60-19916 | 2/1985 |
| EP | 0 596 860 A2 | 5/1994 | JP | 60-184918 | 9/1985 |
| EP | 0 718 481 | 6/1996 | JP | 61-89132 | 5/1986 |
| EP | 0 718 481 A2 | 6/1996 | JP | 61-106918 | 5/1986 |
| EP | 0 761 950 | 3/1997 | JP | 61-106919 | 5/1986 |
| EP | 0 646 703 | 12/1997 | JP | 61-106920 | 5/1986 |
| EP | 0 857 866 | 8/1998 | JP | 61-164036 | 7/1986 |
| EP | 0 690 214 | 10/1999 | JP | 61-182421 | 8/1986 |
| EP | 1 116 870 | 7/2001 | JP | 62-174513 | 7/1987 |
| EP | 1 178 192 | 2/2002 | JP | 62-288333 | 12/1987 |
| EP | 1 234 960 A2 | 8/2002 | JP | 63-38620 | 2/1988 |
| FR | 1 066 038 | 6/1954 | JP | 63-51121 | 3/1988 |
| FR | 2 221 021 | 10/1974 | JP | 363057822 | 3/1988 |
| FR | 2 242 884 | 3/1975 | JP | 63-124828 | 5/1988 |
| FR | 2 269 282 | 11/1975 | JP | 63-176616 | 7/1988 |
| FR | 2 355 997 | 1/1978 | JP | 63176616 | 7/1988 |
| FR | 2 393 937 | 1/1979 | JP | 63-61717 B2 | 11/1988 |
| FR | 2 417 014 | 9/1979 | JP | 63-168221 | 11/1988 |
| FR | 2 476 741 | 8/1981 | JP | 63-268942 | 11/1988 |
| FR | 2 485 622 | 12/1981 | JP | 63268942 | 11/1988 |
| FR | 2 583 108 A2 | 12/1986 | JP | 64-315 | 1/1989 |
| FR | 2 674 285 | 3/1991 | JP | 64-24118 | 1/1989 |
| FR | 2 703 107 | 9/1994 | JP | 64-87828 | 3/1989 |
| FR | 2 757 211 | 6/1998 | JP | 64-87829 | 3/1989 |
| FR | 2 780 093 A3 | 12/1999 | JP | 02-140421 | 5/1990 |
| GB | 1 303 080 | 1/1973 | JP | 02-211318 | 8/1990 |
| GB | 1 321 452 | 6/1973 | JP | 03-37318 | 2/1991 |
| GB | 1 437 171 | 5/1976 | JP | 03-96624 | 4/1991 |
| GB | 1 467 969 | 3/1977 | JP | 03-138419 | 6/1991 |
| GB | 2 018 352 | 10/1979 | JP | 03-156123 | 7/1991 |
| GB | 2 072 957 | 10/1981 | JP | 04-31653 | 2/1992 |
| GB | 2 129 055 | 5/1984 | JP | 404031653 | 2/1992 |
| GB | 2 165 587 | 4/1986 | JP | 04-103867 | 4/1992 |
| GB | 2 180 298 | 3/1987 | JP | 04-136467 | 5/1992 |
| GB | 2 202 001 | 9/1988 | JP | 04-287859 | 10/1992 |
| GB | 2 253 881 | 9/1992 | JP | 04-129812 | 11/1992 |
| GB | 2 301 398 | 4/1996 | JP | 05-1575 | 1/1993 |
| GB | 2 300 226 | 10/1996 | JP | 05-5430 | 1/1993 |
| GB | 2 366 328 | 3/2002 | JP | 05-71426 | 3/1993 |
| GB | 2 366 330 | 3/2002 | JP | 05-71428 | 3/1993 |
| GB | 2 366 331 | 3/2002 | JP | 05-86913 | 4/1993 |
| GB | 2 367 147 | 3/2002 | JP | 05-86989 | 4/1993 |
| GB | 2 367 148 | 3/2002 | JP | 05-086989 | 4/1993 |
| GB | 2 368 614 | 5/2002 | JP | 05-099007 | 4/1993 |
| JP | 51-13024 | 2/1976 | JP | 05-149118 | 6/1993 |
| JP | 56-18030 | 2/1981 | JP | 05-149136 | 6/1993 |
| JP | 56-101022 | 8/1981 | JP | 05-179966 | 7/1993 |
| JP | 56-101031 | 8/1981 | JP | 05-187279 | 7/1993 |
| JP | 58-30416 | 2/1983 | JP | 05-187329 | 7/1993 |
| JP | 58-51221 | 3/1983 | JP | 05-202810 | 8/1993 |
| JP | 58-53634 | 3/1983 | JP | 05-215002 | 8/1993 |
| JP | 58-53635 | 3/1983 | JP | 05-340290 | 12/1993 |
| JP | 58-57019 | 4/1983 | JP | 06-33775 | 2/1994 |
| JP | 58-59317 | 4/1983 | JP | 06-74038 | 3/1994 |
| JP | 58-62314 | 4/1983 | JP | 06-108860 | 4/1994 |
| JP | 58-65932 | 4/1983 | JP | 06-108861 | 4/1994 |
| JP | 58-117319 | 7/1983 | JP | 06-117280 | 4/1994 |
| JP | 58-119920 | 7/1983 | JP | 6-119933 | 4/1994 |
| JP | 58-122314 | 7/1983 | JP | 6-129271 | 5/1994 |
| JP | 58-122315 | 7/1983 | JP | 06-200763 | 7/1994 |
| JP | 58-122318 | 7/1983 | JP | 06-235305 | 8/1994 |
| JP | 58-131311 | 8/1983 | JP | 06-235307 | 8/1994 |
| JP | 58-133422 | 8/1983 | JP | 06-241097 | 8/1994 |
| JP | 58-133450 | 8/1983 | JP | 06-346711 | 12/1994 |
| JP | 58-187540 | 11/1983 | JP | 07-4287 | 1/1995 |
| JP | 59-7744 | 1/1984 | JP | 07-26994 | 1/1995 |
| JP | 59-60034 | 4/1984 | JP | 07-27022 | 1/1995 |
| JP | 59-99025 | 6/1984 | JP | 07-34883 A | 2/1995 |
| JP | 59-119007 | 7/1984 | JP | 07-54664 | 2/1995 |

| | | |
|---|---|---|
| JP | 07-34883 B2 | 4/1995 |
| JP | 07-091265 | 4/1995 |
| JP | 7-145740 | 6/1995 |
| JP | 07-156692 | 6/1995 |
| JP | 07-156696 | 6/1995 |
| JP | 07-158473 | 6/1995 |
| JP | 07-166829 | 6/1995 |
| JP | 07-166926 | 6/1995 |
| JP | 07-180514 | 7/1995 |
| JP | 07-224626 | 8/1995 |
| JP | 07-224671 | 8/1995 |
| JP | 07-224678 | 8/1995 |
| JP | 7-233744 | 9/1995 |
| JP | 07-247859 | 9/1995 |
| JP | 07-259655 | 10/1995 |
| JP | 07-269381 | 10/1995 |
| JP | 07-301107 | 11/1995 |
| JP | 07-310564 | 11/1995 |
| JP | 07-310603 | 11/1995 |
| JP | 07-324610 | 12/1995 |
| JP | 08-28280 | 1/1996 |
| JP | 08-42381 | 2/1996 |
| JP | 08-61070 | 3/1996 |
| JP | 08-82218 | 3/1996 |
| JP | 08-100662 | 4/1996 |
| JP | 08-158901 | 6/1996 |
| JP | 08-158957 | 6/1996 |
| JP | 408158957 | 6/1996 |
| JP | 08-170551 | 7/1996 |
| JP | 08-177432 | 7/1996 |
| JP | 08-177433 | 7/1996 |
| JP | 08-177434 | 7/1996 |
| JP | 08-177435 | 7/1996 |
| JP | 08-177436 | 7/1996 |
| JP | 08-291715 | 11/1996 |
| JP | 08-326548 | 12/1996 |
| JP | 09-151737 | 6/1997 |
| JP | 02645942 | 8/1997 |
| JP | 10-141068 | 5/1998 |
| JP | 10-169513 | 6/1998 |
| JP | 10-238354 | 9/1998 |
| JP | 11-62639 | 3/1999 |
| JP | 11-315726 | 11/1999 |
| JP | 03-96624 B2 | 8/2000 |
| JP | 2000-220480 | 8/2000 |
| JP | 2001-193468 | 7/2001 |
| JP | 2002-256911 | 9/2002 |
| JP | 2003-269202 | 9/2003 |
| SU | 248375 | 7/1966 |
| SU | 914788 | 3/1982 |
| SU | 1247-573 | 2/1983 |
| SU | 1195026 A | 11/1985 |
| SU | 1195027 A | 11/1985 |
| SU | 1668713 A1 | 8/1991 |
| SU | 1701953 A1 | 12/1991 |
| WO | WO 81/03200 | 11/1981 |
| WO | WO 83-04280 | 12/1983 |
| WO | WO 88/01696 | 3/1988 |
| WO | WO 90-10141 | 9/1990 |
| WO | WO 91-05152 | 4/1991 |
| WO | WO 92-04536 | 3/1992 |
| WO | WO 92/13178 | 8/1992 |
| WO | WO 94-28288 A3 | 12/1994 |
| WO | WO 94-28288 A2 | 12/1994 |
| WO | WO 95/08705 | 3/1995 |
| WO | WO 95-15429 | 6/1995 |
| WO | WO 95-16106 | 6/1995 |
| WO | WO 95/18294 | 7/1995 |
| WO | WO 95-23280 | 8/1995 |
| WO | WO 95-24549 | 9/1995 |
| WO | WO 95/33131 | 12/1995 |
| WO | WO 96/01939 | 1/1996 |
| WO | WO 96/15362 | 5/1996 |
| WO | WO 96-30635 | 10/1996 |
| WO | WO 97-11260 | 3/1997 |
| WO | WO 98-07973 | 2/1998 |
| WO | WO 98-34014 | 8/1998 |
| WO | WO 98/55744 | 12/1998 |
| WO | WO 98-55744 | 12/1998 |
| WO | WO 99/42718 | 8/1999 |
| WO | WO 00-23698 | 4/2000 |
| WO | WO 00-28197 | 5/2000 |
| WO | WO 00-68565 A1 | 11/2000 |
| WO | WO 01-69062 A1 | 9/2001 |
| WO | WO 01/86125 | 11/2001 |
| WO | WO 2004/081356 | 9/2004 |

OTHER PUBLICATIONS

T.H. Ma, "Recent Advances in Variable Valve Timing", 1986, pp. 235–253.

Heywood, Internal Combustion Engine Fundamentals, 1988, pp. 9–15.

Office Action dated Feb. 26, 2009, for co-pending U.S. Appl. No. 11/930,683.

Office Action dated Feb. 26, 2009, for co-pending U.S. Appl. No. 11/936,100.

Office Action dated Apr. 6, 2009, for co-pending U.S. Appl. No. 11/936,101.

Ex Parte ReExamination Certificate which issued for co-pending U.S. Patent No. 6,279,550.

Inter Partes Office Action dated Mar. 20, 2009, for co-pending Inter Partes ReExamination No. 95/000,265.

Action Closing Prosecution dated Apr. 3, 2009, for co-pending ReExamination No. 95/000,307.

Office Action dated Feb. 5, 2009, for co-pending U.S. Appl. No. 11/236,765.

Office Action dated Apr. 3, 2009, for co-pending U.S. Appl. No. 11/936,102.

Lilly, L., Diesel Engine Reference Book, Butterworth and Co., (1984), pp. 2/29–2/34, 3/7, 22/7–22/8.

Request for Inter Partes Reexamination filed on Oct. 14, 2007 of U.S. patent No. 7,281,527—ReExam Control No. 95/000,307.

Office Action in Ex Parte Reexamination dated Oct. 29, 2007 of U.S. patent No. 6,279,500—ReExam Control No. 90/007,971.

Patent Owner's Response to Office Action in Inter Partes Reexamination dated Nov. 6, 2007 of U.S. patent No. 7,222,614—ReExam Control No. 95/000,265.

Petition for Entry of Late Papers for Revival of Reexamination Proceeding Under 37 CFR §1.137(b) in Inter Partes Reexamination dated Nov. 6, 2007 of U.S. patent No. 7,222,614—ReExam Control No. 95/000,265.

Submission in Inter Partes Reexamination dated Nov. 6, 2007 of U.S. patent No. 7,222,614—ReExam Control No. 95/000,265.

Information Disclosure Statement Under 37 CFR §1.555 filed Nov. 15, 2006, for ReExamination of U.S. Patent No. 6,688,280—ReExamination No. 95/000,050.

Information Disclosure Statement Under 37 CFR §1.555 filed Nov. 15, 2006, for ReExamination of U.S. Patent No. 6,651,618—ReExamination No. 95/000,049.

Ex Parte ReExamination Communication dated Nov. 15, 2006 for Control No. 90/007,971, ReExamination Patent No. 6,279,550.

Order Granting/Denying Request for Inter Partes ReExamination dated Dec. 4, 2007, for ReExamination of U.S. Patent No. 7,281,527—ReExamination No. 95/000,307.
Office Action in Inter Partes ReExamination dated Dec. 4, 2007, for ReExamination of U.S. Patent No. 7,281,527—ReExamination No. 95/000,307.
Patent Owner's Response to Final Office Action for Ex Parte ReExamination filed Dec. 11, 2007, for ReExamination of U.S. Patent No. 6,279,550—ReExamination No. 90/007,971.
Office Action dated Jul. 9, 1999, for co–pending U.S. Appl. No. 08/863,103.
Amendment & Response to Jul. 9, 1999 Office Action filed Aug. 9, 1999, for co–pending U.S. Appl. No. 08/863,103.
Supplement Amendment filed Aug. 17, 1999, for co–pending U.S. Appl. No. 08/863,103.
Office Action dated Sep. 8, 1999, for co–pending U.S. Appl. No. 08/863,103.
Response to Restriction Requirement and Third Preliminary Amendment filed Jan. 6, 2000, for co–pending U.S. Appl. No. 08/863,103.
Office Action dated Feb. 10, 2000, for co–pending U.S. Appl. No. 08/863,103.
First Amendment & Response to Feb. 10, 2000 Office Action filed Aug. 9, 2000, for co–pending U.S. Appl. No. 08/863,103.
Office Action dated Oct. 12, 2000, for co–pending U.S. Appl. No. 08/863,103.
Interview Summary dated Mar. 7, 2001, for co–pending U.S. Appl. No. 08/863,103.
Second Amendment & Response to Oct. 12, 2000 Office Action filed Mar. 12, 2001, for co–pending U.S. Appl. No. 08/863,103.
Office Action dated Jan. 18, 2001, for co–pending U.S. Appl. No. 09/632,739.
Response to Restriction Requirement dated Jan. 18, 2001 filed Feb. 28, 2001, for co–pending U.S. Appl. No. 09/632,739.
Office Action dated Apr. 2, 2001, for co–pending U.S. Appl. No. 09/632,739.
Amendment & Response to Apr. 2, 2001 Office Action filed Jul. 27, 2001, for co–pending U.S. Appl. No. 09/632,739.
Office Action dated Sep. 11, 2001, for co–pending U.S. Appl. No. 09/632,739.
Response to Restriction Requirement dated Sep. 11, 2001 filed Oct. 10, 2001, for co–pending U.S. Appl. No. 09/632,739.
Office Action dated Jun. 21, 2002, for co–pending U.S. Appl. No. 09/632,739.
Second Amendment & Response to Jun. 21, 2002 Office Action filed Oct. 21, 2002, for co–pending U.S. Appl. No. 09/632,739.
Advisory Action dated Oct. 23, 2002, for co–pending U.S. Appl. No. 09/632,739.
Supplemental Response to Second Amendment & Response (Fax Filed on Oct. 21, 2002) filed Oct. 28, 2002, for co–pending U.S. Appl. No. 09/632,739.
Office Action dated Nov. 5, 2002, for co–pending U.S. Appl. No. 09/632,739.
Supplemental Second Amendment & Response for RCE (Substitute for Un–entered Second Amendment & Response) filed Nov. 18, 2002, for co–pending U.S. Appl. No. 09/632,739.
Office Action dated Dec. 17, 2002, for co–pending U.S. Appl. No. 09/632,739.
Interview Summary dated Apr. 2, 2003, for co–pending U.S. Appl. No. 09/632,739.
Third Amendment & Response to Dec. 17, 2002 Office Action filed Apr. 14, 2003, for co–pending U.S. Appl. No. 09/632,739.
Amendment filed Sep. 29, 2003, for co–pending U.S. Appl. No. 09/632,739.
Preliminary Amendment Filed in Conjunction with RCE filed Aug. 24, 2004, for co–pending U.S. Appl. No. 09/632,739.
Office Action dated Aug. 29, 2005, for co–pending U.S. Appl. No. 09/632,739.
Response to Office Action dated Aug. 29, 2005 filed Nov. 18, 2005, for co–pending U.S. Appl. No. 09/632,739.
Requester's Comments Subsequent to Patent Owner's Response to Office Action filed Feb. 15, 2007, for co–pending U.S. Appl. No. 09/632,739.
Comments on Statement of Reasons for Allowance filed Jun. 12, 2007, for co–pending U.S. Appl. No. 09/632,739.
Notice of Intent to issue Ex Parte Reexamination Certificate dated Mar. 31, 2008, for ReExamination of U.S. Patent No. 6,279,550—ReExamination No. 90/007,971.
Request for Inter Partes Reexamination filed May 29, 2007, Reexamination application No. 95/000,265, of U.S. patent No. 7,222,614.
Heywood, "*Internal Combustion Engine Fundamentals*," International Edition, McGraw–Hill Book Co. (1988), 21 pages (including pp. 1, 7–11, 22, 162–164, 183–186, 248–250, 462, and 463).
Obert, Internal Combustion Engines and Air Pollution, (1973) 4 pages (including pp. 302–303).
Okamoto et al., "*Study on Miller Cycle Gas Engine for Co–generation Systems—Effect of Miller Cycle on the Performance of Gas Engine*," SAE Paper No. 960949, Feb. 26–29, 1996, 15 pages (including pp. 125–137).
Scott, "Quiet Swing–Beam Diesel Has Variable Compression Ratio," Automotive Engineering, Apr. 1977, vol. 85, No. 4, 4 pages (including pp. 10–12).
English language translation of FR 2 674 285.
English language translation of JP 04–136467.
Order Granting Request for Inter Partes Reexamination and Office Action in Inter Partes Reexamination, mailed Aug. 3, 2007, for Inter Partes Reexamination of U.S. Patent No. 7,222,614, Control No. 95/000,265, filed May 29, 2007 (43 pages).
Inter Partes Reexamination Communication date Sep. 25, 2007, Right of Appeal Notice (37 CFR 1.953); application No. 95/000,049, of U.S. patent No. 6,651,618.
Inter Partes Reexamination Communication date Sep. 28, 2007, Office Action in Inter Partes Reexamination; application No. 95/000,050/90/007,885, of U.S. patent No. 6,688,280.
Order Granting Ex Parte ReExamination of Control No. 90/007,971, Patent No. 6,279,550 dated Apr. 21, 2006.
Ansdale, R.F., "The Varimax Engine", Automobile Engineer, Sep. 1968, pp. 382–387.
Miller, R., "Nordberg Supairthermal Diesel, Duafuel and Gas Engines Operating on the Miller Supercharging System", Petroleum Division Conference, ASME, Sep. 1951.
Brinson, L., "High Performance Gas Burning Engines", Seventh International Congress on Combustion Engines, CIMAC, Apr. 1965, pp. 603–622.

Azouz, M.R. et al., "Digital Control of Engine Valve Timing", Military Techinical College, Egypt, Isata, 1987, pp. 193, 195–205.

D'Yachenko, V.G., "Internal Combustion Engines Operation Theory", Kiev, 1988.

"Valve Timing by Tensioner", Engineering Magazine, May 1986, pp. 343, 359.

Hutten, H., "Schnelle Motoren seziert und frisiert", Motorbuchverlag ISBN 3–87943–974–5, 1994, 2 pages.

Heywood, J., "Internal Combustion Engine Fundamentals", McGraw Hill International Editions, Automotive Technology Series, 1989, pp. 6–10.

Hilliard, J., and Springer, George S., "Fuel Economy in Road Vehicles Powered by Sparx Ignition Engines", 1988, pp. 182–187.

"Internal Combustion Engines", Moscow, 1990, pp. 12–23.

Khutziev, A.I., "Internal Combustion Engines with Controlled Compression Mode", Moscow, 1986, pp. 64–69, 102–103.

Lenin, I.M., "Theory of Automotive and Tractor Engines", Moscow, 1969, pp. 34–41, 52–65, 364–367.

Miller, R., "A Low Temperature Supercharging System for Compression, Pilot Oil and Spark Ignition Engines", ASME, paper No. 57–A–250, 1957, pp. 1–10.

"High Powered Medium Speed Engines", The Motor Ship, Jul. 1975, pp. 135–173.

"Two–stage Turbocharging for GMT's 8230 High Speed Engine", The Motor Ship. Sep. 1978, pp. 27–32, 67–68.

O'Flynn, G. et al., "Combustion Characteristics of an Otto–Atkinson Engine Using Late Inlet Valve Closing and Multi–Point Eletronic Fuel Injection", C389/041 IMechE, Paper No. 925107, 1992, pp. 329–338.

Petrov, A.K. et al., "Structural Design of Foreign Cars Produced at 1983", Annual Review, Part III, Automotive Engines, Moscow, 1983, pp. 3–19.

Rajikov, I. et al., "Automotive and Tractor Engines Structural Design", Moscow, 1986. pp. 18–27,104–107.

Rannev, A. V., "Internal Combustion Engines for Construction Site and Road–Building Engines", Moscow, 1986, pp. 10–17.

Boggs, D.L. et al., "The Otto–Atkinson Cycle Engine–Fuel Economy and Emissions Results and Hardware Design", SAE Technical Paper Series 950089, Feb. 27–Mar. 2, 1995, pp. 1–13.

Scott, D., "Variable Valve Timing Has Electronic Control", SAE Automotive Engineering, May 1984, pp. 86–87.

Kentfield, J., "Diesel Engines with Extended Expansion Strokes", SAE Technical Paper Series 891866, Sep. 11–14, 1989, pp. 1–10.

Herzog, P. et al., "NOx Reduction Strategies for DI Diesel Engines", SAE Technical Paper Series 920470, Feb. 24–28, 1992, pp. 1–17.

Durnholz, M. et al., "Exhaust–Gas Recirculation—A Measure to Reduce Exhaust Emissions of DI Diesel Engines", SAE Paper Technical Series 920725, Feb. 24–28, 1992.

Stebler, H. et al., "Reduction of NOx Emissions of D.I. Diesel Engines by Application of the Miller–System: An Experimental and Numerical Investigation", SAE Technical Paper Series 960844, Feb. 26–29, 1996, pp. 1–11.

Kamo, R. et al., "Emissions Comparisons of an Insulated Turbocharged Multi–Cylinder Miller Cycle Diesel Engine", SAE Techincal Paper Series 980888, Feb. 23–26, 1998, pp. 1–7.

Sapojhnikov, E.N., "International Combustion Engines", Klev, 1979, pp. 8–17.

Torazza, G., "A Variable Lift and Event Control Device for Piston Engine Valve Operation", pp. 59–68, Italy.

Wallace, W., and Lux, F., "A Variable Compression Ratio Engine Development", SAE Transactions, Paper No. 762A, Oct. 1963, pp. 680–707.

"Volvo D6A250 Supercharger—Med Hog Prestanda Redan Fran Start", Volvo, 1996.

Vzorov, B.A., and Mordukhovich, M.M., "Forcing of Tractor Engines", Moscow, 1974, pp. 24–31.

Stojek, D., and Stwiorok, A., "Valve Timing with Variable Overlap Control", XX Fisita Congress, SAE 845026, May 1984, pp. 2.8–2.14.

Nagumo, S., et al., "Study of Fuel Economy Improvement Through Control of Intake Valve Closing Timing", 1994, pp. 169–172.

Zhang, F. et al., "Study on Miller Cycle Gas Engine for Generation—A Verification of Miller Cycle Effect", JSAE Convention, May 1995, vol. 951, No. 5, pp. 277–280, Paper No. 9534621.

Nakajima, Y., et al., "Study of Improving Fuel Economy by Early Intake–Valve–Closing Concept", No. 24, 1982, pp. 19–26.

Sakono, T., et al., "Mazda 2.5/ Inline 4W–T Type Turbo Diesel Engine", Mazda Motor Corporation, Dec. 1995, vol. 34, No. 435, pp. 93–99.

Sasaki, Y., "Komatsu Turbo and Turbo Diesel Engine Two Stage Turbocharging for Small Highspeed Diesel Engine", Komatsu Ltd., Dec. 1984, vol. 23 No. 301, pp. 19–24.

Kouichi, H., et al., "Development of Miller Cycle Gasoline Engine—Miller Cycle Engine with Late Intake Valve Closing and Lysholm Compressor", May 1993, Paper No. 9302088, pp. 201–204.

Ichimaru, K., et al., "A High Expansion Ratio Gasoline Engine with Intake Control Rotary Valve Installation", Oct. 1992, Paper No. 924008, pp. 29–32.

Koichi, H., et al., "KJ–ZEM Type Miller Cycle DOHC/2254 cc", Serial No. 0005, pp. 118–163.

Suzuki, T., et al., "Application of a Miller System to a Diesel Engine", Nov. 1991, Paper No. 912183, pp. 2.13–2.16.

Zhang, F., et al., "Effect of Miller Cycle on Gas Engine for Generation", JSAE Spring Convention, Jan. 1996, vol. 27, No. 1, Paper No. 9630723, pp. 79–83.

Ichimaru, K., et al., "Computer Simulation of Miller Cycle Gasoline Engines", JSAE Spring Convention, May 1995, vol. 951, No. 5, Paper No. 9534612, pp. 273–276.

Heuser, F., "Von der Fakuitat fur Maschinenwesen der Rheinisch–Westfallschen Technischen Hochschule Aachen genehmigte Dissertation zur Eriangung des akademischen Grades eines", A Dissertation Submitted to the , Jul. 8, 1988, pp. 1–99.

Haas, A. et al., "Mesures Pour Reduire Les Emissions NOx Des Moteurs Pour Vehicules Utilitaires" Le Moteur Diesel: Evolution Et Mutations, SIA—Societe Des Ingenieurs De L'Automobile, Apr. 10–11, 1996, pp. 1–16.

Montagne, X. et al., "Analyse De La Sensibilite Aux Parametres Gazole D'Un Moteur Diesel D'Automobile A Injection Directe" Le Moteur Diesel: Evolutions Et Mutations, SIA—Societe Des Ingenieurs De L'Automobile, Apr. 10–11, 1996, pp. 1–16.

Herzog, P., "HSDI–Diesel–Euro III Technologies", Le Moteur Diesel: Evolution Et Mutations, SIA—Societe Des Ingenieurs De L'Automobile, Apr. 1996, pp. 1, 4, 8.

Feucht, H. et al., "Development Of The New Turbocharged 2.5l Four Valves Prechamber Diesel Engine For The Mercedes Benz Compact Class", Le Moteur Diesel: Evolution Et Mutations, SIA—Societe Des Ingenieurs De L'Automobile, Apr. 10–11, 1996, 15 pages.

Brun, R., "Science et technique du moteur diesel industriel et de transport", Institut Francais Du Petrole, 1981, 7 pages.

Briand, J., "Diesels marins description et fonctionnement" Masson, Paris, 1992, pp. 137–138.

"Moteurs Diesel", E.T. A.I., 1990, p. 330.

Foy, H., "Technologie Du Turbocompresseur", E.T.A.I., pp. 62, 65, 140.

Suzuki, T., et al, "Development of Diesel Combustion for Commercial Vehicles", Future Diesel Engines, Society of Automotive Engineers, Inc., SAE 972685, 1997, pp. 47–65.

Iwata, N., et al, "Improvement of anit–knocking performance by supercharged Miller–Cycle engine—RAM–Pulsation effects on anti–knocking performance by Miller–Cycle", Mazda Motor Corporation, May 1995, No. 9534603.

Haugen, D., "Performance And Combustion Effects Of Phased Late Intake Valve Closure On A Two Intake Valve Engine", A Thesis Submitted to the Faculty of the Graduate School of the University of Minnesota, Dec. 1995, pp. 1–84.

Boggs, D. et al., "A Small Displacement DI Diesel Engine Concept for High Fuel Economy Vehicles", Future Diesel Engines, Aug. 6–8, 1997, SAE SP–1287, SAE No. 972680, pp. 1–97.

Kesgin, Ugur, "Efficiency Improvement and NOx emission reduction potentials of two–stage turbocharged Miller cycle for stationary natural gas engines", International Journal of Energy Research, 2005, vol. 29, pp. 189–216.

Communications from European Patent Office dated Apr. 21, 2005 and Feb. 23, 2005 from EP Patent Application Nos. 04029382.1 and 04029382.1–2311 including Partial Search Report, Lack of Unity Opinion, and Annex to Search Report.

Office Action dated Feb. 17, 2006 for U.S. Appl. No. 10/733,570.

Reply to Office Action dated Feb. 22, 2006 for U.S. Appl. No. 10/933,300.

Office Action dated Apr. 7, 2006 for U.S. Appl. No. 10/992,069.

Office Action dated Mar. 16, 2006 for U.S. Appl. No. 10/992,070.

Office Action dated Mar. 15, 2006 for U.S. Appl. No. 10/992,071.

Office Action dated Mar. 29, 2006 for U.S. Appl. No. 10/992,074.

Office Action dated Mar. 17, 2006 for U.S. Appl. No. 10/992,137.

Reply to Office Action dated Apr. 20, 2006 for U.S. Appl. No. 10/992,198.

Office Action dated Apr. 12, 2006 for U.S. Appl. No. 10/992,857.

Office Action dated Mar. 29, 2006 for U.S. Appl. No. 10/992,866.

Office Action dated Apr. 18, 2006 for U.S. Appl. No. 10/992,897.

Office Action dated Apr. 18, 2006 for U.S. Appl. No. 10/993,065.

Reply to Office Action dated Feb. 22, 2006 for U.S. Appl. No. 11/105,943.

Office Action dated Feb. 8, 2006 for U.S. Appl. No. 90/007,885.

Reply to Office Action dated May 25, 2006 for U.S. Appl. No. 10/992,125.

Okamoto, Kazuhisa et al., "Development of a High–Performance Gas Engine Operating at a Stoichiometric Condition–Effect of Miller Cycle and EGR", CIMAC Congress 1998, pp. 1345–1360.

Okamoto, Kazuhisa et al., "Effect of EGR on The Late Intake–Valve Closing Miller Cycle for Natural Gas Engines", JSAE 983420 vol. 29, No. 2, Apr. 1998, pp. 17–22.

Clarke, Damien et al., "The Simulation, Implementation and Analysis of the Miller Cycle Using an Inlet Control Rotary Valve", SAE Technical Paper Series 970366, Feb. 24–27, 1997, pp. 61–70.

"Optimierung von Arbeits—und Brennverfahren fur grobere Dieselmotoren mit Common–Rail–Einspritzung", MTZ Motortechnische Zietschrift 61(2000) 4, pp. 248–257.

Okamoto, Kazuhisa et al., "Development of a Late Intake–Valve Closing (LIVC) Miller Cycle for Stationary Natural Gas Engines—Effect of EGR Utilization", SAE 972948, 1997, pp. 87–99.

Zhang, Fu–Rong et al., "Methods of Increasing the BMEP (Power Output) for Natural Gas Spark Ignition Engines", SAE 981385, May 4–6, 1998, pp. 11–19.

Zhang, Fu–Rong et al., "Improvement of BMEP for Natural Gas Fueled Spark Ignition Engines by Using Miller Cycle and EGR", JSAE 9834196 vol. 29, No. 2, Apr. 1998, pp. 11–16.

Nagumo, Shinichi et al., "Study of Fuel Economy Improvement through Control of Intake Valve Closing Timing: Cause of Combustion Deterioration and Improvement", JSAE 9439311, JSAE Review 16 (1995), pp. 13–19.

Akiyama, Mamoru et al., "An Elegant Solution for Vehicular Diesel's Emission and Economy—Hybrid EGR System", SAE 960842, pp. 1–5.

Roda, Franco, "Variable Valve Timing—A Means of Optimizing Tubrocharged Four–Stroke Diesel Engines", MTZ "Mototerchnische Zeitschrift" (Engine Technology Magazine) 49, 1988, pp. 303–308 (with non–verified Translation).

Sakai, Hiroshi et al., "A New Type of Miller Supercharging System for High–Speed Engines—Part 1 Fundamental Considerations and Application to Gasoline Engines", SAE 851522, Sep. 9–12, 1985, pp. 1–7.

Narusawa, Kazuyuki, "An EGR Control Method for Heavy–Duty Diesel Engines under Transient Operations", SAE Technical Paper Series 900444, Feb. 26–Mar. 2, 1990, pp. 1–14.

Gould, Larrie et al., "Electronic Valve Timing: The impact of electronic valve timing on engine 'breathing' produces performance capability radically different from any traditional internal combustion engine", SAE Automotive Engineering vol. 99, No. 4, Apr. 1991, pp. 19–24.

Wadman, Bruce W., "Tandem Turbocharging Delivers 250 BMEP Rating", Diesel and Gas Turbine Progress, Jul. 1967, vol. 23, No. 7, pp. 50–51.

Wadman, Bruce W., "Nordberg Centrifugal Gas Compressor Unit", Diesel and Gas Engine Progress, Apr. 1955, pp. 24–26.

Office Action dated Jul. 11, 2006 for U.S. Appl. No. 10/992,125.

Taylor, Charles Fayette, "The Internal–Combustion Engine in Theory & Practice: vol. 1:Thermodynamics, Fluid, Flow, Performance", Second Edition, Revised, 1985, pp. 8, 362, 392–394, 456–458, 489–491.

Taylor, Charles Fayette, "The Internal–Combustion Engine in Theory & Practice: vol. 2:Combustion, Fuels, Materials, Design", Revised Edition, 1985, pp. 7, 29–31, 71–72, 104, 117, 233–234, 367, 402–409, 422.

Internal Combustion Engines and Air Pollution; E.F. Obert; May 26, 1905.

Notas de prensa—Delphi Launches World's Most Advanced Common Rail Diesel System with Ford; Mar. 16, 2001.

Isuzu New Direct Injection Diesel Lineup; Oct. 19, 1999.

An Experimental Investigation of the Effects of Common Rail Injection Parameters on Emissions and Performance in a High Speed Direct Injection Small Bore Diesel Engine; Paul J. Tennision; Jun. 20, 1905.

Controlling Engine Load by Means of Late Intake—Valve Closing—SAE Technical Paper Series 800794; James H. Tuttle; Jun. 9, 1980.

Effect of Variable Engine Valve Timing on Fuel Economy—SAE Technical Paper Series 880390; T.H. Ma; Feb. 26, 1988.

European Search Report issued for EP patent application No. 04029382.1; Clyde C. Bryant; Apr. 21, 2005.

Documents Related to Reexamination No. 95/000,049—U.S. Patent No. 6,651,618; Coleman et al.

Documents Related to Reexamination No. 95/000,050—U.S. Patent No. 6,688,280; Weber et al.

Inter Partes Reexamination Communication, mailed Sep. 22, 2005, entitled "Action Closing Reexamination" in Reexamination application No. 95/000,049, of U.S. patent No. 6,651,618; Coleman et al.

Inter Partes Reexamination Communication, mailed Sep. 22, 2005, entitled "Action Closing Reexamination" in Reexamination application No. 95/000,050, of U.S. patent No. 6,688,280; Weber et al.

Inter Partes Reexamination Communication, mailed Oct. 24, 2005, entitled "Patent Owner's Response to Action Closing Prosecution" in Reexamination application No. 95/000,050, of U.S. patent No. 6,688,280; Weber et al.

Inter Partes Reexamination Communication, mailed Oct. 24, 2005, entitled "Patent Owner's Response to Action Closing Prosecution" in Reexamination application No. 95/000,049, of U.S. patent No. 6,651,618; Coleman et al.

Office Action Dated May 28, 2004, for pending U.S. Appl. No. 10/733,570; Amendment filed Nov. 24, 2004, for U.S. Appl. No. 10/733,570.

Office Action Dated Jun. 2, 2003, for U.S. Appl. No. 10/143,908; Reply to Office Action filed Sep. 2, 2003, for U.S. Appl. No. 10/143,908; Jun. 2, 2003.

Office Action Dated Jun. 2, 2003, for U.S. Appl. No. 10/370,852; Amendment Filed Jul. 10, 2003, for U.S. Appl. No. 10/370,852; Jun. 2, 2003.

Internal Combustion Engine Fundamentals—McGraw–Hill Book Co.; John B. Heywood.

The Miller Supergarging System for Diesel & Gas Engines Operationg Characteristics—Presented at the 4th Congress of the International Council on Combustion Engines; Ralph Miller & H.U. Lieberherr; Jun. 22, 1957.

3rd Party (Caterpillar Corporation) Claim Charts to claims of U.S. Appl. No. 10/996,695.

"Complaint for Declaratory Relief", *Caterpillar* vs. *Entec Engine Corp. and Clyde C. Bryant*, Dec. 21, 2005 (excluding exhibits).

"Supercharging and Internal Cooling Cycle for High Output", Oil and Gas Power Division proceedings of the National Conference, 1946, ASME 46–OGP–4, pp. 1–5; Miller, R.; 1946.

"Application of Several Variable Valve Timing Concepts to an LHR Engine", Journal of Engineering for Gas Turbines and Power, 1987, pp. 402–409, vol. 109, ASME 87–ICE–29; Morel, T. et al.; 1987.

"Variable Valve Timing Strategies for Optimum Engine Performance and Fuel Economy", Jan. 23–27, 1994, ASME 94–ICE–5, pp. 1–11; Assanis, D. and Bolton, B.; 1994.

"A 4–Stroke High Speed Diesel Engine with Two–Stage of Supercharging and Variable Compression Ratio", 13" International Congress on Combustion Engines, 1979, pp. D19–1–D19–22; Zapp, G. and Franca, T.; 1979.

"A Survey of Variable—Valve–Actuation Technology", SAE Technical Paper Series 891674, Aug. 7–10, 1989, pp. 1–27; Ahmad, T. and Theobald, M.; 1989.

"Computer Simulation of an Otto–Atkinson Cycle Engine with Variable Timing Multi–Intake Valves and Variable Compression Ratio", IMechE C53/88, 1988, pp. 273–277; Ma, T. and Rajabu, H.; 1988.

"Control Technology for Future Low Emissions Diesel Passenger Cars", C517/035/96, 12 pages; Porter, B. et al.

"Application of Variable Valve Timing To a Highly Turbo Charged Diesel Engine", C405/044, IMechE, 1990, pp. 189–195; Charlton, S. et al.; 1990.

"Developments for Direct Injection Diesel Engines", Mechanical Engineering Publications Limited, 1986, pp. 41–53; Ladommatos, N. and Stone, C.

"Variable Valve–Timing Unit Suitable for Internal Combustion Engines", vol. 186 23/72, pp. 301–306 and D103–D105; Roe, G.

"Reduction of Pumping Losses By the Use of a Variable Valve Timing System", IMechE 105/84, 1984, pp. 295–300; Payri, F. et al.

"A Continuously Variable Poppet Valve Actuator for Internal Combustion Engines", IMechE 82/86, 1986, pp. 157–1 95; Charlton, S.

"The Flexible Diesel Engine", SAE Technical Paper Series 900175; Feb. 26–Mar. 2, 1990, pp. 31–39 ; Thring, R.

"Insulated Miller Cycle Diesel Engine", SAE Technical Paper Series 961050, Feb. 26–29, 1996, pp. 1–9; Mavinahally, N. et al.

"Camless Engine", SAE Technical Paper Series 960581, Feb. 25–29, 1996, pp. 17–31; Schechter, M. and Levin, M.

"An Integrated, Full Authority, Electrohydraulic Engine Valve and Diesel Fuel Injection System", SAE Technical Paper Series 880602, Feb. 29–Mar. 4, 1988, pp. 1–10; Mardell, J. and Cross, R.

"A Review of Variable Engine Valve Timing", SAE Technical Series 880386, Feb. 29–Mar. 4, 1988, pp. 1–11; Gray, C.

"Perspectives on Applications of Variable Valve Timing", SAE Technical Series 910445, Feb. 25–Mar. 1, 1991, pp. 1–13; Asmus, T.

"Valve Timing and its Effect on the Performance of Medium–Speed Diesel Engines", 12th International Congress on Combustion Engines, 1977, pp. 1–41; Vormstein, W. and Pleimling, H.

"Pressure Compounding a Four Cycle Diesel Engine", SAE Technical Paper Series 851520, Sep. 9–12, 1985, pp. 1–15; Chute, R.

"A New Type of Miller Supercharging System for High Speed Engines Part 2—Realization of High BMEP Diesel Engines", SAE Technical Series 851523, Sep. 9–12, 1985, pp. 1–10; Ishizuki, et al.

"Parametric Investigation of Variable Valve Timing Applied to a Turbocharged Diesel Engine", SAE Technical Paper Series 910453, Feb. 25–Mar. 1, 1991, pp. 1–9; Leonard, H. et at.

"Design and Analysis of a Roller Follower Variable Valve Timing System", SAE Technical Paper Series 930824, Mar. 1–5, 1993, pp. 61–70; Leonard, H. et at.

"Variable Valve Timing for Diesel Compression Ratio Control", American Society of Mechanical Engineers, Internal Combustion Engine Division ICE, vol. 13, New Technology in Large Bore Engines, 1990, pp. 89–93; Bata, R. et at.

"The Miller System–a Possible Solution to Present Problems with Highly Charged Four—Stroke Engines", Brown Boveri Review, Apr. 1977, pp. 235–242, vol. 64, No. 4; Meier, E. and Baden.

"Optimum Breathing Strategies for Turbocharged Diesel Engines Based on the Miller Cycle Concept", American Society of Mechanical Engineers, Petroleum Division, Engineering Systems Design and Analysis, ASME, 1994, pp. 253–262, vol. 8: Part B "Internal–Combustion Engines,", IL; Bolton, B. and Assanis, D.

"Internal–Combustion Engines," The New Encyclopedia Britannica, 1987, pp. 474–485, Fifteenth edition, Chicago, Il.

"B230 Engines: Research and Experiments for Widening the Speed and Output Range and for Utilizing Alternative Fuels", Tech Paper 41336, 1983, pp. 703–728 "Camlobe Phasing May Be the Key to Controlling Emissions", Automotive Engineer, Jun./Jul. 1990, pp. 26–27; Drei, V.

"Camlobe Phasing May Be the Key to Controlling Emissions", Automotive Engineer, Jun./Jul. 1990, pp. 26–27.

"Two Stage Supercharging with Comprex", 14th International Congress on Combustion Engines, 1981, pp. D111–1–D111–15; Berchtold, M.

"Potential for Reducing Internal Engine Emissions in Modern Commercial Vehicle Diesel Engines", ACEA, Jul. 1–2, 1996, 28 pages; Frankle, G.

"A New Type of Miller Cycle Diesel Engine", JSAE Review, Apr. 1988, pp. 4–9; Sakai, H. et al.

"Development of V6 Miller Cycle Engine", JSAE Review 15 9434154, 1994, pp. 195–200; Choshi, M. et at.

"Relation between Inlet Valve Closing Angle and Volumetric Efficiency of a Four–Stroke Engine", Bulletin of JSME 621.43.05, 1969, pp. 894–901; Nagao, F. et al.

"Recent Advances in Variable Valve Timing", pp. 235–252; Ma, T.

"Effects of Intake–Valve Closing Timing on Spark–Ignition Engine Combustion", SAE Technical Paper Series 850074, Feb. 25–Mar. 1, 1985, pp. 1–10; Hara, S. et al.

"Variable Valve Actuation Mechanisms and the Potential for their Application", SAE Technical Paper Series 890673, Feb. 27–Mar. 3, 1989, pp. 1–18; Stone, R. and Kwan, E.

"Variable Cam Timing as an Emission Control Tool", ASE 700673, Aug. 24–27, 1970, pp. 1–16; Meacham, G.

"How Individual Valve Timing Events Affect Exhaust Emissions", ASE 710609, Jun. 7–11, 1971, pp. 1–17; Siewert, A.

"Valve Timing for Control of Oxides of Nitrogen (NO)", ASE 720121, Jan. 10–14, 1972, pp. 1–10; Freeman, M. and Nicholson, A.

"Design and Development of a Variable Valve Timing (VVT) Camshaft", ASE 740102, Feb. 25–Mar. 1, 1974, pp. 1–9; Schiele, C.

"Variable Displacement by Engine Valve Control", ASE Technical Paper Series 780145, Feb. 27–Mar. 3, 1978, pp. 1–12; Bates, B. et al.

"The Variable Stroke Engine—Problems and Promises", ASE Technical Paper Series 780700, Aug. 7–10, 1978, pp. 1–12; Siegla, D. and Siewert, R.

"The Otto–Atkinson Engine—A New Concept in Automotive Economy", SAE Technical–Paper Series, 820352, Feb. 22–26, 1982, pp. 1–8; Luria, D. et al.

"Controlling Engine Load by Means of Early Intake Valve Closing", SAE Technical Paper Series–820408, Feb. 22–26, 1982, pp. 1–17; Tuttle, J.

"Valve Events and Engine Operation", SAE Technical Paper Series 820749, Jun. 7–10, 1982,—pp. 1–14; Asmus, T.

"A Lost–Motion, Variable–Valve–Timing System for Automotive Piston–Engines", SAE Technical Paper Series 840335, Feb. 27–Mar. 2, 1984, pp. 1–15; Herrin, R. and Pozniak D.

"A Computer–Controlled Poppet–Valve Actuation System for Application on Research Engines", SAE Technical Paper Series 840340, Feb. 27–Mar. 2, 1984, pp. 1–9; Richman, A. and Reynolds, W.

"Development of a Variable Valve Timed Engine to Eliminate the Pumping Losses Associated with Throttled Operation", SAE Technical Paper Series 860537, Feb. 24–28, 1986, –pp. 1–8; Elrod, A., and Nelson, M.

"Continuous–Camlobe Phasing: An Advanced Valve–Timing Approach", SAE Technical Paper Series 870612, Feb. 23–27, 1987, pp. 1–10; Nelson, M. and Elrod, A.

"The Synthesis and Analysis of Variable–Valve–Timing Mechanisms for Internal–Combustion Engines", SAE Technical Paper Series 880387, Feb. 29–Mar. 4, 1988, pp. 1–10; Freudenstein F. et al.

"Variable Valve Timing—A Possibility to Control Engine Load without Throttle", SAE Technical Paper Series 880388, Feb. 29–Mar. 4, 1988, pp. 1–7; Lenz, H. et al.

"An Electronically Controlled Cam Phasing System", SAE Technical Paper Series 880391, Feb. 29–Mar. 4, 1988, pp. 1–7; Sapienza, S. et at.

"Variable Valve Timing for Fuel Economy Improvement—The Mitchell System", SAE Technical Paper Series 880392, Feb. 29–Mar. 4, 1988, pp. 1–9; Griffiths, P. and Mistry, K.

"Variable Valve Action (VVA) Through Variable Ratio Rocker Arms", SAE Technical Paper Series 880730, Feb. 29–Mar. 4, 1988, pp. 1–11; Entzminger, W.

"A Review and Classification of Variable Valve Timing Mechanisms", SAE Technical Paper Series 890674, Feb. 27–Mar. 3, 1989, pp. 1–14; Dresner, T. and Barkan, P.

"Variable Valve Closure Timing for Load Control and the Otto Atkinson Cycle Engine", SAE Technical Paper Series 890677, Feb. 27–Mar. 3, 1989, pp. 1–11; Saunders, R. and Abdul–Wahab, E.

"Initial Test Results of an Electro–Hydraulic Variable–Valve Actuation System on a Firing–Engine", SAE Technical Paper Series 890678, Feb. 27–Mar. 3, 1989, pp. 1–8; Lenz, H. et al.

"The New Camshaft Adjustment System by Mercedes–Benz—Design and Application in 4–Valve Engines", SAE Technical Paper Series 901727, Feb. 17–20, 1990, pp. 1–6; Grohn, M.

"Performance Evaluation of a Camless Engine Using Valve Actuators with Programmable Timing", SAE Technical Paper Series 910450, Feb. 25–Mar. 1, 1991, pp. 1–13; Gould, L. et al.

"Experimental Investigation on Extended Expansion Engine (EEE)", SAE Technical Paper Series 920452, Feb. 24–28, 1992, pp. 1–14; Nagesh, M. et al.

"Asymmetric Valve Strategies and Their Effect on Combustion", SAE Technical Paper Series 930821, Mar. 1–5, 1993, pp. 29–40; Wilson, N. et al.

"Development of a New Multi–Mode Variable Valve Timing Engine", SAE Technical Paper Series 930878, Mar. 1–5, 1993, pp. 137–143; Hatano, K. et al.

"Part Load Efficiency in Gasoline Engines", 1986, pp. 55–62, Mechanical Engineering Publications Limited, Suffolk, UK; Saunders, A. and Rabia, S.

"Variable Valve Timing for IC Engines", Automotive Engineer, pp. 54–58; Stone, C. and Kwan, E.

"Multi–input CAM–Actuated Mechanisms and their Application to IC Engine Variable Valve–Timing", A Dissertation Submitted to the Department of Mechanical Engineering and the Committee of Graduate Studies of Stanford University, Sep. 1988, No. 8906655, pp. 1–277; Dresner, T.

Office Action dated Jul. 28, 2005 for U.S. Appl. No. 10/773,570.

Office Action dated Aug. 22, 2005 for U.S. Appl. No. 10/933,300.

Office Action dated Aug. 22, 2005 for U.S. Appl. No. 11/105,943.

Office Action dated Nov. 25, 2005 for U.S. Appl. No. 10/992,125.

Office Action dated Nov. 23, 2005 for U.S. Appl. No. 10/992,198.

English Language JPO Abstract of JP Publication No. 0516415 Al, Apr. 27, 1993.

English Language JPO Abstract of JP Publication No. 2000145484 A, May 26, 2000.

English Language JPO Abstract of JP Publication No. 2000120457 A, Apr. 25, 2000.

Communication from European Patent Office dated May 18, 2005 from EP Patent Application No. 03006344.0–2311 including Partial Search Report, Lack of Unity Opinion, and Annex to Search Report; Caterpillar, Inc.

Request for Ex Parte Reexamination for U.S. Patent No. 6,688,280, filed Jan. 20, 2006, including Declaration of Dr. Joel Hiltner with each Exhibit referred to in the Declaration. See Reexamination 90/007,885, filed Jan. 20, 2006.

"A Miller System Application for Efficient Diesel Power Units," The American Chemical Society, 1986, pp. 355–360; Sakai, H. et al.

Engine Products, Variable Valve Actuation Devices, http://www.automotive.eaton.com/product/engine_controls/VVA.html, p. 1.

Study on Miller Cycle Gas Engine For Generation—A Verification of Miller Cycle Effect—Tokyo Gas Co., Ltd.—vol. No. 951, Issue No. 5, Year: 1995, pp. 277–280; Zhang et al.

Effect of Miller–Cycle on Gas Engine for Power Generation—Energy Technology Research Institute, Tokyo Gas Co., Ltd.—Proceedings of JSAE Spring Convention—vol. 27, No. 1, Jan. 1996—Article No. 0014; Zhang et al.

71. Computer Simulation of Miller Cycle Gasoline Engines—The University of Tokyo—Proceedings of JSAE Spring Convention, 951, 1995–pp. 273–276; Ichimaru et al.

Request for Ex Parte Reexamination of U.S. Patent No. 6,279,550, filed Mar. 13, 2006—Control No. 90/007,971.

Office Action dated Feb. 17, 2006 in U.S. Appl. No. 10/733,570.

Amendment dated Jan. 27, 2006 in U.S. Appl. No. 10/733,570.

Internal Combustion Engines, 2nd Edition, Analysis & Practice, pp. 142–144, 153 and 154; Figs. 5–12; Obert; 1950.

Information Disclosure Statement filed Mar. 17, 2006 in ReExam of U.S. Patent No. 6,651,618—Control No. 95/000,049.

Information Disclosure Statement filed Mar. 17, 2006 in ReExam of U.S. Patent No. 6,688,280—Control No. 95/000,050.

US 6,951,211 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–6 and 10–28 are cancelled.

Claims 7–9 are determined to be patentable as amended.

New claim 29 is added and determined to be patentable.

7. [The method of claim 5,] *A method of operating an internal combustion engine having a crankshaft driven by at least one piston moving through at least a compression stroke and an expansion stroke aided by combustion taking place within a cylinder, said method comprising the steps of*

*introducing air through a first port into a cylinder;*

*closing the first port at a point selected from the group consisting of a point prior to the beginning of the compression stroke and a point after the compression stroke has begun, thereby capturing a first, light air charge in the cylinder and thereby defining an effective compression ratio lower than or equal to the expansion ratio;*

*compressing air outside the cylinder;*

*cooling the compressed air outside the cylinder;*

*introducing the cooled, compressed air through a second port into the cylinder at some point after compression has begun;*

*expelling from the cylinder, during the compression stroke, at least a portion of any air in the cylinder;*

*after the expelling step, introducing the cooled, compressed air into the cylinder after compression has begun within the cylinder;*

*mixing the air charge with fuel; and*

*igniting the mixture near top dead center of the compression process,*

*wherein the second port is open only while the first port is closed, and* wherein the cylinder is devoid of air immediately before the cooled, compressed air is first introduced.

8. [The method of claim 5,] *A method of operating an internal combustion engine having a crankshaft driven by at least one piston moving through at least an intake stroke followed by a compression stroke, and an expansion stroke aided by combustion taking place within a cylinder, said method comprising the steps of*

*introducing air at a first pressure through a first port into a cylinder;*

*closing the first port at a point selected from the group consisting of a point prior to bottom dead center of the intake stroke and a point after the compression stroke has begun, thereby capturing a first, light air charge in the cylinder and thereby defining an effective compression ratio lower than the expansion ratio;*

*compressing air outside the cylinder;*

*cooling the compressed air outside the cylinder; and*

*introducing the cooled, compressed air at a second pressure through a second port into the cylinder at some point after compression has begun,*

*wherein the second port is open only while the first port is closed, and*

*the second pressure is greater than the first pressure;*

*expelling from the cylinder, during the compression stroke, at least a portion of any air in the cylinder;*

*after the expelling step, introducing the cooled, compressed air into the cylinder after compression has begun within the cylinder;*

*mixing the air charge with fuel; and*

*igniting the mixture near top dead center of the compression process;* wherein there is no appreciable pressure in the cylinder when the cooled, compressed air is first introduced.

9. [The method of claim 5,] *A method of operating an internal combustion engine having a crankshaft driven by at least one piston moving through at least an intake stroke followed by a compression stroke, and an expansion stroke aided by combustion taking place within a cylinder, said method comprising the steps of*

*introducing air at a first pressure through a first port into a cylinder;*

*closing the first port at a point selected from the group consisting of a point prior to bottom dead center of the intake stroke and a point after the compression stroke has begun, thereby capturing a first, light air charge in the cylinder and thereby defining an effective compression ratio lower than the expansion ratio;*

*compressing air outside the cylinder;*

*cooling the compressed air outside the cylinder; and*

*introducing the cooled, compressed air at a second pressure through a second port into the cylinder at some point after compression has begun,*

*wherein the second port is open only while the first port is closed, and*

*the second pressure is greater than the first pressure;*

*expelling from the cylinder, during the compression stroke, at least a portion of any air in the cylinder;*

*after the expelling step, introducing the cooled, compressed air into the cylinder after compression has begun within the cylinder;*

*mixing the air charge with fuel; and*

*igniting the mixture near top dead center of the compression process;* wherein the pressure in the cylinder is approximately ambient at the moment the cooled, compressed air is first introduced.

29. *A method of operating an internal combustion engine having a crankshaft driven by at least one piston moving through at least an intake stroke followed by a compression stroke, and an expansion stroke aided by combustion taking place within a cylinder, said method comprising the steps of*

*introducing air at a first pressure through a first port into a cylinder;*

*closing the first port at a point selected from the group consisting of a point prior to bottom dead center of the intake stroke and a point after the compression stroke*

*has begun, thereby capturing a first, light air charge in the cylinder and thereby defining an effective compression ratio lower than the expansion ratio;*

*compressing air outside the cylinder;*

*cooling the compressed air outside the cylinder; and*

*introducing the cooled, compressed air at a second pressure through a second port into the cylinder at some point after compression has begun,*

*wherein the second port is open only while the first port is closed, and*

*the second pressure is greater than the first pressure; and*

*wherein the cylinder is devoid of air immediately before the cooled, compressed air is introduced.*

\* \* \* \* \*